United States Patent
Lutnick et al.

(10) Patent No.: US 8,500,533 B2
(45) Date of Patent: Aug. 6, 2013

(54) GAME WITH CHANCE ELEMENT AND STRATEGY COMPONENT THAT CAN BE COPIED

(75) Inventors: Howard W. Lutnick, New York, NY (US); Dean P. Alderucci, New York, NY (US); Geoffrey M. Gelman, Brooklyn, NY (US); Kevin Burman, Hunters Hill (AU)

(73) Assignee: CFPH, LLC, New York, NY (US)

( * ) Notice: Subject to any disclaimer, the term of this patent is extended or adjusted under 35 U.S.C. 154(b) by 1472 days.

(21) Appl. No.: 11/846,696

(22) Filed: Aug. 29, 2007

(65) Prior Publication Data
US 2009/0061974 A1  Mar. 5, 2009

(51) Int. Cl.
*A63F 9/24* (2006.01)
(52) U.S. Cl.
USPC .............. 463/16; 463/20; 463/36; 463/42
(58) Field of Classification Search
USPC ............................... 463/16, 20, 36, 42
See application file for complete search history.

(56) References Cited

U.S. PATENT DOCUMENTS

| | | | |
|---|---|---|---|
| 4,446,424 A | 5/1984 | Chatanier et al. |
| 4,531,187 A | 7/1985 | Uhland |
| 4,540,174 A | 9/1985 | Coppock |
| 4,861,041 A | 8/1989 | Jones et al. |
| 5,098,107 A | 3/1992 | Boylan et al. |
| 5,314,194 A | 5/1994 | Wolf |
| 5,350,175 A | 9/1994 | DiLullo et al. |
| 5,374,061 A | 12/1994 | Albrecht |
| 5,390,934 A | 2/1995 | Grassa |
| 5,397,128 A | 3/1995 | Hesse et al. |
| 5,411,258 A | 5/1995 | Wilson et al. |
| 5,494,296 A | 2/1996 | Grassa |
| 5,575,474 A | 11/1996 | Rossides |
| 5,615,888 A | 4/1997 | Lofink et al. |
| 5,636,843 A | 6/1997 | Roberts |
| 5,673,917 A | 10/1997 | Vancura |
| 5,713,793 A | 2/1998 | Holte |
| 5,722,893 A | 3/1998 | Hill et al. |
| 5,728,002 A | 3/1998 | Hobert |
| 5,738,583 A | 4/1998 | Comas et al. |
| 5,749,785 A | 5/1998 | Rossides |
| 5,762,552 A | 6/1998 | Vuong et al. |
| 5,769,714 A | 6/1998 | Wiener et al. |
| 5,785,321 A | 7/1998 | Van Putten et al. |
| 5,788,574 A | 8/1998 | Ornstein et al. |
| 5,800,268 A | 9/1998 | Molnick |
| 5,806,846 A | 9/1998 | Lofink et al. |

(Continued)

FOREIGN PATENT DOCUMENTS

| | | |
|---|---|---|
| AU | 2004202895 | 1/2005 |
| CA | 2472735 | 1/2005 |

(Continued)

OTHER PUBLICATIONS

U.S. Appl. No. 11/467,078, filed Aug. 24, 2006, Lutnick et al.

(Continued)

*Primary Examiner* — Milap Shah
*Assistant Examiner* — Lawrence Galka
(74) *Attorney, Agent, or Firm* — Mark Miller

(57) ABSTRACT

In various embodiments, a first player may follow the same pattern of betting used by a second player.

16 Claims, 14 Drawing Sheets

U.S. PATENT DOCUMENTS

| | | | |
|---|---|---|---|
| 5,810,360 A | 9/1998 | Srichayaporn | |
| 5,826,976 A | 10/1998 | Skratulia | |
| 5,830,067 A * | 11/1998 | Graves et al. | 463/40 |
| 5,836,586 A | 11/1998 | Marks et al. | |
| 5,863,041 A | 1/1999 | Boylan et al. | |
| 5,868,392 A | 2/1999 | Kraft | |
| 5,999,808 A | 12/1999 | LaDue | |
| 6,024,643 A * | 2/2000 | Begis | 463/42 |
| 6,045,129 A | 4/2000 | Cooper et al. | |
| 6,062,565 A | 5/2000 | Chadband et al. | |
| 6,068,552 A | 5/2000 | Walker et al. | |
| 6,070,878 A | 6/2000 | Jones et al. | |
| 6,120,031 A | 9/2000 | Adams | |
| 6,126,166 A | 10/2000 | Lorson et al. | |
| 6,135,453 A | 10/2000 | Srichayaporn | |
| 6,146,272 A | 11/2000 | Walker et al. | |
| 6,158,741 A | 12/2000 | Koelling | |
| 6,165,069 A | 12/2000 | Sines et al. | |
| 6,177,905 B1 | 1/2001 | Welch | |
| 6,183,366 B1 | 2/2001 | Goldberg et al. | |
| 6,206,373 B1 | 3/2001 | Garrod | |
| 6,217,447 B1 | 4/2001 | Lofink et al. | |
| 6,227,969 B1 | 5/2001 | Yoseloff | |
| 6,270,404 B2 | 8/2001 | Sines et al. | |
| 6,285,987 B1 | 9/2001 | Roth et al. | |
| 6,299,533 B1 | 10/2001 | Parra et al. | |
| 6,309,307 B1 | 10/2001 | Krause et al. | |
| 6,325,716 B1 | 12/2001 | Walker et al. | |
| 6,341,305 B2 | 1/2002 | Wolfe | |
| 6,341,778 B1 | 1/2002 | Lee | |
| 6,358,150 B1 | 3/2002 | Mir et al. | |
| 6,503,145 B1 | 1/2003 | Webb | |
| 6,508,709 B1 | 1/2003 | Karmarkar | |
| 6,508,710 B1 | 1/2003 | Paravia et al. | |
| 6,517,073 B1 | 2/2003 | Vancura | |
| 6,520,856 B1 | 2/2003 | Walker et al. | |
| 6,523,829 B1 | 2/2003 | Walker et al. | |
| 6,530,835 B1 | 3/2003 | Walker et al. | |
| 6,533,662 B2 | 3/2003 | Soltys et al. | |
| 6,536,767 B1 | 3/2003 | Keller | |
| 6,540,230 B1 | 4/2003 | Walker et al. | |
| 6,540,609 B1 | 4/2003 | Paige | |
| 6,569,015 B1 | 5/2003 | Baerlocher et al. | |
| 6,571,279 B1 | 5/2003 | Herz et al. | |
| 6,575,465 B2 | 6/2003 | Lo | |
| 6,575,834 B1 | 6/2003 | Lindo | |
| 6,575,843 B2 | 6/2003 | McCabe | |
| 6,616,142 B2 | 9/2003 | Adams | |
| 6,625,578 B2 | 9/2003 | Spaur et al. | |
| 6,628,939 B2 | 9/2003 | Paulsen | |
| 6,648,762 B2 | 11/2003 | Walker et al. | |
| 6,679,497 B2 | 1/2004 | Walker et al. | |
| 6,692,003 B2 | 2/2004 | Potter et al. | |
| 6,692,360 B2 | 2/2004 | Kusuda et al. | |
| 6,695,700 B2 | 2/2004 | Walker et al. | |
| 6,712,702 B2 | 3/2004 | Goldberg et al. | |
| 6,733,387 B2 | 5/2004 | Walker et al. | |
| 6,769,986 B2 | 8/2004 | Vancura | |
| 6,789,800 B2 | 9/2004 | Webb | |
| 6,790,141 B2 | 9/2004 | Muir et al. | |
| 6,790,142 B2 | 9/2004 | Okada et al. | |
| 6,808,173 B2 | 10/2004 | Snow | |
| 6,811,488 B2 | 11/2004 | Paravia et al. | |
| 6,845,981 B1 | 1/2005 | Ko | |
| 6,846,238 B2 | 1/2005 | Wells | |
| 6,857,957 B2 | 2/2005 | Marks et al. | |
| 6,863,274 B2 | 3/2005 | Webb | |
| 6,877,745 B1 | 4/2005 | Walker et al. | |
| 6,896,618 B2 | 5/2005 | Benoy et al. | |
| 6,902,167 B2 | 6/2005 | Webb | |
| 6,912,398 B1 | 6/2005 | Domnitz | |
| 6,921,331 B2 | 7/2005 | Gatto et al. | |
| 6,923,446 B2 | 8/2005 | Snow | |
| 6,929,264 B2 | 8/2005 | Huard et al. | |
| 6,991,544 B2 | 1/2006 | Soltys et al. | |
| 7,000,921 B2 | 2/2006 | Schultz | |
| 7,029,009 B2 | 4/2006 | Grauzer et al. | |
| 7,055,822 B2 | 6/2006 | Lo | |
| 7,066,465 B2 | 6/2006 | Daines | |
| 7,201,654 B1 | 4/2007 | Jarvis et al. | |
| 7,229,354 B2 | 6/2007 | McNutt et al. | |
| 7,255,351 B2 | 8/2007 | Yoseloff et al. | |
| 7,264,546 B2 | 9/2007 | Marshall et al. | |
| 7,300,348 B2 | 11/2007 | Kaminkow et al. | |
| 7,311,600 B2 | 12/2007 | Sundstrom | |
| 7,311,605 B2 | 12/2007 | Moser | |
| 7,316,615 B2 | 1/2008 | Soltys et al. | |
| 7,316,916 B2 | 1/2008 | Takenaka et al. | |
| 7,344,136 B2 | 3/2008 | Schultz | |
| 7,379,886 B1 | 5/2008 | Zaring et al. | |
| 7,394,405 B2 | 7/2008 | Godden | |
| 7,534,169 B2 | 5/2009 | Amaitis et al. | |
| 7,585,217 B2 | 9/2009 | Lutnick et al. | |
| 7,637,810 B2 | 12/2009 | Amaitis et al. | |
| 7,658,673 B2 | 2/2010 | Baerlocher et al. | |
| 7,811,172 B2 | 10/2010 | Asher et al. | |
| 7,833,101 B2 | 11/2010 | Lutnick et al. | |
| 7,904,333 B1 | 3/2011 | Perkowski | |
| 7,997,973 B2 | 8/2011 | Lutnick et al. | |
| 8,070,582 B2 | 12/2011 | Lutnick et al. | |
| 8,142,283 B2 | 3/2012 | Lutnick et al. | |
| 2001/0007828 A1 | 7/2001 | Walker et al. | |
| 2001/0014619 A1 | 8/2001 | Kusuda | |
| 2001/0019965 A1 | 9/2001 | Ochi | |
| 2001/0024970 A1 | 9/2001 | McKee et al. | |
| 2001/0041609 A1 | 11/2001 | Oranges et al. | |
| 2002/0010023 A1 | 1/2002 | Kusuda et al. | |
| 2002/0013167 A1 | 1/2002 | Spaur et al. | |
| 2002/0013174 A1 | 1/2002 | Murata | |
| 2002/0019253 A1 | 2/2002 | Reitzen et al. | |
| 2002/0032049 A1 | 3/2002 | Walker et al. | |
| 2002/0072993 A1 | 6/2002 | Sandus et al. | |
| 2002/0077905 A1 | 6/2002 | Arndt et al. | |
| 2002/0082983 A1 | 6/2002 | Oshiba et al. | |
| 2002/0094869 A1 | 7/2002 | Harkham | |
| 2002/0098829 A1 | 7/2002 | Tendler | |
| 2002/0125639 A1 | 9/2002 | Wells | |
| 2002/0147042 A1 | 10/2002 | Vuong et al. | |
| 2002/0169019 A1 | 11/2002 | Walker et al. | |
| 2002/0196342 A1 | 12/2002 | Walker et al. | |
| 2002/0198044 A1 | 12/2002 | Walker et al. | |
| 2002/0198052 A1 | 12/2002 | Soltys et al. | |
| 2003/0003988 A1 | 1/2003 | Walker et al. | |
| 2003/0006931 A1 | 1/2003 | Mages | |
| 2003/0008662 A1 | 1/2003 | Stern et al. | |
| 2003/0032471 A1 | 2/2003 | Darder | |
| 2003/0040922 A1 | 2/2003 | Bodin | |
| 2003/0040944 A1 | 2/2003 | Hileman | |
| 2003/0046158 A1 | 3/2003 | Kratky | |
| 2003/0047871 A1 | 3/2003 | Vancura | |
| 2003/0050106 A1 | 3/2003 | Lyfoung | |
| 2003/0060276 A1 | 3/2003 | Walker et al. | |
| 2003/0064807 A1 | 4/2003 | Walker et al. | |
| 2003/0069054 A1 * | 4/2003 | D'Aurora et al. | 463/12 |
| 2003/0069058 A1 | 4/2003 | Byrne | |
| 2003/0073480 A1 | 4/2003 | Thomas et al. | |
| 2003/0090063 A1 | 5/2003 | Jarvis et al. | |
| 2003/0114217 A1 | 6/2003 | Walker et al. | |
| 2003/0119579 A1 | 6/2003 | Walker et al. | |
| 2003/0148812 A1 | 8/2003 | Paulsen et al. | |
| 2003/0157977 A1 | 8/2003 | Thomas et al. | |
| 2003/0187736 A1 | 10/2003 | Teague et al. | |
| 2003/0190941 A1 | 10/2003 | Byrne | |
| 2003/0216170 A1 | 11/2003 | Walker et al. | |
| 2003/0224852 A1 | 12/2003 | Walker et al. | |
| 2004/0002374 A1 | 1/2004 | Brown et al. | |
| 2004/0005918 A1 | 1/2004 | Walker et al. | |
| 2004/0015429 A1 | 1/2004 | Tighe et al. | |
| 2004/0043807 A1 | 3/2004 | Pennington | |
| 2004/0044567 A1 | 3/2004 | Willis | |
| 2004/0053664 A1 | 3/2004 | Byrne | |
| 2004/0068439 A1 | 4/2004 | Elgrably | |
| 2004/0106454 A1 | 6/2004 | Walker et al. | |
| 2004/0127277 A1 | 7/2004 | Walker et al. | |
| 2004/0143496 A1 | 7/2004 | Saenz | |
| 2004/0147308 A1 | 7/2004 | Walker et al. | |
| 2004/0148221 A1 | 7/2004 | Chu | |

| | | | | | | |
|---|---|---|---|---|---|---|
| 2004/0162144 A1 | 8/2004 | Loose et al. | 2007/0054739 A1 | 3/2007 | Amaitis et al. | |
| 2004/0176162 A1 | 9/2004 | Rothschild | 2007/0060099 A1 | 3/2007 | Ramer et al. | |
| 2004/0204026 A1 | 10/2004 | Steer et al. | 2007/0060305 A1 | 3/2007 | Amaitis et al. | |
| 2004/0204247 A1 | 10/2004 | Walker et al. | 2007/0060306 A1 | 3/2007 | Amaitis et al. | |
| 2004/0210507 A1 | 10/2004 | Asher et al. | 2007/0060355 A1 | 3/2007 | Amaitis et al. | |
| 2004/0219969 A1 | 11/2004 | Casey et al. | 2007/0060358 A1 | 3/2007 | Amaitis et al. | |
| 2004/0229671 A1 | 11/2004 | Stronach et al. | 2007/0060374 A1* | 3/2007 | Youm et al. | 463/42 |
| 2004/0235560 A1 | 11/2004 | Rossides | 2007/0073585 A1 | 3/2007 | Apple et al. | |
| 2004/0242332 A1 | 12/2004 | Walker et al. | 2007/0077981 A1 | 4/2007 | Hungate et al. | |
| 2004/0243519 A1 | 12/2004 | Perttila et al. | 2007/0078706 A1 | 4/2007 | Datta et al. | |
| 2004/0259621 A1 | 12/2004 | Pfeiffer et al. | 2007/0087834 A1 | 4/2007 | Moser et al. | |
| 2004/0264916 A1 | 12/2004 | Van De Sluis et al. | 2007/0088852 A1 | 4/2007 | Levkovitz | |
| 2005/0003878 A1 | 1/2005 | Updike | 2007/0093296 A1 | 4/2007 | Asher et al. | |
| 2005/0003886 A1 | 1/2005 | Englman et al. | 2007/0105613 A1 | 5/2007 | Adams et al. | |
| 2005/0003888 A1 | 1/2005 | Asher et al. | 2007/0190494 A1 | 8/2007 | Rosenberg | |
| 2005/0003893 A1 | 1/2005 | Hogwood et al. | 2007/0191090 A1 | 8/2007 | O'Halloran et al. | |
| 2005/0004842 A1 | 1/2005 | Mammen | 2007/0243928 A1 | 10/2007 | Iddings | |
| 2005/0023758 A1 | 2/2005 | Noyes | 2007/0259709 A1 | 11/2007 | Kelly et al. | |
| 2005/0043094 A1* | 2/2005 | Nguyen et al. | 463/42 | 2007/0270224 A1 | 11/2007 | Abbott |
| 2005/0064926 A1 | 3/2005 | Walker et al. | 2007/0299723 A1 | 12/2007 | Willis et al. | |
| 2005/0073102 A1 | 4/2005 | Yoseloff et al. | 2008/0005055 A1 | 1/2008 | Horvitz | |
| 2005/0075164 A1 | 4/2005 | Krynicky | 2008/0020848 A1* | 1/2008 | Muir et al. | 463/42 |
| 2005/0082756 A1 | 4/2005 | Duncan | 2008/0033640 A1 | 2/2008 | Amano | |
| 2005/0113161 A1 | 5/2005 | Walker et al. | 2008/0051171 A1 | 2/2008 | Lutnick et al. | |
| 2005/0144065 A1 | 6/2005 | Calabria et al. | 2008/0058048 A1 | 3/2008 | Lutnick et al. | |
| 2005/0151319 A1 | 7/2005 | Berman et al. | 2008/0058049 A1 | 3/2008 | Lutnick et al. | |
| 2005/0159212 A1 | 7/2005 | Romney et al. | 2008/0065481 A1 | 3/2008 | Immorlica et al. | |
| 2005/0170876 A1 | 8/2005 | Masci et al. | 2008/0070667 A1 | 3/2008 | Lutnick et al. | |
| 2005/0173863 A1 | 8/2005 | Walker et al. | 2008/0076505 A1 | 3/2008 | Nguyen et al. | |
| 2005/0194742 A1 | 9/2005 | Donaldson | 2008/0076512 A1 | 3/2008 | Aida | |
| 2005/0233794 A1 | 10/2005 | Cannon et al. | 2008/0076572 A1 | 3/2008 | Nguyen et al. | |
| 2005/0233803 A1 | 10/2005 | Yang | 2008/0085769 A1 | 4/2008 | Lutnick et al. | |
| 2005/0253334 A1 | 11/2005 | Friedman | 2008/0096628 A1 | 4/2008 | Czyzewski et al. | |
| 2005/0253338 A1 | 11/2005 | Daines | 2008/0102956 A1 | 5/2008 | Burman et al. | |
| 2005/0255919 A1 | 11/2005 | Nelson | 2008/0102957 A1 | 5/2008 | Burman et al. | |
| 2005/0275166 A1 | 12/2005 | Wirth | 2008/0113765 A1 | 5/2008 | DeWaal | |
| 2005/0282614 A1 | 12/2005 | Gauselmann | 2008/0139306 A1 | 6/2008 | Lutnick et al. | |
| 2006/0009283 A1 | 1/2006 | Englman et al. | 2008/0149705 A1 | 6/2008 | Giobbi et al. | |
| 2006/0019745 A1 | 1/2006 | Benbrahim | 2008/0154629 A1 | 6/2008 | Breed et al. | |
| 2006/0025192 A1 | 2/2006 | Walker et al. | 2008/0154673 A1 | 6/2008 | Connolly et al. | |
| 2006/0025206 A1 | 2/2006 | Walker et al. | 2008/0161101 A1 | 7/2008 | Lutnick et al. | |
| 2006/0025208 A1 | 2/2006 | Ramsey | 2008/0167106 A1 | 7/2008 | Lutnick et al. | |
| 2006/0035707 A1 | 2/2006 | Nguyen et al. | 2008/0172781 A1 | 7/2008 | Popowich et al. | |
| 2006/0035708 A1 | 2/2006 | Nguyen et al. | 2008/0191418 A1 | 8/2008 | Lutnick et al. | |
| 2006/0036449 A1 | 2/2006 | Araki et al. | 2008/0195312 A1 | 8/2008 | Aaron et al. | |
| 2006/0036495 A1 | 2/2006 | Aufricht et al. | 2008/0195478 A1 | 8/2008 | Yoon et al. | |
| 2006/0046816 A1 | 3/2006 | Walker et al. | 2008/0200251 A1 | 8/2008 | Alderucci et al. | |
| 2006/0046853 A1 | 3/2006 | Black | 2008/0214286 A1 | 9/2008 | Lutnick et al. | |
| 2006/0052148 A1 | 3/2006 | Blair et al. | 2008/0215415 A1 | 9/2008 | Willms | |
| 2006/0052156 A1 | 3/2006 | Yates et al. | 2008/0224399 A1 | 9/2008 | Schambelan | |
| 2006/0052168 A1 | 3/2006 | Shacham | 2008/0248849 A1 | 10/2008 | Lutnick et al. | |
| 2006/0063580 A1 | 3/2006 | Nguyen et al. | 2008/0254881 A1 | 10/2008 | Lutnick et al. | |
| 2006/0063587 A1 | 3/2006 | Manzo | 2008/0288350 A1 | 11/2008 | Iris et al. | |
| 2006/0073882 A1 | 4/2006 | Rozkin et al. | 2008/0311994 A1 | 12/2008 | Amaitis et al. | |
| 2006/0079321 A1 | 4/2006 | Walker et al. | 2009/0017913 A1 | 1/2009 | Bell et al. | |
| 2006/0082056 A1 | 4/2006 | Kane et al. | 2009/0018918 A1 | 1/2009 | Moneypenny et al. | |
| 2006/0111168 A1 | 5/2006 | Nguyen et al. | 2009/0024452 A1 | 1/2009 | Martinez et al. | |
| 2006/0111175 A1 | 5/2006 | Walker et al. | 2009/0029780 A1 | 1/2009 | Amaitis et al. | |
| 2006/0111178 A1 | 5/2006 | Gallaway et al. | 2009/0063463 A1 | 3/2009 | Turner et al. | |
| 2006/0131809 A1 | 6/2006 | Lancaster et al. | 2009/0070215 A1 | 3/2009 | Strzeletz | |
| 2006/0148551 A1 | 7/2006 | Walker et al. | 2009/0093300 A1 | 4/2009 | Lutnick et al. | |
| 2006/0160614 A1 | 7/2006 | Walker et al. | 2009/0098829 A1 | 4/2009 | Jensen | |
| 2006/0189382 A1 | 8/2006 | Muir et al. | 2009/0106085 A1 | 4/2009 | Raimbeault | |
| 2006/0211474 A1 | 9/2006 | Walker et al. | 2009/0131151 A1 | 5/2009 | Harris et al. | |
| 2006/0247037 A1 | 11/2006 | Park | 2009/0138460 A1 | 5/2009 | Gorti et al. | |
| 2006/0247039 A1 | 11/2006 | Lerner et al. | 2009/0157473 A1 | 6/2009 | Belz et al. | |
| 2006/0252482 A1 | 11/2006 | Walker et al. | 2009/0171748 A1 | 7/2009 | Aven et al. | |
| 2006/0252515 A1 | 11/2006 | Walker et al. | 2009/0179733 A1 | 7/2009 | Hattori et al. | |
| 2006/0252520 A1 | 11/2006 | Platis | 2009/0182677 A1 | 7/2009 | Otto et al. | |
| 2006/0252530 A1 | 11/2006 | Oberberger et al. | 2009/0198579 A1 | 8/2009 | Lewis et al. | |
| 2006/0253481 A1 | 11/2006 | Guido et al. | 2009/0215469 A1 | 8/2009 | Fisher et al. | |
| 2006/0264252 A1 | 11/2006 | White et al. | 2009/0216682 A1 | 8/2009 | Foladare et al. | |
| 2006/0287054 A1 | 12/2006 | Walker et al. | 2009/0265105 A1 | 10/2009 | Davis et al. | |
| 2006/0287075 A1* | 12/2006 | Walker et al. | 463/25 | 2009/0265431 A1 | 10/2009 | Jania et al. |
| 2007/0014252 A1 | 1/2007 | Chung et al. | 2009/0291732 A1 | 11/2009 | Lutnick et al. | |
| 2007/0015571 A1 | 1/2007 | Walker et al. | 2009/0327077 A1 | 12/2009 | Kim | |
| 2007/0021181 A1 | 1/2007 | Nelson et al. | 2010/0005520 A1 | 1/2010 | Abbot et al. | |
| 2007/0038516 A1 | 2/2007 | Apple et al. | 2010/0030643 A1 | 2/2010 | Sion | |
| 2007/0050243 A1 | 3/2007 | Kralik | 2010/0030646 A1 | 2/2010 | Riise et al. | |

| | | | |
|---|---|---|---|
| 2010/0036970 | A1 | 2/2010 | Sidi et al. |
| 2010/0048302 | A1 | 2/2010 | Lutnick et al. |
| 2010/0070171 | A1 | 3/2010 | Barbeau et al. |
| 2010/0076841 | A1 | 3/2010 | Rajpure et al. |
| 2010/0106603 | A1 | 4/2010 | Dey et al. |
| 2010/0124960 | A1 | 5/2010 | Lutnick et al. |
| 2010/0124967 | A1 | 5/2010 | Lutnick et al. |
| 2010/0124980 | A1 | 5/2010 | Acres |
| 2010/0125490 | A1 | 5/2010 | Kiciman et al. |
| 2010/0148442 | A1 | 6/2010 | Walker et al. |
| 2010/0161432 | A1 | 6/2010 | Kumanov et al. |
| 2010/0169153 | A1 | 7/2010 | Hwacinski et al. |
| 2010/0211431 | A1 | 8/2010 | Lutnick et al. |
| 2010/0223111 | A1 | 9/2010 | Maekawa |
| 2011/0034228 | A1 | 2/2011 | Lutnick et al. |
| 2011/0065490 | A1 | 3/2011 | Lutnick et al. |
| 2011/0130197 | A1 | 6/2011 | Bytnar et al. |
| 2011/0263310 | A1 | 10/2011 | Lutnick et al. |
| 2011/0275432 | A1 | 11/2011 | Lutnick et al. |
| 2011/0281627 | A1 | 11/2011 | Lutnick et al. |
| 2012/0052939 | A1 | 3/2012 | Lutnick et al. |

FOREIGN PATENT DOCUMENTS

| | | | |
|---|---|---|---|
| CA | 2656934 | | 2/2008 |
| EP | 1158821 | A1 | 11/2001 |
| GB | 2403429 | | 1/2005 |
| JP | 2002-109376 | | 4/2002 |
| JP | 2004-520089 | | 7/2004 |
| WO | WO 97/044105 | | 11/1997 |
| WO | WO 99/48308 | | 9/1999 |
| WO | WO 00/79467 | A2 | 12/2000 |
| WO | WO 02/13932 | | 2/2002 |
| WO | WO 02/060546 | | 8/2002 |
| WO | WO 2004/064258 | A2 | 7/2004 |
| WO | WO 2004/076011 | | 9/2004 |
| WO | WO 2005/102480 | | 11/2005 |
| WO | WO 2006/020413 | | 2/2006 |

OTHER PUBLICATIONS

U.S. Appl. No. 11/468,809, filed Aug. 31, 2006, Lutnick et al.
U.S. Appl. No. 11/470,250, filed Sep. 5, 2006, Lutnick et al.
U.S. Appl. No. 11/533,300, filed Sep. 19, 2006, Lutnick et al.
U.S. Appl. No. 11/618,426, filed Dec. 29, 2006, Lutnick et al.
U.S. Appl. No. 11/539,518, filed Oct. 6, 2006, Lutnick et al.
Notification of Transmittal of the International Search Report and the Written Opinion of the International Searching Authority for International Application No. PCT/US07/86661; 12 pages; May 12, 2008.
Webpage: "Dynamic In-Game Advertising", (http://www.wheii.com/2005_05_01_archive.php), download date: Dec. 11, 2006.
Webpage: "Meet Steven Spielberg, hardboiled cynic", (http://diLsalon.com/story/entimovies/review12002/06121Iminority_report/index. html), download date: Dec. 11, 2006.
USPTO Office Action for U.S. Appl. No. 11/618,426, Jul. 24, 2008 (6 pages).
Susan Chaityn Lebovits, "Free-Play Site Draws Card Players After Crackdown," Boston Globe, Boston, MA, p. E1, Nov. 5, 2007.
U.S. Appl. No. 11/674,232, filed Feb. 13, 2007, Lutnick et al.
U.S. Appl. No. 11/680,764, filed Mar. 1, 2007, Lutnick et al.
U.S. Appl. No. 11/733,902, filed Apr. 11, 2007, Lutnick et al.
U.S. Appl. No. 11/697,024, filed Apr. 5, 2007, Lutnick et al.
U.S. Appl. No. 11/868,013, filed Oct. 5, 2007, Lutnick et al.
U.S. Appl. No. 12/194,593, filed Aug. 20, 2008, Lutnick et al.
U.S. Appl. No. 11/553,130, filed Oct. 26, 2006, Burman et al.
U.S. Appl. No. 11/553,142, filed Oct. 26, 2006, Burman et al.
"William Hill Steps Up Mobile Betting for Closer Targeting," Precision Marketing, London, p. 6, Dec. 19, 2003.
"Ladbrokes Uses Mobile Ads to Push Grand National Betting," (mobile advertising) (brief article), New Media Age, p. 4, Apr. 3, 2008.
"Mobile Lotteries an Odds-On Favourite," Precision Marketing, London, p. 12, Jan. 9, 2004.
"Gambling Revolution Held Back by Red Tape," Precision Marketing, London, p. 11, Sep. 19, 2003.
U.S. Appl. No. 12/197,809, filed Aug. 25, 2008, Amaitis et al.
U.S. Appl. No. 12/247,623, filed Oct. 8, 2008, Amaitis et al.

U.S. Appl. No. 11/199,831, filed Aug. 9, 2005, Amaitis et al.
U.S. Appl. No. 11/199,835, filed Aug. 9, 2005, Amaitis et al.
U.S. Appl. No. 11/201,812, filed Aug. 10, 2005, Amaitis et al.
U.S. Appl. No. 11/210,482, filed Aug. 24, 2005, Amaitis et al.
U.S. Appl. No. 11/199,964, filed Aug. 9, 2005, Amaitis et al.
U.S. Appl. No. 11/256,568, filed Oct. 21, 2005, Asher et al.
U.S. Appl. No. 11/567,322, filed Dec. 6, 2006, Lutnick et al.
U.S. Appl. No. 11/621,369, filed Jan. 9, 2007, Lutnick et al.
U.S. Appl. No. 12/147,005, filed Jun. 26, 2008, Lutnick et al.
USPTO Office Action for U.S. Appl. No. 11/680,764, filed Aug. 31, 2009 (10 pages).
USPTO Office Action for U.S. Appl. No. 11/567,322, filed Sep. 16, 2009 (9 pages).
USPTO Office Action for U.S. Appl. No. 11/621,369, filed Sep. 29, 2009 (11 pages).
"Bill Gates' Goldrush—Rowanlea Report", (http://www.rowanlea.com/report/2/historyofbgates.html), download date: Dec. 28, 2006.
"The Don't Pass Bet", Craps-Info.Net, (http://www.craps-info.net/the_dont_pass_bet.html), download date: Aug. 28, 2006.
"New Side Bet May Assist Gaming Industry in Search of a Booster Shot for Table Games", Hotel-OnLine.com, (http://www.hotel-online.com/News/PressReleases1998_3rd/Sept98_Streak.html), download date: Dec. 28, 2006.
Smith, Rod, "Ironically, Lawsuit Filed Against Some Nevada Casinos for Card Counting; Computerized Card Counting System Boosts the House's Odds of Winning at Blackjack", Hotel Online, Oct. 19, 2004.
"Card Counting", (http://www.homepokergames.com/cardcounting.php), download date: Sep. 7, 2006.
"The Vegas Guy—Dodge City Saloon" (http: www.joebobbriggs.com/vegasguy/vg20020910.html), download date: Sep. 7, 2006.
"Who's Holding the Aces Now?", (http://www.wired.com/news/games/0,2101,60049,00.html), Sep. 7, 2006.
"Top Rated Online Casinos—Find the Best Casinos on the Net—Gambling-Win.com," (http://www.gambling-win.com/most-popular-casinos.html), download date: Dec. 4, 2007.
"My Multimonitor Setup: Three Screens for One Computer," (http://daggle.com/060223-231233.html), download date: Dec. 4, 2007.
"E Ink Corporation—Technology—Electronic Paper Displays," (http://www.eink.com/technology/), download date: Dec. 4, 2007.
U.S. Appl. No. 12/512,730, filed Jul. 30, 2009, Lutnick et al.
USPTO Notice of Allowance for U.S. Appl. No. 11/470,250, Jul. 24, 2009 (4 pages).
USPTO Office Action for U.S. Appl. No. 11/618,426, Apr. 14, 2009 (8 pages).
Notification Concerning Transmittal of International Preliminary Report on Patentability and Written Opinion for International Application No. PCT/US07/76298; 7 pages; Mar. 5, 2009.
Notification of Transmittal of the International Search Report and the Written Opinion of the International Searching Authority for International Application No. PCT/US07/77021; 10 pages; Apr. 14, 2008.
Notification of Transmittal of the International Search Report and the Written Opinion of the International Searching Authority for International Application No. PCT/US08/74220; 14 pages; Nov. 17, 2008.
U.S. Appl. No. 12/693,668, filed Jan. 26, 2010, Lutnick et al.
U.S. Appl. No. 12/693,524, filed Jan. 26, 2010, Lutnick et al.
USPTO Office Action for U.S. Appl. No. 11/733,902, filed May 6, 2010 (6 pages).
USPTO Office Action for U.S. Appl. No. 12/512,730, filed Jul. 20, 2010 (6 pages).
USPTO Office Action for U.S. Appl. No. 11/567,322, filed Apr. 30, 2009 (7 pages).
USPTO Office Action for U.S. Appl. No. 11/567,322, filed Mar. 29, 2010 (14 pages).
USPTO Examiner Interview Summary for U.S. Appl. No. 11/567,322, filed Jul. 23, 2010 (3 pages).
USPTO Office Action for U.S. Appl. No. 11/621,369, filed Apr. 27, 2010 (6 pages).
USPTO Office Action for U.S. Appl. No. 11/680,764, filed Mar. 24, 2010 (19 pages).
Australian Examiner's Report for Application No. 2008201004, dated Aug. 21, 2009 (5 pages).

Australian Examiner's Report for Application No. 2007286884, dated Jul. 12, 2010 (3 pages).
Australian Examiner's Report for Application No. 2009201702, dated Jul. 15, 2010 (2 pages).
Australian Examiner's Report for Application No. 2007329314, dated Jul. 22, 2010 (3 pages).
Australian Examiner's Report for Application No. 2009201701, dated Jul. 23, 2010 (2 pages).
Players Rating System, Il Dado at: http://web.archive.org/web/20040228122341/http://www.ildado.com/players_rating_system.html, dated: Feb. 28, 2004 (2 pages).
U.S. Appl. No. 12/759,757, filed Apr. 14, 2010, Inventors: Howard W. Lutnick, et al. For "Game of Chance Systems and Methods" (443 pages).
International Preliminary Report on Patentability for International Application No. PCT/US07/86661, dated Jun. 10, 2009 (9 pages).
Notification of Transmittal or Search Report and Written Opinion of the ISA, or the Declaration for International Application No. PCT/US08/55209, dated Jul. 31, 2008 (8 pages).
International Preliminary Report on Patentability for International Application No. PCT/US08/55209, dated Sep. 1, 2009 (6 pages).
Notification of Transmittal or Search Report and Written Opinion of the ISA, or the Declaration for International Application No. PCT/US07/76298, dated Sep. 17, 2008 (8 pages).
International Preliminary Report on Patentability for International Application No. PCT/US07/76298, dated Feb. 24, 2009 (6 pages).
International Preliminary Report on Patentability for International Application No. PCT/US08/74220, dated Mar. 2, 2010 (10 pages).
USPTO Office Action for U.S. Appl. No. 11/468,809, filed Aug. 17, 2010 (7 pages).
USPTO Office Action for U.S. Appl. No. 11/567,322, filed Aug. 12, 2010 (13 pages).
USPTO Office Action for U.S. Appl. No. 11/539,518, filed Aug. 20, 2010 (8 pages).
USPTO Office Action for U.S. Appl. No. 11/533,300, filed Aug. 20, 2010 (7 pages).
U.S. Appl. No. 11/675,182, filed Feb. 15, 2007, Alderucci et al.
PCT Search Report and Written Opinion for International Application No. PCT/US08/54128, Sep. 10, 2008 (12 pages).
USPTO Office Action for U.S. Appl. No. 11/675,182, filed May 21, 2009 (6 pages).
USPTO Office Action for U.S. Appl. No. 11/675,182, filed Sep. 4, 2009 (8 pages).
USPTO Office Action for U.S. Appl. No. 11/675,182, filed Apr. 13, 2010 (12 pages).
International Preliminary Report on Patentability for International Application No. PCT/US08/54128, Aug. 19, 2009 (6 pages).
Australian Examination Report for Application No. 2008216057, Jun. 28, 2010 (2 pages).
Michael Friedman, Bet on Poker? Bodog takes bets on the 2005 WSOP, dated Jun. 24, 2005, http://www.pokernews.com/news/2005/06/bet-on-poker-bodog-wsop.htm.
USPTO Pre-Brief Appeal Conference Decision for U.S. Appl. No. 11/680,764, filed Sep. 27, 2010 (2 pages).
USPTO Office Action for U.S. Appl. No. 11/733,902, filed Oct. 6, 2010 (13 pages).
U.S. Appl. No. 12/897,954, filed Oct. 5, 2010, Inventor: Howard W. Lutnick for "Secondary Game" (126 pages).
USPTO Office Action for U.S. Appl. No. 11/618,426, filed dated Feb. 1, 2011 (10 pages).
USPTO Office Action for U.S. Appl. No. 11/468,809, filed Apr. 27, 2011 (12 pages).
USPTO Notice of Allowance and Fees Due for U.S. Appl. No. 12/512,730, filed Apr. 8, 2011 (6 pages).
USPTO Office Action for U.S. Appl. No. 11/533,300, filed May 10, 2011 (5 pages).
USPTO Office Action for U.S. Appl. No. 11/539,518, filed May 11, 2011 (5 pages).
USPTO Office Action for U.S. Appl. No. 11/567,322, filed May 31, 2011 (32 pages).
USPTO Office Action for U.S. Appl. No. 11/674,232, filed Jun. 7, 2011 (8 pages).
USPTO Office Action for U.S. Appl. No. 12/147,005, filed Apr. 20, 2011 (8 pages).
USPTO Office Action for U.S. Appl. No. 11/697,024, filed Apr. 11, 2011 (6 pages).
USPTO Examiner's Answer to Appeal Brief for U.S. Appl. No. 11/675,182, filed Jun. 23, 2011 (17 pages).
USPTO Office Action for U.S. Appl. No. 11/470,250, filed Dec. 5, 2008 (5 pages).
USPTO Office Action for U.S. Appl. No. 12/693,668, filed Jul. 14, 2011 (6 pages).
USPTO Office Action for U.S. Appl. No. 11/621,369, filed Jul. 20, 2011 (8 pages).
USPTO Notice of Allowance and Fees Due and Examiner Interview Summary for U.S. Appl. No. 11/680,764, filed Jul. 25, 2011 (12 pages).
U.S. Appl. No. 12/962,828, filed Dec. 8, 2010, Lutnick et al.
USPTO Office Action for U.S. Appl. No. 11/621,369, filed Nov. 10, 2010 (16 pages).
USPTO Office Action for U.S. Appl. No. 11/674,232, filed Oct. 28, 2010 (6 pages).
USPTO Office Action for U.S. Appl. No. 11/680,764, filed Dec. 7, 2010 (22 pages).
USPTO Pre-Brief Appeal Conference Decision for U.S. Appl. No. 11/675,182, filed Nov. 10, 2010 (2 pages).
USPTO Pre-Brief Appeal Conference Decision for U.S. Appl. No. 11/618,426, filed dated Oct. 3, 2011 (2 pages).
USPTO Pre-Brief Appeal Conference Decision for U.S. Appl. No. 11/680,764, filed Aug. 5, 2011 (2 pages).
USPTO Office Action for U.S. Appl. No. 11/733,902, filed Sep. 7, 2011 (16 pages).
USPTO Notice of Allowance and Fees Due for U.S. Appl. No. 12/194,593, filed Oct. 19, 2011 (9 pages).
Australian Notice of Acceptance for Application No. 2008216057, Aug. 5, 2011 (3 pages).
EPO Communication and Supplementary European Search Report for Application No. 07854996.1, dated Oct. 7, 2011 (7 pages).
Canadian Examiner's Report for Application No. 2653330, dated Sep. 27, 2011 (3 pages).
USPTO Pre-Brief Appeal Conference Decision for U.S. Appl. No. 11/468,809, filed Jan. 13, 2012 (2 pages).
USPTO Office Action for U.S. Appl. No. 12/147,005, filed Nov. 17, 2011 (110 pages).
USPTO Office Action for U.S. Appl. No. 11/697,024, filed Jan. 6, 2012 (12 pages).
USPTO Office Action for U.S. Appl. No. 11/868,013, filed Dec. 22, 2011 (7 pages).
USPTO Office Action for U.S. Appl. No. 12/759,757, filed Nov. 16, 2011 (7 pages).
Canadian Examiner's Report for Application No. 2656934, dated Oct. 17, 2011 (3 pages).
Australian Examination Report for Application No. 2007329314, Nov. 23, 2011 (2 pages).
Australian Notice of Acceptance for Application No. 2007329314, Jan. 5, 2012 (3 pages).
Australian Examiner's Report for Application No. 2009201702, dated Dec. 1, 2011 (4 pages).
Australian Examiner's Report for Application No. 2007286884, dated Nov. 7, 2011 (2 pages).
European Communication and Search Report for Application No. 07841094.1, dated Sep. 22, 2011 (8 pages).
Canadian Examiner's Report for Application No. 2623765, dated Oct. 17, 2011 (7 pages).
USPTO Office Action for U.S. Appl. No. 11/468,809, filed Jan. 27, 2012 (9 pages).
USPTO Office Action for U.S. Appl. No. 12/693,668, filed Jan. 27, 2012 (9 pages).
Australian Examiner's Report for Application No. 2009201701, dated Nov. 17, 2011 (3 pages).
USPTO Notice of Allowance and Fees Due for U.S. Appl. No. 11/674,232, filed Feb. 27, 2012 (11 pages).
USPTO Office Action for U.S. Appl. No. 12/897,954, filed Feb. 15, 2012 (11 pages).

USPTO Office Action for U.S. Appl. No. 11/618,426, filed Mar. 2, 2012 (11 pages).
Australian Examiner's Report for Application No. 2007286884, dated Mar. 8, 2012 (2 pages).
Australian Examiner's Report for Application No. 2009201701, dated Mar. 14, 2012 (3 pages).
USPTO Office Action for U.S. Appl. No. 11/539,518, filed Dec. 8, 2011 (2 pages).
USPTO Office Action for U.S. Appl. No. 12/147,005, filed Jun. 21, 2012 (124 pages).
USPTO Pre-Brief Appeal Conference Decision for U.S. Appl. No. 11/733,902, filed May 23, 2012 (2 pages).
USPTO Notice of Allowance and Fees Due for U.S. Appl. No. 11/468,809, filed Sep. 14, 2012 (9 pages).
USPTO Office Action for U.S. Appl. No. 13/177,901, filed Aug. 27, 2012 (7 pages).
USPTO Office Action for U.S. Appl. No. 11/533,300, filed Jul. 27, 2012 (9 pages).
USPTO Office Action for U.S. Appl. No. 11/533,300, filed Oct. 12, 2012 (10 pages).
USPTO Notice of Allowance for U.S. Appl. No. 12/693,668, filed Aug. 7, 2012 (8 pages).
USPTO Notice of Allowance for U.S. Appl. No. 11/539,518, filed Jul. 20, 2012 (9 pages).
USPTO Notice of Allowance and Fees Due for U.S. Appl. No. 11/618,426, filed Sep. 17, 2012 (9 pages).
USPTO Notice of Allowance and Fees Due for U.S. Appl. No. 11/697,024, filed Sep. 17, 2012 (9 pages).
USPTO Office Action for U.S. Appl. No. 11/733,902, filed Oct. 11, 2012 (14 pages).
USPTO Office Action for U.S. Appl. No. 11/846,696, filed Oct. 11, 2012 (11 pages).
USPTO Office Action for U.S. Appl. No. 12/759,757, filed Aug. 6, 2012 (8 pages).
USPTO Office Action for U.S. Appl. No. 12/759,757, filed Aug. 31, 2012 (3 pages).
Australian Examiner's Report for Application No. 2011250845, dated Sep. 13, 2012 (3 pages).
Canadian Examiner's Report for Application No. 2678362, dated Sep. 10, 2012 (3 pages).
USPTO Office Action for U.S. Appl. No. 12/962,828, filed Nov. 15, 2012 (8 pages).
USPTO Final Office Action for U.S. Appl. No. 12/897,954, filed Oct. 25, 2012 (7 pages).
USPTO Notice of Allowance for U.S. Appl. No. 12/693,524, filed Nov. 19, 2012 (29 pages).
USPTO Notice of Allowance for U.S. Appl. No. 12/693,668, filed Nov. 26, 2012 (5 pages).
Japan Office Action for Application No. 2009-540479, dated Nov. 14, 2012 (6 pages).
Australian Examiner's Report for Application No. 2012202130, dated Nov. 15, 2012 (4 pages).
Canadian Examiner's Report for Application No. 2653330, dated Jun. 20, 2012 (5 pages).
USPTO Notice of Allowance for U.S. Appl. No. 11/468,809, filed Dec. 28, 2012; 9 pages.
USPTO Office Communication for U.S. Appl. No. 12/693,668, filed Jan. 9, 2013; 5 pages.
USPTO Notice of Allowance for U.S. Appl. No. 11/697,024, filed Jan. 4, 2013; 9 pages.
Australian Notice of Acceptance for Appl No. 2011250845, dated Dec. 13, 2012; 5 pages.
USPTO Office Action for U.S. Appl. No. 11/868,013, filed Jan. 9, 2013; 17 pages.
USPTO Notice of Allowance and Fees Due for U.S. Appl. No. 11/618,426, filed Feb. 6, 2013 (8 pages).
USPTO Office Action for U.S. Appl. No. 13/290,346, Mar. 6, 2013; 9 pages.
JP Office Action for Application No. 2009-525712, Feb. 8, 2013; 15 pages.
USPTO Notice of Allowance and Fees Due for U.S. Appl. No. 12/693,524; Mar. 7, 2013 (5 pages).

\* cited by examiner

Database Entry for a Primary Player 700

Player Identifier: P234567 — 705

Player Name: Sam Hunter — 710

| Game Identifier | Date | Time | Amount Bet | Amount Won | Profits, Trailing 100 Games |
|---|---|---|---|---|---|
| G11112222 | 8/7/2011 | 7:21:03 AM | $1 | $0 | $40 |
| G11112297 | 8/7/2011 | 7:21:09 AM | $1 | $0 | $39 |
| G11112350 | 8/7/2011 | 7:21:16 AM | $1 | $4 | $42 |
| G11112412 | 8/7/2011 | 7:21:21 AM | $2 | $0 | $40 |
| G11112490 | 8/7/2011 | 7:21:27 AM | $1 | $0 | $39 |
| G11112545 | 8/7/2011 | 7:21:37 AM | $1 | $0 | $38 |
| G11112610 | 8/7/2011 | 7:21:44 AM | $3 | $30 | $65 |
| G11112699 | 8/7/2011 | 7:21:52 AM | $1 | $0 | $64 |
| G11112770 | 8/7/2011 | 7:22:00 AM | $1 | $1 | $64 |

Betting Interface for a Secondary Player 800

| Your Favorite Primary Players | Announcements |
|---|---|
| Megan Joyce    Arnold Green<br>Slot Stomper    Samantha Chee<br>Norman Crawford    Poker Pirate | Robert Clements has just begun play.<br>The Secondary Player progressive has reached $15,000!! |

| Available Primary Players | Game | Minimum Bet to Participate | Consecutive Games Won | Options |
|---|---|---|---|---|
| Robert Clemens | Video Poker | $0.25 | 0 | *Select* |
| Sue Baker | Fruit Slots | $1.00 | 1 | *Close* |
| TeeBone | Table Blackjack | $5.00 | 3 | *Close* |

Primary Player: TeeBone
His Bet: $25

Player Hand    Dealer Hand

J♦

3♠    2♥

Your Bet: $5

Status: In Progress    *Close Game*

Primary Player: Sue Baker
She won: $6

BAR

You won: $6

Status: Open for Bets    *Close Game*

Credits: 156

Order Drinks

Lock Game

| Bet 25¢ | Bet $1 | Bet $5 | Repeat Last Bet | Auto Bet | Cash Out |

| TIME 1020 | GAMING MACHINE 1030 | AMOUNT BET 1040 | OUTCOME 1050 | AMOUNT WON 1060 |
|---|---|---|---|---|
| 1:10:45PM | PIRATE GOLD | $1 | Gld-Gld-Skull | $5 |
| 1:10:47PM | RED JOKERS | $0.25 | AsJdKsQsAh | $0 |
| 1:10:56PM | DIAMONDVILLE | $0.75 | Coal-Ruby-Diamnd | $0 |
| 1:11:00PM | PEARL BAY | $0.15 | Clam-Pearl-Oyster | $0.05 |
| 1:11:00PM | PIRATE GOLD | $1 | Hook-Gld-Patch | $1 |
| 1:11:04PM | DIAMONDVILLE | $0.75 | Ruby-Ruby-Ruby | $50 |

FIGURE 10

GAME WITH CHANCE ELEMENT AND STRATEGY COMPONENT THAT CAN BE COPIED

BRIEF DESCRIPTION OF THE DRAWINGS

FIG. 7 shows a database entry including various games played by a player.

FIG. 8 shows a touch screen display for entering betting information and tracking the progress of a game, according to some embodiments.

FIG. 10 shows a tabular display with information about various games, according to some embodiments.

DETAILED DESCRIPTION

In various embodiments, a secondary player may include a person who places bets on the games of other people (primary players) but does not directly participate in the game himself. The secondary player may thus be remote from the place where a game is actually played. The secondary player may nevertheless view information about the game, such as from a video feed. A secondary player may also play in games of his own using the outcomes generated at the games of primary players.

Figure 14:
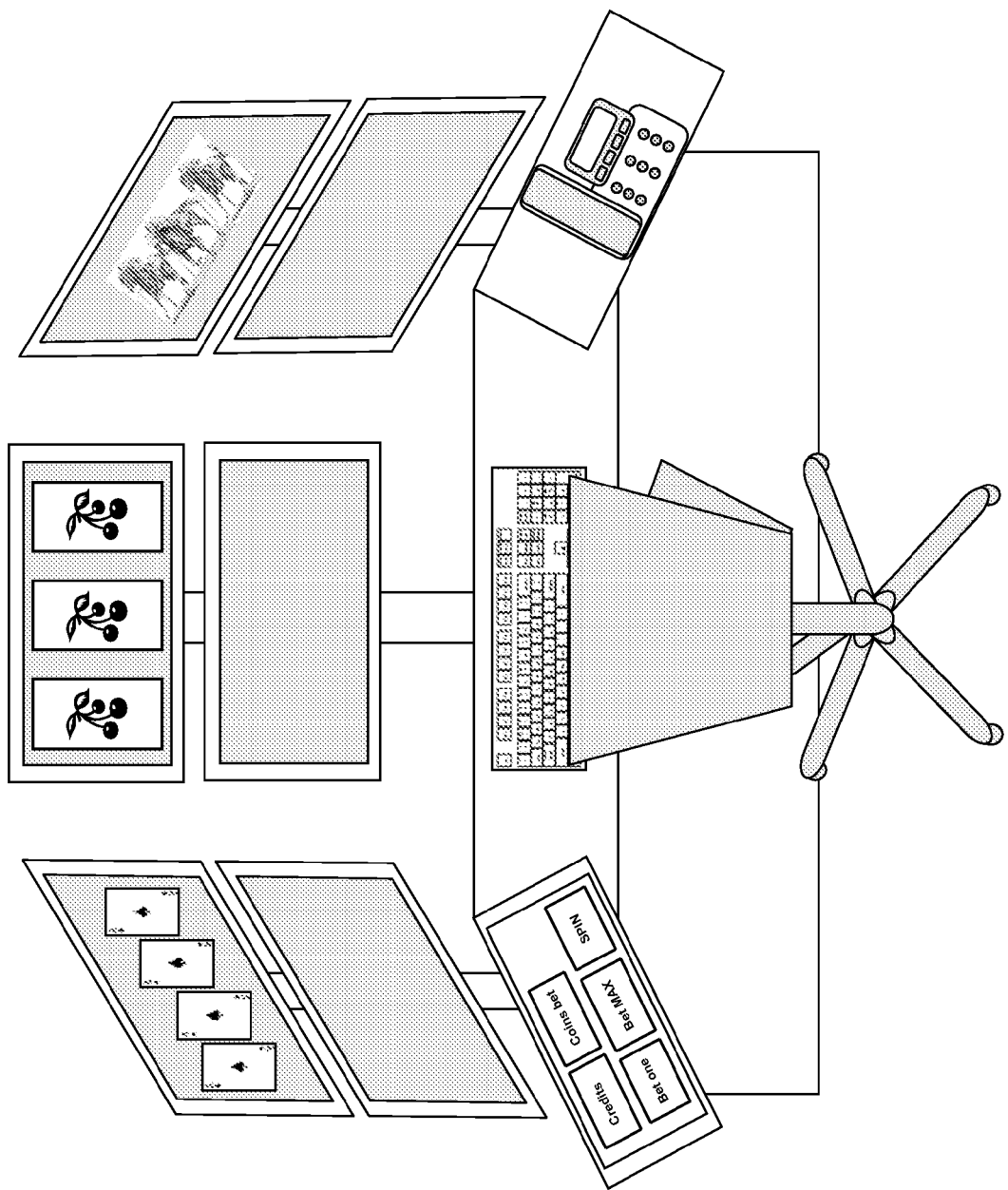
FIG. 14 shows a terminal according to some embodiments.

In various embodiments, a player, such as a secondary player, may engage in gaming activities using a station, workstation, or terminal that has multiple displays. The displays may be monitors. The displays may include liquid crystal displays (LCDs), plasma screens, cathode ray tube displays, or any other displays. The terminal may include various other components. One or more keyboards may include buttons, touch pads, or other devices for receiving inputs from a secondary player. The keyboard may have dedicated keys with certain functions, such as shortcut functions. The terminal may include an audio communication channel, such as a telephone, an internet connection that supports voice, or any other communications channel. The terminal may include one or more touch screens. Touch screens may correspond to display screens. FIG. 14 shows a terminal, according to various embodiments.

1. Changing sizes of windows or feeds. In various embodiments, display screens of a terminal may display windows. A window may be a geometrical region of a display screen that shows related information within the region. For example, a window may show information about a particular game, such as a game from a particular primary player or from a particular slot machine. The window may be rectangular or some other shape. The window may be resized, such as to fill an entire display screen or to fill even more than one display screen. A window may also be resized to a relatively small size. Windows may be closed completely. New windows (e.g., windows showing information about a new type of game) may be opened. Windows may be stacked on top of one another. Windows may have various other relationships. Each window may have a different type of information. Each window, for example, may show information from the game of a different primary player. A window may feature games from a particular gaming device. A window may feature games from a particular game table. A window may feature statistics from around the casino (e.g., which are the top performing gaming devices; e.g., who is the fastest dealer; e.g., what is the longest winning streak in a game of roulette). A window may feature sports scores. A window may feature video feeds, such as video of a sporting event, video of a primary player, video of game table, or any other video. A window may feature game simulations, such as simulated reenactments of games.

1.1. Customized Window Arrangement In various embodiments, a secondary player may have the opportunity to create or open new windows, to resize windows, and to move windows around. The secondary player may also have the opportunity to alter other properties of a window, such as its border color, background color, title bar, or any other properties. A secondary player may thus come to arrive at an arrangement of windows which he finds convenient, comfortable, or otherwise preferable. The secondary player's preferred arrangement of windows, including his preferred windows and/or preferred information to have in windows may be stored. The preferred arrangement may be stored with a terminal, with the casino server, or with the secondary player (e.g., in a portable flash drive or other medium in the possession of the secondary player). A given secondary player may thus leave a terminal and allow other secondary players to use the terminal, where each of the other secondary players has different preferences for window arrangements. The given secondary player may return to the terminal and have his preferred window arrangement automatically called up onto the display screens of the terminal.

A preferred window arrangement may include a specification of which windows a secondary player wants to view. For example, a secondary player may wish to view a window which shows a video feed from a particular craps table, another window which shows game outcomes form a particular bank of slot machines, another window which shows the secondary player's own credit balance and winnings history, another window which shows the top 50 primary players (in terms of net winnings over the last hour) who are currently playing in the casino, and another window which shows movies. A preferred window arrangement may include a specification of the position windows should take within one or more display screens of a terminal. For example, a first window and second window may go in a first display screen, a third window may take up an entire second display screen, a fourth window may occupy another two display screens, and a fifth, sixth and seventh windows may share another display screen. A preferred window arrangement may also include a specification of the position of windows within particular display screens. For example, a first window may be positioned in the top half of a display screen, a second window may be positioned in the lower left hand quadrant of the display screen, and a third window may be positioned in the lower right hand quadrant of the display screen.

In various embodiments, a terminal may include a button, key, or other input device which allows a secondary player to store his preferred window arrangement. The secondary player may press the button to store the arrangement. The secondary player may further provide a name for the arrangement. Thus, the secondary player may have the ability to store multiple arrangements, each under different names. When the secondary player first sits down at a terminal, the secondary player may present identifying information, such as by presenting a player tracking card (e.g., inserting the player tracking card into a card reader of the terminal). The terminal may then display a message for the secondary player asking if the secondary player would like to load a preferred window arrangement. The secondary player may be shown a list of saved window arrangements. The secondary player may then select one arrangement from the list, and the arrangement may be recreated for the secondary player.

In various embodiments, a secondary player may specify a preferred window arrangement using a device other than a terminal. For example, a secondary player may configure a preferred window arrangement on his home computer. The home computer may display, for example, a simulation of the terminal. The player may then create simulated windows and arrange the simulated windows in a preferred arrangement. The player may store such preferred arrangement with the casino server for example. When the secondary player subsequently visits a terminal (e.g., at a casino), the secondary player may load his preferred window arrangement into a terminal.

2. The hardware. A terminal may include one or more displays. Displays may be mounted on movable arms. For example, each display may be mounted on its own adjustable arm. Thus, the display may be repositioned by a secondary player to suit his viewing preferences. A secondary player may position multiple displays in order to arrive at his preferred arrangement. For example, a secondary player may arrange four displays so that they are stacked vertically, so that they form a horizontal row of displays, or so that they form a two by two grid, for example. In various embodiments, displays may be mounted in fixed relation to one another. For example, six displays may be fixed to a rigid, concave metal structure, so that together they form a "C" shape around a secondary player. A terminal may include one or more keyboards. A keyboard may include the "qwerty" arrangement of keys, or may include some other key arrangement. A keyboard may have keys with specific functions related to gaming. A terminal may include other buttons or input devices. A terminal may include a computer processor, computer memory, a communications port for communicating with a network, an antenna or other transceiver for communicating wirelessly, a card reader (e.g., a magnetic stripe card reader; e.g., an RFID reader), audio output devices (e.g., speakers, e.g., headphones), audio input devices (e.g., microphones, e.g., telephone handsets), a chair or bench, a desk, a radio (e.g., a radio for listening to broadcast sports events), and any other pertinent devices. A terminal may further include components for gaming directly at the terminal. A terminal may include a built-in gaming device or may function as a gaming device. For example, a terminal may include coin and bill acceptors, a random number generator, buttons for placing bets, a coin dispenser, a coin tray, a printer, a ticket-in-ticket-out (TITO) printer, a TITO reader, mechanical reels, and/or hardware for conducting a bonus game (e.g., a terminal may include a physical wheel for conducting the bonus round of a Wheel-of-Fortune game). A terminal may include software with various functions. Game software may allow a person to play as a primary player, e.g., to play a game directly at the terminal. Some software may also provide an interface for a secondary player to place bets on games played elsewhere, e.g., games played by primary players. Software may further include software for displaying video feeds, such as feeds from sporting events or the games of primary players. Software may further include software for displaying outcomes generated in games played elsewhere. Software may further include software for allowing communication between the terminal and a network, such as the Internet, a cellular phone network, and/or a telephone network. Software may further include any other software for operating the terminal or associated devices in accordance with various embodiments.

2.1. Displays are stacked. Displays are movable with respect to one another. In some embodiments, displays are all attached to a single rigid body. The body may include a desk, a stand, or a housing which encloses computer hardware used to operate the terminal. The displays may be attached to the body via jointed or flexible arms. For example, a display may be attached to the body via a metal arm with a joint in it. A person may be able to adjust the position of a display by pulling or pushing on it, thereby flexing or contracting the metal arm holding the display. A display may be mounted on a rotatable joint so that it may be oriented facing up or down, facing to one side or the other, or any combination of the above. In some embodiments, displays may be attached to one another. For example, two square displays may be connected at a side by a hinge. Thus, the displays may be folded to face more towards each other or more away from one another. In various embodiments, displays may be attached to a backboard or other rigid body. Their position may be relatively fixed, but their orientation may be adjustable. In various embodiments, displays may be flexible. Thus, a secondary player may bend a display. For example, a large flexible display may be bent to form a semicircle around a secondary player. In some embodiments, displays may be transparent or translucent. One display may be positioned in front of another display. Thus, the player may be able to see some of both displays in the same field of vision.

2.2. Position of displays can be saved. In various embodiments, a player at a terminal may save or record a particular arrangement of displays, keyboards, or other hardware. The arrangement may be stored with the terminal or with the casino server, for example. When a player returns to a terminal after an absence, or if the player comes to a new terminal, the player's stored settings may be recovered. The hardware of the terminal may then be brought into position automatically. For example, arms holding displays may be motorized and under computer control. The motors may thus be operated in such a manner as to bring the displays into the preferred arrangement of the player.

2.3. Displays functioning as one. In some embodiments, two or more displays may function as a single display. A graphic, window, or other image may begin on one display and continue on another display. A player may be able to move a window from one display screen onto another in a seamless motion. For example, a player may be able to use a mouse to drag a window from one display screen to an adjacent screen. In some embodiments, screens or the supporting structures for screens may include position sensors. For example, the joints on the arms supporting screens may include sensors for detecting the angles in the joints. Based on angles of the joints, software may be used to calculate the positions of the screens. Based on the positions of the displays, it may be determined which displays are near to each other or next to each other, and thus it may be determined how a single image should be displayed on multiple displays. For example, parts of the image that are adjacent to one another should be displayed on adjacent screens.

2.4. Special keyboards. A terminal may include one or more keyboards, keypads, buttons, or other input devices. Certain keys may have specific functions.

2.4.1. Functions of keys. A key may be used to open up a specific line of communication (e.g., to another player, e.g., to a casino representative), to call up a video feed for viewing, to call up information about a game for viewing (e.g., what is the current outcome, e.g., what were the last five outcomes), to call up a broadcast for viewing or listening, or for any other function. In various embodiments, a key may have a function as a preprogrammed or default function. In various embodiments, a key may be configured or programmed to perform a function. For example, a secondary player may configure a key to open up a line of communication with a specific friend of the secondary player.

2.4.2. Lines of communication. A key (e.g., a button) may open up a line of communication. The line of communication may be one-way, two-way, or multiway. The line of communication may take the form of audio, text, video, or any combination of audio, text, and video. A key may open up a line of communication between the secondary player and another person, such as a friend of the secondary player or a casino representative. In some embodiments, a secondary player may configure a key to open a line of communication to a specific person. The secondary player may provide the name of the specific person, an identifier for the specific person (e.g., a player tracking card number) or any other information about the other person. The secondary player may visit a special window where a list of keys or buttons is provided, and the player is given the chance to enter names of people that he wishes to contact with the press of a button. A key or button may have a small display associated with it. On the display may appear the name of the person or the party with whom a line of communication is opened once the button is pressed. For example, once a secondary player has entered the name "Joe Smith" of his friend, the name "Joe Smith" may be displayed on or near a button. This may remind the secondary player that the particular button will open up a line of communication with Joe Smith. In various embodiments, a key or button may open a line of communication with a casino representative. The secondary player may press such a button to order a drink, order food, request service to the terminal, request payment for jackpot, of for any other purpose.

The secondary player may also initiate contact with a casino representative for information unrelated to a specific game. For example, the secondary player may wish to make a reservation a restaurant, may wish to find out when a restaurant closes, may wish to purchase show tickets, or may wish to seek out any other information or perform any other task.

In a one-way line of communication, for example, a secondary player may receive a video feed, audio feed, or may receive information in some other format. Information received may pertain to a game on which the secondary player is betting (e.g., to a slot machine game of a primary player playing in some other part of a casino), to a sports game, to a horse race, to general weather information, to general information about a casino (e.g., to when a swimming pool closes), to general news (e.g., to local news, e.g., to world news), or to any other activity or events. In various embodiments, a secondary player may be the one communicating in a one-way line of communication. The secondary player may, for example, open up a voice line to place an order for a drink. The player's request may be recorded at the other end of the line, and may then be forwarded to a waiter or waitress in whose area the secondary player is located.

In a two-way line of communication, a player (e.g., a secondary player), may communicate with another person (e.g., a friend of the player, e.g., a casino representative). Video and/or voice from both parties may be transmitted back and forth via a network, such as via a casino intranet or such as via the Internet.

In some embodiments, a player (e.g., a secondary player) may be able to open up multiple lines of communication at once. For example, a secondary player may be speaking to his friend Joe via one line of two-way voice communication, to his friend Sam via another line of two-way voice communication, and to his friend Bill via a two-way voice and video line of communication. The secondary player may be able to customize each line of communication on the fly. For example, the secondary player may be able to mute two lines of communication so he can speak to his friend Bill without the other friends on the line hearing him. The secondary player may also be able to change a line of communication from solely audio to audio and video, from video to audio, from two-way to multi-way, or to alter lines of communication in any other fashion. For example, a secondary player may be speaking to three friends, each over different lines of communication. The secondary player may be able to merge the lines of communication so that now the friends can hear and talk to each other rather than just hear and talk to the secondary player.

2.4.3. Keys to specific games. In various embodiments, feeds containing information about games may be available to a secondary player. A feed about a game may include a video feed of a particular game. For example, there may be a video feed of a high limit baccarat game available. A feed about game may include a feed with simulated reenactments of a game. For example, a feed may contain animated slot reels spinning to reveal an actual outcome that occurred at a slot machine. A feed about a game may include summary information. The information may be presented in the form of text, graphic, or video. The summary information may include, for example, an indication of an amount bet, an outcome achieved, an amount won, a number of pay lines played, which pay lines won, whether a bonus round was reached, what decisions were made in a bonus round, what decisions were made in the game at any decision juncture, and any other pertinent information. A feed may include video of a primary player. For example, the secondary player may be able to watch footage of a primary player as he plays a game. A feed may include footage for active games. For example, video footage may alternate originating from several different primary players, depending on who is currently involved in a game, depending on who currently has to make a decision in a game, depending on whether a game is near resolution, and so on.

A key may be configured or programmed to always call up a feed for a particular gaming device. A key may be configured or programmed to always call up a feed for a particular gaming table, to always call up a feed for a particular group of tables (e.g., the feed may show information about the outcomes of every game at the group of tables), to always call up a feed for a group of gaming devices (e.g., the feed may show information about the outcomes of every game occurring at the group of gaming devices), to always call up a feed for a particular area of a casino (e.g., the feed may show information about the outcomes of every game for the particular area of the casino), or to call up a feed for any other group of gaming devices or game tables.

In various embodiments, a secondary player may desire ready access to information about a certain preferred game or games. Thus, a single key or button may be configured to call up, when pressed, information about the preferred game or games.

In various embodiments, when information is called up, it may be displayed on one of the display screen of the terminal. Such information may occupy an entire screen, or it may occupy a portion of a screen, such as window within a screen.

2.4.4. Keys for latest updates. In various embodiments, a key or button may be pressed by a secondary player to call up an update about a game, primary player, gaming device, dealer, or other object, entity, or events in which the secondary player is interested. For example, a secondary player may press a key that will caused to be displayed on a screen the most recent outcomes at a particular blackjack table. As another example, a secondary player may press a key that will cause to be displayed on a screen the most recent outcomes which have occurred across a casino and which have paid more than $200. As another example, a player may press a key that will cause to be displayed the ten most recent rolls of the dice at a craps table. In various embodiments, a secondary player may press a key which causes an update to be provided. The update may appear in a window of one of the display screens of the terminal, for example. The update may disappear after some period of time, e.g., after 30 seconds. In some embodiments, the update may remain until the player again presses the key which brought the update in the first place. The window or screen showing the update may be continuously updated or may be static. Thus, in various embodiments, a secondary player may press a key to get updated information about a table, player, etc. However, the information may represent a small snapshot of the latest information and may not represent a continuous information feed of new information as it happens.

2.4.4.1. Keyboard has different channels. In various embodiments, a keyboard may have keys, buttons, or special key combinations which correspond to channels. A channel may be a broadcast or one-way line of communication. A channel may present information related to a particular topic, such as related to a particular type of game, to a particular type of player (e.g., high rollers), or to some other subject or topic. A channel may present video feeds, statistics, game commentary, strategy information, or any other information.

2.4.4.1.1. Video poker channel. In various embodiments, a video poker channel may exist. The channel may broadcast information about one or more video poker games. The channel may present lists of final outcomes as they occur throughout a casino. For example, the video poker channel may present a scrolling list with outcomes, "As 3d 4c Ac Js; 9h 9d 3s 3c Ks; As Ks Qh Jd 10c . . . " Such outcomes may be outcomes that have occurred most recently at video poker games in a casino. A channel may include a scrolling list with cards dealt, with payouts won, with decisions made, or with any other items of information. A channel may include video footage. The video footage may switch from one game to another. For example, an announcer may say, "Let us now go to John's game where he has just been dealt three cards to a royal flush . . . " Video footage may then be shown of John's game. At any given moment, there may be a number of games that could be featured on a channel. Some games might be shown in one form or another, such as in the form of a video feed, in the form of a text description, or in any other form, while some games may not be shown. Games that are shown may match one or more criteria. Such criteria may include: (a) a game had a high bet; (b) a game is being played by a skillful player (e.g., by a player who uses optimal strategy more than 80% of the time); (c) a game is being played by a primary player who has won more than a certain amount of money in the last hour; (d) a game has the potential to yield a high paying final outcome (e.g., an intermediate outcome has been dealt with four cards to a royal flush); (e) a game is played by a primary player that is popular (e.g., that has been rated highly in surveys of secondary players); (f) a game has been bet on by more than a predetermined number of secondary players; (g) a game has more than a certain amount of money bet on it by secondary players; and any other criteria.

More specific channels may exist. For example, there may be a channel dedicated to $1 video poker, to multi-hand video poker, to video poker games played in Las Vegas, to video poker games played in the last hour, or to Jacks-or-Better video poker.

A channel may show live information. A channel may also show historical information. For example, a video poker channel may show the best games from the last week, of games played last year.

2.4.4.1.2. Sports book channel. A sports book channel may show information about various sporting events, such as baseball games, basketball games, horse races, car races, golf tournaments, or any other sporting events or contests. The information may be presented as a text description of scores. For example, the most recent scores of various games may be scrolled across a screen. A sports book channel may show video feeds of various games, or highlights of various games. A sports book channel may selectively show footage from one game over another for various reasons. Footage of a particular game may be shown if: (a) there is a significant amount of money bet on the game by secondary players (e.g., more than a certain amount of money in aggregate, e.g., more money is bet on the game than on another game which is not shown); (b) there are more than a certain number of secondary players betting on the game; (c) the game is close (e.g., the scores of the opponents in the game are close; e.g., the horses in a race are neck and neck); (d) the game is nearing a resolution, or for any other reason.

2.4.4.1.3. Personalized channel. In various embodiments, a channel may be a one-way communication of information to a secondary player. The channel may be customized to the particular player, however. Thus, two different secondary players who are watching the Blackjack Channel, for example, may still receive different sets of information. A channel may be customized to show information about a game that a particular secondary player is betting on, to show information about a game that may be considered relevant to a secondary player based on information about the secondary player (e.g., a sports game may be shown to the secondary player if the secondary player's home team is playing), to show to the secondary player information about a game played by primary players with similar demographics to those of the secondary player, to show the secondary player information about a game played near his hometown (e.g., if the secondary player is from Mississippi, a game from a Mississippi casino may be shown), to show the secondary player information about a game in which the secondary player had previously expressed interest (e.g., if a secondary player previously has made bets on the games played at a particular gaming device, then games played at that same gaming device may be shown to the secondary player on his personalized channel.

In various embodiments, a secondary player may be asked what he would like to see or hear on a particular channel. The secondary player might then select particular types of games (e.g., video poker, e.g., Monopoly Slots), particular primary players, particular tables, particular dealers, particular areas in a casino, particular types of strategies (e.g., the secondary player wants a channel to show only primary players using a particular type of strategy, such as basic strategy), particular stages in games (e.g., the secondary player selects that a channel show only bonus rounds for games; e.g., the secondary player selects that a channel should only show games after an intermediate outcome has occurred, such as after the first two cards in blackjack have been dealt), games with certain types of outcomes (e.g., the secondary player selects that a channel should show only outcomes that have a payout of more than $100; e.g., the secondary player selects that a channel should show only outcomes where the ace of spades is present; e.g., the secondary player selects that a channel should only show games where a primary player has three cards to a royal flush), games played by certain teams (e.g., the secondary player may select that a channel only show baseball games from the National League; e.g., the secondary player may select that a channel only show college basketball games), or the secondary player may select or specify any other type of content to be in his personalized channel. The player may select content from a menu (e.g., the player may select a type of game from a menu containing different types of games), the player may specify desired content using text, or the player may specify desired content using any other format. The secondary player may have the opportunity to name the channel. For example, the player might name a channel "Bonus Rounds", "Top Winning Primary Players", "Craps Games", "High Payout Games", or any other name.

2.4.4.2. Specific table (I like blackjack table X). In various embodiments, a channel may present games or information from a particular gaming table. For example, a channel may present games from a particular blackjack table. The channel may show video footage of the game. Video footage may be shown from overtop the table. Video footage may be shown which focuses on individual players at the table (e.g., video may focus on the face of one of the primary players). Video footage may be shown which focuses on the dealer. Footage may be shown which focuses on particular hands, particular cards, on chip stacks of various players, or on any other aspect of a table. A channel for a table may feature statistics about the table, including percentages of hands won by players in the last hour, including net winnings of the primary players, including the percentage of blackjacks achieved at the table in the last hour, or any other statistics. A channel for a table may feature statistics about rolls of dice (e.g., at a craps table), about outcomes at a roulette wheel (e.g., a statistic may indicate the percentage of "black" outcomes that occurred in the last 100 spins of a roulette wheel), or statistics about any other event or events at a gaming table.

2.4.5. Keys to specific players. In some embodiments, a secondary player may press a key or button to receive information about a specific primary player. Pressing such a key or button may allow the secondary player to see a video feed of the primary player's game, to see a video feed of the primary player himself (e.g., a video feed of the primary player's face), to see simulated renditions of the games of the primary player, to see statistics about the primary player (e.g., lifetime net winnings for the primary player), to see recent statistics for the primary player (e.g., net winnings for the primary player in the last hour), and to see any other information related to the primary player. In various embodiments, a key pressed by the secondary player may allow the secondary player to open up a line of communication with a primary player, such as an audio line of communication.

2.4.6. Keys to specific gaming devices. In some embodiments, a secondary player may press a key to receive information about a specific gaming device. Pressing such a key or button may allow the secondary player to see video of the gaming device, to see outcomes generated on the gaming device, to see reenactments of games played on the gaming device, or to see any other information about the gaming device. A key may be labeled with an identifier for a gaming device, such as "VideoPoker12345". The key may also be given a custom name by the secondary player. In various embodiments, pressing a key or button may allow a secondary player to open up a communication channel with a gaming device. For example, the secondary player may be able to engage in audio communication with a primary player at the gaming device.

2.4.7. Keys to a specific game table. In various embodiments, pressing a key or button may allow a secondary player to receive information about a specific gaming table. For example, the secondary player may receive a video feed from the gaming table, an indication of who the dealer is, an indication of who the primary players are, statistics about what cards were dealt, statistics about what outcomes occurred, statistics about the percentage of time that primary players have won versus the percentage of time that the dealer has won, statistics about what strategy has been used at the table, or any other information about the table. The key may allow a secondary player to open up a line of communication with the table, such as a line of communication with one or more of the primary players at the table, or such as a line of communication with the dealer at the table.

2.4.8. Keys to specific sporting events. In various embodiments, a button or key may give a secondary player access to information about a particular sporting event. For example, a secondary player may press a key to watch a video feed of a baseball game between the Yankees and the Red Sox. When the sports game goes to commercial, the secondary player may press another button which calls up another sporting event. In various embodiments, a secondary player may select a viewing angle for a sporting event. For example, a sporting event may have multiple cameras capturing the action. The secondary player may be able to press a first button to see a feed from a first camera, a second button to see a feed from a second camera, and so on. For example, in a tennis match, one button may correspond to a view from mid-court, while another button may correspond to a view from the back of one side of the court. In some embodiments, a key may allow a secondary player to switch the commentator for a feed, broadcast, or channel. For example, a secondary player may be viewing a feed from a sporting event. The secondary player may press a key to change the audio from one sports commentator to another commentator. A secondary player may also change the commentator for another type of event. For example, a commentator may comment on the strategy of primary players from a table game of blackjack. A secondary player may decide he doesn't like the commentator and may switch to a new commentator. The switch may occur at the press of a button or key, through a menu selection, or through some other means.

2.4.9. Functional Keys for Video feeds. In some embodiments, keys may have specialized functions for controlling video. Various keys may allow a secondary player to zoom in or zoom out. Various keys may allow a player to pan, to tilt, to increase or decrease the viewing angle, to filter out one or more objects in a video feed, to increase or decrease contrast, to increase or decrease brightness. If audio is present, a key may allow a secondary player to filter out certain audio sources (e.g., a secondary player may wish to filter out the voices of certain basketball players to hone in on the voice of his favorite basketball player). Various keys may allow the secondary player to freeze a video, to play the video in slow motion, to play the video backwards, or to play a video in fast forward. Various keys may allow for other manipulation of video or audio.

2.4.10. Programmable keys. Shortcut keys. A button or key may be programmable or configurable to call up any type of information, or to perform any other function. For example, a secondary player may program a button to bring up information about his preferred gaming table, about his preferred primary player, about his preferred outcomes, or about anything else. A secondary player may configure a button to open up a line of communication with a specific other person, with a specific gaming device, with a specific game table, or with any other specific counterparty. A secondary player may configure a button to put in a request. For example, a button may be configured such that if the button is pressed a martini will be ordered for the secondary player.

2.4.11. Keys that provide messages or alerts. In various embodiments, a button or key may change color, flash, or otherwise draw attention. A secondary player may then press the button or key to open up a line of communication, to call up particular information, to view a particular channel (e.g., a video poker channel) or to perform any other function. The button may flash or draw attention when some event of potential interest, importance, or significance has transpired which might warrant the attention of the secondary player. For example, the button may be configured to call up a bonus round channel on screen. The button may flash when a primary player somewhere in a casino has reached the final round of a bonus round. The secondary player may be motivate to press the button when it flashes so as to watch the final round of the bonus round which is occurring. The secondary player may be welcome to press the button at times when it is not flashing as well in order to see information about bonus rounds around the casino. However, the secondary player may be especially motivated to press the button when it is flashing.

2.4.12. Specialized keys dedicated to different games. A terminal may include specialized or dedicated buttons or keys, where such buttons or keys are specialized for particular games, for particular types of bets, or for any other specialized function. One set of keys may be for placing bets on games of video poker. One set of keys may be for placing bets on a game of blackjack. Other sets of keys may include keys for placing bets on games of roulette, keys for placing bets on games of poker (e.g., Texas Hold'em poker), keys for placing bets on craps, keys for placing bets on slot machine games, keys for placing bets on keno games, keys for placing bets on baccarat games, or keys for placing bets on any other types of games. Specialized keys may be used when a player at a terminal acts as a secondary player. Specialized keys may be used when a player at a terminal acts as a primary player.

A specialized set of keys for roulette may include a key for placing a bet on "red" a key for placing a bet on "black" a key for placing a bet on odd numbers, a key for placing a bet on even numbers, a key for each number on the roulette wheel, and a key for any other roulette related bet. A player at a terminal who desires to play or to participate in a game of roulette may thus conveniently use the dedicated keys at the terminal for making roulette bets. A complete roulette bet may be specified using two keys for example, a first key may specify a bet amount (e.g., 5 credits) and a second key may specify the bet type (e.g., "red"). A complete bet may also be specified using a single dedicated key. Pressing the key may be tantamount to instructions to bet 5 on red. In various embodiments, a bet amount may be understood, such as by default. For example, where a bet amount is unspecified, the same bet amount from the previous game may be used. Thus, for example, a player may press a dedicated "red" key to bet 5 credits on red if the player's prior bet had also been 5 credits.

Dedicated keys for a game of video poker may include five different "hold" keys, each key corresponding to a different hand position. A dedicated key, in any game, may also correspond to a strategy. For example, in video poker, there may be a key which directs the strategy with the highest expected winnings to be executed. By pressing such a key, the player allows software (e.g., software residing on the terminal or software residing with the casino server) to decide which cards to hold and which cards to discard based on a calculation of which leads to the highest expected winnings. In a game of blackjack, a dedicated key may be pressed to play basic strategy.

In a game of craps, dedicated keys may allow a player to make a "pass" or "don't pass" bet, or to make any other craps specific bet.

A key may be configured to perform one task. For example, a key may be configured to always place a certain type of bet, when pressed. However, in various embodiments, a key may be reprogrammed to perform another dedicated task. For example, a key that used to always place a bet of 5 on black may be used to now place a bet of 10 on red.

2.4.13. Keys dedicated to different types of bets. Keys customizable for different types of bets. E.g., customize a key for "bet 7 lines and 10 cents on each line". Or customize a key that says, "Bet that primary player Joe will fold". In various embodiments, keys may be customized for particular types of bets. A player may prefer a certain bet that is generally not easily selected or described. For example, a secondary player may wish to place a bet on 7 paylines in a slot machine game and to bet a quarter per payline on five of the paylines and to bet a dollar per payline on the other two lines. The secondary player may program a key to make just this desired bet, or to make any other desired bet. Thus, the player may save himself the trouble of entering intricate instructions each time he wishes to place a bet. In various embodiments, a player may at a first point in time enter detailed instructions for making a complicated bet. The player may then have the opportunity to save the bet. For example, the terminal may display a message for the player asking the player whether he would like to save the bet he just made or just entered. The player may indicate that he would. The terminal may give the secondary player the option of saving the bet to a particular button. For example, the terminal may give the player the option of associating a particular button on the terminal with the bet, so that the player may subsequently simply press the button once in order to make the bet. (In some embodiments, the bet does not take effect until the player confirms or actually initiates a game subsequent to making the bet). In some embodiments, a terminal may store a list of bets made recently by a player at the terminal. For example, the terminal may store the 10 or 50 most recent bets made by the player. The player may have the opportunity to see a list of recent bets and to select one from the list. For example, the player may use a mouse or arrow keys to navigate through a list of recent bets and to select one of them. The player may then make the bet again without having to reenter the bet.

2.4.14. Keys particular to display screens. In various embodiments, a key may correspond to a particular display screen. Pressing the key may somehow activate the corresponding display screen. For example, pressing the key may cause a mouse pointer to appear in the corresponding display screen, so that the player may now select or click on items shown in that display screen. In some embodiments, a player may be playing multiple games simultaneously, with different display screens showing different games. The player may wish to initiate a new game which is shown in a particular screen. Thus, the player may press a button which activates the screen. The player may then use a general set of betting keys to make a bet in that game and to initiate play of the game. The player may then press another key corresponding to another display screen. The new display screen may be activated. The player may then use the same general set of betting keys to activate to make a bet for the game shown in the new display screen.

2.5. Pictures. In various embodiments, a player may have his own photos loaded onto a terminal. For example, the six screens of a terminal may each show a picture of a different one of the secondary player's grand children. The secondary player may bring his photos to a terminal using a portable device, such as an MP3 player. The player may also download photos from a photo sharing web site, such as Flickr.

2.6. Other special input devices. Joystick. A terminal may have various input devices. These may include joysticks, touch pads, track balls, touch screens, microphones, cameras (e.g., a player may make hand signals to issue commands to the terminal, where such hand signals are picked up by the camera and interpreted by software), foot pedals, electronic pads for recognizing handwriting, or any other input devices. A terminal may include input devices of the same type found on some gaming devices. For example, a terminal may include a handle that can be pulled like the handle of a slot machine.

Pulling such a handle may cause the secondary player to bet on the game of a primary player.

2.7. How do we make sure that people can't beat on these things and destroy them? In various embodiments, a terminal may contain expensive or fragile equipment. For example, the terminal may contain multiple buttons and display screens. In various embodiments, sensors may detect behavior which is dangerous to the equipment, such as hitting or banging. For example, vibration or pressure sensors may sense sudden shocks to the equipment. In various embodiments, a camera may monitor areas surrounding the terminal. For example, a camera may monitor the area where a secondary player normally sits or stands. The camera or various sensors may trigger an alert when dangerous behavior is detected or perceived. A casino employee may be alerted to visit the terminal upon detection of potentially dangerous or harmful behavior. The casino employee may be able to ask the secondary player what happened. If necessary, the casino employee may ask the secondary player to refrain from certain behavior. In some embodiments, if potentially harmful behavior is detected at a terminal, a communication line may be opened up between the terminal and a casino employee, such as a security guard. The casino employee may then have the opportunity to talk to the secondary player, ask him what is happening, and perhaps ask the secondary player to refrain from certain potentially damaging behaviors.

2.8. Ticker. Ticker of statistics of interest Red/black casino wide. House versus player casino wide. Many other things displayed can be displayed in ticker form. In various embodiments, a display of a ticker may be shown on one or more display screens. The ticker may comprise a band on one or more display screens, with information moving across the band (e.g., from left to right). The band may have a particular color, such as green, or a particular pattern, or any other markings to distinguish it from surrounding graphics or to put on the appearance of a ticker tape. The ticker may contain various information. The ticker may include statistics about games at a casino or at multiple casinos. For example, a ticker may indicate the number of red outcomes that have occurred in roulette across the casino in the last five minutes, the number of black outcomes that have occurred in the last five minutes, the number of sevens that have been rolled in craps in the last hour, the number of times players have busted in blackjack in the last hour, the number of times the jackpot has paid out at any slot machine in the last twenty minutes, the names of the five players with the most winnings in the last hour, the size of a progressive jackpot, the scores in a sports game, or any other statistic. A ticker may vary or be customized in many ways. A ticker may span one display screen or it may continue across two or more display screens. A ticker may even span less than one display screen. A ticker may be wide or narrow. A ticker may run horizontally, vertically, or along a diagonal. A ticker may proceed quickly (e.g., information may go from one side to the other quickly) or slowly. A ticker may appear as red, blue, or any other color. A ticker may have font in yellow, green, or any other color. There may be more than one ticker. For example, tickers may run in parallel across a display screen, or there may be two different tickers on two different displays screens. A ticker may be customized in various ways. A secondary player may alter the sizes, background colors, font colors, font sizes or any other aspect of a ticker. A secondary player may specify which statistics or other information he wishes to be on the ticker. For example, the secondary player may indicate that he wants statistics only about slot machines and craps. Another secondary player may indicate that he wants statistics describing the winnings of the top 50 players of the most recent hour. Another player may indicate the he wishes to see the scores from sports games currently going on. In some embodiments, certain ticker feeds may exist and may be available to one or more secondary players in a casino. There may be a blackjack ticker, a craps ticker, a sports ticker, a high rollers ticker, or any other particular ticker. A secondary player may then choose one or more tickers that he would like to see scrolling across on a display screen.

In various embodiments a ticker may be displayed using a matrix of light emitting diodes, such as a rectangular array of such diodes.

2.9. The setup adjustably configures to your body. For example, all the screens come in to be within arms reach. The chair moves up or down to get you near the screens. The terminal may include sensors, such as range finders, lasers, sonar, or cameras to determine the body size of the player (e.g., tall, e.g., short). Portions of the terminal may automatically adjust to conform to the body size of the player. For example, the display screens may move in close to a player so he can reach them (e.g., if the display screens are touch screens). A chair of the terminal may move up or down to adjust to the height of the player.

2.10. Audio. A terminal may have various means of outputting audio. The audio that is output may include audio communication from a player's friends, audio communication from casino personnel, audio associated with a television broadcast, audio associated in with a radio broadcast, audio associated with a movie, TV show, or other form of media, audio associated with a game (e.g., audio outputs associated with winning a prize), or any other type of audio.

2.10.1. Give headphones to people. Headphones may be available for a player at a terminal. Using such headphones, a player may ensure that others around him do not hear his audio, or that he may focus on his audio without being distracted by ambient noises. A switch, button, or other input device may allow a player at a terminal to switch audio from one type of output to another. For example, audio may begin by emanating from speakers at a terminal. When a player puts on headphones, the player may flip a switch to cause audio to come through the headphones. In some embodiments, the headphones or the terminal may sense when the player has put on the headphones. Audio meant for the player may then be piped to the headphones rather than broadcast from speakers. In various embodiments, there may be two or more sets of headphones. Each set of headphones may broadcast separate audio feeds. For example, one set of headphones may correspond to a feed from a sporting event while a second set of headphones may provide an audio track for a slot machine game the player is participating in.

2.10.2. Display mounted speakers. In various embodiments, the terminal may include one or more speakers. The speakers may be mounted on the body of the terminal, or on some other structure associated with the terminal. The speakers may form part of the displays. The speakers may be mounted on the displays.

2.10.3. Mute buttons. In various embodiments, a terminal may include one or more mute buttons. Pressing a mute button once may silence an audio feed. Pressing the mute button again may cause the audio feed to return.

2.10.4. Squawk box. In various embodiments, an open line of communication may exist among a number of parties, such as three, four, five, six, or more parties. The communication may be audio based. A terminal may have a speaker which is attuned to broadcast voice or other audio messages from any person who is in on the communication. Further, a microphone or other audio input device may allow the player to communicate audio messages into the open line of communication. Any spoken message may be broadcast to all parties who are on the communication. If several people speak at once, all spoken communications may be communicated at once. Thus, an open line of communication may potentially result in a cacophonous melee of voices. A line of communication may be open among a group of friends, among a group of terminals, among all terminals, among all secondary players, among all secondary players who open the line of communication, among all players at gaming devices in a casino, among players and casino representatives, among players at multiple different casinos, or among any other group of people.

2.11. Phones. A terminal may include one or more phones and/or phone lines. A player may be able to place phone calls to another party.

2.11.1. Phone that only allows local calls. In some embodiments, a phone at a terminal may only allow local calls. In some embodiments, a phone at a terminal may only allow calls to certain areas, to certain people, to certain devices, or to certain other restricted destinations. In some embodiments, restrictions on phone calls may be put in place only when a player is placing bets on sports. For example, a player may be allowed to make only local phone calls when betting on a sporting event. This may help to restrict the player from finding out information about the result of the sporting event before counterparties to the bet. In various embodiments, a player may not place any bets on sports within a predetermined time of having placed a phone call which is not in accordance with various restrictions. For example, a player may be prohibited from placing a bet on a sporting event within 10 minutes of having completed a long distance phone call.

2.11.2. Calls to another node on a network. In various embodiments, phone calls may be restricted to certain parties. Phone calls may be restricted to other terminals. Phone calls may be restricted to people calling from within an internal casino network.

2.11.3. And calls are recorded. Because of sports book restrictions. In various embodiments, a phone call placed from a terminal may be recorded. Recorded calls may be checked to ensure that no sports related information is being communicated, or that no other information that may provide special knowledge about what bets to make are communicated. Recorded calls may be checked at random. Recorded calls may be checked after a player has won a bet. Recorded calls may be checked after a player has won statistically more bets than would be expected of a player. Recorded calls may be checked by a person or by a machine or computer (e.g., using voice recognition software). A recorded call may be analyzed based on the location of the counterparty in the call. For example, if the call was placed to a phone near a race track, the recorded call may be scrutinized.

2.11.4. Phone that allows you to speed dial into a radio show. In various embodiments, various speed dial functions may be associated with a phone or phones at a terminal. A player may be able to press a button to dial into a radio show. The player may then hear the radio show over the phone, or even to pose a question to the host of the radio show. In various embodiments, a speed dial function may allow a player to call up a feed of a radio sports broadcast. For example, the player may pick up a phone to listen to the radio broadcast of a game being played by a favored team. Various buttons may allow the player to dial into different sports broadcasts. In various embodiments, speed dials may allow the player to dial any other number or counterparty in an expedited fashion.

3. Different information on different displays. In various embodiments, different displays may show different information or different types of information. The display screens may complement each other. For example, some displays may show broad types of information, while others show specific types of information, or more detailed information about something shown in another display. Some displays may cover one game or one area of a casino while other displays cover other games or areas of the casino.

3.1. Different Views 3.1.1. One display shows reenactments of outcomes. One display may show reenactments of game outcomes. The display may show footage of the actual outcomes, e.g., as the actual outcomes occurred. Outcomes shown may be outcomes for games in which a player at a terminal is participating as either a primary player or as a secondary player.

3.1.2. One display shows just data about outcomes. In various embodiments, a display may show data about outcomes. The display may show what outcomes have occurred. The display may show statistics describing multiple outcomes. For example, the display may show statistics describing which outcomes were most frequently occurring in the casino in the last five minutes. The display may show statistics describing streaks of outcomes (e.g., 10 sevens in a row have been rolled at a craps game).

3.1.3. One display shows overhead views of regions of a game floor. In various embodiments, a display may show an overhead view of a region of casino. The region may be the same region of a particular game that is more closely featured on another display screen of the terminal.

3.1.4. One display shows a whole game table. In various embodiments, one display screen of a terminal may show an entire gaming table. Another display screen, for example, may show more details about the table, such as focusing in on one player at the table, or showing statistics about the table.

3.1.5. Blow up the video to show an important event on many screens at once. In various embodiments, an important or significant event may be brought to prominence. The display area used for that event may be increased. The area may be increased from one display screen to two or more display screens. The area may be increased from a portion of a display screen to take up a whole display screen. Significant events may include the occurrence of a significant outcome in a game in which the secondary player participates, the occurrence of a jackpot, or the occurrence of any other rare, high paying or otherwise significant event.

3.1.6. Picture in picture. There is a speed dial switch to go from video to video. In various embodiments, a window, frame, or picture may be shown within a larger window, frame, or picture. The smaller window may contain one video feed while the larger window may contain another video feed. The smaller and larger windows may contain other types of feeds or images as well, such as animated reenactments of game outcomes. A player at the terminal may switch the windows so that the footage shown in the larger is now shown in the smaller, and so that the footage that was shown in the smaller is now shown in the larger. A special key or button may rapidly affect the switch. In various embodiments, there may be multiple smaller windows within one larger window. There may be a special key or button which corresponds to each of the smaller windows and/or which corresponds to the footage within the windows. A player may thus monitor a number of games, sporting events, or other activities at once. When the player becomes interested in one particular game (or sporting event or other activity), the player may press a button that corresponds to the game of interest (e.g., to the window with the game of interest). The footage of interest in the window of interest may then enlarge to take up the larger window, while the footage in the larger window may then shrink to occupy the smaller window. In various embodiments, particular events that occur in a game, sporting event, or other activity may cause the corresponding window (e.g., the window showing the game) to become the large window. For example, if a game shown in a smaller window results in a high-payout outcome, footage of the game may be enlarged and shown in the larger window.

3.1.7. Proprietary feeds from different services. For example, there is a feed from one casino. Or a feed from one type of game that is only played in one place. There may be financial arrangements with the casino to get this feed. Information shown at terminals may come from diverse places. Information may come from different casinos, from vendors that specialize in generating game outcomes for sale, from sports franchises, from race tracks, from media companies (e.g., movies shown on terminals may come from media companies) or from any other source. Different sources may charge for providing such information. For example, a sports franchise may charge for blanket use of sporting footage in a casino, or for use of sporting footage at a particular terminal. In various embodiments, different information sources may charge at different rates and according to different schemes. A source may charge according to one or more of the following: (a) the number of terminals using information from that source; (b) the number of viewers of information from that source; (c) the size of a window in which information from that source was displayed (e.g., the casino owning the terminal may pay more for footage shown in a large window than for footage shown in a small window); (d) the number of other information sources shown together with a given information source (e.g., a casino may pay less for showing footage or information from a given source if such information was displayed at the same terminal with a large number of other types of information than if the information was displayed on its own); (e) the length of time for which a feed from that source was viewed; (f) the celebrity status of people in a feed (e.g., footage showing a poker game being played by a celebrity may be more expensive than is footage showing a poker game played by an unknown person), or based on any other metric. A casino may pay for an information feed on periodic basis. For example, a casino may pay a subscription fee for an information source.

3.2. What is the standard default data that is always displayed? E.g., standard games, standard indices. In various embodiments, a terminal may have a default set of feeds or pieces of information that are displayed. For example, there may be video footage shown from a Wheel of Fortune slot machine game, from a video poker game, from a blackjack table, and from a craps game. In various embodiments, default footage is chosen based on what are the most popular games in a casino. For example, if the most played game by primary players was the Monopoly slot machine game, then it may be assumed secondary players at a terminal will wish to participate in such games. Thus, footage may be shown from a Monopoly slot machine game. In various embodiments, just as default footage may be shown, there may be default configurations for various keys, buttons, or switches at a terminal. For example, a set of keys may be configured by default to be used for placing bets on games of video poker.

3.3. Video feeds. Multiple full-motion video feeds. Hi definition video signal. In various embodiments, high bandwidth connections may be used to pipe multiple high-definition video feeds to a terminal. A player may thus enjoy a pleasurable gaming and entertainment experience while at the terminal.

3.4. Alerts. Something happens and shows in red, for example. A terminal may include several windows, several feeds, information about several games, or other diverse information. When a noteworthy event or occurrence happens in one feed, such feed may be emphasized or brought to prominence. For example, a window with a particular feed may be enlarged, or made brighter. Audio from a particular feed may be made louder, or audio from competing feeds made lower. Footage may flash, or other indicators may flash. A button which can call up a particular feed or information source may flash when a noteworthy event occurs for that feed.

3.4.1. Sounds for alerts. In various embodiments, alerts as to the occurrence of a noteworthy event may occur by means of audio. Special sounds may be broadcast for different events. For example, different types of events might have different corresponding sounds. In some embodiments, however, there is a generic sound for any noteworthy event. In some embodiments, the occurrence of a jackpot may be heralded with one type sound, the occurrence of a streak of a certain length may be heralded with another type of sound (e.g., the sounds of chimes play when a primary player wins ten games of blackjack in a row), the initiation of play by a favored primary player (e.g., by a primary player favored by the secondary player at a terminal) may be heralded with a third type of sound (e.g., the sound of a rooster crowing), and so on.

- 3.4.2. Customize your own alert sounds. In various embodiments, a player may customize which sounds will be used to provide alerts or announcements as to the occurrence of particular events. The player may select from a list of special events. The player may similarly select from a menu of sounds. The player may match events to sounds. The player may also provide his own sounds, e.g., via portable MP3 player.
- 3.5. Entertainment. A secondary player may use the terminal for entertainment purposes. The secondary player may watch movies, TV shows, casino related events, or other forms of entertainment. The secondary player may watch news programs, science programs, documentaries, or other video. The player may listen to music, books on tape, speeches, or other audio. The terminal may have available multiple display screens. Thus, a secondary player may watch entertainment on one screen while watching the progress of games on another screen.
  - 3.5.1. Movies on demand. A secondary player may watch a movie at the terminal. The secondary player may request a particular movie, such as from a list of movies licensed by the casino for presentation. The secondary player may also select a movie channel, such as cable or satellite TV channel, on which movies are playing. The player may receive a feed from the channel at the terminal.
  - 3.5.2. TV Shows. A secondary player may watch a TV show at the terminal. The secondary player may select from a list of pre-recorded TV shows. A secondary player may also watch a regular TV channel that may be fed to the terminal.
  - 3.5.3. Casino Related Events. A secondary player may watch video feeds of casino related events. For example, the player may watch a video of a concert that played the previous night, of a comedy act, of an animal performance, or of any other casino related event.
  - 3.5.4. Music. In various embodiments, a secondary player may listen to music at a terminal. The music may come from speakers built into the terminal. A headset with earphones may also be supplied to the player for listening to the music or for other audio communication. A secondary player may select from one or more channels. The channels may correspond to radio stations or to broadcasts made exclusively within a casino. For example, a casino may have its own disc jockey which selects songs or tunes to be broadcast to players in the casino. The player may select a music or audio channel to listen to using a menu. Certain buttons or keys may also be configured to correspond to certain audio or music channels. For example, there may be a "Rock and Roll" button, a "Jazz" button and a "Classical Music" button. In various embodiments, a secondary player may have the ability to select individual songs to play. The casino or a third party may offer a number of songs for selection by the secondary player. Thus, the terminal, in conjunction with the network, may function as a juke box, although payment may or may not be necessary, in various embodiments. In various embodiments, as a secondary player selects songs to play, the secondary player may develop a list of preferred songs. The secondary player may then have the option of having songs from his list (e.g., songs previously selected) to be played. The terminal may systematically proceed song by song through the secondary player's list of preferred song (e.g., playing one by one and then starting from the beginning) or the terminal may randomly select a song to play at any moment in time.
    - 3.5.4.1. Songs chosen to correspond to gaming outcomes. In various embodiments, a terminal may play a song or tune which is chosen based on an outcome that occurred in a game in which the secondary player participated. For example, if the secondary player made a winning bet in a game, then a song with a happy theme may be played. If a player made a losing bet, a song with a sad theme may be played. Songs may be chosen based on the correspondence of their lyrics to the symbols, graphics, or events in a game. For example, if a "grape" symbol occurs in a game, then the song "I Heard It through the Grapevine" may be played.
    - 3.5.4.2. Secondary player brings his own songs. In various embodiments, a secondary player may bring his own tunes or songs for listening at the casino. A player may bring an MP3 player to the casino, such as an iPod. The secondary player may dock the MP3 player into the terminal. The speakers of the terminal may then be used to play songs stored on the MP3 player. Further, information about the songs on the MP3 player may be downloaded to the terminal. Various buttons, dials, or other input devices on the terminal may then be used to navigate through the secondary player's list of songs and to select songs for playing. In various embodiments, a secondary player may also store songs on a network, such as on the Internet. A secondary player may store songs on his home computer, where such home computer is accessible via the Internet, e.g., via file sharing software. The terminal may access the secondary player's songs and may play them upon the request of the secondary player. In various embodiments, a secondary player may bring movies or other entertainment to the terminal. The movies may be brought on a portable movie player, on an MP3 player, on a storage medium (e.g., on a flash drive, e.g., on a DVD), or on any other object or device. The movies or other entertainment may be loaded onto the terminal and played.
  - 3.5.5. Requirements to watch entertainment—must be gaming at a certain rate. In various embodiments, a secondary player may be permitted to watch entertainment or other video unrelated to gaming activities, so long as the secondary player engages in a certain amount of gaming activity. The secondary player may be required to bet a certain amount per unit time, to participate in a certain number of games per unit time, to have a pause between participation in games of no more than X minutes, or to satisfy any other metric of play. Thus, in various embodiments, the ability to watch entertainment may be a reward for the player for his business gaming.
  - 3.5.6. Pausing entertainment for game outcomes. In various embodiments, video or audio feeds, such as video feeds showing a movie or other entertainment, may be paused for various reasons. Feeds may be paused upon the occurrence of certain events in a game. A feed may be paused if a game in which the secondary player participates comes to a resolution or is about to come to a resolution. A feed may be paused if a game in which the secondary player participates results in an outcome that meets certain criteria. An outcome that meets such criteria may include an outcome that corresponds to a payout over a certain threshold, an outcome that corresponds to a jackpot outcome, an outcome that is a winning outcome, an outcome that had less than a predetermined probability of occurrence, or an outcome that meets any other particular set of criteria. The pausing of entertainment may allow a secondary player to focus on game outcomes or game events without missing a portion of a movie, TV show, or other portion of entertainment. A pause in entertainment may also give the player the opportunity to specify a new bet or set of bets.

3.6. Advertising. In various embodiments, one or more displays may include advertisements or other promotions. Advertisements may be for third party merchants' products, for casino shows, for casino restaurants, for products sold at casino shops, for casino hotel rooms, for other casino events, or for other products or services. In various embodiments, a screen of the terminal may be dedicated solely to advertisements. In various embodiments, advertisements may appear in windows within display screens. A secondary player may also have the ability to make purchases using the terminal. For example, a secondary player may respond to an advertisement and purchase a product that was shown in the advertisement. In various embodiments, various buttons or keys at a terminal may be temporarily or permanently associated with a product, service, or advertisement. For example, a message may be shown in associating with an advertisement. The message may say, "If you wish to learn more about this product, or to purchase this product, please press the flashing button." A button at the terminal may be flashing. The player at the terminal may then press the button to view additional screens of information about the product, to open up a line of communication (e.g., a phone call or video conference) with a salesman for the advertised product, to visit a purchase screen where the player can confirm that he wishes to pay a particular price and to receive an advertised product, and/or to purchase the product outright. For example, in some embodiments, a player may press a button to immediately purchase a product. The product's purchase price may be deducted from the player's gaming credits. In some embodiments, buttons or other input devices may be associated with a product or service even in the absence of a promotion or advertisement. A button or other input device may be permanently associated with a product or service. The player may press the button in order to purchase the product or service. After pressing the button, one or more acceptance or confirmation steps may be required. For example, the player may be required to sign, to supply a thumb print, to supply a credit card number, to supply a shipping address, or to otherwise confirm he wishes to make a purchase, or to otherwise supply necessary details for completing the purchase.

4. Play against multiple opponents. See one on each monitor. In various embodiments, a secondary player may participate in a game in which there are multiple primary players. For example, the secondary player may participate in a game of Texas Hold'em poker. The terminal may feature images or videos of two or more of the players participating in the game. The images or videos may be shown simultaneously. The images or video may be shown simultaneously on different screens. For example, there may be six primary players in a game of Texas Hold'em. There may be six display screens at the terminal. Each display screen may show video footage of a different one of the six players. In various embodiments, the displays may be arranged horizontally side by side, such as to simulate a visual field as if the secondary player were actually sitting at the live game of poker. In various embodiments, the display screens may be located near or far from the secondary player to simulate visual depth even more realistically. For example, suppose video footage is taken of all the players at a poker table from the vantage point of one seat at the poker table. Video of the primary player furthest from that seat may be shown on a display screen which is located furthest from the secondary player (e.g., furthest of any display screen at the terminal). Likewise, video of the primary player nearest the seat from which the video is taken may be shown on a display screen which is nearest to the secondary player (e.g., the nearest of any display screen at the terminal).

In various embodiments, a player at a terminal may play in a game as a primary player. For example, the player may play in a game of Texas Hold'em poker or in a game of Blackjack. Video or images of his opponents may appear on various screens of the terminal. In some embodiments, each screen may contain an image or video of a different one of the player's opponents.

In various embodiments, a player (e.g., a primary player) whose turn it is to act in a game may be prominently featured at a terminal. A player whose turn it is to act may have his image placed on a center screen on a terminal. If videos or images of multiple players are shown, the image of the player to act may be enlarged, highlighted, made more bright than images of the other players, or otherwise emphasized.

In various embodiments, avatars for players (e.g., for primary players) may be shown on the display screens of terminals. For example, a video or image of a primary player may not be available, or the primary player may wish that a video of him not be shown. Thus, an avatar or other representation of a primary player may be shown on the display screens of a terminal. Where a player acts as a primary player at a terminal, avatars for his opponents may be shown on display screens of the terminal.

5. Applications to server based gaming. No reason you can't now play multiple different gaming devices at once. In various embodiments, a terminal may function as a gaming device. A terminal may also function as two or more gaming devices. A terminal may, for instance, allow a player to play two or more games at once. In various embodiments, a first screen of a terminal may show a first game. A second screen of a terminal may show a second game. For example, the first screen may show a game of video poker. The second screen may show a slot machine game.

5.1. Gaming Device. The functions of conducting a game may be performed in several steps, in some embodiments. A random number may be generated. The random number may be translated into an outcome. A game scenario may be shown or displayed which ultimately leads to a display of the outcome. For example, reels may be shown to spin and then stop at the outcome. Further steps may include determining intermediate outcomes (e.g., based on the same or other random numbers), receiving decisions from a player, determining a payout based on an outcome, and crediting a player account with a payout. A terminal may perform one or more functions of conducting a game. A terminal may display the outcome of a game to a player. Functions of a game not performed by a terminal may be performed by another device, such as by a casino server or by a separate gaming device. For example, the casinos server may determine a random number and an outcome for a game. The terminal may then display the outcome of the game for a player. Where the terminal and another device together conduct a game, the terminal may be in communication with the other device, e.g., to request game related information from the other device and to receive such game related information from the other device. In various embodiments, a terminal may download software for conducting all or a portion of a game. The software may be downloaded, for example, from a casino server. The software may make the terminal operable to render graphics and to provide audio associated with the game. The terminal may be operable to download software for multiple different games, and therefore the terminal may be operable to conduct portions of multiple different games. For example, a terminal may be operable to conduct a portion of a slot machine game and to conduct a portion of a video poker game.

5.2. Two or more gaming devices. In some embodiments, a terminal may function as two or more gaming devices at once. For example, on one screen of the terminal may be displayed graphics and other information from a video poker game. On another screen of the terminal may be displayed graphics and other information from a slot machine game. In some embodiments, as the player at the terminal pleases, he may initiate a new game for one or the other or for both types of games. A terminal may include separate keys or controls for two types of games. For example, one set of keys may be operable to place bets in slot machine game, while another set of keys may be operable to place bets and make decisions in a video poker game. Both sets of keys may be part of the same terminal. Further, other sets of keys may be available, such as keys for craps, roulette, or other games. In some embodiments, a terminal may conduct two of the same type of game at once. For example, a first screen may show a first slot machine game and a second screen may show a second slot machine game. There may be separate sets of keys even for two of the same type of game.

5.3. A player plays as a primary player and as a secondary player. In various embodiments, a terminal may allow a player to play a first game as a primary player and to participate in a second game as a secondary player. For example, a player may place a bet on slot machine game, initiate the slot machine game, and receive a payout based on the outcome of the slot machine game. The player at the terminal may also place a bet on a slot machine game being initiated and played by a different player (e.g., by a primary player). A first display screen of the terminal may show information about a first game in which the player at the terminal is acting as a primary player. A second display screen of the terminal may show information about a second game in which the player at the terminal is participating as a secondary player. One set of keys or buttons or other input devices may allow the player at the terminal to play a first game as a primary player (e.g., to place bets; e.g., to make decisions; e.g., to initiate games). A second set of keys or buttons or other input devices may allow the player at the terminal to participate in a second game as a secondary player (e.g., to select primary players to bet on; e.g., to place bets).

6. Screen with control panel. In various embodiments, a terminal may include a screen with information about a player using the terminal. Such information may include a credit balance, an amount bet or to be bet on a first game, an amount bet or to be bet on a second game, amounts bet or to be bet on any number of other games, a primary player on whom the secondary is betting, a game in which the secondary player is participating, a pay table for a game in which the player (e.g., the secondary player) is participating, and any other information about the activities of the secondary player. The information about a player at a terminal may generally give the player an idea of how he is doing (e.g., how much he has won or lost) how much money he has left, how much he has just won on a particular game, what are the games in which he is participating, and any other useful information or other information related to the secondary player. In some embodiments, a terminal may indicate to a player how many comp points he has in total, and/or how many comp points the player has earned over a particular gaming session (e.g., over the gaming session at the terminal). A screen of the terminal may further include interactive areas where the player can touch or otherwise interact with in order to receive further information. The screen may be a touch screen, for example. In various embodiments a player may touch a screen to reveal the rules of a game. For example, the player may touch a "rules" button on the screen. In some embodiments, a player may touch a screen to reveal the pay table of a game. In some embodiments, a player may touch a screen to show the pay lines on a game.

7. Various Screens Show Layers of Information. In various embodiments, a first display screen at a terminal may show a first set of information. A player at the terminal may wish to delve further into the information, however. Thus the player may provide some indication of where he wants to learn more information. Further information may then appear on another display screen of the terminal. Screens may thus have a hierarchical relationship. A first screen may generally show broad or top-level information. A second screen may generally show more detailed information on specific items from the first screen. The first screen may be located centrally in the field of vision of the player, while the second screen may be located to the side, high above the player, or somewhere else not quite as easily visible as is the first screen. In one example, the first screen may show video footage of a primary player. The secondary player at the terminal may click on an image of the primary player in the video in order to learn more about the primary player. Subsequently, on the second screen, more information about the primary player may appear. Such information may include the primary player's name, age, occupation, the type of strategy typically employed by the primary player, the results of the last ten games of the primary player, the net winnings of the primary player in the last 20 minutes, the number of jackpots won by the primary player in his life, or any other information about the primary player. In another example, a player at a terminal may be watching a sporting event. The player may click on a horse, at which point statistics about the horse may pop up on another screen. In another example, a player may be watching a feed of a game from a blackjack table. The player may click on the table in order to see the percentage of hands won by the dealer, the percentage of hands won by the primary players at the table, the number of blackjacks that have been dealt in the last 100 hands, and any other information about the table. In various embodiments, there may be several levels of hierarchy among display screens at a terminal. It may be possible to repeatedly request more and more specific information on a topic, with each layer of more specific information appearing on a new screen of the terminal.

The following are embodiments, not claims:

A. A method comprising:
  receiving identifying information for a player at a casino;
  associating the player with a button;
  determining that the button has been pressed;
  identifying footage pertaining to the player; and
  presenting the footage.

B. The method of embodiment A further including displaying a name of the player on the button.

C. The method of embodiment A in which identifying footage includes:
  transmitting to a casino server a request for footage pertaining to the player; and
  receiving the footage from the casino server.

D. The method of embodiment A in which presenting the footage includes displaying the footage on a display screen.

E. The method of embodiment A in which identifying footage includes identifying a video showing the face of the player.

F. The method of embodiment A in which identifying footage includes identifying a video showing the player engaged in play of a game.

G. The method of embodiment A in which identifying footage includes identifying video showing an indication of game outcomes achieved by the player.

H. A method comprising:
  receiving a request from a player at a gaming device to place a phone call;
  determining a destination of the phone call;
  determining a bet that is available at the gaming device;
  determining a set of rules that are associated with the bet;
  determining that the placement of the phone call to the destination is in compliance with the set of rules; and
  connecting the player to his destination.

I. The method of embodiment H in which receiving a request from a player includes receiving from the player at the gaming device an indication of a set of digits dialed.

J. The method of embodiment H in which determining a bet that is available at the gaming device includes determining a bet on a sporting event that is available on the gaming device.

K. The method of embodiment J in which determining a set of rules includes determining that no phone calls are allowed outside the local area of the gaming device when the bet on the sporting event is placed.

L. The method of embodiment H further including recording the phone call.

M. The method of embodiment L further including:
  determining that the player has made the bet;
  determining whether the player has won the bet; and
  replaying the recorded phone call if the player has won the bet.

N. A method comprising:
  receiving an indication of a first bet from a first player;
  deducting the amount of the first bet from a credit balance associated with the first player;
  receiving a game initiation signal from the first player;
  determining a first outcome of a first game;
  displaying graphics associated with the first game on a first display screen;
  determining a first payout of the first game based on the first outcome and based on the first bet;
  increasing the credit balance associated with the first player by the amount of the first payout;
  receiving an indication of a second bet from the first player;
  deducting the amount of the second bet from the credit balance associated with the first player;
  receiving from the first player an indication of a second game played by a second player;
  determining a second outcome of the second game;
  displaying graphics associated with the second game on a second display screen, in which graphics associated with the second game are displayed simultaneously to the display of the graphics associated with the first game;
  determining a second outcome of the second game;
  determining a second payout based on the second outcome and based on the second bet; and
  increasing the credit balance associated with the first player by the amount of the second payout.

For example, the second player may be a primary player, and the first player may participate in the game of the primary player as a secondary player. At the same time, the first player may play the first game as a primary player. Thus, the first player may simultaneously act as both a primary player and a secondary player.

O. The method of embodiment N in which the second game is played remotely from the location of the first player.

P. The method of embodiment N in which displaying graphics associated with the first game includes displaying a rendition of spinning slot machine reels.

Q. The method of embodiment N in which displaying graphics associated with the second game includes displaying video footage of the second player playing the second game.

Game Sorting

In some embodiments, a primary player may directly participate in a game of chance. The primary player may place a bet, make game decisions, roll dice (e.g., if the game is a game of craps), and receive winnings and losses based on his bet, his decisions, and events (e.g., random events) that occur during the game. In some embodiments, a secondary player may place bets on games played by a primary player. The secondary player may bet that certain outcomes will occur, that certain decisions will be made, that certain cards will be dealt, that certain numbers will be rolled in a game of dice, or that any other event will occur. The secondary player may be removed from the physical location of the game. The secondary player may be uninvolved with any decisions made during the game. A secondary player may participate in a game via a remote terminal, mobile gaming device, or other device. For example, a secondary player may use a terminal with buttons and a monitor to input bets and to watch the progress of a game.

In various embodiments, a secondary player may view data or information about games in which the secondary player may participate (e.g., about games on which the secondary player can bet). The secondary player may view different types of data, may view data in various ways or presentation formats, may sort the data in different ways, may search through the data in various ways, may filter the data in various ways, and may otherwise view and interact with data about games in various ways.

1. Data about a gaming activity. Various data may be associated with a game, a player, a game table, a gaming device, or with any entity or event related to gaming. Data may include: (a) a time of day (e.g., a time of day during which a game was played); (b) a game type (e.g., video poker; e.g., slots; e.g., craps; e.g., table game; e.g., "Double Diamond 2005 Video Slots"), (c) a game platform (e.g., Game King); (d) the maximum payout or prize of a game; (e) a payout of an outcome of a game; (f) a probability of an outcome of a game; (g) a result of the game (e.g., player win; e.g., player loss; e.g., player won the jackpot; e.g., player entered the bonus round; e.g., outcome of "cherrycherry-cherry"); (h) a decision made in a game (e.g., hit; e.g., discard the first three cards of a video poker hand) (i) a bet made in a game (e.g., a bet of "red" in roulette; e.g., a bet of "don't pass" in craps); (j) a quality of a decision made in a game (e.g., was an optimal decision made; e.g., by how much did a strategy deviate from optimal strategy; e.g., was a strategy chosen that maximized expected player winnings; e.g., was a strategy chosen that maximized the chances of receiving the highest possible payout), (k) a player (e.g., a player who played a particular game), (l) a location (e.g., a city where a game was played; e.g., an area of a casino where a game was played; e.g., a shop where a game was played; e.g., a gaming table where a game was played); (m) a place in a streak (e.g., a game occurred after 3 wins; e.g., a game occurred after 5 losses; e.g., a game occurred after 3 wins and prior to 6 more wins), (n) a probability or odds associated with a particular outcome that occurred in a game (e.g., a probability associated with an outcome of "bell-bell-bell" that occurred in a game); (o) an amount won in a game; (p) an amount bet in a game; (q) one or more cards dealt in a game (e.g., the ace of spades was dealt in a game; e.g., three diamonds were dealt in a game); (r) one or more indicia that occurred in a game (e.g., "cherry"; e.g., "cherry" and "bell"; e.g., a wild symbol; e.g., "bell" or "bar"); (s) a demographic of a player who played a game (e.g., the primary player of a game is from Wisconsin; e.g., the player of a game is a nurse); (t) a player celebrity status (e.g., the player of a game is a state senator); (u) a popularity of a game (e.g., a game was the fifth most played game in a casino in the past week); (v) a popularity of a game from the vantage point of secondary players (e.g., a game was the most frequently bet on by secondary players of any type of game) (w) a similarity of one game to another (e.g., game A has similar rules to game B; e.g., players who played game A most often played game B); (x) a recommendation, such as of a game, player, dealer, table, etc. (e.g., Slot Mania got positive recommendations from 90% of players); (y) an index, such as an index of players, game results, dealers, game tables, etc. (e.g., an index may describe an average amount won by players at a particular game table; e.g., an index may describe an average amount won per game at a particular type of game in the last hour); (z) a game manufacturer (e.g., a game manufacturer associated with a particular game), (aa) a game rating or review (e.g., by other players); (bb) a number comps associated with the play of a game; or any other data about a game related device, entity; (cc) whether or not a game was a table game; (dd) whether or not a game was played without player input; (ee) a ratio of how much a player has won to how much a dealer has won; (ff) a ratio of how much a set of players has won to how much a dealer has won; or any other data.

1.1. Sort by any of the above attributes. In various embodiments, a secondary player may view data associated with a plurality of games, gaming devices, players (e.g., primary players), game tables, or other entities devices, or events. For example, a secondary player may view a listing of games together with, for each game, an indication of the time the game was played, the player who played the game, the amount bet, and the amount won. The secondary player may sort the listing of games by the time the game was played, the player who played the game by the amount of the bet, or by the amount won. Thus, for example, the secondary player may sort the listing of games into chronological order by when the games were played. Similarly, the secondary player may sort the games so that the game with the most won is at the top of the list, and the game with the least amount won is at the bottom of the list. In some embodiments, the secondary player may sort by more than one type of data. For example, the secondary player may sort first by amount won and then by amount bet.

1.2. Search for any of the above attributes. In some embodiments, a player may search for a game with a particular value or a particular instance of any associated type of data. For example, a player may search for a game played at a particular time, for a game played by a particular player, for a gaming table with a highly rated dealer, for a gaming device located in a particular area of a casino, and/or for any other particular characteristic. A secondary player may search for multiple characteristics simultaneously. For example, a secondary player may search for a gaming device that is located in a particular area of a casino and which has had 6 payouts of more than 100 coins in the last hour.

In various embodiments, data about games may be stored in a database, such as in a database located with the casino server. Various database searches techniques may be used to find games with particular attributes. For example, Structured Query Language (SQL) may be used for finding games with particular attributes.

1.3. Search for any of the above attributes with respect to a group of games, players, tables, dealers, or other objects or entities. In various embodiments, secondary player may search for data associated with a set of games, a set of table, a set of dealers, a set of gaming devices, a set of locations, or a set of any other objects or entities. For example, a secondary player may search for: (a) a set of tables at which players have won more than 60% of the games in the last 5 minutes; (b) a set of gaming devices that have together paid more than four payouts of more than $100 in the last 10 minutes; (c) a set of primary players each of whom uses basic strategy; (d) a set of dealers, each of whom deals more than 20 hands per hour; or for any other set satisfying some criterion or criteria. In various embodiments, there may be some constraint on a set of objects or entities searched for. For example, a constraint may say that all must be within the same region, such as a room of a casino. Otherwise, for example, a set of primary players who uses basic strategy might be readily found by picking individual primary players from all around the casino, although this may be permitted, in some embodiments. In some embodiments, sets of players, tables, dealers, gaming devices, or other objects or entities are defined or understood to exist in advance of a search. For example, gaming devices in a particular bank are understood to constitute a set of gaming devices. Thus, for example, a secondary player may search for banks of gaming devices that satisfy certain criteria, such as banks of gaming devices that are more than 70% occupied.

1.4. Searching for streaks. In various embodiments, a secondary player may search for a player, game, dealer, gaming device, game table, or other object or entity that is associated with a streak. A streak may include some pattern of wins, losses, or other outcomes. A streak may include a plurality of consecutive games that were all wins, a plurality of consecutive games that were all losses, a plurality of consecutive games in which a win always follows a loss and a loss follows a win, or any other pattern. A streak may involve only one of something, such as only one game. For example, a winning streak for a primary player may be one game long. A streak may not cover consecutive games. For example, primary player may go on a streak in which he wins every other game over a period of twenty total games. A streak may also include overlapping games. For example, primary players at a gaming table may be on a streak in which primary players at the table win 15 games without loss. However, many of those games may have occurred simultaneously (e.g., many of those games may be against the same dealer cards).

In various embodiments, a secondary player may search for a player, game, dealer, gaming device, game table, or other object or entity that is associated with a streak of a certain length, such as a streak of seven games. In various embodiments, a secondary player may search for a primary player, game, dealer, etc., that is associated with a streak of at least a certain length, such as with a losing streak of at least 10 games. For example, a secondary player may wish to participate in the games of a primary player has lost at least ten games in a row because the secondary player may believe the primary player is due to win soon.

Figure 11:
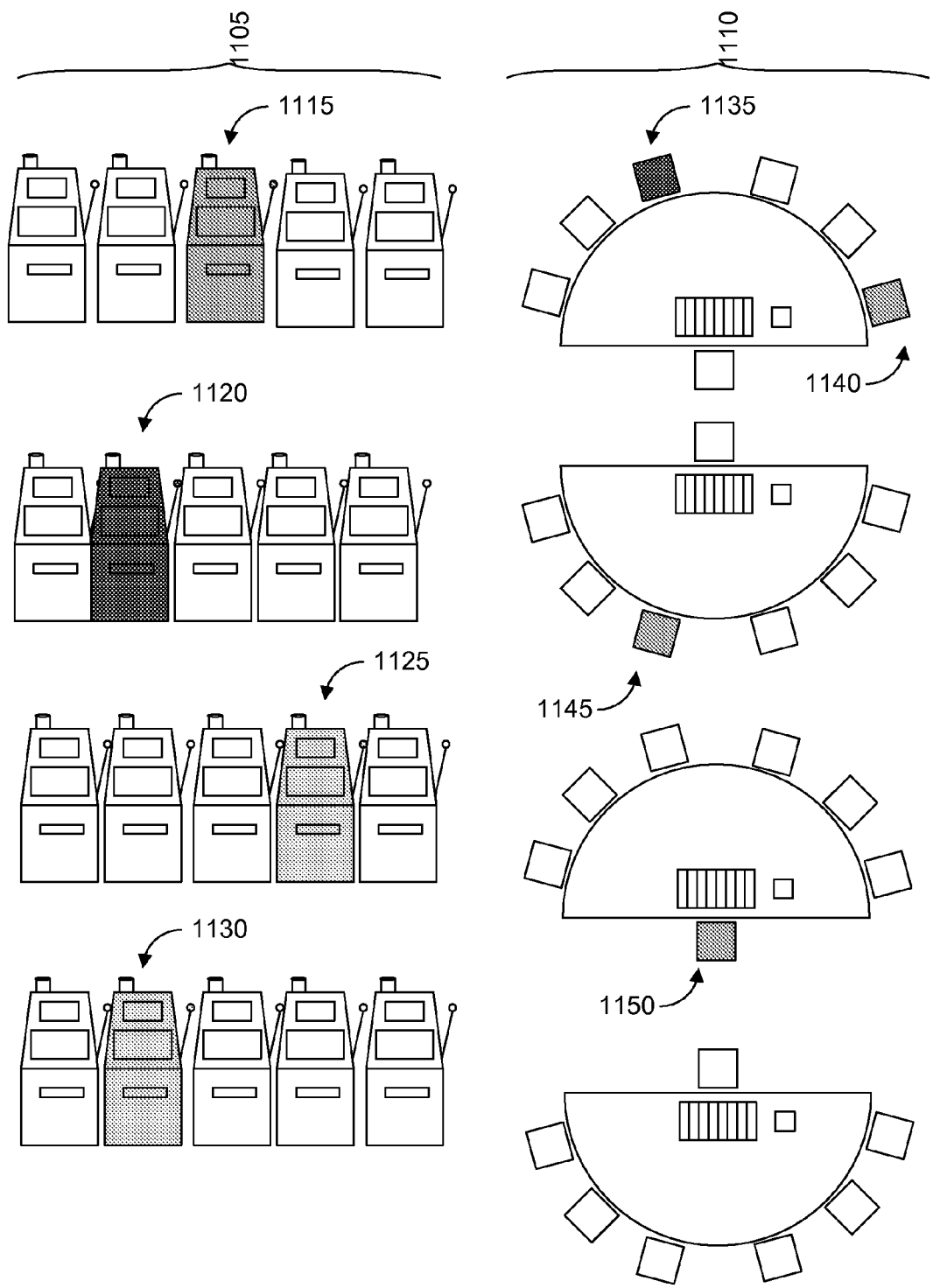
FIG. 11 shows a gaming environment, according to some embodiments.

2. Types of displays
   2.1. Tabular display. In various embodiments, a secondary player may view data related to a game, gaming device, primary player, game table, dealer, or other entity or device related to gaming using a tabular format. Each line in a table may contain related data, such as data all describing the same game or the same gaming device. For example, one line in a table may contain data related to a game. The line may include data describing the time the game was played, the gaming device at which the game was played, the amount bet on the game, the top jackpot in the game. The next line in the table may contain the same type of data, but about a different game. Thus, each column of the table may contain a similar type of data, such as a time during which a game was played. A secondary player may be able to sort the data using any of the columns. For example, the secondary player may be able to sort games by time played, so that all games will be in chronological order. The secondary player may be able to sort games by type of game, such as video poker or slot machines. After such a sort, all video poker games would be on adjacent lines in the table, for example. In various embodiments, a tabular display may be used to show a list of games, gaming devices, or other entities or devices to a secondary player only after the secondary player has used some filtering or sorting criteria to limit the universe of games (or entities or devices). Otherwise, the list may be so long as to be unwieldy or overwhelming for the secondary player. FIG. 10 shows some embodiments of a tabular display. Column 1020 may indicate the time a game was played, such as the start time of the game. Column 1030 may indicate the name of a game or gaming device. Column 1040 may indicate an amount bet on a game by a primary player. Column 1050 may indicate an outcome of a game. Column 1060 may indicate an amount won in a game by a primary player.
   2.2. Geographic (floor plan). In some embodiments, a secondary player may view a display of a casino floor-plan or other model of a casino venue. The view may show the location of various rooms, game tables, gaming devices, people and so on. For example, the view may represent a scale model of the configuration of the casino and/or of the objects in a casino. In some embodiments, a floor plan may not be made according to scale. For example, the sizes of some rooms relative to others may be exaggerated. A secondary player may use the floor plan view to find players, gaming tables, dealers, etc., based on various search criteria, such as based on a specification of a range for certain data. Different visual cues on the floor plan, such as different colors, different shading patterns, different gray levels, and so on may be used to indicate different types of data or data within different ranges. For example, red colors may indicate game tables where players have beaten the dealers, on average. Green colors may indicate game tables where dealers have beaten players, on average.
   2.2.1. Players pick colors and choose what those colors will represent. In various embodiments, a secondary player may pick colors, shading patterns, gray scales, or other visual cues to use on a geographic view of a casino floor or other gaming venue. For example, a player may choose to use red to represent gaming devices with jackpots over $2000, orange to represent gaming devices with jackpots between $1000 and $2000, and yellow to represent gaming devices with jackpots below $1000. However, the player may just as easily pick a different color scheme to represent data on the floor plan. An interface for the second player may present fixed data ranges, such as ranges of jackpot levels. The player may then select a color to correspond to the range, such as from a menu.
   2.2.2. Winning devices or players. In some embodiments, a floor plan view may show in different shades, colors, or other patterns primary players, gaming devices, game tables, or other objects or entities that have had distinctive results. For example, gaming devices which have paid out more than $100 in the last five minutes may be shown in a first shaded color. Gaming devices which have paid out more than $200 in the last five minutes may be shown in a second shaded color. As another example, positions at a gaming table where a player has won more than a certain amount in the last five minutes (or the last X minutes) may be shown with a color, shading, etc. FIG. 11 shows a floor plan view according to some embodiments. Reference numeral 1105 corresponds to gaming devices. Reference numeral 1110 corresponds to game tables, each game table including player positions and a dealer position. Gaming devices 1115, 1120, 1125, and 1130 are shown shaded. The shading may indicate that such gaming devices have paid out more than a threshold amount of money in the most recent time period, e.g., in the last 20 minutes. The different levels of shading (e.g., gaming device 1120 has a darker shading than does gaming device 1130) may indicate that the different gaming devices have crossed different thresholds. For example, gaming device 1120 may have paid out $500 in the last 10 minutes, whereas gaming device 1125 may have paid out only $250 in the last 10 minutes. Different levels of shading may have other meanings besides amounts paid out. For example, a level of shading may indicate a number of games played at a gaming device, a number of times a bonus round was reached, a size of a jackpot, a percentage of the time the gaming device was occupied, a number of consecutive losses, or any other information. Reference numerals 1135, 1140, and 1145 may indicate player positions at gaming tables. A display of shading or other color at a player position may convey various information. Such information may include an amount won in some period of time, an amount lost in some period of time, a number of consecutive hands won, a number of times a particular hand has been achieved (e.g., blackjack), a skill level, an age of a player, or any other information. The shading of a player position may indicate information about the player currently occupying the position (e.g., information about the player's amount won over the past day in any game), or may indicate information about the position itself (e.g., about how much money was won at this position in the last hour, regardless of the primary player). Reference numeral 1150 may indicate a dealer position. The shading of a dealer position may indicate various information about the dealer himself (e.g., how quickly this dealer deals), about the dealer position (e.g., how many blackjacks did the dealer receive in the past 2 hours, regardless of who was dealing), or about the table itself (e.g., what percentage of the games at this table have been won by primary players in the last hour). In various embodiments, other parts of a floor play may be shaded or otherwise patterned. For example, an entire game table may be shaded. The shading of a game table may indicate that players at the game table have won a higher percentage of games than have players at any other game table.

2.2.3. Hotspots. A floor plan view may show areas in a casino where a significant amount of activity is taking place, or where a significant amount of a certain type of activity is taking place. For example, a floor plan view may show areas of a casino where more than 80% of the gaming devices are occupied. As another example, a floor plan view may show areas of a casino where more than three jackpots have been won in the last hour. As another example, a floor plan view may show areas of a casino where players have net winnings of more than $10 per player, on average. Areas of significant activity may be indicated or conveyed with the use of certain colors, shades, with boundary lines (e.g., an area of significant activity is shown encircled with a boundary line) or with any other cues. Further, a player may select the colors, shades, or other visual cues to be used for conveying information about certain activity. In various embodiments, a "hotness meter" may appear in a view of a casino floor, game table, gaming device or other area. The "hotness meter" may consist of a color scheme or shading scheme used to convey information about how well a gaming device, player, or game is doing, for example. For example, a red color may indicate that a gaming device is in the top 5% of all gaming devices in terms of being profitable for players, while a blue color may indicate that a gaming device is in the bottom 5% in terms of being profitable for players. A hotness meter may indicate an amount won, a length of a streak, a profitability of a gaming device, a popularity of a gaming device, a number of times a bonus round has been reached, or may indicate any other information.

2.2.4. Where most players are. A floor plan view may show the locations of players or other casino patrons. Areas with relatively high concentrations of players may be shown in one color, while areas with relatively lower concentrations of players may be shown in another color. In various embodiments, a secondary player may be able to specify a certain category of primary player. For example, a category might be: primary players who have won more than $100 in the last hour; primary players from Minnesota; primary players who play perfect strategy in video poker; primary player who are betting more than $10 per game; or any other category. The floor plan view may then show the locations of primary players falling into a specified category. For example, areas with a high concentration of primary players who have pets may be shown in one color, while areas with a low concentration of such players may be shown in another color. To find and display primary players or other casino patrons falling within a particular category, a secondary player may, for example, peruse a list of available categories. The secondary player may select one or more categories. The secondary player may then select a color or other visual cue to correspond to one or more selected categories. The secondary player may select a visual cue for each category (e.g., where each different category of primary player is to be shown using a different visual cue). The selected visual cue may then be used to show the secondary player the category (or group of categories, e.g., the logical intersection of several different categories) that the secondary player has chosen to view. In various embodiments, a floor plan view may show players (e.g., primary players) according to some individual identifying information, such as according to name or according to an alias. For example, a secondary player may see a dot moving on the floor plan view of a casino. A text box may hover over the dot as it moves, indicating the name of the player who the dot represents.

2.2.5. Interactive floor plan view. In various embodiments, a secondary player may select a region on a floor play, or may select on object, person, or other entity displayed on the floor plan. For example, the secondary player may drag a mouse pointer over a gaming table shown on a floor plan view of casino. Dragging the mouse pointer over the gaming table may bring up a bubble or text box which includes information about the gaming table. For example, the bubble may indicate the name of the dealer, the percentage of times that players have won in the last 10 games, the betting limits, the game, or any other information about the table. A secondary player may interact with a floor plan view in various other ways, such as by touching various parts of a touch screen display device with the floor plan view displayed on it.

2.2.6. Show the whole floor as a roulette game or other game. In various embodiments, a casino floor or other location within a casino may be shown as one large game. For example, different regions within the casino floor may be shown within distinct boundary lines. Each bounded region may have an identifier. For example, 30 different bounded regions may be numbered 1 to 30. The secondary player may choose a region. For example, the secondary player may place a bet on a particular region. A winning region may then be determined based on events that actually happen within that region. For example, the winning region may be the first region in which a jackpot is won. For example, the winning region may be the first region in which 10 primary players achieve a flush in video poker. A region may be chosen based on any other event or set of events to transpire within that region. In some embodiments, one or more regions in a casino may be used to determine a symbol or indicia. For example, a casino may be divided into five regions. The most frequently dealt card in each region may be determined. For example, out of ten games of video poker and four tables of blackjack, the two of hearts may have been the most frequently dealt card in a first region. Using five regions, a hand of video poker may then be determined. The hand of video poker may be used in a game played by a secondary player.

2.2.7. Some data for floor plan views. A floor plan view of casino may convey a number of different types of information. As applicable for any given game, gaming device, game table, player, dealer, or group thereof, a floor plan view may indicate: (a) a ratio of amounts won by a player to amounts won by the house; (b) a length of a streak or other pattern of outcomes; (c) a name (e.g., of a player; e.g., of a dealer); (d) a demographic (e.g., of a player; e.g., of a dealer); (e) a betting limit; (f) a card that was dealt; (g) a number of times a particular card was dealt; (h) a proportion of time that a particular card was dealt (e.g., over the last hour); (i) a speed of play; (j) a highest amount won (e.g., over the last 10 minutes); (k) a size of a jackpot; or any other information. Such information may be indicated using any pattern or color scheme, using text or video, or using any other mode of conveyance.

2.2.8. Pop up window. In various embodiments, a player may view a floor plan view or any other view of information about various games, players, dealers, game tables, gaming devices, or other objects or entities. The player may move a mouse pointer over a particular object or entity (e.g., over a gaming device) and may click on that device. There may be various other ways of selecting the device. A pop-up window or other separate window may then appear to allow the player to view more detailed information or further information about the object or entity which was selected. The window may include a video feed of play or action (e.g., at a gaming device). The window may include a simulation of the action. The window may include statistics, demographic information about players or dealers, pay table information, jackpot information, information about related games, information about historical games (e.g., for comparison purposes), or any other type of information. Thus, in various embodiments, a floor plan view may have one or more selectable elements. When selected, further information may be revealed, such as about the objects or entities represented by those elements. In various embodiments, a player viewing a floor plan may have the opportunity to zoom in on one or more portions of the floor plan view, or of the objects or entities represented. For example, a player may zoom in on a particular group of gaming devices, or on a particular set of gaming tables. The representation of such objects or entities may be expanded to fill a larger screen area and/or a larger field of view. A player may also zoom out to view a representation of a larger area of a casino or more game tables, for example. When a player zooms in, more information about the objects or entities in the field of view may be provided. There may be more room to provide such information since, for example, a representation of a gaming device may now appear larger and may therefore fit more text, graphics, or other information on it. Information may include statistics (e.g., about games which have occurred at a gaming device), jackpot sizes, payout amounts, player demographic information, or any other information.

2.2.9. Searching for data using filters. In various embodiments, a secondary player may search for games, dealers, game tables, or primary players, based on various types of data. A secondary player may specify a range of values for a particular type of data, and may find all games, dealers, game tables, or primary players with associated data falling in the specified range. For example, a secondary player may specify a range of gross winnings paid by a gaming device in the last hour, where the range is specified as from $500 to $2000. Thus, every gaming device which has paid $500 to $2000 in the last hour may be found. Such gaming devices may be highlighted on a floor-plan view of a casino. In some embodiments, all other gaming devices besides those with gross winnings falling in the specified range may be blacked out or grayed out in a floor-plan view of the casino. Thus, the specification of a range of data may serve as a filter that highlights or brings to prominence those devices (or games or players or game tables, etc.) falling within a specified range, while filtering out those that do not. In some embodiments, a secondary player may specify multiple filters. The filters may successively eliminate games, gaming devices, game tables, or other entities as ranges for more types of data are specified. For example, a secondary player may specify a particular game manufacturer (e.g., IGT), so that all gaming devices not manufactured by the game manufacturer are blacked out from a casino floor plan. The player may further specify a range for the top jackpot (e.g., $1000 to $2000). All remaining gaming devices with top jackpots outside this range may be blacked out. In this way, a secondary player may successively narrow down a list or a view of gaming devices (or players, entities, game table, etc.). This may help the secondary player to hone in on a gaming device that he wishes to bet on.

2.3. Virtual Tour Display (you can move virtually through the casino and see overlaid statistics). In some embodiments, a secondary player may view a casino as if he were walking through it. For example, the view of the casino may be as from a camera that was positioned somewhere within the casino. The view may evolve as if the camera was moving. In some embodiments, a secondary player may view a casino as if he were flying through it, going through walls, or performing other stunts. The player may view actual footage from the casino, or the player may view a simulated rendition of the casino. The player may navigate through the rendition of the casino by, for example, manipulating a joystick in the direction he wishes to proceed. As the secondary player takes the "virtual tour" of the casino, the secondary player may view things that a person would normally see while walking through the casino. Namely, the secondary player may see gaming devices, game tables, people, works of art, etc. In some embodiments, the secondary player may see additional information overlays that would not be visible to someone walking through the actual casino. The player may see information superimposed on a gaming device. The information may indicate the length of a streak of games where a primary player has won at the gaming device, the last outcome achieved at the gaming device, the time of the most recent jackpot payout, or any other information. Similarly, information may be superimposed over the image of a gaming table. The information may indicate current players at the gaming table, the ratio of the amount players have won to the amount dealers have won in the last hour, the popularity of the dealer, or any other information related to the gaming table. Thus, in various embodiments, a secondary player may take a virtual tour of a casino, or of any other location, with various features, objects, or people having informative tags that may not be present or visible in the real world. A secondary player taking a virtual tour may thus be able to readily find a game, a primary player, a dealer, a gaming table, or other game or entity that suits his preferences.

2.4. Ladder display—could be a bar graph, or just a graph with the cards. A ladder display may include a first axis representing some set of units. The units may be an amount won at a gaming device in the last hour, for example. As another example, the units may be games in the current winning streak. At various points along the axis may be a number, bar, picture, or other depiction representing a quantity of something that fits at that point on the axis. For example, a number "30" at the point 5 units above the origin on the axis may indicate that there are 30 gaming devices that have just made a payout of $5. A number 31 at a point 8 units above the origin on the axis may indicate that there are 31 gaming devices that have just made a payout of $8. In some embodiments, a ladder display may show a ratio of an amount players have won to an amount that the house has won. Locations on the axis may correspond to ratios such as 0.8 (players have won 80 cents for every dollar the house has won), 1.0 (players and the house have won equal amounts of money), and 1.2 (players have won $1.20 for every dollar the house has won). At various points on the axis there may be bars, with the length of such bars corresponding to the number of gaming tables that should fall at that point on the axis. For example, a bar that appears one inch long extending horizontally from the point on the vertical axis corresponding to a ratio of 0.9 may indicate that there are 3 gaming tables where players have won 90 cents for every dollar won by a dealer. A bar that appears two inches long extending horizontally from the point on the vertical axis corresponding to a ratio of 1.0 may indicate that there are 6 gaming tables where players have won $1 for every $1 that the house has won.

In various embodiments, a ladder display may indicate the average amount that players are ahead or behind at a table. For example, for each $25 dollar range (e.g., –$25 to 0, 0 to $25, $25 to $50, etc.) that ladder display may show the number of gaming tables such that players at those tables are ahead by an average number of dollars falling within the range. For example, the ladder display may show that there are 4 gaming tables where the average player is ahead anywhere from $25 to $50.

In some embodiments, a secondary player may drill down further into the data making up a ladder display. For example, a secondary player may see from a ladder display that there are four gaming devices where the player has won the last five games in a row. The secondary player may then wish to further inquire as to which four gaming devices those are. The player may indicate such a desire in various ways. For example, the player may click on the number "4" on the ladder display indicating the number of gaming devices where the last five games in a row have been won. A text window may then appear showing details about such gaming devices, such as the locations, the type of game, the name of the primary players at the gaming devices, and so on.

In various embodiments, a ladder display may show the number of times that a particular indicium appeared, or the number of gaming devices at which a particular indicium appeared, or the number of gaming tables at which a particular card appeared, or the number of games in which a particular combination of cards appeared. For example, each position on the axis may represent a different card. Thus, for example, there may be 52 positions on the axis. A first position may correspond to an ace of spades, a second position may correspond to a king of spades, and so on. At each position may be listed a number, such as "12". The "12" may indicate that there have been 12 gaming devices in the last 30 seconds at which the ace of spades has been dealt. It may be possible for a single gaming device to be counted twice in the ladder display, since more than one card may have been dealt at the gaming device.

In some embodiments, each position on the axis of a ladder display may correspond to a combination of indicia. For example, a position may correspond to "bell-bell-bell". A number listed at the position may indicate the number of gaming devices that have generated the outcome "bell-bell-bell" in the last 10 minutes of time (or in the last X period of time). As another example, a position on the axis of a ladder display may correspond to "As Ks Js 10h 10d". A corresponding number may indicate how many video poker games have generated the above card combination in the last hour.

Various embodiments contemplate a ladder display where an axis is oriented vertically, horizontally, or in any other orientation.

2.5. Time varying attribute (things evolving over time), e.g., winnings as a function of time. In various embodiments, a display may include an indication of changing data, changing games, changing circumstances, or other changes occurring over time. A floor plan view of a casino may indicate a time evolution in some circumstance. For example, a floor plan view of a casino may indicate a first gaming table where players were winning the most at a first point in time. The floor plan view of the casino may indicate a second gaming table where players were winning the most at a second point in time. An arrow may be drawn from the first gaming table to the second gaming table, showing how the state of meeting certain criteria (in this case being the table where players win the most) has changed over time. Multiple points in time may be shown, and a secondary player may thereby see how the "crown" of being the table where players win the most has shifted over time. A secondary player may attempt to discern a pattern as to which table will be the next table where primary players win the most. For example, the secondary player may say to himself, "These three most recent arrows seem to show a shift to the west of the casino. Therefore, I think the next table which will be the best for players will be this other table on the western side of the casino."

Figure 12:
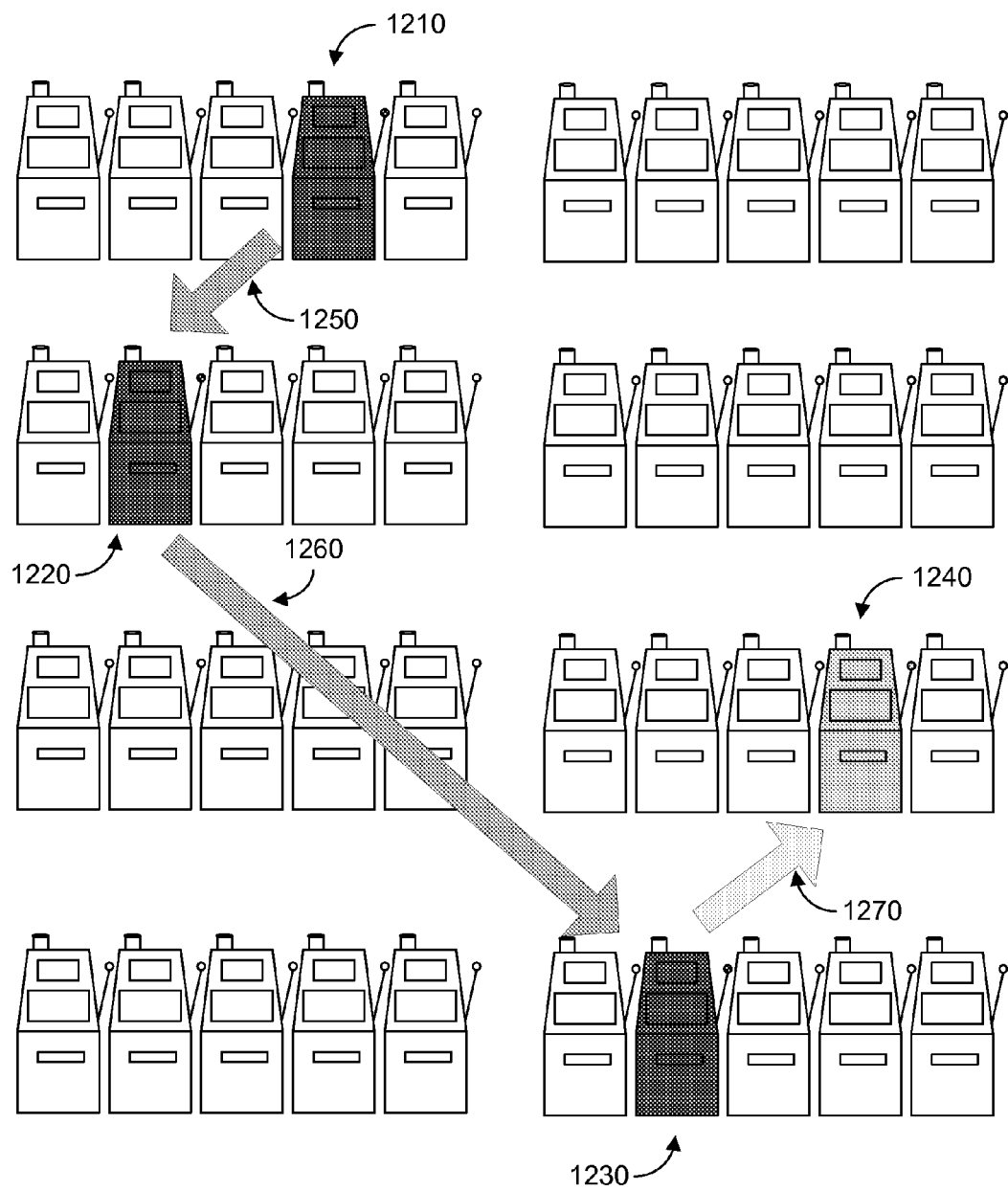
FIG. 12 shows a gaming environment, according to some embodiments.

FIG. 12 shows a floor plan view according to some embodiments. A number of gaming devices are shown. Some gaming devices are shaded, indicating that such gaming devices paid out the most in net winnings over a particular five-minute interval of any other gaming device. Gaming device 1210 paid out the most during a first five minute interval. Gaming device 1220 paid out the most during a second, later five minute interval. Gaming device 1230 paid out the most during a third, even later five minute interval. Arrows 1250, and 1260 show the progression of the highest paying gaming devices over time. Gaming device 1240 is shaded in a different tone to that of gaming devices 1210, 1220, and 1230, indicating that it is predicted to be the gaming device that will pay the most in the coming five-minute period. Gaming device 1240 may have been chosen, for example, to complete a somewhat rectangular pattern that would be formed among gaming devices 1210, 1220, 1230, and 1240.

In various embodiments, a time evolution of circumstances may be shown with respect to a single game, a single table, a single player, a single gaming device, a single dealer, or any other single object or entity. For example, a display may show the trend of a player's net winnings over time. The display may show a chart such that at each point in time, the player's cumulative net winnings since the start of the player's gaming session is shown. As another example, a display may show the time between the start of games at a particular gaming table as a function of time. For example, the display may show that it was an average of two minutes between the start of games at a table between 10:00 am and 10:30 am, but it was two minutes and thirty seconds on average between the start of games at the table between 10:30 am and 11:00 am.

In various embodiments, a time evolution of circumstances may be shown with respect to a group or set of games, tables, players, dealers, gaming devices, or any other set of objects or entities. For example, a display may show, for a bank of 10 gaming devices, how many times payouts over $20 have been paid in each five-minute interval over the last three hours.

In various embodiments, a time evolution of circumstances may be shown in tabular format. For example, each row in a table may correspond to a particular point in time. Data associated with each point in time may include a payout paid at that point in time, a decision made in a game at that point in time, an outcome that occurred at that point in time, and so on.

In various embodiments, the ability to see data or circumstances as they evolve over time may give a secondary player a chance to try to predict where a trend is leading. For example, if a group of gaming devices has been paying greater payouts, on average, during each five-minute interval over the last hour, a secondary player may assume this trend will continue and may thereby wish to participate in a game played at one of the gaming devices in the group.

In various embodiments, a secondary player may be given access to a prediction tool or tools. The prediction tools may allow the secondary player to use a set of known data and to extrapolate possible future occurrences based on the known data. For example, a prediction tool may be able to perform linear regressions, to perform predictions using neural networks, to perform predictions using a set of rules, or to perform predictions in any other fashion. The secondary player may use a prediction tool in conjunction with various data (e.g., with various data about games, gaming devices, etc.) and may thereby determine a game in which to participate. In various embodiments, a secondary player may allow a bet to be placed automatically on his behalf based on the outputs of a prediction tool. In various embodiments, a prediction tool may be a software program that resides on a casino server. In various embodiments, a person, such as a "resident expert" may make predictions as to which games are likely to be favorable for a secondary player to participate in. The resident expert may supply his predictions to one or more secondary players. A secondary player may pay to receive the services of a person making predictions and/or of a prediction tool. A resident expert may be a casino employee. In some embodiments, it may be determined which of a plurality of secondary players has had the greatest success (e.g., has won the most over a certain period of time). This secondary player may be chosen or selected to be a "resident expert". Other secondary player may then have the opportunity to use the predictions of the chosen secondary player. In various embodiments, data about the success of secondary players may be made available to other secondary players. For example, data about what percentage of bets have won for a first secondary player may be made available to a second secondary player. The secondary player, based on his own evaluation of the data, may then determine whether or not to participate in the same games as does the first secondary player.

2.6. Network diagram (one game related to another game, which is related to another game). A network with related things joined together) games played by the same player. In various embodiments, a display may represent gaming devices, players, dealers, gaming tables, or other objects or entities as nodes on a network. The nodes may be connected to each other based on some similarity between the players (or games, or game tables, etc.) represented by the nodes. For example, two gaming devices that are both video slot machines with five reels may be shown as near to one another in the network, perhaps with a direct connection between them. As another example, two games for which the jackpot size is the same may be shown as being near to one another in the network. In one example, a first gaming device featuring a particular game and accepting $1 chips is shown connected in the network diagram to a second gaming device featuring the same game and accepting quarters. The second gaming device is, in turn, shown connected to a third gaming device featuring the particular game but accepting nickels. The first and third gaming devices may not be shown as being directly connected.

In various embodiments, a network display may show primary players. Primary players may be shown connected or near to one another based on: strategies used by the primary players (e.g., primary player use of basic strategy); games played by primary players (e.g., primary players nearby on the diagram all like blackjack); times when the primary players are active (e.g., primary players near to one another on the diagram may play at similar times); demographic of the primary player (e.g., primary players near to one another on the diagram may be within similar age groups; e.g., primary players near to one another on the diagram may have occupations in similar industries).

In various embodiments, a network diagram may show dealers' relationships to one another. Dealers may be located close to one another based on how quickly the dealers deal, based on how full the tables are when the dealers deal, based on how many mistakes the dealers make, based on how much players usually win when the dealers deal, and/or based on any other factors.

A display which shows gaming devices, players, dealers, or other objects or entities as being connected does not necessarily imply that there is any physical connection between the objects or entities. Rather, the display may seek to illustrate similarities between objects or entities by showing such objects or entities as being proximate to one another or connected to one another in terms of the network display. A secondary player may find a network display useful if, for example, he finds that he likes participating in games of a certain type of gaming device and wishes to find other gaming devices with similar characteristics. To do so, he may find other gaming devices in the network display that are connected to the gaming device he already likes.

A network display may be developed or built in various ways. Objective data about gaming devices, players, dealers, or other objects or entities may be used. For example, the casino server may have data about a gaming device's jackpot, its manufacturer, whether it uses video reels or mechanical reels, or data about any other feature of the gaming device. Objective data may be used to place devices (or players, or dealers, etc.) near to other gaming devices with similar objective data (e.g., with a similar manufacturer; e.g., with a similar jackpot). A network display may be built based on the activities of secondary players. If the games of two different gaming devices tend to be participated in by many of the same secondary players, such gaming devices may be deemed similar, at least insofar as preferences of secondary players. Therefore, such gaming devices may be located near to one another on a network display. Thus, a network display may tend to place near to one another, or connected to one another, gaming devices, primary players, dealers, gaming tables, games, etc., that tend to be preferred by the same secondary players.

Figure 13:
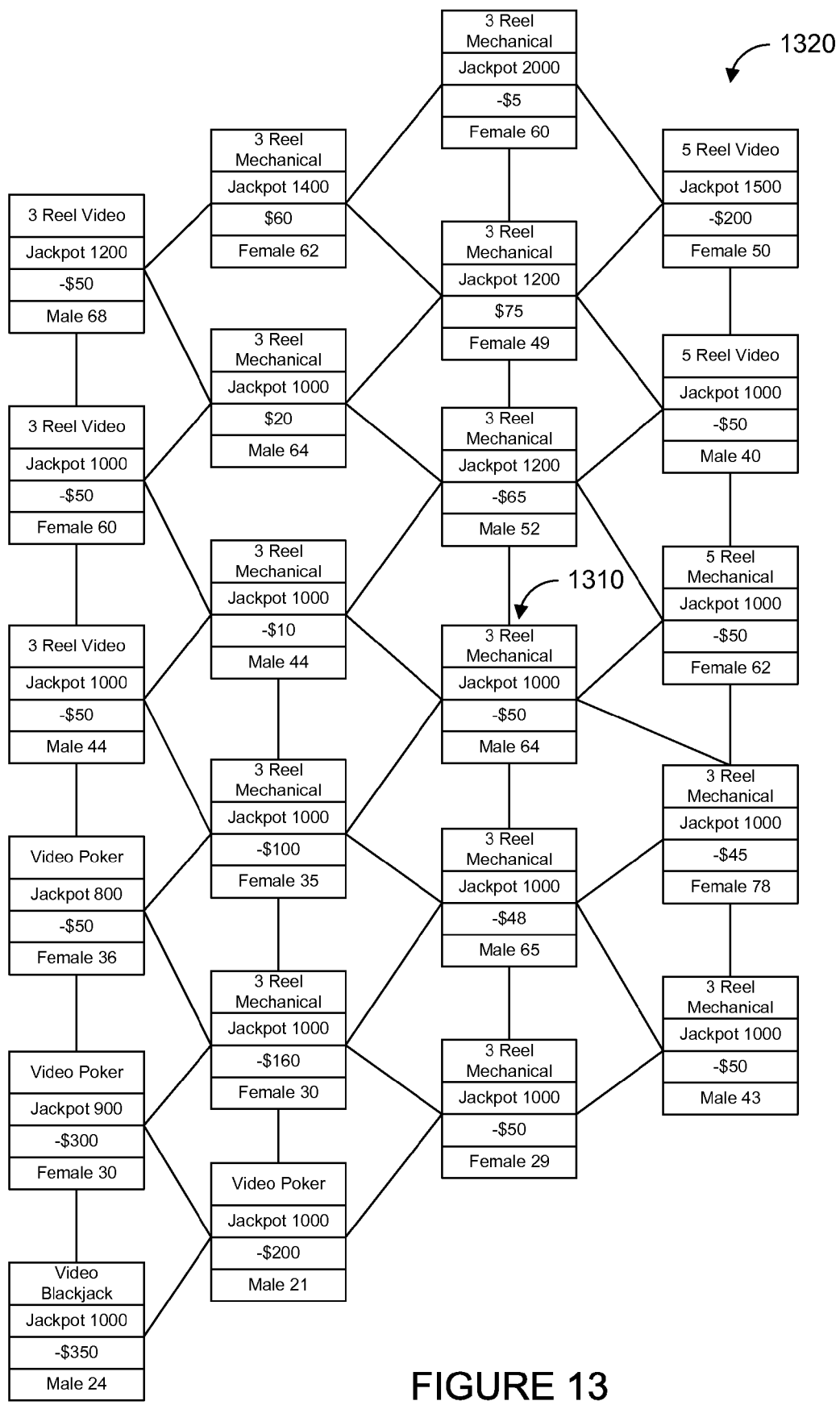
FIG. 13 shows information about gaming devices, according to some embodiments.

FIG. 13 shows a network display according to some embodiments. Each node, such as nodes 1310 and 1320 represents a gaming device. Some information about each gaming device is displayed on a node, including the type of game, the size of the jackpot, the amount won or lost at the gaming device in the last 20 minutes, and age and gender of the primary player at the gaming device. Gaming devices with one or more common or similar characteristics may tend to be connected to each other in the network display.

2.7. Combination display and betting interface. Drag chips to certain games on the display to make a bet. In various embodiments, a display may show a representation of a game, a player, a dealer, a game table, or a game. A secondary player may, in some embodiments, use the display to gather information. In some embodiments, a display may be used as a betting interface. A player may place bets on a gaming device, for instance, by selecting or designating the gaming device on the display. For example, a secondary player may drag a representation of a gaming chip onto a representation of a gaming device using a computer mouse. Doing so may indicate that the secondary player is placing a bet equal to the amount represented by the gaming chip on the next game to be played at the gaming device. A player may designate a gaming device in various other ways, such as by double clicking on the representation of the gaming device, such as by circling the gaming device with a mouse pointer, and so on. In various embodiments, a secondary player may designate a primary player using a display. For example, a display may show representations of various primary players. A secondary player may drag a representation of a gaming chip onto a representation of a selected primary player. The secondary player may thereby place a bet on the next game of the selected primary player. In various embodiments, a secondary player may drag representations of gaming chips onto a representation of a gaming table (e.g., in order to place a bet on the next game played at that gaming table), onto a representation of a dealer (e.g., in order to place a bet on the next game played by that dealer), onto a representation of a game (e.g., in order to place a bet on the next instance of that game that is played anywhere in the casino), and so on.

2.8. Different windows for different games out there. The one in progress comes to the foreground. Or there are different criteria for coming to the foreground. In some embodiments, a secondary player may participate in two or more different types of games. A secondary player may participate in games at two or more different gaming devices. A secondary player may participate in the games of two or more primary players. A secondary player may participate in the games of two or more dealers. A secondary player may participate in games at two or more tables. In various embodiments, a secondary player may participate in two or more separate games at approximately the same times. For example, the secondary player may place a first bet on a first game at a first gaming table. While the first game is still in progress, the secondary player may place a second bet on a second game at a second gaming table. The first game may resolve while the second game is still in progress. The secondary player may thereupon place a third bet on a third game at the first gaming table. While the third game is still in progress, the second game may finish. The secondary player may thereupon place a fourth bet on a fourth game at the second gaming table. Thus, for example, the secondary player may simultaneously participate in games at two or more gaming tables.

In various embodiments, where a secondary player participates in multiple different games at the same time, games falling into different categories may be shown in different windows. For example, games at different gaming tables may be shown in different windows. For example, games at different gaming devices may be shown in different windows. For example, the games of different primary players may be shown in different windows. In various embodiments, games with a common characteristic may be shown in the same window. For example, games from the same gaming table may be shown in the same window. A secondary player may, for example, place bets on the games of two different primary players, both of whom are sitting at the same gaming table.

In various embodiments, a display may alternately bring windows to the foreground based on events that happen in games featured in those windows. For example, when a game featured in a window comes to a resolution, the window featuring the game may come to the foreground. This may allow a secondary player to see what the result of the game was and how much he won. It may also give the secondary player the opportunity to bet on a new game that is to follow the game that just finished (e.g., a new game that is to be played at the same gaming device as was the game that just finished; e.g., a new game that is to be played by the same primary player as was the game that just finished; e.g., a new game that is to be played at the same gaming table as was the game that was just finished). In various embodiments, a window may come to the foreground when a featured game is about to come to a resolution. This may allow the secondary player a moment of anticipation before seeing the resolution. In various embodiments, a window may come to the foreground when there is a possibility of a large payout being won. For example, a window may feature a game of video poker. If an intermediate outcome of four cards to a royal flush is dealt, the window may come to the foreground, since there is a significant possibility that a royal flush payout may be won. In various embodiments, a window may come to the foreground if a decision is to be made in a game. For example, if a window features a game of blackjack, the window may be brought to the foreground if a decision is to be made or is about to be made in the game. The secondary player may thereby see the decision and may also have the opportunity to evaluate the skill of the primary player making the decision. In various embodiments, a window may come to the foreground if an unusual event happens in the featured game. An unusual event may include a decision that is contrary to basic strategy or optimal strategy, an occurrence of a high-payout outcome (e.g., a jackpot at a slot machine), a situation where every player at a table gets the same outcome; a situation where every player at a table wins; situation where every player at a table loses; or any other event that may be considered rare or unusual.

In various embodiments, a window may be removed from the foreground if gaming activity ceases in the game or games that were featured in the window. For example, if a gaming table is closed down, a window featuring games from the gaming table may be removed from the foreground, or removed altogether.

A window may include a bounded region on a display screen, such as a rectangular region. The region may have a well-defined border. The region may show images, text, or other visual cues which are distinct from those in areas outside the window. When a window comes to the foreground, the complete area of the window may be visible. Parts of the areas of other windows may be obscured by the window in the foreground. When a new window comes to the foreground, parts of the window that was previously in the foreground may become obscured.

2.9. Displays of people's faces or avatars (sort by mood, or other facial features). In various embodiments, a display may show the faces of primary players. The faces may be real faces, or the faces may be animated faces that do not necessarily mirror the actual appearance of the primary player. Faces of primary players may be shown from photographs previously taken of the primary players. Faces of primary players may be shown live, e.g., based on footage taken by a camera of a primary player as he plays a gaming device. By viewing the faces of primary players, secondary players may have more information available to them in determining which games to participate in. For example, a secondary player may think to himself, "That guy looks like he knows what he is doing, so I'll bet on him." As another example, a secondary player may think, "She is looking very lucky today, I think I'll bet on her."

In various embodiments, to participate in a game of a primary player, a secondary player may click on the face of the primary player on the display viewed by the secondary player. The secondary player may select the face of the primary player in other ways as well. The secondary player may also view the face of a primary player, but my actually select the primary player in a different manner, such as by typing in a name or identifier associated with the primary player.

In various embodiments, software tools may be available for discerning information about a primary player based on images of the primary player's face. For example, software may be used to determine (e.g., to determine with some probability) the mood of a primary player. In various embodiments, a secondary player may sort or search primary players based on the moods of the primary players. For example, a secondary player may search for a primary player that is "happy" because the secondary player may feel such a primary player is likely to be on a winning streak. Software that analyzes images of a primary player may also be used to infer other information, such as age, ethnicity, gender, or health. In various embodiments, a secondary player may search or sort primary players based on any information that is discernable from images of the primary players.

In various embodiments, a display may feature images of dealers, such as images of dealers' faces. A display may also feature avatars of dealers' faces. A secondary player may choose a game to play based on the appearance of the dealer who is dealing that game. For example, a secondary player may wish to participate in a game of a dealer who appears to be in a bad mood, since the bad mood may signify to the secondary player that the house is losing. In various embodiments, software tools may be used to determine information about a dealer from images of the dealer. In various embodiments, software tools may be used to search or to sort dealers based on information that is discerned from images of the dealers.

2.10. A virtual world display. So games are organized into a virtual world. In various embodiments, a display may scenes from a virtual world. The virtual world may appear like a fantasy landscape, a dessert, a pasture, or the inside of a building. Within the virtual world may be representations of gaming tables or gaming devices. Such representations may have a similar appearance to actual gaming tables or gaming devices. In some embodiments, representations of gaming tables or gaming devices may have completely different appearances. For example, a gaming table may be represented as a large mushroom, while a gaming device may be represented as a rose bush. A secondary player may select a mushroom in order to participate in games at the gaming table represented by the mushroom. In some embodiments, a virtual world may organize gaming devices and game tables in different ways than they are organized in a real casino. For example, rather than intermingling different types of games, a virtual world may present all gaming devices of a first type in one area, all gaming devices of a second type in another area, and so on. Thus, it may be easy for a secondary player to find a game he might be looking for within the virtual world. In various embodiments, a secondary player may navigate the virtual world as if from the vantage point of a person walking within it. For example, the secondary player may move a joystick forward so as to get closer to objects which appear distant on the screen. Similarly the secondary player may move the joystick backwards so as to get further way from objects which appear distant on the screen.

2.11. Ways to distribute information over multiple displays screens (e.g., different floor of the casino on each display). In various embodiments, a terminal, computer, or other device used by a secondary player may include multiple display screens. On the multiple display screens, a secondary player may view information about games in which he is participating, about games that are available for him to participate in, about his current credit balances, about options for betting on games, and/or about any other pertinent topic. There may be various ways to divide the information shown to the secondary player over the various screens.

2.11.1. Different games. In various embodiments, different screens may be used to display information about different games. For example, on a first screen, a secondary player may watch the progress of a video poker game, while on a second screen a secondary player may watch the progress of a slot machine game. As another example, a secondary player may watch the progress of a game at a first gaming device on one screen, while he watches the progress of a game at a second gaming device on another screen.

2.11.2. Different types of games. In various embodiments, information about games of a first type may be displayed on a first screen, while information about games of a second type may be displayed on a second screen. For example, information about table games may be displayed on a first screen, while information about games from gaming devices may be displayed on a second screen. As another example, roulette games may be displayed on one screen, while video poker games are displayed on another screen.

2.11.3. Different views of a game. (From the top, or as if you were playing). In various embodiments, different screens may be used to show views of the same game from different vantage points. For example, a secondary player may be participating in a table game of blackjack. One view may show the game unfolding as if the secondary player was sitting in the primary player's shoes. Thus, the secondary player may be able to see the cards dealt, but may not be able to see the primary player. Another view may show the game unfolding as if the secondary player was hovering overhead. Thus, in the second view, the secondary player may see top of the primary player's head and the cards dealt. Other views may also be possible, such as a view from the vantage point of the dealer or such as a view from the underside of the table.

2.11.4. Control panel versus game information. In various embodiments, one screen may show the progress of a game in which a secondary player is participating. Another screen may show controls or interfaces that the secondary player may use. Controls or interfaces may include controls for selecting a game in which to participate, controls for selecting an amount to bet, controls for entering search criteria (e.g., search criteria for finding a game of interest to the secondary player), or controls for making any other gaming related decision, or other decision. The screen featuring the controls may be a touch screen, in some embodiments.

2.11.5. Game view versus view of statistics (e.g., about a player, gaming device, dealer, etc.). In various embodiments, a first screen may show the progress of a game in which the secondary player is participating. A second screen may show statistics or other information. The statistics or other information may be related in some way to the game being shown on the first screen. The statistics may indicate the probability that one or more outcomes will occur, the number of times similar cards have been dealt already in the last day, the place in a streak that a certain game occupies (e.g., this is the eighth game in a losing streak), or other information. Statistics may relate to the primary player of a game. For example, statistics may indicate the net winnings of the primary player over the last two hours, the typical strategy used by the primary player, the number of times the primary player has won a jackpot in his life, the city the primary player is from, or any other information about the primary player. The second screen may also show statistics about a dealer, game, or gaming table.

2.11.6. One screen is common to several secondary players. For example, all secondary players are participating in the games at one table. In various embodiments, two or more secondary players may be in proximity to one another. A screen may be visible to both of the secondary players. The screen may show information that is relevant to both secondary players. For example, both secondary players may be participating in games at the same gaming table. The screen visible to both secondary players may show the dealer's cards, or may show a view of the gaming table from high up so that all games at the table are visible. Each of the secondary players may have his own personal screen as well. A personal screen may show information that is more pertinent to the individual secondary player. For example, a personal screen may show the cards of the primary player for the game in which the secondary player is participating. Another secondary player may be participating in the game of a different primary player, and so may be unconcerned about such cards.

2.12. You can have an actual physical machine recreate what's going on down there. E.g., a wheel of fortune on your machine spins. But it just says "reenactment". In various embodiments, a game played on a first gaming device may be reenacted on a second gaming device. For example, a primary player may play a first game at a first gaming device. A second gaming device located near a secondary player may receive information about the first game. The second gaming device may then reenact the first game by, e.g., displaying similar indicia as were displayed in the first game, by making similar sounds as were made in the first game, by flashing similar lights as were flashed in the first game, and/or by otherwise mimicking the first gaming device. Thus, the second gaming device may function as a three dimensional display, and may be used to recreate or reenact games played at the first gaming device. In some embodiments, a gaming device near the secondary player may include a spinning wheel, as in a Wheel of Fortune game. The second gaming device may spin the wheel in the manner that the wheel was spun at the first gaming device. The secondary player may then feel the experience of watching a nearby wheel spin. In various embodiments, a device which is not a complete gaming device may nevertheless be used to reenact parts of a game that occurred on a first gaming device, e.g., in a game played by a primary player. For example, a device may include a spinning wheel as in the Wheel of Fortune game, but may not include a video display or spinning reels. In various embodiments, when a device is used to reenact or recreate a game, the device may clearly indicate that the game is only a reenactment that the game is not original, that the game will not pay out real winnings, or may provide some other related indication. When a device provides an indication that a game is only a reenactment, problems such as a person claiming a jackpot shown by the device may be avoided.

3. Zooming in. In some embodiments, a secondary player may wish to watch the progress of a game. For example, the secondary player may wish to watch the progress of a game as it is played. As another example, the secondary player may wish to watch the progress of a game that had been played in the past, as if the game was currently being played (e.g., the player wishes to watch footage or a reenactment of the game). A secondary player may, for example, be perusing a floor plan view of a casino. The secondary player may find a gaming table where players have won 80% of the last 40 hands dealt. The secondary player may therefore wish to watch games at that table as the games unfold. A secondary player may indicate in various ways that he wishes to watch a game in progress. The secondary player may click on a gaming device or game table from a floor plan view of a casino. The secondary player may click on a line or record corresponding to a gaming device in a tabular view in order to watch games progressing at that gaming device. The secondary player may also key in the name of a game type, a location in a casino, or any other criteria that may narrow down the universe of gaming devices or players. Once the universe is narrowed down to one or a few games, such games may be watched as they are in progress. For example, the secondary player may be able to watch in real or in near time as bets are made, as cards are dealt.

In some embodiments, a player may watch the progress of a game together with other information. The other information may be information that was not present in the original footage. For example, the casino server may add to the game footage text indicating a probability of a certain final outcome occurring, text indicating the name of a player, text indicating what happened the last time a similar intermediate outcome occurred (e.g., text indicating what happened the last time a primary player drew to a royal flush), or any other text overlay.

3.1. Video. In some embodiments, a secondary player may watch the progress of a game via video. The video may represent actual footage, such as from a camera overlooking a gaming table or gaming device. The video may be live, delayed or it may represent footage that has been stored from a previously played game.

3.2. Simulation. In some embodiments, a secondary player may watch the progress of a game via a simulation. The simulation may be a simulated reenactment of the game. The reenactment may feature the dealing of animated cards and the placement of bets by animated hands holding animated chips. The simulation may show actual indicia which have occurred or are occurring in a game. The simulation may shown an animated spinning of slot machine reels, the animated roll of dice, or the animated spinning of a roulette wheel, for example.

3.3. Battle Blackjack. In various embodiments, a game may be simulated or reenacted metaphorically. For example, rather than showing the cards dealt in a game of blackjack, a reenactment may show two people arm wrestling. As the advantage in the game shifts one way (e.g., the player has a favorable hand, such as a 20 in blackjack versus a 16 for the dealer), the arm wrestler representing the player with the advantage may be shown to be winning the arm wrestling battle (e.g., the arm wrestler representing the player may be shown having pressed the arm of his opponent to within one inch of the table). Similarly, if the player's opponent (e.g., the dealer or another game player) gains an advantage, the arm wrestler representing the opponent may be shown to gain the advantage in the arm wrestling battle. Many other metaphors for a reenacting a game may be used, including various sporting contests, battles, wars, or other confrontations or activities. The advantage of one player or another in a game may be determined probabilistically. For example, the advantage may be determined based on a player's chance of winning a game. A player's advantage may also be determined with the assumption of a particular strategy, such as basic strategy or optimal strategy.

3.4. Commentary—good or bad decision. In various embodiments, a game reenactment, or live game may be shown together with commentary on the game. The commentary may indicate whether decisions made in the game were good or bad. For example, a comment may indicate that a player made a good decision, e.g., a decision according to basic strategy. As another example, a comment may indicate that a player made a decision which gave up $2 in expected value. Comments may indicate other things. For example, a comment might indicate what a player might be thinking. For example, "John is considering between hitting or standing right here. Both would be reasonable decisions, though hitting is considered slightly better under normal conditions."

3.5. Simple text description of the game. In various embodiments, a reenactment of a game or a live display of the progress of a game may be text-based. For example, text may say, "Player Henry M. is dealt the A 7 . . . . " Thus, a secondary player may get enough information to reconstruct a game, but may not necessarily see indicia or other game events in the form that they originally or actually happen. In various embodiments, a secondary player may hear audio descriptions of a game. The secondary player may hear audio commentary too.

4. Player wants to be in a game with certain criteria. As the criteria change, the player is automatically switched to the new table. E.g., I want to be on the table with the best winning streak. So it switches you. So currently you might pick a table. Then, you check a box that says keep me on the table that has the most winnings streak. In some embodiments, a secondary player may indicate criteria for participating in a game. The criteria may specify a primary player of the game, a game type, a bet amount, a location in a casino, or any other data related to the game. The casino server may find games matching criteria desired by the secondary player (e.g., criteria specified by the secondary player). The casino may then allow the secondary player to participate in one or more of such games. For example, the casino server may allow the player to place a bet on one or more of such games and to receive winnings based on the outcomes of one or more such games. In some embodiments, a secondary player may continue to participate in successive games played at a particular gaming device, a particular table, played by a particular primary player, or otherwise having something in common. For example a secondary player may continue to participate in successive games played at a particular slot machine. The particular slot machine may be a slot machine that has matched criteria specified by the secondary player. For example, the slot machine may be a slot machine that has paid out the most of any slot machine in the casino in the past half hour. However, it may happen that, over time, a game, player, gaming table, gaming device, or other device or entity no longer satisfies the same criteria that it originally satisfied. For example, for a few minutes a particular slot machine may hold the distinction of having paid out more money in the most recent half hour than any other slot machine.

However, during the course of those few minutes, other slot machines may make large payouts, so that the first slot machine is no longer the highest paying slot machine in the most recent half hour. Thus, in some embodiments, a secondary player may wish to switch gaming devices, to switch primary players, to switch game tables, or to make some other switch so that the secondary player can continue to participate in games that currently meet his desired criteria. Thus, for example, a secondary player may begin play at a first slot machine that has paid the most of any slot machine in the last half hour. When a new slot machine becomes the slot machine that has paid the most in the most recent half hour, the secondary player may cease participating in games at the first slot machine and may switch to participating in games of the new slot machine.

In some embodiments, a secondary player may specify criteria for a game in which he wishes to participate. The casino server may find a first game satisfying the criteria and allow the secondary player to participate in the game. The secondary player may then continue to participate in games having something in common with the first game, such as in games played by the same primary player as the first game, such as in games played at the same gaming device as the first game, such as in games played at the same gaming table as the first game, such as in games played by the same dealers as the first game, and so on. At some point, the casino server may determine that the games in which the secondary player will participate (e.g., if he keeps participating in the games of the same primary player; e.g., if he keeps participating in games at the same gaming table) will no longer meet the original criteria set forth by the secondary player. At this point, the secondary player may be switched so that he is now participating in games that do meet his original criteria. In various embodiments, a secondary player may specify whether he wishes to be switched from participating in a first set of games (e.g., from participating in a games of a first primary player) to participating in a second set of games (e.g., to participating in the games of a second primary player). The secondary player may indicate a desire to be switched when he originally specifies criteria for participating in games. For example, a secondary player may specify that he wishes to participate in the games of a first primary player who has the highest net winnings of any primary player over the last hour. The secondary player may further specify that the moment a different primary player overtakes the first primary player in terms of having the highest net winnings in the last hour, the secondary player would like stop participating in the games of the first primary player and begin participating in the games of the new, different primary player.

In various embodiments, when the games in which a secondary player is participating no longer satisfy the criteria specified by the secondary player for participating in games, the secondary player may be switched to new games automatically. For example, the secondary player may be automatically switched from participating in the games at a first table to participating in the games at a second table. In some embodiments, the secondary player is informed of this switch. For example, a message may pop up on the screen of the secondary player's display. The message may say, "You are now participating in games at Blackjack table 6, where player net winnings over the last hour are the highest of any table." In some embodiments, the secondary player may not even be informed of a switch. Rather, the secondary player may continue to see a reenactment of games without realizing the games are originating from a different gaming table. In some embodiments, though a secondary player may not be told explicitly of a switch (e.g., via a pop-up message), ways may be available for the secondary player to surmise that a switch has occurred. For example, a display screen on which the secondary player is watching a simulated reenactment of a blackjack game may include a table identifier in the lower right hand corner. When the secondary player is switched from participating in the games of a first table to participating in the games of a second table, the table number in the lower right hand corner may change.

In some embodiments, a secondary player may be asked for an input in relation to a potential switch. For example, a message may be displayed for the secondary player indicating that the secondary player is to be switched from participating in a first set of games to participating in a second set of games. The secondary player may be asked whether he would really like to be switched or whether he would like to remain a participant in the first set of games. The secondary player may be informed of the reason for the switch. For example, the secondary player may be informed that he is being switched because the second set of games better match his criteria for participating in games than do the first set of games.

In various embodiments, a secondary player may not provide an indication that he would want to switch from a first set of games to a second set of games. The secondary player may only specify criteria for selecting games in which to participate. The casino server may, in various embodiments, determine at some point that a second set of games better matches the secondary player's criteria for participating in games than does the set of games in which the secondary player is currently participating. Thus, the casino server may ask the secondary player whether he would like to switch and participate in the second set of games. The question may be asked though the secondary player never before indicated an interest in switching. The secondary player may then have an opportunity to accept or not.

In various embodiments, a secondary player may be rotated from game to game according to some algorithm. For example, after every 50 games of a first gaming device in which a secondary player participates, the secondary player may be automatically moved to a second gaming device of the same type (e.g., featuring the same game). In various embodiments, after a certain patterns of wins or losses, a secondary player may be rotated to another gaming device, game table, or primary player. For example, if a secondary player loses five games in a row while participating in the games of a first primary player, the secondary player may be automatically rotated to the games of another primary player. In some embodiments, a secondary player may be asked to confirm his approval before being rotated to a new game.

In various embodiments, a secondary player may wish to participate in a game with a certain characteristic. The secondary player may wish to participate in a game with a certain primary player, in a game at a certain gaming table, in a game at a certain gaming device, in a game with a certain betting limit, in a game with a certain jackpot, in a game made by a particular manufacturer, in a game that follows X consecutive wins, in a game that follows X consecutive losses, or in a game with any other characteristic. However, a game that conforms to the desires of the secondary player may not be immediately available for the secondary player to participate in. For example, there may be no primary player who is playing a particular gaming device whose games the secondary player wishes to participate in. Thus, in various embodiments, a secondary player may be alerted when a game that meets some criteria becomes available. The criteria may include criteria that secondary player has previously used to find a game in which to participate. For example, if no primary player is currently playing at a gaming device in whose games the secondary player wishes to participate, the secondary player may be alerted when a primary player does sit down at the gaming device.

Patterns of Betting

In various embodiments, a pattern of betting may be determined for a player, such as for a primary player or for a secondary player. A pattern of betting may entail any system of rules, tendencies, criteria, or other factors used by a player in placing a bet or series of bets.

A pattern of betting may describe or encapsulate a first player's tendency to: (a) bet on a particular second player; (b) bet on only the house (e.g., in a game of blackjack or roulette); (c) bet on only the player position (e.g., in a game where a house plays against the player); (d) double a bet after a loss; (e) change a bet size under particular circumstances; (f) bet only on a particular type of outcome (e.g., bet only on red in roulette; e.g., bet only on the pass line in craps); (g) employ a particular strategy in a game; (h) bet on a particular type of second player (e.g., a first player's betting pattern may be to always bet on a second player who has won more than $100 in the last 10 minutes); and/or any other tendency.

A first player's pattern of betting may include the tendency to always bet on another player (e.g., on a primary player) who is the top performing player in the last hour. A first player's pattern of betting may include the tendency to always use optimal strategy in a game of blackjack. A first player's pattern of betting may include the tendency to bet on a second player only when the second player plays a particular game, such as blackjack. A first player's pattern of betting may include the tendency to bet on a second player only when the second player is on a winning streak.

In various embodiments, a pattern of betting may be exhibited by either a primary player or by a secondary player. A secondary player may exhibit a pattern of betting, for example, in the way he chooses primary players on which to bet. The secondary player may tend to choose primary players of a particular age, occupation, or skill level, for example. A secondary player may tend to bet on a particular primary player (e.g., Bob Smith), or the secondary player may tend to bet on a primary player with a certain game history (e.g., a primary player with the most money won in the last hour). A secondary player may tend to bet on any primary player that happens to be seated in a particular spot at a gaming table (e.g., at the spot just to the left of the dealer). Any tendency used by a secondary player to choose primary players on which to bet may constitute a pattern of betting.

In various embodiments, any tendency used by a player in choosing which games to play or bet on may constitute a pattern of betting. For example, a tendency of a player to bet only on blackjack may constitute a pattern of betting. A tendency of a player to bet only on slot machine games may constitute a pattern of betting.

In various embodiments, a tendency of a player to play games at a particular time may constitute a pattern of betting. For example, the tendency of the player to always play games between 1:00 pm and 2:00 pm may constitute a pattern of betting.

In various embodiments, a pattern of betting may constitute an alternating or varying pattern. For example, a secondary player may have the tendency to alternate between betting on the dealer and betting on a primary player in a game of blackjack.

In various embodiments, a pattern of betting that has been determined or deduced need not necessarily fit every bet that has been made by a particular player. For example, out of 1000 bets made by a player, a set of rules made to describe such bets may explain 900 of those bets, but may fail to explain the remaining 100.

Copying Someone Else's Pattern of Betting

In various embodiments, bets made by a player may be recorded, e.g., by a gaming device or a terminal where such bets are placed. Bets may also be recorded by an information capturing device, such as a scanner or camera.

Bets made by a player may be analyzed for patterns of betting. The central server may, for example, employ statistical algorithms to deduce rules or tendencies of the player in placing bets. A betting pattern may take the form of a set of rules. For example, each rule may specify one or more conditions and an action to be taken if the conditions are true. For example, a rule may state that if the last game of a first player was a win, then the first player should bet twice the amount of his previous bet on the next game he will play. As another example, a rule may state that a first player should place a bet on the player at a particular blackjack table who has won the most money in the last five hands (e.g., the first player should bet that such a player will win again).

Once patterns of betting have been determined, such patterns may be made available for use by other players. Other players may then have the opportunity to follow the same patterns in their own betting practices. For example, a first player may follow the same pattern of betting used by a second player.

A pattern of betting may be made available in a number of forms. A first player may be able to view a list of rules that would allow the first player to follow the pattern. A first player may be able to view a text description of the pattern. A first player may be able to view suggestions of what to do in a given situation (e.g., suggestions of how much to make or which strategy decision to make), where such suggestions are made in accordance with a pattern of betting.

In various embodiments, a first player may indicate a desire to automatically follow a pattern of betting used by a second player. Thus, the first player may authorize a gaming device, the central server, or some other device to automatically place bets on his behalf, or to automatically employ a particular game strategy on his behalf, in accordance with the betting patterns of a second player. The first player may then sit back and watch games unfold without providing any further input.

In various embodiments, a first player may receive information about what bet he should make or what strategy he should use next if he wishes to follow a pattern of betting of a second player. However, the first player may be given the opportunity to manually confirm or enter (e.g., via the press of a button) his own bet, so that the first player has the opportunity but not the obligation to follow the betting pattern of the second player.

In various embodiments, a first player may copy some aspects of a second player's pattern of betting, but not all aspects. For example, a first player may copy the second player's strategy, but not his pattern of varying the bet sizes. As another example, a first player may copy the betting patterns of a second player, but only when the second player is playing blackjack. As another example, a first player may copy the betting patterns of the second player, but only between the hours of 2:00 pm and 3:00 pm. As another example, a first player may copy the betting pattern of a second player, but only when the first player is ahead by more than a certain amount of money. As another example, a first player may copy the betting pattern of a second player, but only when the second player is ahead by more than a certain amount of money.

In various embodiments, a first player may search for a second player with certain characteristics. For example, a first player may search for a second player who has won more than any other player playing blackjack. The first player may then choose to copy the betting patterns of the second player. In various embodiments, a first player may periodically alter the betting patterns which he follows, depending on some criteria. For example, the first player may always follow the betting pattern of the second player who is most ahead at the moment. Thus, as different players win money and become the player with the most winnings at a casino, a first player may change the betting pattern he follows.

In various embodiments, a first player may follow the betting pattern of a second player so long as that second player is still following the same betting pattern. If the second player starts using a different betting pattern or makes bets that are inconsistent with the first betting pattern, then the first player may cease following the betting pattern of the second player.

In various embodiments, following a betting pattern need not include making the exact same bets as another player. Rather, a first player may employ the same rules for making bets that a second player uses, but may employ those rules on a different game.

Statistics on Patterns of Betting

In various embodiments, a player may wish to employ a pattern of betting. The pattern employed may be a pattern that had previously been used by a second player, or that had previously been used by a number of other players. The player may wish to know various statistics about the pattern. For example, the player may wish to know how successful the pattern has been or how many other players have used the same pattern in the past. Knowing statistics about a pattern of betting may allow a player to decide whether or not to use the pattern and/or whether or not to choose a first pattern of betting over a second pattern of betting.

In various embodiments, a casino server or other device or entity may track the games played, the amounts bet, the strategies used, and any other information about one or more players. The casino server may use the collected information to determine betting patterns and to determine statistics about the betting patterns. The casino may determine how many players are using a particular pattern. The casino may determine how many players are using a particular pattern over a particular time interval (e.g., over a ten-minute period). The casino server may also determine how many players have used a particular pattern at all, e.g., in the last day. The casino server may determine the percentage of time that a particular pattern of betting has been used as opposed to other patterns of betting. For example, a casino server may determine that 20% of the time when any player engages in play at the casino, the player employs a particular pattern of betting.

In various embodiments, a casino may determine statistics or metrics about the success of a pattern. For example, the casino may determine which patterns of betting have resulted in the most money won for players, which patterns have resulted in the most won games for players, which patterns have been profitable for the longest amounts of time, and/or any other metrics about a pattern. A casino may determine which pattern has been successful over the most recent time period, or during the current time period. For example, in some embodiments, a casino may determine all the patterns of betting that are currently being employed by players across the casino, or by a particular subset of players (e.g., by blackjack players). The casino may then determine which pattern is or has been the most successful according to some metric.

Upon request of a player, or without any particular request, a casino may display statistics about different patterns of betting. For example, the casino may periodically rank and re-rank patterns of betting according to which has been the most successful (e.g., which has generated the most winning per player using the pattern) over the most recent time period. A player may have the opportunity to view statistics about a pattern of betting and to use such statistics, for example, to aid in his decision of whether or not to copy the pattern of betting himself.

In various embodiments, a first player may wish to be alerted or informed about a pattern of betting that is being used by a second player. The second player may be a successful player, for example. The first player may, in particular, wish to be alerted when the second player switches his pattern of betting. For example, the first player may copy a first pattern of betting from the second player. However, if the second player switches to using a second pattern of betting, then the first player may decide to stop using the first pattern of betting, and perhaps to switch to the second pattern of betting.

The following are embodiments, not claims:

A. A method comprising:
receiving an indication of a first plurality of decisions made by a first player under a first set of circumstances;
determining a set of rules that, when followed under the first set of circumstances, generate the first plurality of decisions;
receiving a request from a device of a second player for a description of the rules; and
transmitting the description of the rules to the device of the second player.

B. The method of embodiment A in which receiving an indication of a first plurality of decisions made by a first player under a first set of circumstances includes receiving an indication of a first plurality of decisions made by a first player while playing a particular set of games.

C. The method of embodiment A in which transmitting the description of the rules includes transmitting computer executable instructions for following the rules. The computer executable instructions may be useable by a gaming device or mobile gaming device for making decisions in a game.

D. The method of embodiment A in which the set of rules includes rules for determining a size of a bet.

E. The method of embodiment A in which the set of rules includes rules for selecting a card to hold in a game of video poker.

F. The method of embodiment A in which the set of rules includes rules for determining whether to hit or stand in a game of blackjack.

G. A method comprising:
receiving a set of rules that, when followed under a first set of circumstances, generate a first plurality of decisions previously made by a first player faced with the first set of circumstances (e.g., the first plurality of decisions may include decisions as to the size of a bet and/or decisions as to a game strategy);
receiving a first instruction from a second player to follow the set of rules automatically;
generating a second plurality of decisions in accordance with the set of rules;
receiving a second instruction from the second player to cease following the set of rules; and receiving from the second player a third instruction detailing a third decision.

H. The method of embodiment G further including conducting a first plurality of games. Conducting a game may include, for example, receiving a bet, receiving or generating a random number, determining a first outcome based on the random number, receiving a game decision, determining a second outcome based on the first outcome and the game decision, presenting graphics depicting the first and/or second outcomes, presenting audio, determining a payout based on the first and/or second outcomes, providing the payout, and/or performing any other functions associated with a game. The game may be conducted, for example, by a stationary gaming device or by a mobile gaming device.

I. The method of embodiment H in which generating a second plurality of decisions includes generating a second plurality of decisions to be made in the first plurality of games.

J. The method of embodiment I further including conducting a second game that is not one of the first plurality of games.

K. The method of embodiment J further including applying the third decision to the second game.

L. The method of embodiment G in which receiving a first instruction from a second player to follow the set of rules automatically includes receiving a first instruction from a second player to repeatedly conduct games and to use the set of rules for making decisions in the games, until further instructed by the second player.

M. The method of embodiment G in which the third decision does not conform to the set of rules. For example, the rules would not yield the third decision if the rules were used to make a decision.

N. The method of embodiment G in which generating a second plurality of decisions in accordance with the set of rules includes:
 determining a bet size in accordance with the set of rules;
 determining a first outcome in a game;
 determining a course of action to take in the game in accordance with the set of rules; and
 determining a second outcome in the game based on the first outcome and based on the course of action.

O. A method comprising:
 determining a first set of rules for making decisions in a game;
 determining a second set of rules for making decisions in a game;
 determining a first performance metric for the first set of rules at a first time;
 determining a second performance metric for the second set of rules at the first time;
 determining a first ranking of the first set of rules and the second set of rules based on the first performance metric and based on the second performance metric;
 presenting the first ranking;
 determining a third performance metric for the first set of rules at a second time;
 determining a fourth performance metric for the second set of rules at the second time;
 determining a second ranking of the first set of rules and the second set of rules based on the third performance metric and based on the fourth performance metric, in which the second ranking is different from the first ranking; and
 presenting the second ranking.

P. The method of embodiment O in which determining a first set of rules includes:
 tracking decisions made in a set of games by a first set of players; and
 determining a first set of rules that explain the decisions made in the set of games.

Q. The method of embodiment O in which determining a first performance metric includes:
 tracking decisions made in a set of games by a first set of players;
 determining a second set of players who have followed the first set of rules, in which the second set of players is a subset of the first set of players (e.g., the first set of players may be filtered down to eliminate players who have not followed the first set of rules, thus yielding the second set of players); and
 determining an amount of money that the second set of players has won.

R. The method of embodiment O in which presenting the first ranking includes:
 assigning a first text identifier to the first set of rules (e.g., the first set of rules may be associated with a name, such as "The Crazy Money System");
 assigning a second text identifier to the second set of rules; and
 displaying a list that includes the first text identifier and the second text identifier, in which the list is ordered based on the ranking.

S. The method of embodiment O further including:
 receiving from a player instructions to place bets automatically in accordance with a set of rules that is ranked the highest among all sets of rules;
 placing, at the first time, a bet on behalf of the player that is made in accordance with the first set of rules; and
 placing, at the second time, a bet on behalf of the player that is made in accordance with the second set of rules.

T. The method of embodiment O in which determining a first performance metric includes determining, at a first time, a first performance metric describing the performance of the first set of rules with respect to games played in the hour preceding the first time.

The following are embodiments, not claims:

A. A method comprising:
 receiving from a secondary player at least one criterion for selecting a game;
 determining at a first point in time a first game that matches the at least one criterion, the first game to be played by a first primary player;
 receiving a first bet from the secondary player;
 determining a first outcome of the first game;
 determining a first payout based on the first bet and the first outcome;
 adding credits to an account associated with the secondary player based on the first payout;
 determining, at a second point in time after the first point in time, that a second game to be played by the first primary player does not match the at least one criterion; and
 transmitting to the secondary player an indication that the second game does not match the at least one criterion.

B. The method of embodiment A in which the at least one criterion is that the game is to be played by a primary player who has the highest net winnings of any primary player over a particular period of time.

C. The method of embodiment A in which the at least one criterion is that the game is to be played at a gaming table at which the most money has been won of any gaming table over a particular period of time.

D. The method of embodiment A in which the at least one criterion is that the game is to be played by a primary player who has won the last five games that he has played.

E. The method of embodiment A further including:
receiving from the secondary player a second bet for a third game played by the first primary player, the third game played after the first game and before the second game;
determining a second outcome of the third game;
determining a second payout based on the second bet and the second outcome; and
adding credits to the account associated with the secondary player based on the second payout.

F. The method of embodiment A further including:
receiving, after transmitting the indication, instructions from the secondary player to find another game that matches the at least one criterion;
determining a third game that matches the at least one criterion;
receiving from the secondary player a second bet;
determining a second outcome of the third game;
determining a second payout based on the second bet and the second outcome; and
adding credits to the account associated with the secondary player based on the second payout.

G. The method of embodiment F in which the third game is not played by the first primary player.

H. The method of embodiment A further including:
determining a third game that matches the at least one criterion, in which the third game is not played by the first primary player;
receiving from the secondary player a second bet;
determining a second outcome of the third game;
determining a second payout based on the second bet and the second outcome; and
adding credits to the account associated with the secondary player based on the second payout.

I. A method comprising:
receiving from a secondary player at least one criterion for selecting a game;
determining at a first point in time a first game that matches the at least one criterion, the first game to be played at a first gaming table;
receiving a first bet from the secondary player;
determining a first outcome of the first game;
determining a first payout based on the first bet and the first outcome;
adding credits to an account associated with the secondary player based on the first payout;
determining, at a second point in time after the first point in time, that a second game to be played at the first gaming table does not match the at least one criterion; and
transmitting to the secondary player an indication that the second game does not match the at least one criterion.

J. A method comprising:
determining at least one criterion for a gaming device;
determining at a first point in time a first gaming device that meets the at least one criterion;
determining at a second point in time after the first point in time a second gaming device that meets the at least one criterion;
determining at a third point in time after the second point in time a third gaming device that meets the at least one criterion; and
presenting an image which includes visual representations of the first, second, and third gaming devices, the image further including a first arrow pointing from the first gaming device to the second gaming device and a second arrow pointing from the second gaming device to the third gaming device.

K. The method of embodiment J in which the at least one criterion can be met by only a single gaming device at any one time.

L. The method of claim embodiment J further including receiving an indication of at least one of: (a) an outcome generated at the first gaming device; (b) an outcome generated at the second gaming device; (c) an outcome generated at the third gaming device; (d) a payout made at the first gaming device; (e) a payout made at the second gaming device; and (f) a payout made at the third gaming device.

M. The method of embodiment J in which determining at least one criterion for a gaming device includes determining that a gaming device must have made the highest payout of any gaming device in a casino in the last hour.

N. The method of embodiment J in which determining at least one criterion for a gaming device includes determining that a gaming device must have had the longest streak of consecutive outcomes that were winning for a player of any gaming device in a casino in the last hour.

O. The method of embodiment J in which presenting an image includes presenting a visual representation of a casino floor, the image including visual representations of the first, second, and third gaming devices, the image further including a first arrow pointing from the first gaming device to the second gaming device and a second arrow pointing from the second gaming device to the third gaming device.

P. The method of embodiment J further including generating, based on the first, second and third gaming devices, a prediction of a fourth gaming device that will meet the at least one criterion, in which an indication of the fourth gaming device is included in the image.

Q. The method of embodiment J further including generating, based on the locations of the first, second and third gaming devices, a prediction of a location of a fourth gaming device that will meet the at least one criterion, in which an indication of the fourth gaming device is included in the image.

Automatic Play of Games

In various embodiments, a gaming device may initiate and/or conduct a series of games for a player in an automatic fashion. During the series of games, no player input may be required. Prior to the series of games, the player may describe rules or parameters according to which the games will be played. The player may thereby configure the gaming device to use these rules or parameters. The parameters may include: (a) the number of games to be played; (b) the time to play each game; (c) the time to play the whole series of games; (d) the amount to wager on each game; (e) the strategy to be used in each game; (f) a criterion or criteria for when to stop playing automatically; (g) a criterion or criteria for when to seek player input; (h) the type or types of games to be played; (i) the gaming device or devices to be used for conducting the game (e.g., for generating game outcomes); (j) the manner in which outcomes will be communicated to the player (e.g., the outcomes may be displayed; e.g., the outcomes may be printed on a paper for the player); or any other parameters.

In various embodiments, a gaming device may be configured to use a particular strategy for a particular period of time. The particular strategy may be an optimal strategy. In various embodiments, a strategy may be optimal in the sense that it maximizes a player's expected winnings for a game once the game has been started. The particular strategy may be a strategy which allows for the highest possible payout. For example, in a game of video poker, one strategy may be to always pursue the royal flush. In various embodiments, a player may configure a gaming device to play optimal strategy for the next ten minutes. In various embodiments, a player may configure a gaming device to play blackjack using basic strategy for the next 20 minutes.

In various embodiments, a gaming device may be configured with a frequency of play. For example, the gaming device may be configured to play 10 games per minute. A gaming device may similarly be configured to have a particular period of time between games. For example, a gaming device may be configured to initiate each new game ten seconds after the last game was initiated. A gaming device may be configured to play a game of a certain length. For example, a slot machine may be configured so that the reels take 10 seconds before they stop spinning.

In various embodiments, a gaming device may be configured to play for some length of time. For example, the gaming device may be configured to conduct games for the next 45 minutes. In various embodiments, a gaming device may be configured to play games until some amount of money is won or lost. For example, a gaming device may start with a player bankroll of $50. The gaming device may be configured to keep playing until either the bankroll reaches $75 (and thereby $25 has been won) or until the bankroll reaches $25 (and thereby $25 has been lost). In various embodiments, the gaming device may cease playing even though an amount won or lost (or a bankroll) has not reached an exact threshold. For example, having started at $50, a bankroll may reach $25.50 at a dollar-denomination machine. The machine may stop playing because one further bet would risk leaving the bankroll at $24.50, which is below the lower limit for which the gaming device has been configured.

In various embodiments, a gaming device may be configured to play optimal strategy for some percentage of the games played. For example, a gaming device may be configured to play optimal strategy in 80% of games played. Thus, for example, the gaming device may randomly determine, for each game, whether it will use optimal strategy. If random determination may be made such that there is an 80% likelihood that optimal strategy will be used (e.g., there is a biased drawing made to determine whether optimal strategy will be used. In various embodiments, a gaming device may be configured to play optimal strategy for some percent of the time. For example, for the first 60% of a period of time during which a gaming device is playing automatically, optimal strategy may be used. For the remaining 40% of the time, some non-optimal strategy may be used. In various embodiments, using a strategy that is not optimal does not necessarily mean that a gaming device won't make the same decision that would have been made had it been using optimal strategy. In various embodiments, two different strategies may sometimes yield the same decision. For example, a strategy to maximize expected winnings may sometimes yield the same decision as a strategy to always shoot for the highest possible payout.

In various embodiments, a gaming device may be configured to pursue a first strategy (e.g., optimal strategy) for some percentage of time or for some percentage of games played. During the times or the games when optimal strategy is not used, some other strategy may be used. The other strategy may be a strategy which attempts to obtain the largest possible payout, whether or not obtaining such a payout is a remote possibility. The other strategy may be a strategy which always seeks to obtain a payout above a certain level. For example, one strategy in video poker may be to maximize the chances of receive a flush or better.

In various embodiments, a gaming device is configured to play a sequence of games automatically. Playing games automatically may include making strategy decisions. However, in various embodiments, a gaming device may halt the automatic play of a game and wait to receive a player input to the game. The player may then provide an input. The input may indicate a strategy to pursue in a game. For example, the input may indicate which cards to hold in a game of video poker, or whether to hit or stand in blackjack. A gaming device may halt automatic play to allow for player input for various reasons. A gaming device may halt automatic play if: (a) two possible decisions are equally valid according to some strategy (e.g., if two possible decisions both lead to the same expected winnings for the player); (b) a possible payout for a game is larger than a predetermined threshold (e.g., if a possible payout for a game is more than 500 times the amount wagered); (c) a large payout has more than a predetermined probability of occurring (e.g., if a royal flush has more than a 1% chance of occurring); (d) a winning payout is certain to occur (e.g., if a player has received three cards of the same rank in the first five cards dealt in a game of video poker, the player may be allowed to complete the game manually to experience the pleasure of winning); (e) if the gaming device has been configured to stop for any particular outcome or intermediate outcome (e.g., if the gaming device has been configured to stop automatic play when there are two aces dealt to a player in a game of blackjack then the gaming device may actually stop automatic play when two aces are dealt to a player in a game of blackjack); or any other circumstances or criteria dictate that the gaming device should halt automatic play. In various embodiments, automatic play may stop so that a gaming device may accept a player decision. However, automatic play may resume once a player has made his decision, in various embodiments. In various embodiments, after automatic play has stopped, a player must explicitly indicate that he wishes for automatic play to resume. For example, the player may press a button that says "resume automatic play". Other wise the player may continue to initiate games and make decisions manually.

In various embodiments, automatic play may be halted upon any event or sequence of events. A sequence of events may include a sequence of outcomes. Automatic play may be halted if, for example, the player wins on five games in a row, the player loses on five games in a row, the player wins more than a predetermined amount of money in a some number of games (e.g., if the player wins more than $50 in ten hands), a particular card occurs in a predetermined number of games in a row, a particular outcome occurs in a predetermined number of games in a row, or upon any other sequence events or pattern of events. Further patterns are described herein, and various embodiments contemplate that automatic play may be halted upon the occurrence of any particular or designated pattern or sequence of events.

In various embodiments, automatic play may be paused for some period of time to allow for player input. However, if the player has not provided input after some period of time, the gaming device may automatically determine an input. For example, the gaming device may determine an input according to optimal strategy. In various embodiments, a halt or a pause in automatic play may be emphasized with a beep, vibration, or other alert. For example, a beep may signify to the player that he must make some decision in a game and that he can not sit back and watch games proceed automatically. Similarly, a vibration on a mobile gaming device may alert a player to take the mobile gaming device out of his pocket because his input is required. In various embodiments, a player may set the preference as to the type of alert that will be provided to him. In various embodiments, when automatic play stops, the gaming device may display or otherwise communicate a message to the player. The message may say that input is requested from the player. The message may further indicate the amount of time that the player has to provide an input (e.g., before automatic play is resumed). In various embodiments, when a player is asked for a manual input, the player may have an option to tell the gaming device to make its own decision. For example, a button may read "Keep playing". Pressing such a button may cause the gaming device to determine a decision. The decision may be made according to any particular strategy, such as according to optimal strategy.

In various embodiments, a gaming device may halt automatic play. However the gaming device may halt automatic play only to allow a player to view the state of the current game. The gaming device may, after some period of time, resume automatic play. In various embodiments, upon a halting or pausing of automatic play, a player may have the opportunity to interject and make his own decision. For example, a player may press buttons which are ordinarily indicative of a player strategy. For example, a player may press buttons underneath cards dealt in a game of video poker, indicating the player's desire to hold the cards. By pressing such buttons, the player may override the decision process of the gaming device and cause his own decisions to be registered in the game. In various embodiments, a player may override the decisions of the gaming device at any point, not just when the gaming device has paused. For example, the player may at any point during automatic play press a button which says "stop". The player may then have the opportunity to input his own decisions. The player may later press a button labeled "resume" or the like. Automatic play may thereupon resume.

In various embodiments, a gaming device may make decisions automatically. However, the gaming device may seek confirmation from the player. Upon learning of a decision (e.g., because an indication of the decision is displayed on the screen of the gaming device), a player may have the opportunity to press a button (or provide some other input) to stop the gaming device and instead to cause the gaming device to make a different decision. In various embodiments, a gaming device may make automatic decisions. The gaming device may allow some period of time (e.g., 3 seconds) for the player to override a decision. However, if there is no input from the player, the gaming device may proceed to generate the remaining part of the game stemming from the decision.

In various embodiments, when automatic play has been halted or paused, the player may have the opportunity to specify a new strategy to be used. When automatic play is subsequently resumed, the new strategy may be employed.

In various embodiments, when a player elects to bet on some number of games, such games may be generated and conducted for the first time for the player. In various embodiments, when a player elects to bet on some number of games, such games may include games that have already been played by other players (e.g., by primary players). Thus, for example, a player may elect to bet on 100 games. A casino server may then select 100 games that have been previously played. The selection may be random. If such games were winning for the player who originally played them, the current player may win as well. If such games were losing for the player who originally played them, the current player may lose as well. In various embodiments, a player may elect to play some number of games. A casino server may then use games that are currently being played or about to be played. For example, the casino may use games that are played at video poker machines around the casino. The player may participate in such games and may win if those games result in a win for the player side, and may lose if those games result in a loss for the player side. In various embodiments, a player may bet against a primary player, and may e.g., win when the primary player loses and lose when the primary player wins. Thus, it will be appreciated that when a player selects some number of games in which to participate, the games may be generated for the first time for that player, or the games may be games that have been or will be played by others.

In various embodiments, two or more players may wish to engage in automatic play. For example, both players may wish to have 50 games played automatically by the players' respective gaming devices. The players may, in various embodiments, participate in the same games. The common games played may, for example, come from other players around the casino. In various embodiments, the casino may have a data feed of game results from around the casino. The data feed may go to the gaming devices of players who wish to play automatically, and may thereby allow such players to participate in games from around the casino. In various embodiments, when players participate in a common set of games, the players may participate in such games out of order. For example, player A may participate first in game X and then in game Y. Player B may participate first in game Y and then in game X.

In various embodiments, a number of interfaces may be associated with automatic play. Input buttons may allow a player to override a strategy, to tell a gaming device to halt automatic play, to tell a gaming device to resume automatic play, to indicate a particular strategy to be used, to indicate the parameters using which a gaming device should initiate a session of automatic play, and to perform any other function. In various embodiments, a player may be required to make two button presses to override a strategy suggested by the gaming device. The two button presses may include pressing each of two different buttons, or may include pressing the same button twice (e.g., double clicking). In this fashion, there may be a reduced chance that a player automatically overrides a good decision of the gaming device. In various embodiments, a wheel, such as a thumb wheel, may allow a player to vary the speed of automatic play. For example, the player may move the wheel one way to increase the speed of play, and may move the wheel the other way to decrease the speed of play. In various embodiments, a button may be used to indicate that a gaming device should proceed with automatic play, such as after the gaming device has paused.

In various embodiments, when automatic play has been paused to await the player's input, or for any other reason, the player may cause automatic play to resume in various ways. The player may double click on a button to cause automatic play to proceed. In some embodiments, the player may press any button to cause automatic play to proceed. In some embodiments, the player may touch any area of a touch screen to cause automatic play to proceed. In some embodiments, the player may make a noise or vocalization. For example, the player may clap twice in order to cause automatic play to proceed. In various embodiments, a player may scroll a thumb wheel to cause automatic play to proceed.

In various embodiments, when automatic play has been paused to await the player's input, the player may provide an input in various ways. Certain ways may be available for the player to quickly and/or conveniently provide a desired input with minimal effort. In a game of video poker, a list of strategies may be provided for a player. The list of strategies may include corresponding expected winnings for each strategy, and/or may include one or more other statistics for each strategy. The strategies may be sorted by expected value or by some other metric. The player may then select a strategy with one input based on his desired metric. For example, to execute the strategy with the highest expected winnings, the player may simply click on the strategy from the list. This may save the player the trouble of executing the strategy himself by, for example, selecting all cards to hold in order to follow the strategy. In some embodiments, a player may indicate that a random strategy should be followed. For example, in bonus round, a player may have the option of opening one of three envelopes. The player may press a button, touch an area of the screen, or otherwise provide an indication that a random strategy should be chosen on the player's behalf and carried out (e.g., that a random envelope should be chosen).

In various embodiments, every game played could be an entry into a drawing. The faster games are played (e.g., in an automatic play mode), the more entries a player may receive. Drawings may be done at certain times, e.g., at 4:00 every day or at random times. Thus, players may be encouraged to play games at a more rapid pace (e.g., to have games played automatically at a more rapid pace) so as to accumulate plenty of entries by the time any random drawing occurs. In various embodiments, cards received in games may constitute entries into a drawing. A player may win if the cards he has received in a game match the cards drawn in a drawing. As will be appreciated, other game indicia may serve as entries into a drawing, where indicia drawn may be compared to indicia received from players entering the drawing. In various embodiments, games played, cards received, or other indicia received may serve as entries into a drawing. In various embodiments, a meter may indicate to a player how many hands he has played, how many cards he has received, and/or how many other types of indicia he has received. The meter may thereby indicate to the player how many entries he has in an upcoming drawing. The player may be encouraged to play more rapidly so as to watch the meter go higher.

In various embodiments, a jackpot, such as a progressive jackpot, may receive as contributions portions of bets made from automatic play. Thus, automatic play may cause a jackpot to grow in size. Players who participate in automatic play may also have the opportunity to win the jackpot, such as the progressive jackpot. Thus, players may have additional incentive to engage in automatic play.

In various embodiments, a particular area of a casino includes facilities to allow secondary players to monitor primary players at one or more games throughout the casino, or at one or more games beyond the casino. The area of the casino may include one or more monitors. Such monitors may be small or large. Large monitors, for example, may be visible to multiple secondary players. Small monitors may be visible to individual secondary players. Further, the individual players may customize the small monitors so as to view the primary player of interest, a statistic of interest, a game of interest, or anything else of interest. The monitors may display various information. Monitors may display video feeds from games. For example, a monitor may show a video feed of a blackjack game which is in progress. Monitors may recreate game outcomes. For example, a monitor may show a rendition of a slot machine game that has been or is being played by a primary player. Monitors may also show statistics. For example, a monitor may show the total amount of money won by a primary player in the last hour, the number of times a particular dealer has busted in the past half hour, the number of consecutive times red has come up at the roulette wheel, and so on. In various embodiments, a monitor may show betting rules, odds, payout ratios, and other information which may apply to bets made by the secondary player. For example, a monitor may indicate that a secondary player can win a payout at odds of 1:1 by for betting that a primary player will get red in roulette, and that the secondary player can win a payout at odds of 16:1 for betting that a primary player will get red four times in a row at roulette.

In various embodiments, an area of the casino may include facilities for betting on one or more games being monitored. For example, terminals may allow secondary players to place bets on a game, e.g., on a game which is being monitored. The terminal may include keys, acceptors for charge cards (e.g., for credit cards or debit cards), acceptors for currency or gaming chips, acceptors for cashless gaming tickets, keys or buttons for entering betting information (e.g., for entering an amount to bet; e.g., for choosing a game on which to bet), and any other facilities or interfaces for allowing bets. A terminal may include a monitor. The monitor may be used to display betting information to a secondary player, to show the secondary player the game on which he is betting, to show the secondary player how much money he has won, and to show the secondary player any other information related to his bet or otherwise relevant to the player.

In various embodiments a betting area for secondary players to bet on and monitor the games of primary players may have the appearance of a sports book.

The following sections I-X provide a guide to interpreting the present application.

I. TERMS

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application" unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. DETERMINING

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. FORMS OF SENTENCES

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. DISCLOSED EXAMPLES AND TERMINOLOGY ARE NOT LIMITING

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. COMPUTING

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. CONTINUING APPLICATIONS

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, PARAGRAPH 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. DISCLAIMER

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. INCORPORATION BY REFERENCE

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. PROSECUTION HISTORY

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. EMBODIMENTS

Terms

As used herein, the term "viewing window" includes an area of a gaming device at which symbols or outcomes are visible. The area may, for instance, include a pane of glass or other transparent material situated over reels of the gaming device. Thus, only the portion of the reels under the transparent material may be visible to the player. A viewing window may include a display screen, in some embodiments. The symbols or outcomes visible in the viewing window may include the symbols or outcomes that determine the player's winnings.

Encryption

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

It will be appreciated that other methods besides encryption may be used to hide or obscure information, such as encoding or steganography. Such methods may also be used in conjunction with cryptography.

Encryption may be used to:

Send a message only specific recipients can read. For example, Alice and Bob may both be in possession of the same secret key. Alice may encrypt a plaintext message with the secret key. She may transmit the resultant ciphertext to Bob. Bob may then decrypt the cyphertext using the secret key so as to view the plaintext version of the message.

Allow messages to be encrypted by many and decrypted only one (e.g., PGP). For example, Alice may possess a public and a private key. Bob may wish to send Alice a message that only Alice will be able to read. Bob may create a message in plaintext and encrypt it using Alice's public key. Bob may send the resultant ciphertext to Alice. Alice may then decrypt the ciphertext using her private key, and may thereby view the plaintext message. Should Cindy intercept the ciphertext message on its way from Bob to Alice, Cindy would not be able to decrypt the message since Cindy would not have access to Alice's private key. Alice's public key, although available to Cindy, would not be sufficient to decrypt the ciphertext message in a practicable amount of time.

Authenticate the sender of a message. This use of encryption may include having the sender create a digital signature. For example, Alice would like to send a message to Bob in such a way that Bob can be confident that the message has come from her. Alice may construct a plaintext message and encrypt the plaintext into ciphertext using her private key. Alice may then send the ciphertext message to Bob. Bob may then use Alice's public key to decrypt the ciphertext back in to plaintext. Since Alice's public key only works to decrypt a ciphertext message created using Alice's private key, and since presumably only Alice has access to her own private key, Bob can be confident that the message originated from Alice.

Allow for non-repudiation. If a sender has applied a digital signature to a message, or portion of a message, then the sender will not later be able to claim he did not send the message.

Guarantee a time/data sent. See hashing below.

Guarantee receipt by recipient. See hashing below.

Verify that a message has not been altered after being sent by the sender. See hashing below.

Hashing is a process whereby input data, typically of arbitrary length, is transformed into output data, typically of shorter length and/or of fixed length. A hash function is a function that performs the transformation. Often, useful hash functions will be one-way functions. That is, for a given input, the output can be computed readily. However, for a given output, the input which produced the output will be difficult to calculate. Also, useful hash functions will often have the property that two differing inputs rarely produce the same output. Hashing can be used for the following purposes:

To perform data redundancy checks. For example, a database may contain a large number of names. The names may be of arbitrary length. To check for redundant names, hash values for the names may be created. The hash values may be of smaller size than the names and may all be of the same length. Thus, it may be easier to compare the hash values of the names that it will be to compare the names themselves.

To verify that a message has not been altered. For example, Alice can send a plaintext message to Bob along with a hash value of the message. Alice can apply a digital signature to the hash value so as to assure Bob that the hash value has been sent by Alice. When Bob receives the plaintext message from Alice, Bob can compute the hash value of the message. If the hash value that Bob computes is the same as the hash value that Alice has sent to Bob, then Bob can be fairly confident that the message has not been altered en route from Alice to Bob.

To prove possession of a message without having to reveal the message. For example, Alice can send a message to Bob. Bob can take the hash of the message and send it back to Alice. Alice may thus be assured that Bob has the message without the risk of the message being intercepted en route from Bob to Alice.

To prove possession of a message at a certain time without having to reveal the message. For example, Alice might have a great idea and wish to prove she came up with it at a certain time without having to reveal the idea. Thus, Alice might write out the idea in the form of text, and take a hash value of the text. Alice can then publish the hash of the text in a newspaper. It will then be readily apparent that Alice had possession of the idea at least on the date of the newspaper's publication.

To timestamp a document. For example, a document may be sent to a time-stamping service. The service may then determine the hash value of the document. The service may append the then current date and time to the hash value of the document and apply a digital signature to the result. The digitally signed hash value plus date and time may then be published. So long as the time-stamping service can be trusted to provide accurate dates and times (e.g., not to use old dates and times) then the published timestamp may serve as proof that the document was in existence as of the date and time provided by the time-stamping service. Further precautions may ensure that it becomes very difficult for even the time-stamping service to provide fake times and dates. For example, the time-stamping service may add a sequence number, (e.g., 1, 2, 3, etc.) to each document it timestamps. If the service wishes to provide an old date, the service would have to find an older sequence number. The older sequence number would have to fit between two sequence numbers used immediately before and immediately after the desired fake date. However, no such sequence number would be available if, e.g., no numbers had been skipped in the first place.

Figure 1:
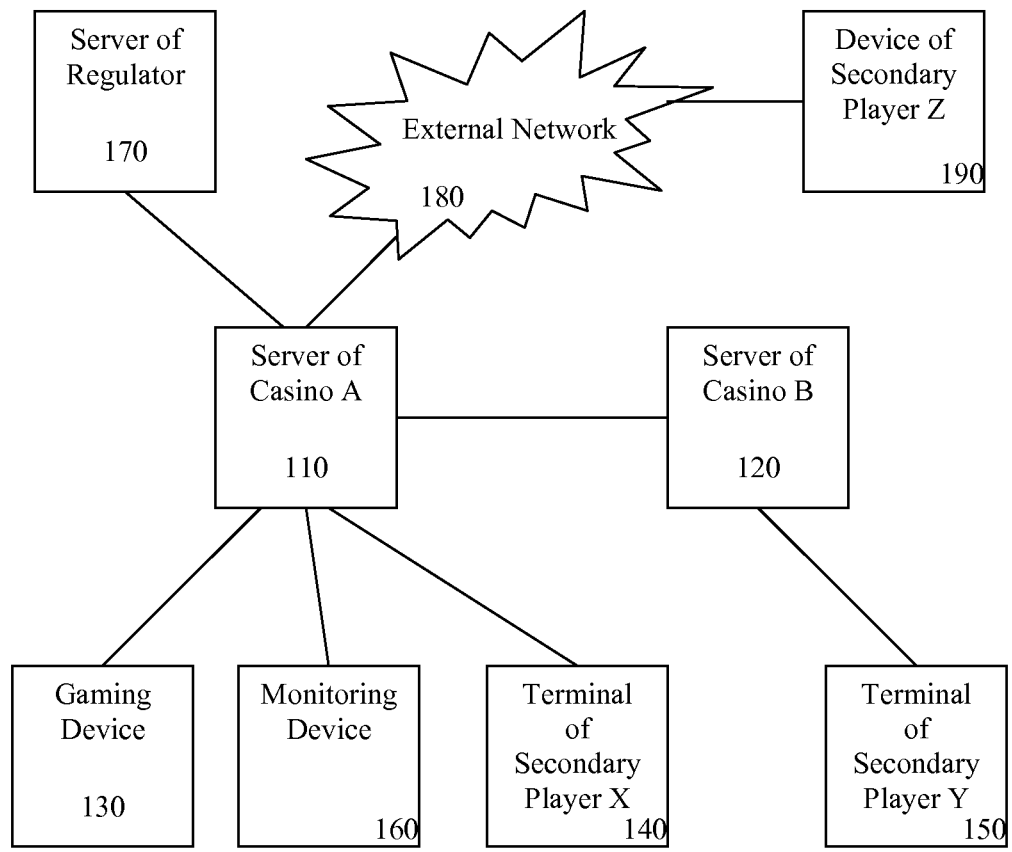
FIG. 1 shows a system according to some embodiments.

FIG. 1 shows a system according to some embodiments. According to some embodiments, Casino A and Casino B may represent facilities where participation in games of chance or in other contests is permitted. In various embodiments, in Casinos A and B, players may place bets on games or contests, and/or may win or lose money based on games or contests. The system of FIG. 1 may permit secondary players in Casino A and secondary players in Casino B to participate in the games of primary players who are at Casino A. Further, the system of FIG. 1 may permit a secondary player outside of Casinos A or B to participate in games of primary players at casino A. Further, the system of FIG. 1 may permit regulators to track various data related to the games of primary players played at Casino A, to the participation in games by secondary players who are at Casino A, to the participation in games by secondary players who are at Casino B, and to the participation in games by secondary players who are at neither Casino A nor Casino B. According to some embodiments, Casino A may include a server 110. The server may be in communication with a gaming device 130, a monitoring device 160, and a terminal of secondary player X 140, each of which may lie within the premises of Casino A. Server 110 may further be in communication with server 120 of Casino B, with a server of a regulator 170, and with a device of a secondary player Z 190, where the secondary player device 190 is not located on the premises of Casino A nor Casino B. Communication between server 110 and the device 190 may occur through an external network 180, e.g., through the Internet. Casino B may include a server 120 which is in communication with server 110, with the server of a regulator 170, and with a terminal of secondary player Y 150, which may lie within the premises of Casino B.

In some embodiments, the server of Casino A 110 may receive data about a game from gaming device 130 or from monitoring device 160. A monitoring device may include a device such as a camera or microphone which may monitor a game at Casino A and transmit data about the game to the server of Casino A. The server of Casino A may transmit data received from gaming device 130 or monitoring device 160 to the terminal of a secondary player X 140 so as to allow the terminal 140 to recreate the game, to accept bets from secondary player X on the game, and to pay winnings to secondary player X based on the game.

The server of Casino A 110 may further transmit received data about a game to the server of Casino B 120. The server of Casino B may, in turn, transmit such data to the terminal of a secondary player Y 150 so as to allow the terminal 150 to recreate the game, to accept bets from secondary player Y on the game, and to pay winnings to secondary player Y based on the game.

The server of Casino A 110 may further transmit received data about a game to the device of secondary player Z 190, e.g., through the Internet. The device of secondary player Z 190 may, in turn, recreate the game for secondary player Z, receive bets on the game from secondary player Z, and/or credit winnings to secondary player Z based on the game.

The server of Casino A 110 may further transmit received data about a game to the server of the regulator 170. Such data may allow the regulator to monitor the fairness of games, to watch for illegal gaming, to track taxable income of the casino, or to perform any other desired function.

In various embodiments, the terminal of secondary player X 140 may transmit to the server of Casino A 110 data about the activities of secondary player X at the terminal. Further, the terminal of secondary player Y 150 may transmit to the server of Casino B 120 data about the activities of secondary player Y at the terminal. The server of Casino B 120 may transmit such data to the server of Casino A 110. Further, the device of secondary player Z 150 may transmit to the server of Casino A 110 data about the activities of secondary player Z at the device. Data received by the server of Casino A 110 from terminals 140 and 150, and from device 190 may allow the server of Casino A to tracking winnings and losses of secondary players X, Y, and Z; to determine which data (e.g., data about which games) to transmit to the terminals or device; to determine an amount owed to Casino A by Casino B for use of data from Casino A; and so on. Further, data received by the server of Casino A 110 from terminals 140 and 150, and from device 190 may be forwarded to the server of the regulator 170. The regulator may use such data to track the bets of secondary players, to check for illegal gambling, to monitor the fairness of games, etc.

It should be appreciated that the system of FIG. 1 represents a system according to some embodiments, and that other servers, devices, terminals, networks, and communication links may be present in various embodiments.

Figure 2:
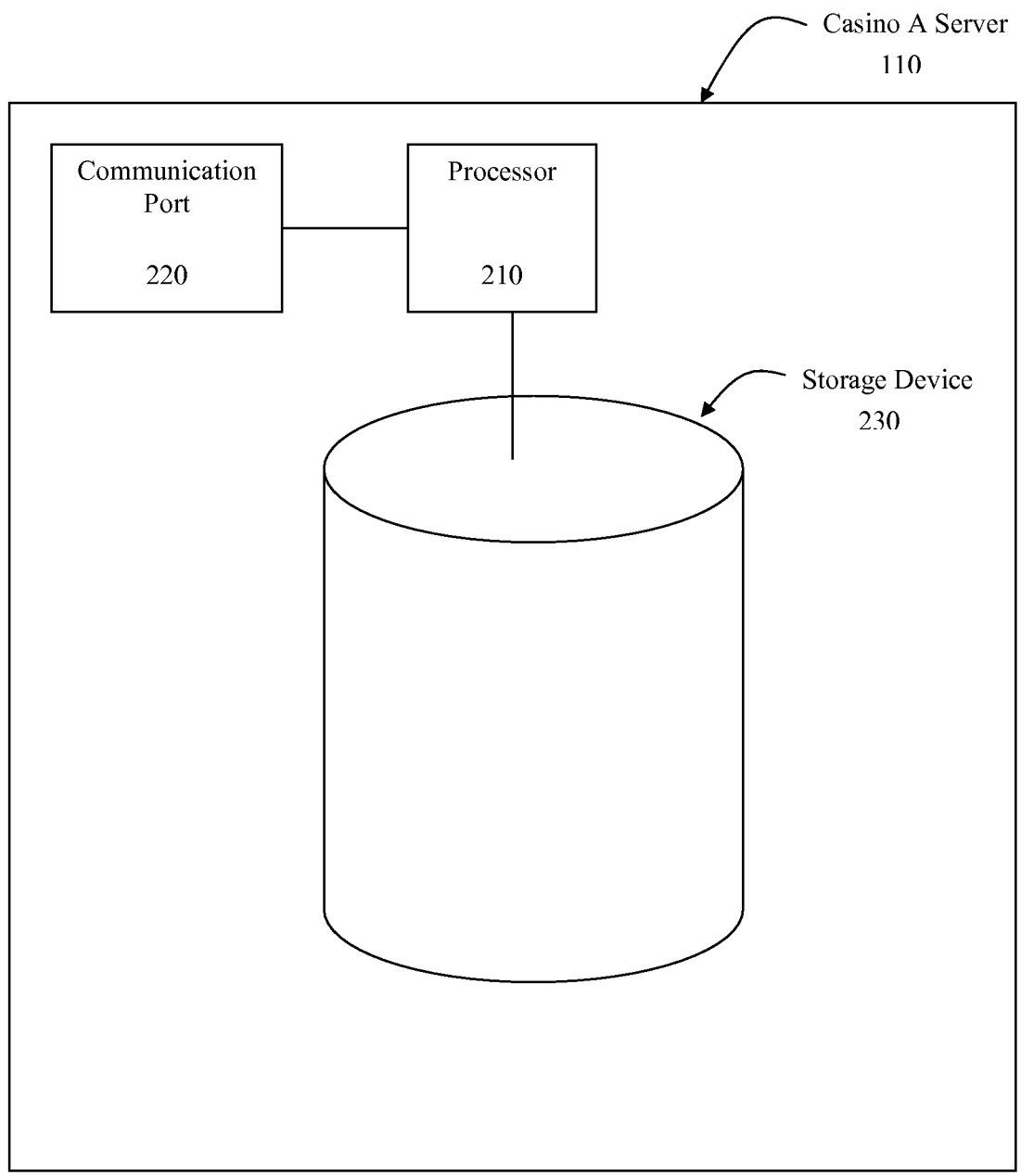
FIG. 2 shows a casino server according to some embodiments.

FIG. 2 shows the Casino A server according to some embodiments. In various embodiments a similar server may constitute the Casino B server, or the server of any other casino. The storage device 230 may store program data. The program data may be used to direct the processor 210 to execute algorithms in accordance with various embodiments. The storage device 230 may store other types of data. Such data may include data received from the play of games; data that can be used to recreate games; data describing bets, wins, and loss of primary and secondary players; data describing the current locations or activities of primary or secondary players; data describing amounts owed to a casino; and so on. Communication port 220 may be used to transmit and/or to receive data. Communication port 220 may include an antenna, a wireless transmitter, a signal generator, a router, or any other communication device. Any data transmitted or received may be stored, at least at some point, in storage device 230.

Figure 3:
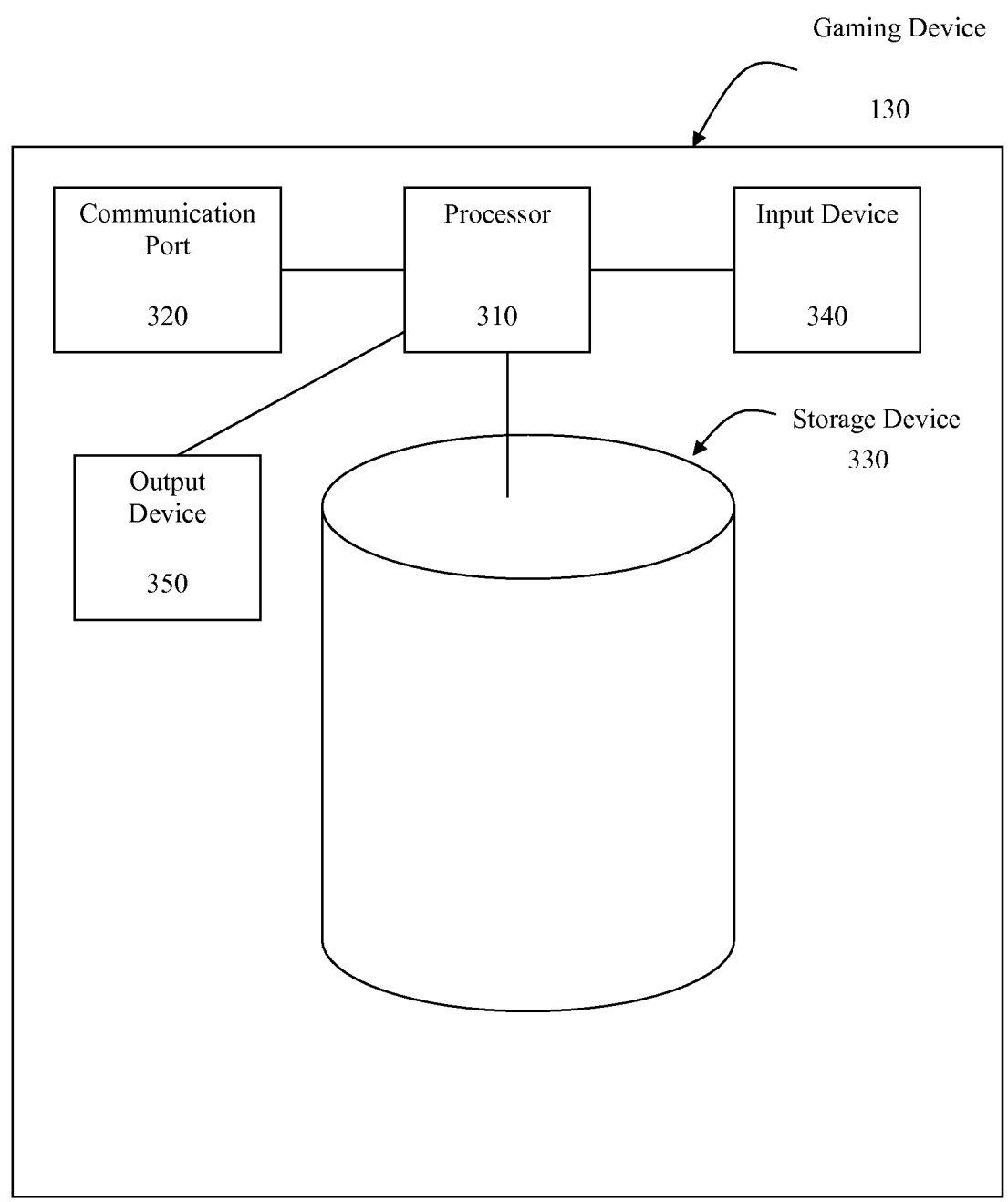
FIG. 3 shows a terminal for use by a secondary player, according to some embodiments.

FIG. 3 shows a gaming device 130 according to some embodiments. The storage device 330 may store program data. The program data may be used to direct the processor 310 to execute algorithms in accordance with various embodiments. Program data may include data used to generate graphics, to determine game outcomes, to compute winnings, and so on. The storage device 330 may store other types of data. Such data may include data describing bets, wins, and losses by a primary player at gaming device 130. Input device 340 may include sensors, buttons, touch screens, microphones, bill validators, coin acceptors, card readers, and any other means by which a primary player or other party may interact with gaming device 130. For example, the input device 340 may include a "bet" button.

The output device 350 may include display screens, microphones, lights, coin dispensers, buzzers, and any other means by which a gaming device may provide a signal to the secondary player. The communication port 320 may be used to transmit and/or to receive data.

Figure 4:
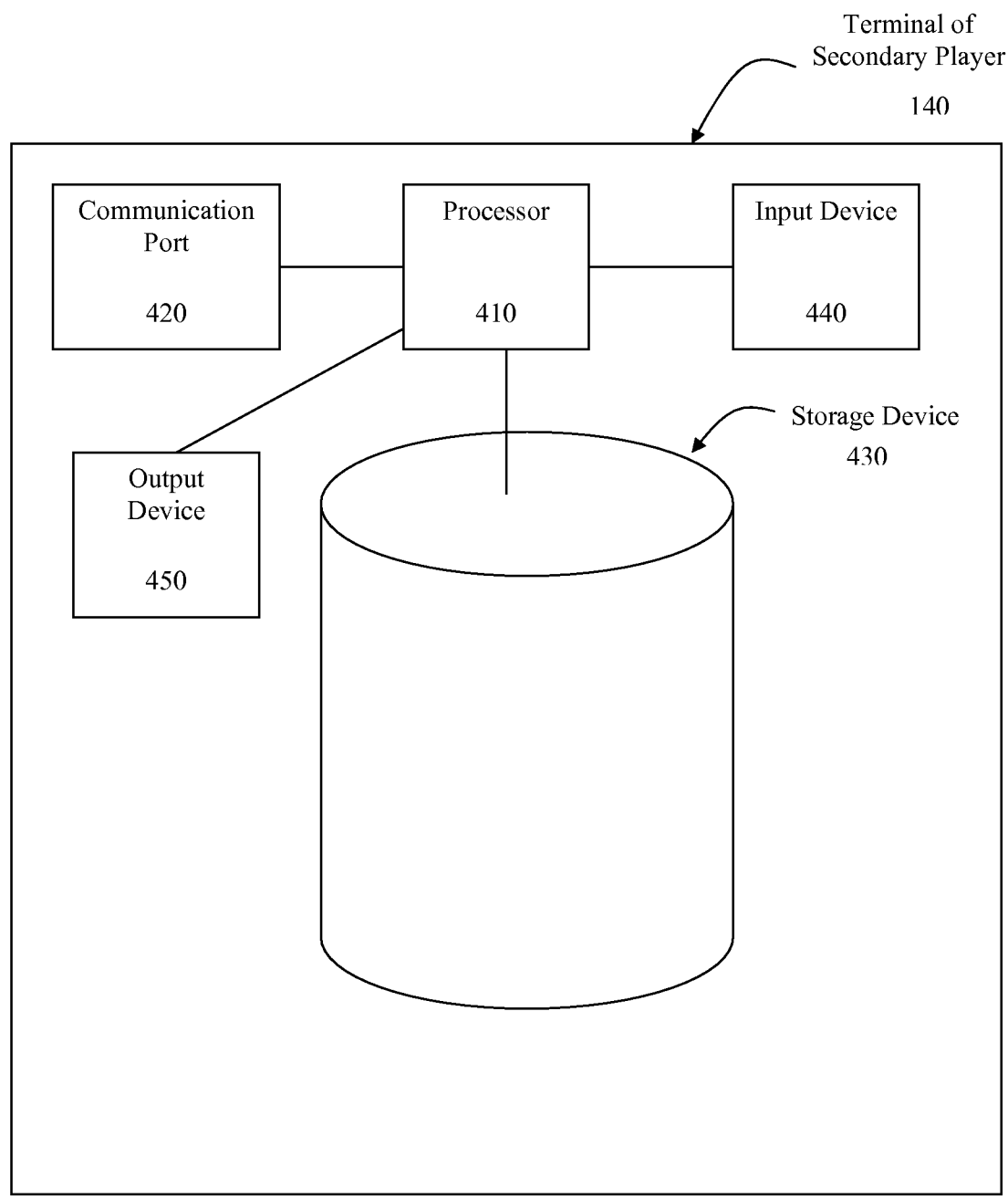
FIG. 4 shows a gaming device according to some embodiments.

FIG. 4 shows a terminal 140 for use by a secondary player, according to some embodiments. The storage device 430 may store program data. The program data may be used to direct the processor 410 to execute algorithms in accordance with various embodiments. Program data may include data used to a recreate games or depictions of games based on data received about original games. Program data may include data used to generate graphics, to display game outcomes, to compute winnings, and so on. The storage device 430 may store other types of data. Such data may include data describing bets, wins, and losses by a secondary player at terminal 140. Input device 340 may include sensors, buttons, touch screens, microphones, bill validators, coin acceptors, card readers, and any other means by which a secondary player or other party may interact with terminal 130. For example, the input device 340 may include a "bet" button.

The output device 350 may include display screens, microphones, lights, coin dispensers, buzzers, and any other means by which terminal 140 may provide a signal to the secondary player. The communication port 320 may be used to transmit and/or to receive data.

Figure 5:
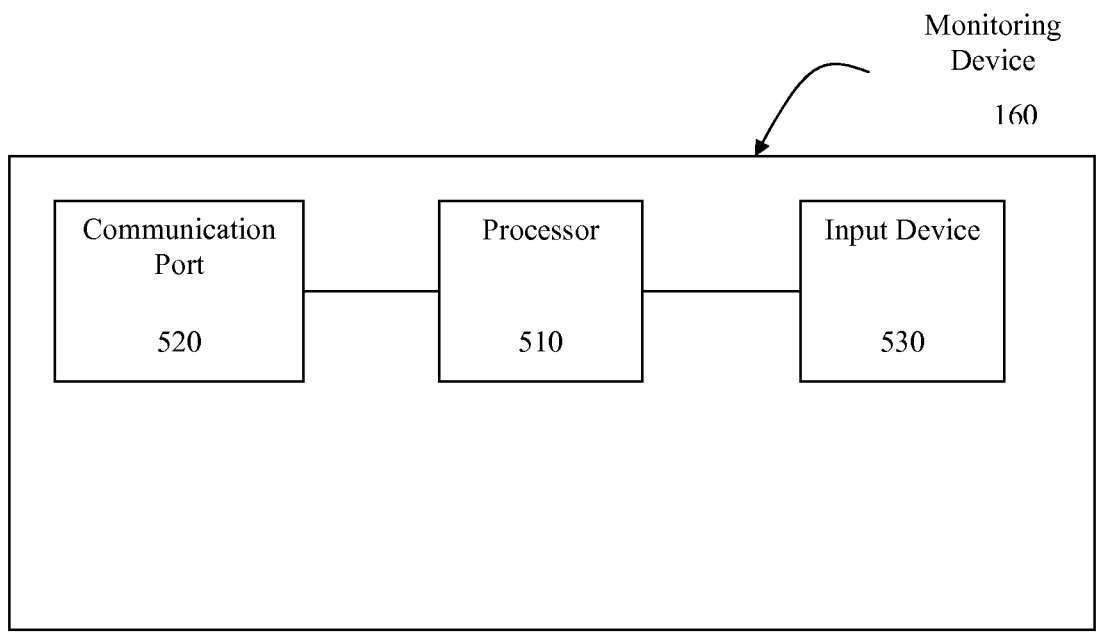
FIG. 5 shows a monitoring device (e.g., camera, card reader) according to some embodiments.

FIG. 5 shows a monitoring device 160 according to some embodiments. The monitoring device may receive data about a game via input device 530. The input device 530 may include a camera, microphone, pressure sensor, bar code scanner, sensor, button, and so on. For example, an input device may include a camera that is pointed at a table where a game of blackjack is being played. For example, an input device may include a camera that is pointed at the viewing window of a slot machine. Communication port 520 may be used to transmit data received by the input device to e.g., a casino server. In various embodiments, the monitoring device may serve multiple purposes, some of which may not involve receiving data about a game. For example, a monitoring device may include a camera which also serves security purposes at casinos.

Figure 6:
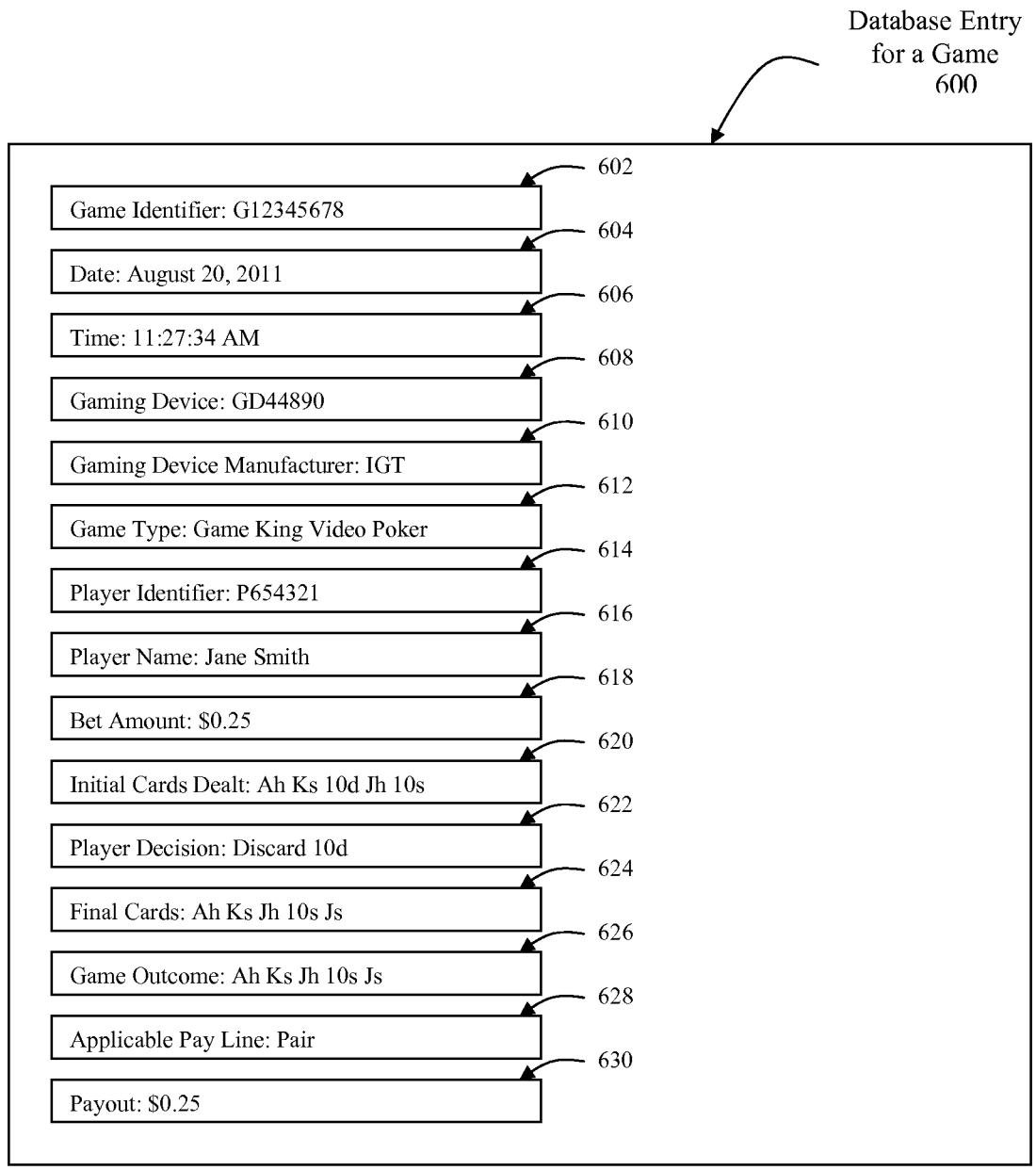
FIG. 6 shows a database entry including various information about a game (e.g., date, time, outcome, player, bet amount)

FIG. 6 shows a database entry 600 including various information about a game. The database entry may store various aspects of a game played by primary player (e.g., by Jane Smith). Such data may later be used to allow a secondary player to participate in the game.

FIG. 7 shows a database entry 700 including various games played by a player. The player may be a primary player. The data in database entry 700 may allow a secondary player to examine historical data about the games of a primary player (e.g., about the games of Sam Hunter), including statistics about the games (e.g., the profits made in the last 100 games).

FIG. 8 shows a display screen for entering betting information and tracking the progress of a game, according to some embodiments. The display screen may be sensitive and/or responsive to touch and may thereby function as a touch screen, in some embodiments. One area of the display screen lists the favored primary players of the secondary player currently viewing the display. Presumably, the secondary player has logged in or otherwise identified himself to the terminal or device to which the display belongs. The secondary player may have previously indicated his favored primary players. The casino may thus track the whereabouts of the favored primary players and alert the secondary player when a favored primary player begins play.

Another area of the display screen includes an announcements area. The casino may make announcements to the secondary player. Such announcements may include promotional announcements. For example, such announcements may include announcements of discounts at casino or other restaurants, announcements of discounts on shows, announcements about upcoming concerts or boxing matches, announcements about discounts on hotel rooms, and so on. Announcements may include promotions for other products, such as automobiles, toothpaste, or plane flights to the Caribbean. Announcements may further include announcements about primary players in which the secondary player may be interested. For example, an announcement may indicate that a favored primary player of the secondary player has just begun play.

Another area of the display screen includes a list of primary players that are available in the sense that the secondary player may participate in the games of these primary players. This display area may identify the primary player, either by real name or by an alias, such as "TeeBone". The alias may allow a primary player to maintain some anonymity or privacy. This display area may further indicate a game which the primary player is playing (and thus the game the secondary player would be participating in), a minimum bet required of the secondary player to participate in the game, and one or more statistics related to the primary players. For example, statistics may indicate a number of consecutive games won by the primary players. This display area may further include areas where a secondary player can touch in order to begin participating in the games of a primary player. For example, by touching an area labeled "select" next to primary player Robert Clements, the secondary player may begin participating in the games of Robert Clemens.

Another area of the display screen includes windows where a secondary player may track the progress of games in which he is participating. FIG. 8 depicts a first window where the secondary player can follow the game of primary player "TeeBone", in whose game the secondary player is participating. The game is blackjack, and the secondary player has a bet of $5 riding on the game. The game is currently in progress. FIG. 8 depicts a second window where the secondary player can follow the game of primary player Sue Baker. The game is a slot machine game. The game has just finished with an outcome of "cherry-bar-cherry". The secondary player has just won $6 on the game. Now, the secondary player has the opportunity to place bets on the next game, as indicated by the status "open for bets".

Another area of the display screen includes a display of the credit balance of the secondary player. These credits may be used to bet on games in which the secondary player is participating. Each credit may correspond, for example, to $0.25 in value. The secondary player may place bets using the betting areas of the display screen, including a "Bet 25¢" area, a "Bet $1" area, a "Bet $5" area, a "Repeat Last Bet" area, and an "Auto Bet" area. When touched, such areas may apply to only the game which has a status of "Open for Bets". For example, touching the "Bet 1" may cause a bet of $1 to be placed on the game of Sue Baker, since it is that game which has the status of "Open for Bets". In this way, there need not be a separate set of betting buttons for every game in which the secondary player is participating. The "Repeat Last Bet" area may allow the secondary player to easily repeat a prior bet that may take extra effort to enter using the other betting areas. For example, rather than touching the "Bet $1" area 4 times to enter a $4 bet, the secondary player might simply touch the "Repeat Last Bet" area to repeat a prior bet of $4. The "Auto Bet" area may allow the secondary player to continue making the same bet on each new game, for example, without having to always enter a bet. In some embodiments, the secondary player may program in a particular betting strategy and then touch the "Auto Bet" area to have the strategy executed automatically by the terminal of the secondary player. The "Lock Game" area may allow the secondary player to prevent access to the terminal by other secondary players while he steps away for a break. The "Order Drinks"

area may allow the secondary player to order drinks or other items and have them delivered to his terminal without ever leaving.

As will be appreciated, the various areas of the touch screen that allow touch interaction may also be implemented using ordinary buttons or any other interactive technology.

It should be appreciated that the figures do not necessarily show everything that might be included in a system, object, machine, device, etc. For example, although not shown in FIG. 3, gaming device 130 may include a coin hopper.

1. One player bets on the outcome of a game of another player. For example, one player bets on whether a winning outcome will be achieved in the game of another player. For example, one player bets on whether another player will win. In various embodiments, one player may place a bet and either win or lose money based on the results of a game played by another player. As used herein, "primary player", "primary players", and the like, may refer to a player or players who most directly participate in a game, such as a casino game. A primary player may, for example, be physically located at a slot machine and may participate in a game at the slot machine by inserting a coin, indicating a bet amount, and pulling a handle of the slot machine. A primary player may also be physically located at a table game, such as a game of blackjack with a live dealer. In various embodiments, a primary player directly initiates a game in which he participates, e.g., by pulling the handle of slot machine or physically placing a bet at a table game and motioning to a dealer that he is interested in playing. In various embodiments, a particular game would not occur but for the actions of the primary player.

As used herein, "secondary player", "secondary players", and the like, may refer to a player or players who participate or may come to participate in games played by primary players or by other secondary players. For example, a secondary player places a bet on a game in which a primary player is involved. The secondary player wins if the primary player wins, and the secondary player loses if the primary player loses. In another example, a secondary player places a bet for a game that has already occurred. When placing the bet, the secondary player does not know the outcome of the game. Once the secondary player has placed the bet, the outcome of the game may be revealed to the secondary player, and the secondary player may be paid if the outcome is a winning outcome. In another embodiment, secondary player A places a $10 bet on secondary player B, betting that secondary player B will win a game on which secondary player B has placed a $20 bet. If secondary player B wins the $20 bet, then secondary player A will win the $10 bet. In various embodiments, the secondary player does not initiate the game in which he participates. In various embodiments, a game in which the secondary player participates would occur whether or not the secondary player chose to bet on the game. The game in which a secondary player participates may be initiated by a primary player or may be initiated automatically, e.g., by a computer program.

Where ever data is used herein, it should be understood that such data may be stored, such as in a database or in any other suitable medium, format, or data structure. Data may be stored in either a fixed location or throughout distributed locations. Data may be stored either in a single location or in multiple locations (e.g., in multiple redundant locations). The data may be retrieved as needed from its storage location. When data is generated but not immediately needed, such data may be stored for later retrieval. Data may be accessible by reference to any part of the data, including any tag or label associated with the data. For example, if some data elements of a set of data elements are known, the remaining data elements from the set of data elements may be retrieved based on the known data elements. For example, the known data elements may serve as a search key for finding the remaining data elements in the set of data elements.

In all applicable embodiments described herein, any data generated, transmitted, stored, retrieved, or used may also be stored for auditing purposes. Such data may be made available to regulators to casinos (e.g., to casinos generating the data; e.g., to casinos using the data), or to any other relevant party. Data that may be stored may include data describing the size of a bet made by a primary player on a game, the type of bet made by a primary player on a game, intermediate events that occurred during a game (e.g., rolls prior to the final roll in a game of craps), the date of a game, the decision options that were available in a game (e.g., hit, stand in blackjack), the decisions that were made in a game, the outcome of a game, the amount paid to the winner of a game, and so on.

In various embodiments, data may be collected and stored relating to any searches of game related data. For example, suppose a secondary player searches for all games in which a payout of more than 100 coins was won. Accordingly, data indicating the search criteria may be stored so that it may be possible to determine in the future that a secondary player searched for all games in which a payout of more than 100 coins was won. Further data describing the results of a search may be stored. For example, if the search by the secondary player yielded 1218 games, then this fact may be stored. Further identifiers for each game identified by the search may be stored.

1.1. One player places bets on a game in which another player participates. In various embodiments, a secondary player may place a bet on the outcome of a game itself. For example, a secondary player may place a bet on the outcome of a slot machine game. If the outcome "bar-bar-bar" occurs in the game, then the secondary player may receive ten times his bet. The secondary player need not, in various embodiments, place the same type of bet as does the primary player. For example, the primary player may initiate a craps game with a "pass" bet. The secondary player may bet on the same craps game, but may place a "don't pass" bet. Thus, though the secondary player and the primary player have placed bets on the same game, the primary player may lose and the secondary player may win.

1.2. One player places bets on how another player will do. In various embodiments, a secondary player may place a bet on what will happen to a primary player in a game. The secondary player does not, in various embodiments, bet on the outcome of the game itself, but only on how the outcome of the game effects the primary player given the primary player's bet on the game. For example, the secondary player may bet that the primary player will win the game. If the primary player wins, then the secondary player's bet may be a winning bet and the secondary player may receive a payment. If, however, the primary player loses, then the secondary player may lose.

In various embodiments, the secondary player may bet that the primary player will lose. The secondary player may thus receive a payment for a winning bet if the primary player loses, but the secondary player may lose his bet if the primary player wins.

It should be noted that often, a bet placed by a primary player will provide the house or casino with an advantage. This is how the house may make money, on average. Thus, if a secondary player is permitted to place a bet against a primary player, then the secondary player may enjoy the same advantage as the house. In various embodiments, the secondary player may be charged a fee for betting against the primary player. The fee may provide the house with an advantage in a bet that might otherwise favor the secondary player. The fee may be a flat fee. The fee may be a percentage of the secondary player's bet. The fee may be taken only from payments of winnings received by the secondary player. For example, if the secondary player wins a payment of $10 based on a $10 bet placed, 50 cents may be deducted from the payment and kept by the house.

In various embodiments a fee charged to the secondary player may be set at an amount which provides to the house the same advantage as the house had against the primary player. As used herein, a "house advantage" or "house edge" may be defined as a ratio of the expected amount won by a casino to the initial amount bet by a player. Suppose that a house advantage on a game is 1.41%. Thus, a primary player who bets $1 could expect to receive $0.98.59 back, on average. Further, suppose that a primary player initially bets $1 and may receive back $0 (for a net loss of $1) or may receive back $2 (for a net gain of $1). An exemplary such bet would be a $1 pass bet in the game of craps. The secondary player, in this example, may bet $1 against the primary player. The secondary player would then expect to receive back $1.01.41, on average. In order to give the house the same advantage against the secondary player that it had against the primary player, the secondary player may be charged a fee of $0.02.82. This fee may be rounded to $0.03, or may be varied over a large number of secondary player bets so as to average out to $0.02.82. With the fee taken into account, the secondary player might expect to receive $0.98.59 back per dollar bet, providing the house with the same advantage against the secondary player as it had against the primary player.

In various embodiments, the secondary player may not be allowed to take exactly the opposite position as does the primary (e.g., where all wins for the primary player are losses for the secondary player, and vice versa). In various embodiments, an outcome that causes the primary player to lose may not result in a win for the secondary player, even though the secondary player has bet against the primary player. For example, an outcome of "plum-orange-cherry" may cause the primary player to lose, but may also cause the secondary player to lose. In various embodiments, an outcome that caused the primary player to lose may result in a push or tie for the secondary player. In this way, the house may maintain an edge against the secondary player even if the house also had an edge against the primary player. In various embodiments, the outcomes which are losing for the primary player and not winning for the secondary player may be chosen in such a way that the house is given the same advantage over the secondary player that it had over the primary player. For example, suppose that a particular game provides the primary player with the potential to either win $1 net, or lose $1 net. Suppose further that the game has a 2% house edge. Suppose further that outcomes X and Y in the game are both losing outcomes for the primary player. Outcome X occurs with probability 0.03, and outcome Y occurs with probability 0.01. With a bet of $1 against the primary player, the secondary player would ordinarily expect to win $1.02, for an average net profit of $0.02. However, in various embodiments, outcomes X and Y may also be counted as ties for the secondary player. The secondary player's expected payment is then reduced by the probability of X times the amount that would have been won (beyond the bet amount) upon the occurrence of X, plus the probability of Y times the amount that would have been won (beyond the bet amount) upon the occurrence of Y. This reduction is equal to $0.03 \times \$1 + 0.01 \times \$1 = \$0.04$. The secondary player's expected winnings have thus been brought down from $1.02 to $0.98. This reduction provides the house with the same 2% edge against the secondary player as it had in the original game against the primary player.

In various embodiments, the secondary player may bet against an outcome that would ordinarily be winning in a game. For example, in a game of blackjack, the secondary player may bet that the dealer will win. In various embodiments, the house may then alter the probabilities of various outcomes in the game so as to return an edge to the house. For example, if a secondary player bets on the dealer in a game of blackjack, the house may remove cards with low point values from the deck. This may reduce the probability of a dealer win, and thus may reduce the probability that the secondary player may win when betting on the dealer. In various embodiments, a game where the secondary player bets on the house may not be a game that was actually played by a primary player. Rather, the game may be a game that is or was simulated by the house with probabilities of various outcomes altered from the standard probabilities of the game.

In various embodiments, a secondary player may take the house's position, or approximately the house's position, and bet against a primary player. The secondary player may thereby lose whatever the primary player wins, and win whatever the primary player loses. For example, if the primary player loses his bet of $1, then the secondary player may win $1. However, if the primary player wins $10, the secondary loses $10. In order that the house may be sure of collecting $10 from the secondary player in the event that the primary player wins $10, the house may require the secondary player to place a sufficient deposit with the house to cover possible losses of the secondary player. The deposit might come in the form of a credit balance that the secondary player has accumulated (e.g., as a result of inserting bills, or as a result of winning bets), in the form of a financial account that the house is free to charge in order to collect on the secondary player's obligations (e.g., the secondary player may provide a credit card number), in the form of a check that the secondary player has provided to the house, or in any other suitable form. In various embodiments, the house may require a deposit or other commitment from the secondary player equal to the maximum possible payout that may be received by the primary player. For example, suppose the primary player participates in a game in which the primary player may win up to $100. If the secondary player bets against the primary player, then the secondary player may risk losing up to $100 in a game. The house may thus require the secondary player to have a credit balance of as much as $100 in order to bet against the primary player. In various embodiments, the house may require the secondary player to confirm (e.g., by pressing a button) that the secondary player is aware he has the potential to lose up to X amount, where X is the maximum the secondary player might lose from participating in a game.

In various embodiments, a secondary player may bet against a primary player while not mirroring the payouts of the primary player. For example, the secondary player may bet $1 on a game in which the secondary player bets that the primary player will lose. If the primary player does lose the game, the secondary player may receive $1.25, for a net profit of $0.25. If, the primary player wins, the secondary player may lose his bet of $1, for a net loss of $1. The secondary player may lose $1 regardless of the amount that the primary player wins. For example, the secondary player may lose $1 whether the primary player wins $1 or whether the primary player wins $100.

In various embodiments, the secondary player may bet that a primary player will win a certain multiple of the primary player's bet in a given game. For example, the secondary player may bet $5 that the primary player will win at least triple the primary player's bet of $2 in a game. The secondary player may win $20 if the primary player wins at least $6. Otherwise, the secondary player may lose his bet of $5.

In various embodiments, the secondary player may be paid according to a table or function that maps every possible result of a primary player to a payment for the secondary player. For example, the secondary player may receive $3 if the primary player wins $0, $5 if the primary player wins $1, $0 if the primary player wins $2, $0 if the primary player wins $3, $1 if the primary player wins $4, and so on. As will be understood, the function need not perform a linear or continuous mapping.

In various embodiments, a secondary player may be forbidden and/or prevented from placing a bet that would provide the secondary player with an edge. For example, a secondary player may be prevented from betting against a primary player, where the house had an edge versus the primary player.

1.3. A player places bets for games from the past. In various embodiments, a secondary player may place a bet on a game that has occurred in the past. With respect to the game, at least one of the following may have occurred in the past (e.g., before the secondary player placed a bet on the game): (a) the game's start; (b) the game's conclusion; (c) collection of a bet from the primary player who played the game; and (d) payment of winnings to the primary player who played the game.

When a game is originally played, a record of the game may be created. The record may include data sufficient to recreate all or part of the game. Such data may include: (a) one or more seeds or random numbers used to generate outcomes for the game; (b) one or more outcomes of the game (e.g., "cherry-bell-lemon"; e.g., a sequence of five cards, such as cards constituting a poker hand; e.g., a set of hands of cards, such as a player hand and dealer hand, or such as a player hand and hands of the player's opponent; e.g., the number or numbers showing on one or more dice, such as in a game of craps; e.g., a sequence of numbers showing on a sequence of dice rolls; e.g., a set of numbers in a game of keno; e.g., the payouts achieved in a bonus round; e.g., the level achieved in a bonus round); (c) one or more symbols comprising an outcome of the game; (d) one or more cards; (e) reel positions for one or more reels of a slot machine; (f) a number of decks used; (g) a decision made by a primary player of the game; (h) one or more algorithms used to generate an outcome of the game; (i) an identifier for the gaming device used in the game; (j) a pay table used for the game; (k) a make, model, or year for the gaming device used in the game; (l) a date or time when the game was played; (m) a location where the game was played; (n) a dealer involved in the game; (o) a position of the primary player at a table used in playing the game; (p) an identifier (e.g., a name) for the primary player who played the game; (q) an identifier of another player in the game (e.g., another player at a blackjack table where the game was played); (r) a bet made by a primary player of the game; (s) winnings received by the primary player in the game; (t) video footage of the game; (u) audio footage of the game; and (v) an order of cards dealt from a deck of cards. Video footage of the game may include video footage from various perspectives. In some embodiments, video footage may show or focus on cards, dice, or reels, or other items which determine and/or reveal the outcome of a game. Video footage may include footage of actions in a game, such as footage of a player making bets, making decision, and/or collecting winnings. Such video footage may focus on a player's hands, for example. In some embodiments, video footage may show or focus on a dealer or other casino representative in charge of a game. In some embodiments, video footage may show or focus on a player's face or body. For example, video footage may show a player's facial expressions or body language during a game. In some embodiments, video footage may focus on spectators. In some embodiments, video footage is recorded from a live game. In some embodiments, video footage is generated. Video footage may be generated based on stored data about a game.

Video footage may be generated in a number of ways. In some embodiments, video footage may be generated by assembling stock video clips. For example, one stock video clip may show a primary player (e.g., an actor acting as a primary player) making a bet. Another stock video clip may show a primary player rolling the dice. There may be stock video clips of every possible outcome in a game. For example, there may be a stock video clip showing the every possible roll of two dice. To assemble video footage of a complete game, the casino may e.g., put together a video clip of a bet being made, a video clip of an outcome being rolled corresponding to the outcome that actually occurred in the original game the secondary player is betting on, and a video clip of a player collecting his winnings. In some embodiments, stock video footage may include video footage of entire games. Should a similar game later occur, the same video footage may be used for the similar game when the secondary player is participating in the similar game.

In some embodiments, video footage is generated using computer algorithms. For example, computer algorithms may generate footage showing a simulated primary player placing a bet and rolling dice, the dice bouncing and landing, a simulated croupier paying winnings, and so on. In various embodiments, video may be generated so as to be true, as much as practicable, to the data of the game. For example, video may be generated to show a video or animated depiction of an outcome that actually occurred in a game of a primary player.

In various embodiments, video may be generated based on data about a game. Data indicating the bet amount of a primary player may be used to generate video of a primary player (e.g., a simulated primary player) making a bet of the same bet amount. Data indicating an outcome of a game may be used to generate video showing the same outcome being generated. Data indicating intermediate symbols or indicia that appear during a game may be used to generate video showing those same intermediate symbols or indicia. For example, data indicating that a particular position at a blackjack table was dealt the seven of hearts may be used to generate video showing the simulated dealing of the seven of hearts on a simulated blackjack table. Data indicating the identity of a primary player may be used to generate video. For example, based on a stored photo of a primary player, the casino may generate cartoon caricatures of the primary player playing a game. Data indicating the age or other demographic of a primary player may be used to generate video. For example, if the primary player is a 60 year-old female, the casino may generate a cartoon caricature of a 60 year-old female playing a game. In some embodiments, demographic data about a player may be used to retrieve stock footage of a player with similar characteristics. For example, stock footage of a 60 year-old female player may be retrieved.

The record of the game may be stored by a gaming device, casino server, third party server, or other device. Subsequently, a secondary player may place a bet on the game, or on some aspect of the game. Once the secondary player has placed a bet, data stored in the record may be used to recreate the game, or to recreate some aspect of the game. For example, video footage of the game may be shown to the secondary player. In some embodiments, the outcome of the game may simply be displayed for the secondary player.

Based on the outcome of the game, and based on the bet placed by the secondary player, the secondary player may lose his bet, lose a portion of his bet, break even, or be paid winnings. For example, if the outcome of the game is a winning outcome, then the secondary player may be paid based on the standard rules of the game. For example, if the secondary player bets $10 on a game of blackjack, and the primary player in the game received 20 points to the dealer's 19, then the secondary player may win $10 in addition to keeping his bet.

If the secondary player has placed a bet on what would happen to the primary player, then the winnings and/or losses of the primary player may be revealed to the secondary player. For example, if the secondary player bet against the primary player, and the primary player lost, the secondary player may win. If the secondary player made a bet whereby the secondary player receives twice the winnings of the primary player, and the primary player wins $20, then the secondary player may receive $40

1.4. A primary player on which a secondary player was betting is no longer available. In various embodiments, a secondary player may participate in one or more games played by a primary player. For example, the secondary player may place bets on the games played by the primary player. The primary player may, at some point, terminate his playing session. The secondary player may, on the other hand, wish to continue his participation in the games of the primary player, and may thus find himself deprived of opportunities to make bets on the games of the primary player.

1.4.1. A primary player is asked to stay. In various embodiments, the primary player may signal his intention to terminate a playing session. For example, the primary player may stand up, cash out, refrain from placing a bet even though he is at a table game, and so on. The secondary player may signal his desire to continue participating. For example, the secondary player may press a button labeled "continue session" on a betting interface. The secondary player may communicate his desire verbally (e.g., to a casino representative), via text (e.g., via a text message sent to a casino representative) or in any other manner. Regardless of whether the secondary player actually signals his desire to continue participating, the primary player may be contacted. For example, a representative of the casino may contact the primary player. Such a representative may include a waitress, pit boss, dealer, etc. The primary player may be asked to stay and to continue playing. The primary player may be offered a benefit for staying, such as cash, goods or services, a free meal, show tickets, improved odds, comp points, and so on. The primary player may be informed that there is a secondary player who appreciates the results of the primary player and wishes for the primary player to remain.

In some embodiments, a primary player who has signaled an intent to leave may be asked to stay only if one or more criteria are satisfied. For example, the primary player may be asked to stay only if at least three secondary players have been participating in the games of the primary player. Other criteria may include: (a) there are at least X secondary players watching the games of the primary player; (b) there are at least X secondary players who are interested in participating in the games of the primary player; (c) there has been at least X dollar amount of bets placed by secondary players on each game of the primary player; (d) there has been a total of at least X dollar amount of bets placed by secondary players on games of the primary player during a particular period of time, number of games, particular playing session, etc.; (e) the casino has made at least X dollars of profit from secondary players having participated in the games of the primary player; (f) the casino has made at least X dollars of theoretical win or profits from secondary players having participated in the games of the primary player; and so on. It will be appreciated that a casino may require any combination of the above criteria to be met in order for a primary player to be asked to stay. There may be multiple ways of meeting the above criteria, including by partially satisfying two or more of the criteria. It will further be appreciated that there may be other criteria that a casino may use based on whose satisfaction the casino may ask a primary player to continue with a playing session.

In various embodiments, a casino may offer a primary player an opportunity to play a fair game (i.e., where the primary player's expected winnings accounting for the cost of betting are exactly 0), if the primary player will continue to play.

1.4.2. The casino plays automatically. In some embodiments, when a primary player terminates a playing session, the casino or house may play in place of the primary player. For example, a dealer at a blackjack table may continue to deal a hand to the position where the primary player had been. The dealer may make decisions for the hand, such as hit or stand decisions. The decisions may be made according to optimum strategy. The decisions may also be made based on inputs from the secondary player. Another representative of the casino may also stand in for the primary player. For example, the other representative may sit at the table or slot machine where the primary player had been, and may resume play.

In some embodiments, game outcomes may be generated automatically once the primary player leaves. For example, a slot machine that the primary player has left may continue to generate outcomes. The secondary player may thus continue to place bets on the outcomes.

In some embodiments, a computer algorithm may make decisions in a game. The computer algorithm may substitute in for a primary player in a game so that a secondary player may participate in the game without the presence of a human primary player. In some embodiments a computer algorithm may act as a primary player even when a secondary player had not been participating in games of a prior human primary player. In other words, a computer algorithm need not necessarily substitute in for a primary player, but may serve as a simulated or artificial primary player from the get go. A computer algorithm may make decisions in a game. The computer algorithm may make decisions of how much to bet; decisions of what types of bets to make (e.g., the computer algorithm may decide whether or not to make an insurance get in a game of blackjack); decisions of whether to check, bet, raise, call, or fold (e.g., in a game of poker); decisions about whether or not to receive additional cards (e.g., in games of blackjack or video poker); and any other decisions that may be made in a game. The computer algorithm may refer to a stored set of rules for making decisions in a game. For example, the computer algorithm may refer to a table which lists one or more possible situations which might arise in a game and which lists a corresponding decision that should be made should that situation arise. The computer algorithm may also include procedures, logic, or other computational methods for computing a decision given a game state. For example, in a game of video poker, a computer algorithm may compute expected winnings given each of several possible decisions. The computer may determine which of the decisions leads to the highest expected winnings and make that decision.

In various embodiments, a computer algorithm may be programmed to make decisions which yield the highest expected winnings, payouts, and/or profits in a game. In various embodiments, a computer algorithm may be programmed to approximate the play of a human player. The computer algorithm may be programmed to, at least occasionally, favor strategies with emotional or intuitive appeal over those that are optimal. For example, a computer algorithm may be programmed to pursue a high paying hand in a game of video poker even when expected winnings would be optimized by pursuing a lower paying but more certain hand. In various embodiments, computer algorithms may be programmed with different personalities. Some might be programmed to take big risks in the strategies they use. Some might be programmed to play conservatively. Some computer algorithms may be programmed to bet frequently (e.g., in games of poker). Some computer algorithms may be programmed to bet infrequently, and only with very good hands (e.g., in games of poker).

1.4.3. An interrupted session of the primary player is resumed when primary player returns. In some embodiments, when a primary player leaves, the session of the secondary player may be put on hold. That is, for the time being, the secondary player may not have the opportunity of placing bets and participating in games played by the primary player. However, the secondary player may have the opportunity to resume playing when the primary player returns and initiates new games.

1.4.3.1. An alert is given to the secondary player when primary player returns. In some embodiments, the secondary player may be sent an alert when the primary player has returned, or when the primary player is soon to return, or when the primary player is likely to return. The alert may take the form of a phone call, email, text message, verbal alert by a casino representative, and so on.

1.4.4. In some embodiments, a secondary player may indicate a primary player in whose games the secondary player may be interested in participating. The secondary player may thereby "tag" or "bookmark" the primary player as a player in whose games the secondary player may wish to participate. In various embodiments, the casino may allow the secondary player to easily determine when a bookmarked primary player is playing (e.g., is seated at a gaming device or gaming table; e.g., has inserted a player tracking card at a gaming device or gaming table; e.g., has played one or more games in the recent past). For example, a secondary player may peruse a list of bookmarked primary player. The secondary player may select one of the primary players from the list and may then be shown whether or not the primary player is currently playing, what game the primary player is playing, where the primary player is playing, or any other information of interest. In some embodiments, the casino may alert the secondary player anytime a bookmarked primary player has begun playing. In some embodiments, the casino may keep track of various statistics related to primary players that the secondary player has bookmarked. The casino may report such statistics to the secondary player when the secondary player makes contact with the casino (e.g., sits at terminal from which the secondary player may participate in games of the primary player), or at any other time. Statistics may include statistics about recent games played, recent wins, recent losses, recent large payouts, recent profits, and so on. Statistics need not necessarily be recent, but may be recent if the secondary player has previously learned of older statistics about the primary player. In various embodiments, if a secondary player is ready to begin participating in the games of a primary player, the secondary player may be offered (e.g., by default) the opportunity to participate in games of a bookmarked primary player. The secondary player may be offered the opportunity to participate in the games of a first bookmarked primary player (e.g., a primary player that is first on the secondary player's list of favorite primary players). If the secondary player declines, the secondary player may be offered the opportunity to participate in games of a second bookmarked primary player (e.g., a primary player that is second on the secondary player's list of favorite primary players), and so on. In various embodiments, secondary players may share tags or bookmarks of primary players amongst themselves. For example, a secondary player may publish a list of whom he thinks are "lucky" primary players.

Other secondary players may view the list and decide to participate in the games of the listed primary players.

1.4.5. An expected value is paid to the secondary player. In various embodiments, a secondary player may have placed a bet on results of a primary player spanning more than one game. For example, the secondary player may have bet that a primary player would be ahead monetarily after one hour of play. If, however, the primary player leaves prior to completing one hour of play, there is the potential that the secondary player's bet remains unresolved. In various embodiments, the secondary player's bet is settled for the expected value (EV) of the secondary player's winnings. For example, if, based on the current time, the current winnings of the primary player, and the odds of the game that the primary player has been playing, the expected winnings of the secondary player are $8, then the secondary player may be paid $8 when the primary player terminates his session. The bet may also be settled for various functions of the EV, such as for the EV less a processing fee, 50% of the EV, and so on.

1.4.6. Bets are returned to the secondary player. In some embodiments, when the primary player terminates a session, a bet made be the secondary player that was dependent on the primary player finishing the session may be returned to the secondary player.

1.4.7. Options to participate in the games of other primary players are shown to the secondary player. In some embodiments, when the primary player terminates a session, the secondary player may be presented with other primary players on whom or on whose games the secondary player might bet. By selecting one or more of the new primary players, the secondary player may continue participating in games. For the purposes of a bet that required the completion of the session by the original primary player, the new primary player may be treated as if he was continuing where the original primary player left off. For example, the new primary player may be treated as if he has lost $6 during the past half hour, as the original primary player actually did. If the new primary player subsequently wins $10 in the next half hour, a bet made by the secondary player that the original primary player would be ahead after an hour of play would be a winning bet.

When a selection of new primary players is presented to the secondary player, primary players presented may be chosen by the casino based on similarities to the original primary player. For example, suppose the original primary player was from Texas. When the original primary player terminates his session, new primary players may be presented wherein each is also from Texas. Other characteristics that the original and new primary players may share include: (a) both may play the same type game (e.g., both may play IGT's Wheel of Fortune® slot machines); (b) both may be of the same gender; (c) both may be the same age; (d) both may have the same occupation; (e) both may have the same geographic location of residence or origin; (f) both may have common interests (e.g., in music, food, sports, etc.); and (g) both may share common birthdays.

1.4.8. The secondary player is given the opportunity to become a primary player. He's told where he can sit down and start playing. In some embodiments, when a primary player terminates his session, the secondary player is offered the chance to become a primary player. For example, the secondary player is shown the location of the slot machine or table game where the primary player had been playing. The secondary player may be offered the opportunity to take the seat and/or take the place of the primary player.

1.4.9. Historical games of the primary player are found. In some embodiments, when the primary player terminates a session of play, the secondary player may be offered the opportunity to participate in historical games of the primary player. In various embodiments, the historical games may include games in which the secondary player has not already participated. The secondary player may thereby have the opportunity to continue benefiting from the skill, luck, or other value he associates with the primary player.

1.5. Maintenance of player privacy. In various embodiments, the identity of a primary player may be shielded from the secondary player. This may prevent a secondary player from finding out sensitive financial information about the primary player, from scolding the primary player for unfavorable outcomes, or for otherwise causing harm or discomfort to the primary player.

1.5.1. The secondary player doesn't see who he is betting on. In various embodiments, facial features or any other potentially identifying features of a primary player are hidden from the secondary player. For example, in video footage of the game of the primary player, the face is blurred, covered, or completely omitted from the field of view. Voices may be edited out or masked.

1.5.2. The secondary player does not know the location of the person he is betting on. In various embodiments, the location of the primary player is disguised or kept hidden. Otherwise, especially for a live game, it would be conceivable that the secondary player could find the primary player by simply going to the location of the primary player. Thus, in various embodiments, video footage of the game of the primary player may omit distinguishing characteristics of the primary player's location. Such characteristics may include identifiable features of a casino, such as pictures, sculptures, fountains, names of restaurants, signs for a bathroom, signs for a poker room or other casino sector, and so on. Distinguishing features of a table game may also be disguised or omitted. For example, a unique design or color of a table may be omitted. In various embodiments, games or locations with readily identifiable and/or unique characteristics may be ineligible for participation by secondary players.

1.5.3. Limits to how many times a secondary player can bet on one particular person. In various embodiments, there may be a limit as to the number of games of a primary player in which a secondary player may participate. This may lessen the likelihood of the secondary player developing any strong feelings towards the primary player one way or the other. In various embodiments, there is a limit to the amount of time that the secondary player is allowed to spend participating in the games of a given primary player.

In various embodiments, a secondary player may be switched from participating in the games of a first primary player to participating in the games of a second primary player. The secondary player may be switched without the secondary player knowing that he has been switched. For example, the secondary player may receive data about a game that includes the symbols, indicia, and/or outcomes generated during the game. However, the secondary player may not necessarily receive identifying information about a primary player of the game. Thus, when the secondary player is switched from participating in the games of a first primary player to participating in the games of a second primary player, the secondary player may not be aware of the switch since the secondary player may have no access to identifying information for either the first or second primary players. In various embodiments, the secondary player may be switched form participating in the games of a first primary player to participating in the games of a second primary player after a predetermined number of games. For example, after participating in 25 games of a first primary player, the secondary player may be switched to participating in the games of a second primary player. In various embodiments, a switch may occur at random. For example, after every game played by a first primary player, the casino may randomly generate a number between 1 and 100. If the number is greater than 80, the casino may switch the secondary player from participating in the games of the first primary player to participating in the games of a second primary player. In some embodiments, the switch may occur after a random number of games with an upper boundary. For example, if the secondary player has not been switched after 20 games with a first primary player, the secondary player may be switched automatically. In some embodiments, a secondary player may be switched upon his own request. In various embodiments, when a secondary player is switched between the games of different primary players with reasonable frequency, the chances with which a primary player's privacy becomes compromised may be reduced. In some embodiments, a secondary player may be informed when he has been switched from the games of a first primary player to the games of a second primary player. In some embodiments, the secondary player is not informed of the switch.

1.5.4. Introduction of a time delay so that the primary player is no longer located where he had been by the time the secondary player begins participation in the games of the primary player. In various embodiments, a secondary player is restricted to betting on games that have occurred a predetermined amount of time in the past, e.g., one day or more in the past. In this way, the secondary player is unlikely to be able to contact the primary player, as the primary player may no longer be in the vicinity. In various embodiments, the secondary player is restricted to betting on games that have been played by a primary player who has already left the location in which the games were originally played.

1.6. A secondary player or spectator is provided with knowledge about what the next cards will be, or what the primary player's opponent holds. The secondary player may watch the primary player struggle with a decision while the secondary player already knows the correct decision. In various embodiments, a secondary player may be informed of some information about a game that the primary player does not know, or at least did not know at the time the primary player was participating in the game. For example, a primary player may be engaged in a game of video poker. The secondary player may watch the progress of the game from a remote terminal. The secondary player may be informed that the next four cards in the deck are all aces. However, this information is not known to the primary player. Thus, the secondary player may experience the excitement of hoping the primary player will draw four cards.

1.6.1. The secondary player knows the next cards, the symbols that will occur on reels, the proper door to open in a bonus game, etc. In various embodiments, a secondary player may be informed of one or more of the following at a point in a game prior to when a primary player finds out (or found out): (a) an outcome of a game (e.g., "cherry-cherry-cherry"); (b) a payment that the primary player will receive based on the game; (c) a game result (e.g., win, lose); (d) a reel position; (e) a symbol that will appear on a reel (e.g., the secondary player may know that the third reel of a slot machine will show a symbol "bar" that will complete a winning outcome of "bar-bar-bar" prior to when the primary player finds out); (f) a card that will be received by the primary player; (g) a card that will be received by a dealer; (h) a card that is at or near the top of the deck being used in a game of cards; (i) a hand of cards that will be achieved by a primary player should the primary player make a particular decision (e.g., a hit decision in blackjack); (j) an order of cards in a deck of cards (k) a payment, result, or outcome that would result from a particular choice in a bonus game of a gaming device (e.g., the primary player would win 200 coins by choosing door number 3 in a bonus game); (l) a card that will be received by the primary player's opponent; (m) a card held by the primary player's opponent (e.g., in a poker hand); (n) a number that will appear on a die in a game (e.g., in craps); (o) a number that will come up in the game of roulette; and so on.

1.6.2. The secondary player may make a new bet at apparently good odds if the primary player is not likely to make a decision that would win for the secondary player. In various embodiments, a secondary player may be allowed to place a bet on a game being played by the primary player after finding out information about the game. The bet may be made at odds apparently favorable to the primary player. For example, suppose that a primary player holds an initial hand of video poker comprising the Ks, Kc, 10h, 3c and 7d. Unbeknownst to the primary player, but known to the secondary player, the next four cards in the deck are the Ah, Kh, Qh, and Jh. Thus, were the primary player to discard the Ks, Kc, 3c, and 7d, the primary player would achieve a royal flush, the highest paying outcome, in various embodiments. The secondary player may be allowed to bet four coins on the game. The secondary player may win 1 coin for a pair, jacks or better, 2 coins for two-pair, 3 coins for three-of-a-kind, and 800 for a royal flush. Thus, the secondary player may bet 4 coins with an apparent potential to win 800 coins. Indeed, it is possible that the second player will win 800 coins. However, it would be very unlikely for the primary player to discard a pair of kings in order to draw four cards to the 10h. Thus, it is more likely the primary player will keep his pair of kings, draw three cards, and end up with three kings, providing the secondary player with a payout of 3 coins. Thus, in various embodiments, the strategy of a primary player may be predicted, e.g., by the casino server. The predicted strategy may be, e.g., an optimal strategy given lack of any knowledge about future results or outcomes (e.g., future cards in a deck). Based on predictions of the primary player's strategy, the casino server may provide betting opportunities for the secondary player such that the house will maintain an advantage given the predicted strategies. The same betting opportunities provided to the secondary player may have provided the house with a disadvantage if the primary player were to be able to utilize knowledge of future results or outcomes (e.g., future cards in a deck). Accordingly, a secondary player may make certain bets on a game in the hopes that the primary player will deviate from optimal or conventional strategy.

1.6.3. The secondary player may provide hints. In various embodiments, a secondary player may have the opportunity to convey a hint to the primary player. A hint may take the form of a suggested decision. For example, a hint may indicate that the primary player should discard the first and third cards in his hand of video poker. A hint may take the form of a veto. For example, the primary player may first indicate a particular choice of strategy, such as a particular combination of cards to discard in a game of video poker. The secondary player may provide an indication that such a strategy should not be followed. The secondary player may be allowed only one veto, or may be allowed up to a predetermined number of vetoes. A hint may take the form of information about a symbol, result, or outcome of a game. For example, in the bonus round of a slot machine game, the secondary player may inform the primary player of the number of coins behind door 2. It may happen that there are more coins behind door 3, but the secondary player may only be allowed to give a hint about door 2, in some embodiments.

1.6.4. The secondary player may watch the primary player for entertainment purposes. The secondary player may watch facial expressions during good outcomes or during near-misses. In various embodiments, the secondary player may derive entertainment or other gratification from watching the experiences of the primary player. The secondary player may, for instance, watch a primary player play a game in which the primary player will win a large payout. The secondary player can watch the expression on the face of the primary player (e.g., from video footage) and see the expression change from neutral to an expression of surprise and elation. The secondary player may choose to participate in games that are likely to have or to have had an emotional impact on the primary player. The secondary player may thus choose games in which a payment above a predetermined amount was won, in which a certain outcome (e.g., a winning outcome) was achieved, in which a jackpot was achieved, in which a bonus round was played, and so on. A secondary player may also choose a game in which the primary player comes close, or apparently comes close to achieving a large payment. For example, the secondary player may choose a game in which the primary player has four cards to a royal flush in video poker, and will draw a fifth card. The secondary player may also choose a game in which two out of three reels of a slot machine line up on jackpot symbols.

1.6.5. A search is performed to find games that include near misses of high paying outcomes, or any other characteristic. In various embodiments, a secondary player may receive information about various games that will happen, are in progress, or have happened already. Based on the information, the secondary player may choose a game in which to participate, or which to watch. The secondary player may have a preferred game he likes to play, a preferred primary player he likes to bet with (or on), a preferred dealer in whose game he wishes to participate, and so on. The secondary player may also wish to participate in games where he knows something about the outcome, results, or other information about the game. For example, the secondary player may wish to participate in games where the first two reels of a slot machine show the jackpot symbols.

In various embodiments, the secondary player may indicate a desired criterion, or desired criteria about the game. Various games satisfying the criterion or criteria may then be made available for the secondary player to participate in. The secondary player may then choose one or more of the games to participate in. In various embodiments, once the secondary player has indicated a criterion or criteria, the secondary player may automatically begin participating in a game matching the criterion or criteria. Criteria indicated for a game by a secondary player may include one or more of the following: (a) the game has a particular dealer; (b) the game has a particular number of players; (c) the game is played at a particular gaming device; (d) the game is played at a particular type of gaming device; (e) the game is played by a particular primary player; (f) the game is played by a primary player with a particular characteristic (e.g., age, race, marital status, nationality, area of residence, occupation, etc.); (g) the game has a potential payout above a particular level (e.g., the game has a payout of more than 1000 times the bet); (h) the game has an expected payout above a certain level (e.g., an expected payout of more than 95% of the original bet); (i) the game has a bonus round; (j) the game is played in a certain location; (k) the game is played at a certain time or date; (l) the game is, or will be a winning game (e.g., the game will pay at least three times an initial bet of the primary player); (m) the game will feature an outcome that has almost all the required symbols necessary for a large payout (e.g., a game of video poker has four cards to a royal flush); and so on.

1.6.6. Preventing collaboration. In various embodiments, measures may be taken to prevent collaboration between the primary player and the secondary player. Particularly if the secondary player knows information about the game, such as hidden cards in a deck, the secondary player would be able to confer an advantage to the primary player and to himself by communicating with the primary player. As discussed previously, the identity of the primary player may be shielded from the secondary player. Similarly, the identity of the secondary player may be shielded from the primary player. One or both of the primary and secondary players may be kept in an enclosure, such as a sound-proof room or Faraday cage, that reduces the possibility of communication. Signal detectors, such as antennas, may be placed near the primary or secondary players to detect possible communications between the two. Cell phones, pagers, Blackberries™ and other communication devices may be temporarily confiscated from either or both of the primary and secondary players. The secondary player may participate in the game only after one or more, including all game decisions have been made in the game.

1.7. What happens if a machine needs servicing in the middle of a roll? What happens if the primary player is taking too long to finish a game? In various embodiments, the completion of a game may be delayed or prevented. For example, a gaming device may break down in the middle of a game. A primary player may get into a discussion with a friend in the middle of a video poker game, and may thus delay a decision in the game for several minutes. A secondary player participating in a delayed game may find the delay frustrating and may wish to complete the game in some other manner.

1.7.1. A game is completed automatically. In various embodiments, the game may be completed automatically, e.g., by the casino. The game that is completed automatically may, in fact, be a copy of the original game, so that the primary player can complete the original game on his own. However, the secondary player may receive a payment based on the automatically completed game. The game may be completed using a predetermined strategy, such as optimal strategy. The game may be completed using a random strategy where, for example, one of several possible strategies is selected at random.

1.7.2. The secondary player makes the decisions in a game. In some embodiments, the secondary player may have the opportunity to complete the game by making his own decisions. For example, if the game is blackjack, the secondary player may indicate decisions such as "hit" or "stand" so as to complete the game. The secondary player may, in various embodiments, complete a copy of the original game, so that the primary player may complete the original game on his own. A copy of the original game may include a second game with one or more similar parameters or aspects to the first game. For example, in the copied version of the game, one or more of the player hand, the dealer's hand, the order of cards in a deck, the prizes available behind certain doors in a bonus game, etc., may be the same as in the original game.

1.7.3. A bet is returned to the secondary player. In various embodiments, when a game is delayed, the bet placed by the secondary player on the game may be returned to the secondary player.

1.7.4. The secondary player is provided with an expected value of his winnings at that point in the game. In various embodiments, when a game is delayed, the expected payment or the expected winnings to be paid the secondary player may be provided to the secondary player. In some embodiments, a function of the expected payment is provided, such as the expected payment less a fee.

1.8. Communication between the secondary player and the primary player. In some embodiments, the primary player and the secondary player may be given the opportunity to communicate. Communication may occur via text, voice, or any other means. Communication may occur through the casino server. Communication may be monitored by the casino, such as by a computer program or a casino representative. Communication may be edited or prevented if there is inappropriate or threatening language and/or if communication somehow provides either the primary player or secondary player with an unfair advantage.

1.8.1. The secondary player sends help to the primary player. For example, "you should hit here" In some embodiments, the secondary player may send help to the primary player. The secondary player may help the primary player with strategy in a game such as blackjack, video poker, or live poker. In video poker, the secondary player may suggest which cards the primary player should discard. In blackjack, the secondary player may suggest whether to hit, stand, double down, split, etc. In a live game of poker, the secondary player may advise the primary player whether to check, bet, raise, fold, or call. The secondary player may also suggest an amount of a bet or raise. The secondary player may provide other suggestions or opinions, such as suggesting that another player is probably bluffing. The secondary player may provide additional information, such as the probabilities of various events occurring given a particular strategy. For example, the secondary player may indicate that the primary player would have roughly 2 to 1 odds against making a flush should he continue in a game of poker.

1.8.2. The secondary player takes over the game. In various embodiments, a secondary player may take the place of a primary player in making decisions in a game. For example, the secondary player may transmit signals that cause game decisions to be made without additional input by the primary player. For example, the primary player may press a button on a gaming device labeled "defer to secondary player". The secondary player may then select, e.g., cards to discard from a remote terminal. The remote terminal may, in turn, transmit to the gaming device indications of which cards the secondary player has chosen to discard. The chosen cards may then be removed from the primary player's hand and replaced with new cards. The primary player may win or lose, and may receive payments based on the decisions made by the secondary player.

1.8.3. Sending a tip to the primary player. In various embodiments, the secondary player may send a tip, other consideration, or other token of gratitude to the primary player. For example, if the primary player has just won a large payment, thereby causing the secondary player also to win a large payment, the secondary player may be grateful and wish to tip the primary player. The secondary player may provide an indication that he wishes to tip the primary player, e.g., by pressing a button on a remote terminal. The casino server may then deduct the amount of the tip from an account associated with the secondary player, and add such amount to an account associated with the primary player. The casino server may also cause the amount of the tip to be paid out at the primary player's gaming device or table, e.g., in the form of a coin or cashless gaming receipt. In some embodiments, the primary player may pay to have something delivered to the primary player. For example, the secondary player may pay for a bottle of wine. A casino representative, such as a waitress, may then deliver the bottle of wine to the primary player at the location of the primary player.

1.9. Betting interfaces. A secondary player may participate in the game of a primary player using various interfaces.

The interfaces may allow the secondary player to select a game in which to participate, including selecting various aspects of a game, such as the machine on which the game is played, the primary player playing the game, the time, and so on. The interface may allow the secondary player to select a bet type. For example, the secondary player can bet for a primary player to win, or for a primary player to lose. The interface may allow the secondary player to select a bet amount. The interface may allow the secondary player to insert cash or other consideration, to identify himself (e.g., for the purposes of receiving comp points), and to cash out winnings or remaining balances.

1.9.1. Internet A secondary player may participate using a network, such as the internet or a casino intranet. The secondary player may employ a computer, such as a personal computer, for this purpose. The secondary player may view a selection of games to participate in, progress of a current game, credit balances, etc., using a computer monitor. The secondary player may input decisions using a mouse, computer keyboard, or any other computer input device. For example, the secondary player may key in a bet amount using a numeric keypad on a computer keyboard. The secondary player may also use a device such as a phone, a cell phone, personal digital assistant, or Blackberry™. The contents of the following United States patent applications, listed with serial numbers, titles, and matter numbers in parenthesis, are incorporated by reference herein for all purposes: (a) Ser. No. 10/835,995 System and Method for Convenience Gaming (075234.0121); (b) Ser. No. 11/063,311 System and Method for Convenience Gaming (075234.0136); (c) Ser. No. 11/199,835 System and Method for Wireless Gaming System with User Profiles (075234.0173); (d) Ser. No. 11/199,831 System for Wireless Gaming System with Alerts (075234.0174); (e) Ser. No. 11/201,812 System and Method for Wireless Gaming with Location Determination (075234.0176); (f) Ser. No. 11/199,964 System and Method for Providing Wireless Gaming as a Service Application (075234.0177); (g) Ser. No. 11/256,568 System and Method for Wireless Lottery (075234.0178); (h) Ser. No. 11/210,482 System and Method for Peer-to-Peer Wireless Gaming (075234.0179); (i) 60/697,861 Enhanced Wireless Gaming System (075234.0183). The device used by the secondary player for participating in games may communicate with a casino server via the network, as is commonly known in the art. Messages may be exchanged back and forth between a device used by the secondary player and the casino, the messages taking the form of streams of bits represented by electronic pulses, optical pulses, or any other practical representation.

1.9.2. Felt table with live dealer. In various embodiments a secondary player may participate in a game by sitting at a table and interacting with a casino representative. The table at which the secondary player sits may be different from the table the primary player sits at. Thus the game activities of the primary player may occur elsewhere from the location of the secondary player. However, the secondary player may store cash or chips at his table, and may indicate bets by placing chips at certain parts of the table. From this table, the secondary player may watch the action in the game of the primary player, e.g., using closed circuit television. Based on the outcome of the game played by the primary player, the secondary player may receive payments at his table. Thus, for example, the casino representative at the table of the secondary player may collect bets from the secondary player, and may pay winnings to the secondary player if the outcome of the game of the primary player is winning for the primary player. The table of the secondary player may appear similar to that of the primary player. For example, the table may have the same shape and surface markings. The secondary player may even sit at the same position with respect to his table as the primary player sits with respect to the primary player's table. The secondary player may enjoy a similar experience to that of the primary player, only, perhaps, without the cards, dice, or other game apparatus used at the table of the primary player. In various embodiments, the table of the secondary player may serve as a means for the secondary player to make bets, receive winnings, and possibly to view the game of the primary player. In some embodiments, the secondary player uses the same table or gaming device as does the primary player. For example, the secondary player may place a bet beside the hand of the primary player. The secondary player may then receive payments based on the outcome of the game of the primary player.

1.9.3. Machine at the casino. In some embodiments, a secondary player may participate in a game using a machine or terminal configured to allow participation in a separate game. The terminal may include a coin slot, bill validator, credit card reader, and/or other means for accepting consideration. The terminal may include buttons, keys, roller balls, and/or other input devices that may be used by the secondary player for selecting a game in which to participate, for selecting bet amounts, for selecting bet types, and so on. The terminal may be in communication with the device that conducts the actual game. For example, the terminal of the secondary player may be in communication with a gaming device at which the primary player is playing. The terminal may thus receive from the device of the primary player an indication of games played by the primary player, amounts bet, outcomes received, and other pertinent information. The terminal of the secondary player may be in direct communication with the device of the primary player, or may be in communication with the casino server which, in turn, communicates with the device of the primary player. The terminal of the secondary player may also be in communication with sensors, detectors, and/or other monitoring devices at a game played by the primary player, such as at a blackjack game. For example, the terminal of the secondary player may receive feeds from cameras located at a blackjack game being played by the primary player. In various embodiments, a dealer or other casino representative may report information about a game of the primary player. For example, a dealer may input into keypad connected to the casino server that a primary player has been dealt an ace and a ten in a game of blackjack. Such information may subsequently be received at the terminal of the secondary player, and may be used in determining a payment for the secondary player. The terminal of the secondary player may be a mobile device, e.g., a mobile device as set forth in Nevada bill AB471.

In some embodiments, the terminal of the secondary player may be constructed or configured to look like a gaming device. Betting interfaces at the terminal may be designed to mimic or appear similar to those at the gaming device. Graphics shown on the housing or the screen may also be similar. However, the terminal may simply recreate and redisplay games and outcomes generated by the gaming device. The terminal may not, in various embodiments, generate games or outcomes of its own, e.g., using its own processor or locally stored algorithms. In various embodiments, the terminal may comprise a kiosk.

1.9.4. Casino desk. In various embodiments, a secondary player may visit a casino desk, casino cage, or other casino venue where bets may be placed in person. The secondary player may there select a game in which to participate. The secondary player may place a bet. The secondary player may receive some record of his bet. The record may be a paper receipt, for example. The record may include the name of the secondary player, the name of the primary player, the type of game, the time of the game, the machine or location at which the game was played, the amount of the bet, the terms of the bet (e.g., what outcomes constitute winning outcomes), and any other pertinent information. Upon resolution of the game, the secondary player may return to the desk and receive payment of any winnings.

1.9.5. How bets are entered. In various embodiments bet amounts and bet selections may be entered using buttons, keyboards, microphones, computer mice, joysticks, or any other input devices. A secondary player may also place bets and indicate bet amounts according to rules. Rules may include instructions that may be followed by a computer algorithm, the instructions indicating rules or conditions specifying when and how much to bet. By betting according to rules, the secondary player may save himself the effort of repeatedly indicating a desire to place a bet. Rules may include the following: (a) continue betting $1 on each new game until the secondary player provides an indication to stop; (b) continue betting $1 on each new game for the next 20 games; (c) bet $1 on the game following every win, and double the prior bet following every loss; (d) continue betting until a credit balance reaches either 0 or $100; and so on. In some embodiments, rules may be entered explicitly by the secondary player. In some embodiments, different sets of rules may be predefined. A secondary player need then only select one of the predefined sets of rules to have betting done automatically on his behalf according to the selected set of rules. In some embodiments, a set of rules indicates that the prior bet should be repeated. A secondary player may simply need to confirm each new bet before it is made. For example, for a first game, a secondary player may bet 5 coins on each of 7 pay lines of a slot machine game. For a second game, the secondary player may simply press a "repeat prior bet" button in order to once again bet 5 coins on each of 7 pay lines. Without pressing such a button, the process of entering the bet again might be time consuming. Further, the primary player may have continued on with the next game before the secondary player had time to enter the bet a second time. In various embodiments, a secondary player may specify a bet with reference to a prior bet. For example, the secondary player may indicate a desire to bet twice his prior bet, or to make the same bet he made two games ago.

1.9.5.1. Layout of the betting screen and the graphical user interface. In various embodiments a secondary player may choose a bet type; choose a bet amount; follow the progress of a game; follow the progress of a primary player; view statistics related to a gaming device, table, dealer, primary player, casino, etc.; all using a betting interface on a display screen. The display screen may also function as a touch screen so that the secondary player may interact with the screen by touching it in certain locations. A first location of the screen may include a selection area. Shown in the selection area may be any number of attributes pertaining to a game. For example, a selection area may list a number of primary players. The secondary player may select one of the primary players to indicate that the secondary player would like to participate in the game of the selected primary player. The selection area may present a selection of: (a) primary players; (b) gaming devices; (c) times; (d) dates; (e) casinos; (f) game types (e.g., video poker, slot, etc); (g) dealers; (h) opponents; (i) game results (e.g., ranges of payouts provided by the game, such as games which paid 0-2 coins, games which paid 3-4 coins, games which paid 5-6 coins, etc); and so on. Possible selections may be presented as a menu, a list, a scroll bar, or any other presentation. The secondary player may go through various layers of selection until he has completely specified a game in which to participate. For example, the secondary player may first select a primary player, then a gaming device, then a time of a game. Each set of choices may be presented as a new menu.

A second location of the screen may include a betting area. In the betting area, the secondary player may indicate an amount to bet on a game. The secondary player may specify a number of outcomes to bet on, such as a number of pay lines to bet on, or a number of hands of video poker on which to bet. The secondary player may also specify an amount to bet on each pay line or each outcome. If different types of bets may be made (e.g., a main bet and an insurance bet in blackjack, or pass line and hard eight in craps), then the secondary player may specify which of such bets he wishes to make. A secondary player may specify bets to be made on the primary player. For example, the secondary player may specify a bet that the primary player will lose or will win, or may specify a bet that the primary player will win more than a certain amount.

A third location of the screen may include an area where information about a game is displayed. The area may allow the secondary player to follow the progress of the game. In this area, the secondary may watch as new symbols (e.g., cards in a card game or symbols on slot reels) arise, as new bets are made by the primary player and/or his opponent(s), as decisions are made by the primary player, as decisions are made by the dealer, as hidden symbols are revealed (e.g., as a dealer's down card is turned face up in the game of blackjack), as bets are collected (e.g., from the primary player), and as winnings are paid out (e.g., to the primary player).

The third location of the screen may include live video, animations depicting a reenactment of the game, pre-recorded video of the game, pre-recorded video depicting a game similar to the game in which the secondary player is participating, or any other video depiction. The third location may include text descriptions of events in the game. For example, a text description may read, "Joe Smith has just been dealt a pair of kings."

A fourth location of the screen may allow a secondary player to view statistics related to a gaming device, table, dealer, primary player, casino, etc. For example, the fourth location may show the number of times a primary player has won or lost in his last 100 games, a graph depicting the bankroll of the primary player over the last two hours, the number of times a particular gaming device has paid more than 20 coins in the last day, and so on. Statistics may be presented in any conceivable form, such as using tables, graphs, bar graphs, line graphs, pie charts, and so on.

A fifth location of the screen may allow a secondary player to communicate with the primary player, with a casino representative, with other secondary players, or with others. The fifth location may comprise a chat area, for example, where text conversations are tracked, and where different statements are labeled with the name of the originator of the statement.

A sixth location of the screen may allow the secondary player to follow his own progress. For example, the secondary player may see his account balance and statistics about his own wins or losses.

A seventh location of the screen may allow the secondary player to cash out a portion of his winnings and/or account balances.

An eighth location of the screen may allow the secondary player to summon a casino representative, e.g., to order food.

As will be appreciated, the locations described above may be overlapping. All locations need not have the same function at once, but may alternate. For example, at a first point in time, the screen may be occupied completely with video footage of a game. When the game finishes, the video footage may be replaced with statistics about the player. It will be further appreciated that there may be additional locations on the screen.

1.9.6. In order to participate in the games of a primary player, a secondary player may provide identifying information about himself. Identifying information may include a name, age, state of residence, nationality, driver's license number, social security number, and/or any other identifying information. The casino may use such identifying information in order to verify that the secondary player is authorized to place bets and/or to participate in games as a secondary player. For example, the casino may use identifying information to verify that a secondary player is over 21 years of age. The casino may only permit the secondary player to participate in games of the primary player if the secondary player is over 21 years of age.

In various embodiments, a secondary player may be identified automatically by the casino. For example, the secondary player may seek to participate in a game while situated at a remote terminal or device. The remote terminal or device may be configured to check the identity of the secondary player prior to communicating with the casino. The terminal or device may only communicate with the casino, in some embodiments, if the secondary player is a particular player. Thus, the casino may automatically identify a secondary player by virtue of the terminal or device at which the secondary player is situated. If a terminal or device is configured only to communicate with the casino when a particular secondary player has identified himself to the terminal or device, then the casino can be assured that a particular secondary player is desirous of participating in games. The particular secondary player may be, for example, a particular secondary player that is authorized to participate in games. In some embodiments, a remote device or terminal may constitute a mobile device (e.g., a mobile device as set forth in Nevada bill AB471). The mobile device may be programmed to be used only by a particular secondary player. Therefore, if the secondary player is authorized to make bets, and the mobile device is configured to communicate with the casino only when the particular secondary player is using it, then the casino may assume that it is an authorized secondary player that is placing bets through the mobile device.

1.10. The secondary player bets on outcomes on which the primary player did not. In various embodiments, a secondary player may place bets on results or outcomes that were not bet on by the primary player. As will be appreciated, for a given game, there can be many possible outcomes, and many types of bets placed on the various outcomes. For example, in craps, many different bets can be placed in the same game, among them pass and don't pass.

1.10.1. The secondary player bets on a pay-line that the primary player did not. In various embodiments, the secondary player may bet on a pay-line of a slot machine that was not bet on by the primary player. For example, a slot machine may include three pay-lines, e.g., lines 1, 2, and 3. The primary player may bet on pay-line 1. The secondary player may bet on pay-line 2 and/or pay-line 3. The secondary player may, in various embodiments, bet on pay-line 1 as well. In some embodiments, the secondary player is only allowed to bet on pay-lines that the primary player has not already bet on. Such embodiments may help prevent a secondary player from determining a game in which the primary player has achieved a winning pay-line, and then betting on the same pay-line. In some embodiments, a secondary player may bet on pay-lines that were not available to the primary player when he played. For example, the secondary player may bet on a custom pay-line consisting of the top two symbols on a first reel, and the bottom symbol on a second reel of a slot machine. In some embodiments, the secondary player may bet on a pay-line that was not even visible to the primary player during his play of the game. For example, a slot machine may only show one symbol on each reel in a viewing window. The symbol on each reel that is one position above the viewing window may not be visible. Nevertheless, the secondary player may have the opportunity to bet on a pay-line comprising the row of symbols one position above the viewing window. Similarly, the secondary player may bet on a pay-line comprising the row of symbols one position below the viewing window. In various embodiments, any other pay-line or outcome may be constructed using visible and non-visible symbols. For example, a pay-line may be constructed using some symbols that were visible, and some symbols that were not visible to the primary player.

1.10.2. In various embodiments, the secondary player may place bets on symbols that were never even shown to the primary player. Such symbols may have occurred, for example, well above the viewing window. In some embodiments, such symbols may be shown to the secondary player.

1.10.3. Play a card game with unused cards. For example, in video poker, only the top 10 cards may be used during a game. The secondary player could play another game using cards from the bottom of the deck. In various embodiments, a secondary player may play a game using cards, symbols, or other indicia that were not revealed to the primary player. For example, a primary player may participate in a game of video poker. The primary player may use the top nine cards from a shuffled deck during the game (e.g., the primary player receives an initial deal of five cards, and subsequently draws four additional cards). However, in a standard 52-card deck, 43 cards would remain in the deck. The secondary player may play a new game using the 43 remaining cards. The secondary player may thus engage in a game for which no person yet knows the outcome. This may help to avoid situations where a secondary player can choose to participate in a game where he knows the outcome will be favorable to him. In various embodiments, a secondary player may participate in a new game using cards remaining after a game of blackjack, after a game of poker, after a game of casino war, or after any other game. In various embodiments, the secondary player may make his own decisions in the game, e.g., rather than relying upon decisions of the primary player. In various embodiments, a secondary player may use cards remaining in a deck for a game other than the game for which the deck was first used. For example, after a deck is used for a video poker game of the primary player, the secondary player may use the remaining cards in the deck for a game of blackjack.

1.10.4. The secondary player bets on some function of the data from a game. In some embodiments, a secondary player may bet on some function or transformation of the outcomes, results, or other data used in a game played by a primary player. As used herein, the term "function" may refer to a process or procedure for relating any acceptable input to an output, such that there is only one output per unique input. The output and input may be numerical or non-numerical. As used herein, a "function of" an input may refer to the resultant output when the function is used to relate the input to the output. As used herein, the term "transformation" may refer to a process or procedure for relating any acceptable input to an output.

1.10.4.1. An outcome is generated using a function of a random number used in generating an outcome in the primary game. Suppose a random number 10232 was used to generate an outcome in a game of a primary player. The random number+1 could be used, such that the number 10233 is used. This could yield a completely different outcome. Various games played at a casino utilize random number generators. For example, a slot machine may utilize a random number generator to choose a random number for each reel of the slot machine. Each random number is then used to determine the symbol that should be revealed by the corresponding reel. In various embodiments, a game played by a secondary player may use a new set of random numbers generated based on some function of the random numbers used in a game played by the primary player. For example, the random numbers used in the game played by the secondary player may consist of the random numbers used in the game played by the primary player with one added to each. Thus, {10245, 31189, 19320} may be transformed to {10246, 31190, 19321}. The new set of random numbers may be used as inputs to an algorithm (e.g., the same algorithm used in the game played by the primary player), to generate the symbols or outcomes of the game played by the secondary player. As will be appreciated, any function of the random numbers in the primary player's game may be used to come up with random numbers in the secondary player's game. For example, one may be subtracted from each random number, the order of the random numbers may be changed (e.g., so each random number now corresponds to different one of the reels), each random number may be multiplied by a factor, and so on.

In various embodiments, seed numbers may be used in the generation of random numbers. Thus, in some embodiments, a seed number used in a game played by a primary player may be transformed according to some function (e.g., one may be added) in order to generate a seed to be used in the game played by the secondary player.

In various embodiments, a game played by a primary player may result in a first outcome with a first associated payout. The game may be disguised by changing the first outcome to a second outcome with the same payout. Thus, the primary player may view the first outcome while he plays the game, but the secondary player may view the second outcome when he participates in the game. Monetarily, the primary player and the secondary player may have had the same experiences. In other words, given identical bets, both the primary player and the secondary player will have had the same payouts, in various embodiments. However, the primary player and the secondary player will have seen different representations of the game. For example, suppose a slot machine game includes several possible outcomes. Among the possible outcomes are "bar-bar-bar" with an associated payout of 10 coins, and "cherry-cherry-cherry", also with an associated payout of 10 coins. The primary player may play the game and achieve the outcome "bar-bar-bar". The secondary player may also participate in the game. When the game is presented to the secondary player, the secondary player may be shown an outcome of "cherry-cherry-cherry".

Thus, in various embodiments, a first outcome of a game may be generated for a primary player. The casino may determine what other outcomes have the same payout as the first outcome. From among the other outcomes, the casino may select one to present to a secondary player who has participated in the game.

In various embodiments the outcome presented to a secondary player may differ both in terms of the constituent symbols and in terms of the payout from the outcome that was seen by the primary player. However, over the course of two or more games, a secondary player may be presented with outcomes whose associated payouts sum to the same total as do the payouts associated with the outcomes presented to the primary player over the course of the same two or more games. For example, both a primary player and a secondary player may participate in the same two games. In the first game, the primary player may be presented with outcome A and receive an associated payout of 4 coins. For the first game, the secondary player may be presented with outcome C and receive an associated payout of 3 coins. In the second game, the primary player may be presented with outcome B and receive an associated payout of 6 coins. For the second game, the secondary player may be presented with outcome D and receive an associated payout of 7 coins. Thus, neither the primary and secondary players have been presented with different outcomes over the course of the two games. However, after two games, both have received the same total payouts, each having received 10 coins in total.

In various embodiments, a secondary player may view what is essentially the same game that the primary player is playing. However, the game may be disguised by replacing symbols from the presentation to the primary player with new symbols for presentation to the secondary player. For example, a "cherry" when viewed by the primary player becomes a "dog" when viewed by the secondary player. In terms of underlying logic, however, the games may remain the same. For example, "cherry" may always map to "dog", and likewise there may be a consistent function which maps the symbols shown to the primary player to the symbols shown to the secondary player. The pay tables on display for the primary and secondary players may exhibit a similar functional relationship. For example, suppose the primary player's pay table includes a line showing a payout of 15 for "cherry-cherry-cherry". A corresponding line on the pay table for the secondary player may include a line showing a payout of 15 for "dog-dog-dog". In various embodiments, other graphics may be altered. For example, a background coloration of the game viewed by the primary player may be blue, whereas the background coloration of the same game viewed by the secondary player may be green.

In various embodiments, a second game presented to the secondary player may be a different type of game from that presented to the primary player. However, an outcome may be chosen for presentation to the secondary player that has the same payout as an outcome that occurred in a game played by the primary player. For example, a primary player may be involved in a game of Casino War. The secondary player may view the outcomes of the games of the primary player, but disguised as the game of craps. For example, if the primary player wins a game of Casino War (e.g., by being dealt a card with a higher rank than the card dealt to the dealer), then the secondary player may be shown an animated sequence of dice rolling a seven during the first roll of the game (i.e., a winning outcome in craps). If, however, the primary player loses the game of Casino War, then the secondary player may be shown an animated sequence of dice rolling a two on the first roll of the game (i.e., a losing outcome in craps).

The various methods of disguising a game described herein may provide an advantage, in certain embodiments, of making it difficult for the secondary player to determine details about the original game in which he is participating. For example, this may make it difficult for the secondary player to vary his bets based on advanced knowledge about the outcome of the original game.

1.10.4.2. The same random number may be used, but a different reel configuration. In various embodiments, a gaming device may store an internal table or function which maps random numbers to symbols or outcomes. For example, the random number 1293 may map to the symbol of "cherry" on reel 1 of a slot machine. In various embodiments, a game played by a secondary player may utilize the same random numbers used in a game played by a primary player. However, the game of the secondary player may include a different table or matching function between random numbers and symbols. Thus, for example, in the game played by the secondary player, the number 1293 may map to the symbol "bell" instead of "cherry". Accordingly, using the same random numbers, the game of the secondary player may arrive at different symbols or outcomes than those that occurred in the game of the primary player.

In various embodiments, a gaming device may store an internal table or function which maps random numbers to reel positions. For example, the random number 2451 may instruct a gaming device to stop reel 1 with position 12 visible in the viewing window of the gaming device. Each position on a reel may feature a symbol. For example, a reel may have ten positions, each position corresponding roughly to 36 degrees of arc of the circular reel. Thus, by instructing a gaming device to stop a reel at a certain position, a random number will also instruct the reel to display the symbol featured at the certain position. In various embodiments, the game played by the secondary player may utilize the same random numbers utilized by the game played by the primary player. However, the positions and/or ordering of one or more symbols may be changed. Thus, the same reel position in the game of the secondary player may corresponding to a different symbol than it did in the game of the primary player. Thus, using the same set of random numbers, the game of the secondary player may nevertheless result in different symbols or outcomes than does the game of the primary player.

1.10.4.3. What if all cherries were transformed into bars? A secondary player may bet on real outcomes, but with one aspect altered into another. In some embodiments, one or more symbols obtained in a game played by a primary player may be mapped to other symbols in a game played by a secondary player. For example, any "cherry" symbol in a game of a primary player may be transformed into a "bar" symbol in a game of a secondary player. Thus, if the primary player receives the outcome of "cherry-bell-cherry", the secondary player will receive the outcome of "bar-bell-bar". The pay table, between the two games, may remain the same. In embodiments where the pay table remains the same, it is possible for a winning outcome to be mapped to a losing outcome, and for a losing outcome to be mapped to a winning outcome. In some embodiments, a first card in one game is transformed into a second card in another game. For example, the two of hearts becomes the king of diamonds. In some embodiments, an entire outcome in a game of the primary player may be mapped to a different outcome in a game of the secondary player. For example, the outcome of "bell-lemon-plum" may map to "cherry-cherry-cherry". In various embodiments, when one symbol in a game played by a primary player is mapped to another symbol in a game presented to a secondary player, the same mapping may also occur in the pay table. For example, suppose the symbol "lemon" in a game played by the primary player is mapped to the symbol "tree" in a game presented to the secondary player. If there is a line in the pay table of the primary player indicating a payout of 100 associated with the outcome "lemon-lemon-lemon", then there may be a corresponding line in the pay table of the secondary player indicating a payout of 100 associated with the outcome "tree-tree-tree".

1.10.4.4. A secondary player may bet on original deals of cards, but with 7s now wild. In some embodiments, symbols in a game played by the primary player can take new meaning in the game of the secondary player. For example, in a game of cards, any seven dealt in the game of the primary player may count as a wild card in the game of the secondary player. Thus, for example, the primary player may receive a final poker hand of Qs Qh Jd 3h 7s. The primary player may then be paid based on having a hand with a pair, jacks or better. The secondary player may be paid based on having a hand with three of a kind, since the 7s, as a wild card, may count as a queen.

1.10.4.5. A secondary player may bet on a blackjack hand occurring with poker, or vice versa. In various embodiments, the secondary player may use the same symbols or outcomes obtained by the primary player, but to play a different game. For example, the primary player may be engaged in a game of blackjack. The secondary player may use the cards received by the primary player to form a poker hand. Thus, if the primary player receives the 2s 7s 3s As and 6s, yielding 19 points in the game of blackjack, the secondary player may receive a flush (all spades) in a game of poker.

1.10.4.6. A secondary player may bet on shifted data. For instance, an outcome consists of the last two reels from one slot pull, and then the first reel of the next slot pull. Or a hand of poker consists of the last three cards from one hand and the first two cards from the next hand. In various embodiments, data, symbols, or outcomes from two or more games of a primary player may be combined to create a single game for the primary player. For example, three cards used in a first game of the primary player, and two cards used in a second game of the primary player may be combined to form a single hand of cards for a single game of the secondary player. Data used in consecutive games of the primary player may be treated as a stream of data frames, each frame including all the data from one game. For example, each frame may include the three symbols appearing on the pay-line of a slot machine. A new stream of data frames may be created by shifting the frame limits over (e.g., left or right) by some number of data points, e.g., by some number of symbols. Thus, for example, each frame in the new stream of data frames may include symbols from reels two and three followed by a symbol from reel one. In other words, new games have been created by using the last two symbols in a first game of the primary player and the first symbol in a second game of the primary player. Thus, by shifting data frames used in a sequence of games of a primary player, a new sequence of games may be generated for a secondary player.

1.10.4.7. A secondary player may bet on the same outcome, but with a different pay structure. For example, a secondary player may lose on a royal flush. In some embodiments, a secondary player may receive the same outcomes as does a primary player. However, the pay table that applies to the secondary player may differ from that which applies to the primary player. For example, in a game of video poker, the primary player may win 5 coins with a flush, but the secondary player may only win 2 coins.

1.11. A secondary player may bet on an aggregate outcome of a primary player. For example, a secondary player may bet that a primary player will be ahead or behind after an hour. In some embodiments, a secondary player may place a bet that depends on multiple games or outcomes of a primary player. For example, the secondary player may bet that the primary player will win the next three games in a row, or that the primary player will win the next game but lose the following game. The secondary player may bet that the winnings or losses of the primary player will satisfy one or more conditions after a designated period of time. The secondary player may bet that the winnings of the primary player will total more than a given amount in the next hour. The secondary player may bet that the losses of the primary player will exceed more than $1000 in the next 6 hours. The secondary player may bet that primary player will either lose more than $100 or will win more than $200 in the next 15 minutes. Winnings and losses may be net of each other (e.g., a $20 win and $10 loss may net to a $10 win) or may count separately (e.g., a winnings total is the sum of all amounts won regardless of bets lost). The secondary player may bet on any statistic pertaining to outcomes received by the primary player. For example, the secondary player may bet that the primary player will receive more than 10 payouts of more than 20 coins each in the next 25 minutes. The secondary player may bet that the primary player will achieve 4 full-houses in the next 50 games. In various embodiments, the secondary player may track the net winnings or net losses of the primary player. Thus, for example, if the primary player has lost $200 after an hour, the secondary player will also have lost $200. If the primary player has won $734, the secondary player will also have won $734.

1.11.1. A secondary player may take the upside of a primary player but not his downside. In some embodiments, the secondary player may make a payment or place a bet that entitles the secondary player to an amount equal to the primary player's winnings, if any, over a period of time, but does not obligate the secondary player for anything if the primary player has net losses. For example, if the primary player achieves winnings over the next hour of $50, the secondary player may also receive $50. However, if the primary player loses in the next hour, the secondary player does not owe anything beyond his initial bet or payment. In various embodiments, the secondary player may receive, or owe monies based on more complicated functions of the primary player's winnings and losses. For example, the secondary player may receive three times the primary player's winnings (if there are any) for the next hour, but may owe 1.5 times the primary player's losses if the there are losses.

1.11.2. In some embodiments, a secondary player may bet that a primary player will receive five payouts of over 20 coins.

1.12. A secondary player may bet the difference between what a primary player bet and what the primary player could have bet. A secondary player may complete a partial bet and thereby win only the extra payouts that resulted from the extra amount bet. In some embodiments, a secondary player may place a bet that a primary player could have made but did not. This includes completing a bet that the primary player made. The secondary player may, in this fashion, win any payments that a primary player would have won, beyond those the primary player actually did win, had the primary player made the bet.

1.12.1. For example, many machines require three coins bet to win the jackpot. If a primary player bets only two coins, then a secondary player may bet the $3^{rd}$ and then win the difference of what someone would win with three coins versus two coins bet. Various gaming devices include pay tables that are based on the number of coins bet. For example, if a player bets one coin and receives the outcome "bell-bell-bell", then the player wins 100 coins. If, however, the player bets two coins and receives the same outcome, then the player wins 200 coins. Many gaming devices provide better payout odds for each incremental coin bet. Thus, in the prior example, if the player bets three coins and receives the outcome "bell-bell-bell", then the player wins 400 coins. Thus, the incremental payout odds for the third coin bet are better than those for the second coin bet, at least with respect to "bell-bell-bell". Accordingly, for example, if a primary player bets only two coins in a game, a secondary player may take advantage of the better incremental payout odds offered for the third coin bet by betting the third coin himself. If the outcome of "bell-bell-bell" occurs, the secondary player may thus receive the difference between the payout for three coins bet and the payout for two coins bet, i.e., the difference between 400 coins and 200 coins, equal to 200 coins.

In various embodiments, a secondary player may add to or complete a bet on a game made by a primary player so that the total bet of both the primary and secondary player would result in a higher set of payouts. The secondary player may receive any extra payouts associated with his bet. Thus, if the payout associated with the primary player's bet alone is X, and the payout associated with the primary player's bet plus the secondary player's bet is Y, then the primary player may receive X, and the secondary player may receive Y-X.

1.12.2. In craps, placing bets behind the bets of other people. In various embodiments, a primary player in a game of craps is given additional opportunities to bet during the course of a game. For example, when the primary player establishes a point for a pass line bet, he has the opportunity to place bets behind his pass line bet, called "odds bets". The odds bets often have no house edge, and therefore are typically more advantageous to a player than almost any other bet in a casino. However, a player at a craps table often does not make an odds bet, or does not make the full amount of an odds bet that he is allowed. In various embodiments, a secondary player is allowed to make an odds bet that a primary player could have made. The secondary player may then be paid for the odds bet if the odds bet wins. Accordingly, the secondary player may enjoy the opportunity to make a bet at true odds, without the requirement of first making a disadvantageous pass line bet.

1.12.3. In various embodiments, a secondary player may make odds bets or may make partial bets such as betting the third coin at a slot machine, even if the primary player has already made such bets. The secondary player may nevertheless receive the incremental payouts associated with such bets. For example, the secondary player may bet a single coin which counts as the third coin bet at a slot machine. The secondary player may thus be eligible to win the difference in payouts between the payout for three coins bet and the payout for two coins bet.

1.13. Primary players might see who or how many people are betting on them. In various embodiments, a primary player may be made aware of a secondary player who is participating in the game of the primary player, or who subsequently participates in the game of the primary player. The primary player may receive a name, an image, and description of various attributes (e.g., age, occupation, area of residence, etc.) of the secondary player. The primary player may also receive an indication of the performance of the secondary player while participating in the games of the primary player. For example, the primary player may see how much the secondary has won or lost, what types of bets he has made, how many games he has participated in, for how long he has been participating in the games of the primary player, and so on. The primary player may derive a measure of satisfaction or gratification from the participation of secondary players. For example, a primary player may feel proud that a large number of secondary players have participated in his games. He may feel proud to have won money for them. In various embodiments, the primary player may have the opportunity to communicate with a secondary player. For example, the casino server may provide the primary player with contact information for a secondary player.

In various embodiments, a primary player may be compensated based on participation by secondary players in the games of the primary players. The primary player may be compensated per secondary player and per game. For example, the primary player may receive 0.5 cents per secondary player per game. Thus, if three secondary players each participate in two games of the primary player, the primary player may receive 0.5 cents×3 secondary players×2 games=3 cents. Thus, the primary player benefits by having more secondary players and by increasing the number of games in which each secondary player participates. The primary player may be compensated with a percentage of the bets made by secondary players participating in his games. The primary player may be compensated with some percentage of expected winnings to be derived from the bets of secondary players participating in the games of the primary player.

A primary player may thus be encouraged to convey some value to secondary player so as to attract secondary players to participating in his games. The primary player may convey value by employing good strategy, for example. The primary player may also attempt to provide entertainment, e.g., by telling jokes or by making commentary about his games.

In various embodiments, the games of a primary player, and/or data from the games of a primary player may be made available for participation and/or for viewing by interested secondary players. Data from the games of a primary player may be made available on an ongoing, continuous, and/or real-time basis. Secondary players may, at their leisure or pleasure, view or participate in the games. As such, data from the games of the primary player may be broadcast or transmitted in an analogous fashion to programs on a television or radio show, or analogously to periodically updated Web pages. Secondary players may tune in or out as desired. Each primary player may constitute a "channel" or "station". A secondary player may, for example, view a list of primary players just as he would a list of television stations. The secondary player may then decide which primary player or "station" he wants to participate with. When selecting a primary player, the secondary player may also have the opportunity to review data about historical games played by the primary player. For example, the secondary player may be able to review the primary player's wins and losses over the prior 20 games.

In various embodiments, a casino may select from a subset of available primary players to choose primary players for whose games data will be made available to secondary players. In some embodiments, a casino may serve as a "disc jockey" by choosing which primary players will have their data made available to others. The disc jockeys may be humans (e.g., casino employees), or may be computer algorithms which automatically select certain primary players based, for example, upon a defined set of rules. The disc jockey or jockeys may select primary players based on any number of factors. A primary player may be selected based on: (a) recent results (e.g., recent wins or high payouts); (b) based on long term results (e.g., long term profits); (c) based on skill at playing a game (e.g., based on his use of basic strategy in blackjack); (d) based on his celebrity status (e.g., based on whether his name has been published in any newspaper in the past year); (e) based on a history of being favored by secondary players; and so on. At any given time, a disc jockey may decide to stop making data available from certain primary players, and/or to commence making data available from other primary players. For example, a disc jockey may decide that a primary player has hit a string of losses and therefore would not be of interest to any secondary player. The disc jockey may accordingly stop making data from the primary player available. For example, a disc jockey may decide that a given primary player has just won a large payout and therefore would be of interest to secondary players. Accordingly, the disc jockey may commence making data from the primary player available.

In various embodiments, the data about the games of a primary player may be made available across one or more casinos. A first casino may broadcast or transmit data from the games of one or more primary players to a second casino. The broadcast may occur via the radio or television spectrums, via mobile wireless frequencies, via microwave frequencies, via metal or optical cables, or via any other means. Secondary players in one or more of the casinos may view the data (e.g., may view games that are reconstructed based on the data). The data may be made available on the Internet, on one or more radio stations, on television, on interactive television, and so on. For example, a secondary player may visit a web page on which are listed names or identifiers for one or more primary players. The secondary player may click on an identifier in order to view data about games of the corresponding primary player. In some embodiments, a secondary player may set the channel on his television to a particular channel whereby identifiers for various primary players are listed on a menu. The secondary player may select an identifier from the menu (e.g., using a remote control) and may thereby call up on the television screen further data pertaining to the games of the primary player.

In various embodiments, data about the game of a primary player may originate in a first casino. For example, the primary player may play the game in the first casino. Data about the game may be transmitted to a second casino. From the second casino (e.g., from a terminal located in the second casino), a secondary player may participate in the game. The second casino may thereby derive revenue from the secondary player by using data originating from the first casino. In various embodiments, the first casino and the second casino may split revenue, win, profits, theoretical win, or any other financial gain that has been derived from the use of the data at the secondary casino. For example, 50% of the theoretical win from a bet by the secondary player (i.e., the casino advantage on the bet multiplied by the amount bet by the secondary player) may be given to the first casino by the second casino. The financial gain may be split with one percentage going to the first casino and another percentage going to the second casino. In some embodiments, the second casino pays a flat fee to the first casino for the use of the data. The flat fee may cover all possible uses of the data (i.e., uses of the data in as many games as the second casino desires) or may cover a single use of the data (i.e., in one game). In some embodiments, the second casino keeps a fixed financial gain from the use of the data and pays any remaining financial gain to the first casino. For example, the second casino may keep 2 cents of theoretical win per game in which the data is used, and give the remaining portion of the theoretical win to the first casino. As will be appreciate, financial gain may be split between the first and second casinos in many other ways.

1.14. A secondary player watches games in progress. The secondary player may have various ways of watching or following the game or games in which he is participating. Following a game may include receiving information about the outcome or result of the game, receiving information about symbols or indicia that have arisen in the game (e.g., cards that have been dealt), receiving information about outcomes or results received by a dealer or opposing players, receiving information about decisions that are available or have been made in a game (e.g., decisions by a primary player to hit or stand), receiving information about player mannerisms in a game (e.g., facial expressions of a primary player or his opponents), information about amounts bet on a game (e.g., amounts bet by the primary player or the secondary player), information about amounts won on a game (e.g., amounts won by the primary player or the secondary player); and so on.

1.14.1. A split screen allows the secondary player to see all the roulette wheels in the casino at once. In various embodiments, the secondary player may follow the progress of one or more games in which he participates using one or more display screens. Display screens may include cathode ray tubes, flat panel displays, plasma displays, liquid crystal displays, diode displays, light-emitting diode displays, organic light-emitting diode displays, projection displays, rear projection displays, front projection displays, digital light processing (DLP) displays, surface-conduction electron-emitter (SED) displays, electronic ink displays (e.g., E-Ink Corp's display technology), holographic displays, and so on. A secondary player may follow the progress of a game using a device such as a Blackberry®, iPod®, personal digital assistant, mobile phone, laptop computer, camera, personal computer, television, electronic book (eBook) and so on. A single screen may contain information about a single game in which the secondary player participates. A single screen may also contain information about multiple games in which the secondary player participates. The display screen may display information about one game on one part of the screen, and about another game on another part of the screen. For example, the screen may be divided into four quadrants, each quadrant showing information about a different game that the secondary player is participating in. A secondary player participating in two games may view a first of the two games on one display screen, and a second of the two games on another display screen. A secondary player may thus watch or follow the progress of games using multiple displays screens.

1.14.2. Views come from overhead cameras. In various embodiments, a secondary player may follow the progress of a game in which he participates using video and/or audio feeds from the proximity of the game. For example, a camera may capture the progress of a blackjack game played by a primary player. By watching a video feed, the secondary player may see the cards dealt in the game, the decisions made by the primary player, the decisions made by the dealer, and the result of the game (e.g., win for the primary player, win for the dealer, blackjack for the primary player, tie). In various embodiments, video or audio feeds may be live, delayed, or may be stored and played back at a later time for the secondary player.

1.14.3. Data is piped electronically from the slot machines. In various embodiments, data may be captured from a gaming device or live table game, encoded into electronic form, and transmitted to a display device, speaker, or other output device used to present the data to the secondary player. The output devices may decode the electronic data and present it in a sensible form for human viewing. The presentation may include a text description of occurrences in the game. For example, text may read, "At 9:02 pm, slot machine number 1423 achieved the outcome of bar-bar-bar. Congratulations, you have won 20 coins." The presentation may include a reconstruction of the game. For example, the game may be reconstructed using animated renditions of the game. For example, an animated slot machine may show animated reels spinning and stopping to show the outcome achieved by the actual slot machine which generated the game the secondary player participated in. In another example, an animated dealer using animated cards may be used to reconstruct a live table game of blackjack. In various embodiments, a computer synthesized voice may report to the secondary player occurrences in a game in which the secondary player participates.

1.14.4. Only active machines are shown to the secondary player. For example, the machine currently resolving into an outcome is shown. In various embodiments, a secondary player may participate in several games at once. The games may not necessarily all proceed at the same pace. For example, one game may finish while another is still in progress. In some embodiments, games or aspects of games may be presented to the secondary player only as important or relevant events occur in the game. For example, when a first game finishes, all or part of the game may be presented to the secondary player. For example, when the first game finishes, a depiction or an image of the final outcome (e.g., the final cards in the primary player's hand) may be flashed onto a display screen viewed by the secondary player. The image pertaining to the first game may be removed when a second game finishes. When the second game finishes, a depiction or image of the final outcome in the second game may be flashed onto the display screen. In this way, the secondary player need only view aspects of a game that are most relevant, most important, or most interesting to him. When a game is in an uninteresting stage (e.g., when the reels of a slot machine are spinning), the secondary player may view information about other games. Information that may be deemed worthy of showing to a secondary player may include: information about a decision that is to be made in a game (e.g., the primary player has received an initial hand of blackjack and must now decide to hit or stand); information about a decision that has been made in a game (e.g., the primary player has decided to hit); information about a new card, symbol, or other indicium obtained in a game (e.g., a new reel of the slot machine has stopped, showing a new symbol for the pay-line); information about a final outcome of a game; information about entry into a bonus round or bonus game (e.g., the primary player has just won the opportunity to play a bonus round); information about a symbol, card, or other indicium obtained by a dealer or by an opponent of the primary player; information about an amount bet (e.g., by the primary player or by the secondary player); and information about an amount won (e.g., by the primary player or by the secondary player).

1.15. The secondary player is alerted when his favorite primary player sits down. In various embodiments, a secondary player may prefer to participate in the games of particular primary players, in the games of particular gaming devices, in games played at particular gaming tables, in games played with particular dealers, and so on. A secondary player may explicitly record his preferences, e.g., by informing the casino. In some embodiments, the secondary player may be assumed to have certain preferences, based, for example, on a history of participating in the games of a particular primary player. For example, if a secondary player has participated in 300 games of a particular primary player, the secondary player may be assumed to prefer or to enjoy participating in the games of the primary player. In some embodiments, the casino may inform a secondary player when a game in which the secondary player may be interested in participating is or will be in progress. For example, suppose that the secondary player has indicated that he likes to participate in games played by primary player Joe Smith. When Joe Smith sits down at a gaming device and begins playing, the casino may detect the presence of Joe Smith (e.g., by means of a player tracking card inserted by Joe Smith) and may then alert the secondary player that Joe Smith has begun playing. The secondary player may then place bets on the games of Joe Smith. The casino may alert the secondary player using any number of communication means. A casino representative may call the secondary player, may send a text or email message to the secondary player, may page the secondary player, may find the secondary player in person, and so on.

1.15.1. A secondary player is alerted as to the presence of a primary player who has done well for him. A secondary player may be alerted when a primary player commences play if the secondary player has had favorable results in the past when participating in the games of the primary player. Favorable past results may mean that: the secondary player is ahead in terms of winnings based on all prior participation in the games of the primary player; the secondary player was ahead in the most recent time period during which he participated in the games of the primary player; the secondary player won more than a predetermined amount of money (e.g., more than $500) in a single session while participating in the games of the primary player; the secondary player won a jackpot or other high-paying outcome while participating in the games of the primary player; the secondary player was ahead in the most recent X number of games when participating in the games of the primary player; or any other measure of performance while participating in the games of the primary player.

1.15.2. A secondary player is alerted as to the presence of a primary player with good statistics. A secondary player may be alerted when a primary player commences play if the primary player has a certain historical record or certain statistics that may be of interest to the secondary player. The historical record may include a record of: having won one or more jackpots or other high-paying outcomes; having won money for other secondary players; having achieved profitable sessions in the most recent gaming session or in any prior gaming session; having achieved a profit during some prior time period (e.g., during the past six months); and so on. A secondary player may also be alerted if a primary player that has some measure of popularity commences play. For example, primary players may be rated, e.g., by one or more secondary players, based on the secondary players' degree of satisfaction with, or other feelings towards the primary player. A primary player may, for example, be rated highly if he has won money for many secondary players in the past. Thus, for example, if a highly rated primary player commences play, a secondary player may be alerted and may be given the opportunity to participate in the games of the primary player.

1.15.3. A secondary player is alerted when good machine is taken. In various embodiments, a secondary player may be alerted if play commences at a gaming device or table that is or may be of interest to the secondary player. The gaming device may be of interest due to a number of factors, among them: the secondary player has won a jackpot or other high-paying outcome while participating in games of the gaming device; the secondary player has had profitable sessions at the gaming device; the secondary player has had recent profitable sessions at the gaming device; the secondary player has had profitable sessions at another gaming device similar to the gaming device (e.g., at a gaming device of the same type or from the same manufacturer); one or more recent games at the gaming device have resulted in jackpots or high-paying outcomes; recent games at the gaming device have resulted in profits for the player or players at the gaming device; the gaming device is highly rated (e.g., by secondary players); and so on.

1.16. A secondary player pays a fee to participate in games. In various embodiments, a secondary player may be required to pay in order to participate in the game of a primary player. The amount paid may be based on the status, rating, historical results, or requests of the primary player. For example, if the primary player is a well-known celebrity, the fees required of a secondary player may be higher than if the primary player were a lesser-known celebrity. If the primary player has had highly favorable historical results (e.g., has made large profits in the past), then the fees required of the secondary player may be higher than if the primary player did not have such favorable historical results. In various embodiments, the primary player may also declare a fee required for secondary players to participate in his games. A portion of such fee paid by a secondary player may be paid to the primary player.

1.17. Rules for using old data in a game with real money on the line. There is opportunity of misconduct since the player and/or the casino may know the data already. The use of historical games, outcomes, and other data related to a game presents an opportunity for an advantage by any party with knowledge of a data. For example, a casino might provide secondary players with the opportunity to participate only in games whose results the casino knows are losing for the player (and therefore winning for the casino). In another example, a secondary player may have already participated in a particular game (e.g., as a primary player) and may therefore know the outcome of the game in advance. The secondary player may thus make a large bet on the game if he knows the game will result in a winning outcome for him, and will make a small bet or no bet on the game if he knows the game will result in a losing outcome for him.

1.17.1. Before the original data is generated, it may be tagged for reuse at a particular date and time in the future. That way, the casino may be afforded no discretion as to whether or not to use the data. In various embodiments, before a particular game is played for the first time, a casino designates a time, date, location, and/or any other situation or circumstance under which the game will be made available for participation by others. The situation under which the game will be made available may be chosen randomly, according to some algorithm, or in any other fashion. Once the situation or circumstances for future participation in the game have been established, the game may commence for the first time. In this way, the casino has established future circumstances under which the game may be made available for participation by others (e.g., by secondary players) before the casino is aware of the outcome of the game. The casino cannot, therefore, decide not to allow participation in the game if the game turns out to result in a jackpot for the player. In various embodiments, the establishment of future circumstances under which a game will be available for participation by others is binding upon the casino. Regulators may keep track of when games must be made available for future participation, and may verify that the games have in fact been made available. In various embodiments, players or other parties may not necessarily know the circumstances under which a game must be made available in the future. In this way, players will not be able to selectively choose games to participate in based on advanced knowledge of the outcomes. In various embodiments, a record is stored, the record including information about a game and information about circumstances under which the game is to be made available in the future for participation by others.

1.17.2. Data may be put in a queue. When it reaches the front of the queue, it must be used. In various embodiments, when a game is played or generated for the first time, data or information about the game is placed in a queue. Games from the queue are then made available for participation by secondary players based on a first-in-first-out model. Thus, a game becomes available for participation based on a relatively straightforward scheduling algorithm, and there is little discretion on the part of the casino as to when the game will become available for participation. In various embodiments, other scheduling algorithms may be used. For example, games are made available according to a last-in-first-out scheduling algorithm. Any other scheduling algorithm may be used, particularly if the casino has little control over the schedule once the outcome of a game is known.

1.17.3. One set of data may be used after and only after another set of data. In various embodiments, data about a second game may be associated with data about a first game. The association may dictate that the data about the second game may be used to allow participation in the second game by a secondary player when, and only when, the data about the first game has been used. Similarly, data about a third game may be associated with the data about the second game, such that the data about the third game may be used when, and only when, the data about the second game has been used. In this way, through a chain of association, data about different games can be made available in sequence, allowing the secondary player to participate in a sequence of games. Data about different games may be associated in many ways. For example, data about a first game and a second game can be stored in locations with sequential addresses in a semiconductor memory. The casino may access the locations in the memory sequentially by address, and thereby make available data about the first game and data about the second game in sequence. In some embodiments, data about a given game may be associated with an index. The index may be a numerical index using integer numbers, for example. With such an indexing scheme, data about a game associated with index 235, for example, would be made available once data about a game associated with index 234 had already been made available. In some embodiments, the index may be a time. The time may represent a time during which the associated data was originally generated, or a time when the data should be made available again, for example. For instance, when the time associated with a particular set of data actually comes to match the current time, the particular set of data may be made available so that a secondary player might participate in a game generated using the data.

1.17.4. The time, date, and/or the machine that generated the data may be chosen at random. In various embodiments, a game that is made available for participation by a secondary player is selected at random using one or more randomly chosen variables or parameters. For example, a time and/or date may be chosen at random. Once a time and date have been chosen, for example, a game played at that time and date may be made available for participation by the secondary player. A gaming device, player, dealer, casino, location, and type of game may also constitute parameters that are chosen at random. In various embodiments, several parameters must be chosen at once in order to narrow down the universe of games to one particular game. For example, to determine a unique game, a time, date, and machine number may be required. In various embodiments, the parameters may be chosen by the secondary player, by the casino, or by third parties, such as regulators. Parameters may, in various embodiments, be chosen after the game has been played for the first time.

1.17.5. The secondary player may choose the time and/or machine. In various embodiments, a secondary player may choose the time, date, machine, or other parameter used to select a game. The choice may not necessarily by random.

1.17.6. Regulators may choose the time and/or machine. In various embodiments, a third party, such as a gaming regulator, may select a game that will be made available for participation by a secondary player. The third party may, in particular, have no stake in the outcome of the game. Therefore the third party may not be biased towards selecting a game that is winning for the secondary player or winning for the casino. The regulator or other third party may not necessarily select the game directly. Rather the third party may select one or more parameters (e.g., a time, date, machine number) that may be used to select a game that meets the selected parameters.

1.17.7. A player who had his player tacking card in a gaming device when the data was originally generated may be prevented from playing a game based on that data. In various embodiments, the casino may verify that the secondary player was not present for a game when it was originally played and/or had no knowledge of the result of the game. The casino may verify that the player was not staying at the casino's hotel during the day or time when the game was played. For example, the casino may check records of who had checked into its hotel on the day of the game. The casino may check to see whether the player made any bets at the casino on the day of the game. For example, the casino may check to see whether the player had a player tracking card inserted into a gaming device, or otherwise on record, for the day of the game. It will be understood that the casino may verify the presence of the player not just during a particular day, but during longer or shorter time periods as well. For example, the casino may verify that there is no record of a player's presence during an entire 5 day period surrounding the day of the game. A casino may verify that a player was not in the same city where the game was played at the time the game was played. For example, the casino may verify that there is no record of the player at any other casino affiliated with the casino (e.g., under the same ownership as the casino) during the day of the game. The casino may use any practicable means to verify that the player had no knowledge of the game or the outcome of the game.

1.17.8. Disallowing variation of bet size. In various embodiments, a secondary player may be prevented from varying the sizes of his bets over the course of a gaming session. In particular, the secondary player may be prevented from varying his bet sizes if he is participating in games that were first played in the past. The secondary player may thereby be prevented from varying his bet sizes based on advanced knowledge of the outcomes of the game. For example, the secondary player may be prevented from making larger bets when he knows the outcome of a game will be favorable, and a small bet when he knows the outcome of a game will be unfavorable.

1.17.9. Bet limits on game. In various embodiments, limits may be placed on the size of bets placed on games that have already been generated or played. For example, a secondary player may be permitted to bet no more than $1 on a game that has been played in the past. In this way, the casino's losses will be limited even if the secondary player has knowledge of the outcome of the game. In some embodiments, the total amount of bets placed on a game may be limited. For example, bets placed by all secondary players participating in a particular game may be limited to totaling less than $5.

1.17.10. Limits on winnings. In various embodiments, potential winnings or payouts for a game may be capped. For example, if the payout for an outcome of "bell-bell-bell" in an original game was 2000 coins, the potential payout for the same game may be reduced to 500 coins when a secondary player is participating in the game. This may limit the potential losses to a casino for a secondary player that has knowledge of the outcome of a game.

1.17.11. Disguising a game. In various embodiments, one or more aspects of a game may be disguised before a secondary player is allowed to participate in the game. Thus a secondary player who had previously participated in the game may still fail to recognize the game and to bet accordingly. A game may be disguised in a number of ways. One or more graphics of the game may be changed to appear differently. For example, a "cherry" symbol may appear in a different shade of red or with three cherries on a stem rather than two. In some embodiments, new symbols are substituted in for old symbols. For example, rather than "cherry" symbols, a game may use "blueberry" symbols. However, outcomes containing blueberries may result in the same winnings as did outcomes with cherry symbols in the original game. In some embodiments, sound effects are changed or disguised. For example the background music in the disguised game may be different from that in the original game. In some embodiments, the animation or video sequences may be altered. For example, reels of a gaming device may appear to spin faster or slower, to appear jerkier or less jerky, etc., than they did in the original game. For live games, features of one or more players may be hidden or disguised. For example the face of a dealer at a live game may be blurred out in footage of the game. In some embodiments, a new face may be super-imposed over the old face of a dealer or player so as to heighten the effect of the disguising. As will be appreciated, there are many other possible ways of disguising a game so that its outcome is not predictable to even a player who has knowledge of the original game. As described elsewhere in this document, a game may be disguised by using a different game skin while maintaining the same underlying events, outcomes, logic, etc. In some embodiments, a game may be generated and presented using at least two steps. In a first step, the results of one or more random events are determined, leading to the determination of a final outcome and a final payout for the game. In the second step, data about the results of the random event(s), the final outcome, and the final payout are used to create a graphical presentation for the player. For example, once it is determined that a player will receive an outcome consisting of three like symbols, with an associated payout of 20 coins, such data may be fed into the second step. In the second step, a graphical rendering of slot machine reels may be created, with such rendering showing the reels spinning and finally landing on an outcome with three like symbols. Further the graphical rendering may include a flashing message that says, "Congratulations, you won 20 coins!" It will be appreciated that the first step may be performed by a first device, processor, algorithm or set of algorithms, and that the second step may be performed by a second device, processor, algorithm, or set of algorithms. Accordingly, the second device, processor, algorithm, or set of algorithms may be removed and replaced with a third device, processor, algorithm, or set of algorithms. This third device, processor, algorithm, or set of algorithms may receive the same set of data from the first step as did the second device, processor, algorithm, or set of algorithms. However, the third device, processor, algorithm, or set of algorithms may perform the second step in a different fashion. The third device, processor, algorithm, or set of algorithms may thereby generated a different set of graphics, graphical renderings, or other presentation formats than did the second device, processor, algorithm, or set of algorithms. Thus, the underlying structure of the game has remained the same, but it has been presented using a different skin.

1.18. Choosing aspects of a game. In various embodiments, a secondary player may choose a game in which to participate based on one or more attributes of the game or associated with the game. The secondary player may indirectly choose the game by first choosing an attribute, and then having the opportunity to participate in one or more games having the chosen attribute. Various attributes may be especially meaningful to a secondary player and thus a secondary player may prefer to play games having those attributes. In various embodiments, the casino may select for the secondary player a game with an attribute that is anticipated to be meaningful for the secondary player. In various embodiments, the casino may provide the secondary player with the ability to search for a game based on one or more attributes of the game.

1.18.1. Choose a special date. In various embodiments, a secondary player may find a particular date to be meaningful. Thus, the secondary player may select a game that was played on the date. If the casino knows a date to be meaningful for the secondary player, then the casino may select for the player a game played on that date.

1.18.1.1. Choose the secondary player's birthday. A meaningful date for a secondary player may be a birthday. The birthday may be the birthday of the secondary player, of a relative of the secondary player's, of a pet of the secondary player's, of a friend of the secondary player's and so on. The secondary player may indicate to the casino that such a date is meaningful to the secondary player. The casino may accordingly select a game for the secondary player that was played on the date. The casino may also have a record of the secondary player's birthday based on information already provided to the casino by the secondary player. For example, the secondary player may have provided the casino with his date of birth when signing up for a player tracking card, or when taking a loan from the casino. The casino may then select, without request from the secondary player, a game that was first played on the birthday of the secondary player.

1.18.1.2. Choose a date on which a big jackpot was won. In various embodiments, a secondary player may wish to play a game that was first played on the date that a large payout, such as a jackpot, was won. This may give the secondary player the opportunity to participate in the game in which the jackpot was won. The secondary player may indicate to the casino a desire to play a game that was first played on the day of a big jackpot. The casino may then allow the secondary player to participate in one or more games played on the day of the jackpot. The secondary player may not himself know the date when a big jackpot was won. Thus, the secondary player may request that he be allowed to participate in games from the same date as the date that the last big jackpot was won.

1.18.1.3. Choose a date when the progressive was still big. The secondary player may have a shot at the large progressive. In various embodiments, a secondary player may wish to have the opportunity to win a large progressive jackpot. As is well known, the size of a progressive jackpot may vary over time. In general, as time passes without a progressive jackpot being won, the progressive jackpot becomes larger. The current size of a progressive jackpot may not be large enough to satisfy the desires of a secondary player. Therefore, the secondary player may wish to participate in a historical game from a time that the progressive jackpot was larger. Accordingly, the secondary player may request to participate in a game that was first played at a time the progressive jackpot was in excess of a certain threshold. The casino may, accordingly, allow the secondary player to participate in such a game.

1.18.2. Choose a gaming device. In various embodiments, a secondary player may search for a gaming device having desired attributes or characteristics. Upon finding a gaming device with desired attributes or characteristics, the secondary player may choose to participate in games played at the gaming device. The secondary player may search for a gamine device using a search form. In the search form, the player may select from among various characteristics of a gaming device, some of which are described below.

1.18.2.1. A secondary player may search for a gaming device based on the historical results of the gaming device. For example, a secondary player may search for a gaming device with one or more of the following characteristics: (a) the gaming device has paid more than X amount of money in the last Y amount of time; (b) the gaming device has paid more than X amount of money in general; (c) the gaming device has paid X amount of in excess of what it has taken in, in the last Y amount of time; (d) the gaming device has made X amount in excess of what it has taken in, in general; (e) the gaming device has generated winning games for players in X % of its games in the last Y period of time; (f) the gaming device has generated winning games for players in X % of its games out of the last Y games; (g) the gaming device generated winning games for players in X of its most recent games; (h) the gaming device has paid X payouts greater than Y in the last Z games; (i) the gaming device has paid X payouts greater than Y; (j) the gaming device has paid a jackpot in the last X days (or other time period); (k) the gaming device has paid X jackpots in general; (l) the gaming device has entered X number of bonus rounds in his last Y games; (m) the gaming device has entered X number of bonus rounds ever.

1.18.2.2. A secondary player may search for a gaming device based on the type of game or based on a characteristic of a game played at the gaming device. A secondary player may search for a gaming device with one or more of the following attributes: (a) the gaming device uses mechanical reels; (b) the gaming device uses video reels; (c) the gaming device has three reels; (d) the gaming device has five reels; (e) the gaming device has X number of reels; (f) the gaming device accepts a particular denomination of bets (e.g., penny, nickel, quarter, dollar); (g) the gaming device has X number of pay-lines; (h) the gaming device has 1 pay-line; (i) the gaming device has 3 pay-lines; (j) the gaming device has more than 1 pay-line; (k) the gaming device allows multiple bets per pay-line; (l) the gaming device is made by a particular manufacturer; (m) the gaming device or a game at the gaming device was introduced in the last X years (e.g., the game is a new game); (n) the gaming device has a particular theme (e.g., I Love Lucy, Regis Philbin); (o) the gaming device features a slot game; (p) the gaming device features a video poker game; (q) the gaming device features video blackjack; (r) the gaming device is part of a particular cluster of gaming devices (e.g., a cluster of gaming devices where an outcome at one gaming device may influence an outcome at another gaming device in the cluster); and so on.

1.18.2.3. A secondary player may search for a gaming device based on one or more payouts that may be provided by the gaming device. Such payouts may be contingent on a primary player of the gaming device obtaining a particular outcome at the gaming device. A secondary player may search for a gaming device that has a top payout of over X times a bet, that has a payout of over X amount, and/or that has at least X payouts over Y amount. A secondary player may search for a gaming device that has more than X outcomes that are winning and/or a gaming device that has more than X outcomes that pay more than Y. A secondary player may search for a gaming device that has a particular or a particular range of payout frequency. For example, a secondary player may search for a gaming device that pays, on average, between once ever five games and once every seven games.

1.18.3. A simulated game matches search criteria. In various embodiments, a secondary player may specify search criteria in order to find a game in which to participate. The casino may then provide the secondary player with the opportunity to participate in a simulated game which matches the search criteria. For example, a secondary player may search for a game of blackjack in which the dealer up-card is a six. The casino may then offer the secondary player an opportunity to participate in a simulated game of blackjack in which the dealer has an up-card of six. The simulated game may have been simulated in the past. For example, the casino may have simulated numerous games in the past and stored data about the games. The casino may then find one of the games from the stored set of games such that the found game matches the secondary player's search criteria. The casino server may then offer the secondary player the opportunity to participate in the found game. In the aforementioned example, the casino server may offer the secondary player the chance to participate in a simulated game in which the dealer had an up-card of six. In various embodiments, a simulated game may include a game where player decisions were made by a computer routine. In various embodiments, a simulated game may include a game in which random events were generated using a computer routine. In various embodiments, a secondary player may perform a search for a game of a primary player matching certain criteria. The casino may, once the search criteria have been specified by the secondary player, generate one or more simulated games matching the search criteria. For example, the secondary player may search for a series of games in which a primary player has won 10 consecutive games in a row. The casino may thereupon simulate a series of games. The casino may continue simulating games until the simulated primary player has won 10 games in a row. The casino may then, for example, provide the secondary player with the opportunity to participate in the next simulated game. In various embodiments, the casino may construct one or more games that match search criteria of the secondary player. For example, if the secondary player is interested in participating in a game of craps in which the first roll of the dice is an eight, then the casino may begin a simulated game and force the first roll to be a eight. Subsequent rolls in the game may be generated at random. In embodiments described herein, any searches performed by a secondary player for a particular type of game may be satisfied by simulated games and/or by games constructed by the casino server. In various embodiments the odds, the payouts, the rules, and/or the required bet amount for a game may be changed when a secondary player has specified a criterion that the game must meet. For example, if the secondary player specifies a game of blackjack in which the primary player has a good starting hand (e.g., an 11 point total) then the payout for a winning hand may be reduced.

1.18.4. Search for a trend. In various embodiments, a secondary player may search for a particular trend or pattern among one or more games. For example, a secondary player may search for any string of 10 consecutive games played by the same primary player in which the primary player won all 10 games. Once finding the trend, the secondary player may participate in the game immediately following the trend. For example, a secondary player may find a trend of spins at a roulette wheel in which three consecutive spins resulted in the number 13. The secondary player may then participate in the spin of the roulette wheel that immediately followed the three spins in which the number 13 came up. The secondary player may not know the result of the spin which immediately followed the three spins where a 13 came up. A secondary player may search for various trends, including: (a) a series of consecutive games played by the same primary player in which the primary player has lost all the games; (b) a series of consecutive games played by the same primary player in which the primary player has won all the games; (c) a series of consecutive games played by the same primary player in which the primary player has tied in all the games; (d) a series of consecutive games played by the same primary player in which the primary player has generated at least a predetermined amount of net winnings; (e) a series of consecutive games played by the same primary player in which the primary player has generated at least a predetermined amount of gross winnings; (f) a series of consecutive games played by the same primary player for which a particular symbol (e.g., "bell") has occurred in every game; (g) a series of consecutive games played by the same primary player in which the primary player has alternated every game between winning and losing; (h) a series of consecutive spins at of a roulette wheel that have resulted in the same outcome (e.g., the number 4); (i) a series of consecutive spins at of a roulette wheel that have resulted in the same type of outcome (e.g., a red outcome); (j) a time period (e.g., a five-minute time period) during which 80% of blackjack games played by any primary player were won; (k) a time period (e.g., a one-hour period) during which three jackpot outcomes were won at slot machines in a particular casino; (l) a series of games (e.g., games played at a particular table at a casino) in which a particular starting hand occurred at least 20% of the time (e.g., in which primary players received a blackjack at least 20% of the time); and so on. In various embodiments, a secondary player may search for a primary player who is the biggest loser within a given population during a given period of time. For example, a secondary player may search for a primary player who has lost the most during a one-hour period of time at the reel slot machines. In various embodiments, a secondary player may search for a primary player who is the biggest winner within a given population during a given period of time. In various embodiments, a secondary player may search for a primary player who has had the most outcomes paying more than $50 within a given population during a given period of time. In various embodiments, a secondary player may search for a primary player who is the biggest loser over his entire playing session when compared to any other primary player. In various embodiments, a secondary player may search for a primary player who is the biggest loser over his entire playing career, at least at a particular casino. In various embodiments, a secondary player may search for a trend that is based on an area of a casino. For example, a secondary player may search for an area of a casino such that games played in that area over the last hour have resulted in net winnings for all players of $3000. In various embodiments, a secondary player may search for a trend that is based on a type of game. For example, the secondary player may search for a type of game such that, in the last X minutes, games of that type have resulted in average winnings for primary players of more than $20. In various embodiments, a secondary player may search for a trend that is based on primary players with a certain characteristic. For example, the secondary player may search for a trend in which primary players from Arkansas have won, on average, more than $50 per player over the last hour.

1.18.5. Choose a primary player. In various embodiments, a secondary player may search for a primary player having desired attributes or characteristics. Upon finding a primary player with desired attributes or characteristics, the secondary player may choose to participate in games of the primary player. The secondary player may search for a primary player using a search form. In the search form, the player may select from among various characteristics of the primary player, some of which are described below. For example, the secondary player may enter an age or age range desired in a primary player. The secondary player may also select a characteristic of a primary player from a menu. For example, the secondary player may select one of fifty states from a menu, the state indicating a desired residence location for a primary player. As will be appreciated, a secondary player may search for a primary player in many other ways. For example, a secondary player may communicate to a casino representative (e.g., via text message) a description of a primary player. The casino representative may then check records of people currently checked into its hotel or currently playing at gaming devices (e.g., with tracking cards inserted), and may attempt to locate a person matching the description provided by the secondary player. In some embodiments, a secondary player may seek a particular and unique individual, i.e., the secondary player may submit a description that can only be satisfied by one person in the world. For example, the secondary player may submit a name. In some embodiments, the secondary player may submit a description that may be satisfied by any one or a plurality of primary players. The secondary player need not have a particular individual in mind.

1.18.5.1. A secondary player may search for a primary player based on the historical results of the primary player. For example, a secondary player may search for a primary player with one or more of the following characteristics: (a) the primary player has won more than X amount of money in the last Y amount of time; (b) the primary player has won more than X amount of money in general; (c) the primary player has made X amount of profits in the last Y amount of time; (d) the primary player has made X amount of profits in general; (e) the primary player has won X % of his games in the last Y period of time; (f) the primary player has won X % of his games out of the last Y games; (g) the primary player won X of his most recent games; (h) the primary player has won X payouts greater than Y in the last Z games; (i) the primary player has won X payouts greater than Y; (j) the primary player has won a jackpot in the last X days (or other time period); (k) the primary player has won x jackpots in general; (l) the primary player has used optimal strategy in his last X games; (m) the primary player has used good or expert level strategy in his last X games; (n) the primary player has entered X number of bonus rounds in his last Y games; (o) the primary player has entered X number of bonus rounds ever.

1.18.5.2. A secondary player may search for a primary player based on a historical relationship between the primary player and the secondary player. The secondary player may search for a primary player in whose game or games the secondary player has previously participated. The secondary player may search for a primary player, where, participating in the games of the primary player: (a) the secondary player has won a jackpot; (b) the secondary player has made a profit; (c) the secondary player has entered X number of bonus rounds; (d) the secondary player has won in X of the last Y games; (e) the secondary player has won X % of the last Y games; (f) the secondary player has won X payouts more than Y amount; and so on. The secondary player may also search for a primary player where the secondary player has participated in more than X number of games with the primary player.

1.18.5.3. A secondary player may search for a primary player based on demographic characteristics of the primary player. For example, the secondary player may search for a primary player based on one or more of the primary player's: (a) age; (b) race; (c) marital status; (d) number of children; (e) number of grandchildren; (f) religion; (g) place of birth; (h) place of residence; (i) gender; (j) occupation; (k) income; (l) disability status; (m) education level; (n) high school attended; (o) college attended; and so on. For example, the secondary player may wish to participate in games of a primary player who shares one or more demographic characteristics with the secondary player.

1.18.5.4. A secondary player may search for a primary player based on hobbies enjoyed by the primary player. For example, the secondary player may search for a primary player that enjoys a particular game or sport, or for a primary player that is a fan of a particular sports team.

1.18.5.5. A secondary player may search for a primary player with whom the secondary player has some prior connection or relationship. The secondary player may search for a primary player in whose games the secondary player has previously participated. The secondary player may search for primary players in whose game the secondary player has previously won money, won a jackpot, won a large payout, or had some other result of interest to the secondary player.

1.18.6. In various embodiments, a secondary player may search for a particular game based on attributes of the game. The search may be particular to an individual game. For example, a search may distinguish between two games played by the same primary player at the same gaming device. In some embodiments, a secondary player may search for a game in which a certain amount has been bet. For example, a secondary player may search for a game in which three coins have been bet. The bet of three coins may make the primary player of the game eligible to win the jackpot. The secondary player may search for a game in which X number of pay-lines are activated, or a game in which X number of hands of video poker are being played simultaneously. A secondary player may search for a game based on the time or date on which the game was played.

1.18.6.1. In some embodiments, a secondary player may search for a game based on events that transpire within the game. For example, the game may have already occurred, or the game may be in process at the time of the secondary player's search. A secondary player may search for a game in which: (a) a particular set of cards have been dealt (e.g., a video poker game where a pair has been dealt in an initial hand, or a blackjack hand where cards totaling 11 have been dealt as a starting hand); (b) a particular symbol or symbols of an outcome have been determined (e.g., two bar symbols have appeared on the reels of a gaming device out of an outcome consisting of three symbols); (c) a bonus round has been reached; and/or (d) a certain level of a bonus round has been reached.

1.18.7. Providing a game for the secondary player to participate in. At some point, the secondary player may be ready to participate in a game with certain attributes. The attributes may be attributes specified by the secondary player. For example, the secondary player may have searched for a game with the certain attributes, or otherwise provided an indication of a desire to participate in a game with the certain attributes. In some embodiments, the casino may, for other reasons, wish to have the secondary player participate in a game with the certain attributes.

1.18.7.1. An actual historical game is provided. Given a set of attributes or characteristics, a casino may retrieve data about a historical game with the given set of attributes or characteristics. The historical game may be a game that was actually played by a real human player. For example, when a secondary player has indicated a desire to play in a game of video poker that was played by a primary player aged 60 years old, the casino may retrieve data about a game that was actually played in the past by a 60 year-old primary player and that was played at a video poker machine. The data retrieved may be used to display information about the game to the secondary player (e.g., to show screen shots of the cards being dealt in the game), to determine what the outcome of the game was, to determine whether the secondary player is a winner based on bets placed on the game by the secondary player, and to determine an amount to pay the secondary player. Data about historical games may be stored in a database or in any other storage means. Data about historical games may be indexed by different attributes, such as the age of the player or the type of game. Games may thus be searched by attributes, and data about games with attributes desired by a secondary player may be retrieved.

1.18.7.2. A historical simulated game is provided. Given a set of attributes or characteristics, a casino may retrieve data about a historical game that was simulated. The game may not ever have been played by a real human being. In some embodiments, the outcome of the game may have been determined prior to play by a real human being. However, subsequent to the outcome being generated, a person (e.g., a secondary player) may have participated in the game. As with a historical game originally played by a live player, data about a historical game that was simulated may be stored in a database and indexed by attributes. Subsequently, data about historical games may be searched according to desired attributes. The data may then be used to recreate the game for a secondary player, and to determine an outcome and an amount to be paid to a secondary player.

1.18.7.3. A current actual game is provided. Given a set of attributes or characteristics, a casino may determine a current game in progress with the given set of attributes or characteristics. For example, a 60 year-old primary player from Wisconsin may currently be involved in a game at a video poker machine in which an initial hand with a pair has been dealt. The secondary player may be allowed to participate in the game in progress. For example, the secondary player may be allowed to place a bet on what the final outcome of the game will be. In various embodiments, the secondary player need not have the benefit of the same pay table as does the primary player, since the secondary player is placing a bet in the middle of the game and has more information than the primary player did at the start of the game.

1.18.7.4. A current simulated game is provided. Given a set of attributes or characteristics, a casino may simulate a game having the given attributes or characteristics. The casino may, for example, use a computer algorithm to determine cards to deal in a card game (e.g., video poker) or to determine symbols to show in a simulated reel slot machine. For example, if a secondary player desires to participate in a game of video poker, the casino may simulate a game of video poker. If the secondary player desires to participate in a video slot machine game, the casino may simulate a video slot machine game. In various embodiments, the casino may use algorithms to simulate table games as well as games typically played on a gaming device. For example, the casino server may simulate craps, blackjack, or poker. If other players would normally be present in a game, the casino may use computer algorithms to simulate the decisions that would have been made by humans. For example, in order to simulate a game of poker, the casino may use algorithms designed to bet, call, fold, raise, or check, according to certain pre-programmed rules.

In some embodiments, a secondary player may wish to participate in a game in which certain symbols or outcomes occur. The casino may, in some embodiments, simulate multiple games until the desired symbols or outcomes occur. The secondary player may have the opportunity to participate only in the game, of the multiple games, in which the desired symbols or outcomes occurred. For example, the secondary player may indicate a desire to participate in a game in which three-of-a-kind was dealt on the initial hand in a game of video poker. The casino may deal a number of simulated hands of video poker. Only when the casino finally deals an initial hand with three-of-a-kind, e.g., due to random chance, does the casino allow the secondary player to then place a bet and to receive winnings for the final outcome of the game. In some embodiments, the casino may accept a bet from the secondary player first, simulate multiple games until a game with desired characteristics is simulated, and then pay the player based upon the outcome of the game with the desired characteristics. In some embodiments, the simulation may begin with a game of the desired attributes. For example, if a secondary player desires to play in a game of video poker with three-of-a-kind dealt on the starting hand, then the simulation may begin by immediately dealing three-of-a-kind. The simulation may randomize the remaining cards (e.g., shuffle the cards remaining after the three cards of the same rank have been dealt, the remaining cards completing a standard deck of 52 cards). The game may continue with two additional cards dealt from the randomized deck to complete the initial hand, followed by the discarding of one or two cards, followed by the replacing of the discarded cards with new cards from the randomized deck. In various embodiments, the secondary player may or may not have the opportunity to make decisions in a simulated game. For example, in some embodiments, the secondary player may choose which cards to discard in a game of video poker. In some embodiments, the cards that are discarded may be chosen automatically, e.g., by a computer algorithm employing optimal poker strategy.

1.18.7.5. An alert is provided for when a game with desired characteristics will be played. Given a set of attributes or characteristics, a casino may determine when such a game will be played or will be likely to be played. For example, a secondary player may wish to participate in a game played by a primary player at a 3-reel slot machine, the primary player having three kids and a birthday in April. The casino may determine that a primary player with three kids and a birthday in April is indeed seated at a 3-reel slot machine. The primary player may have been playing for 20 minutes already, and presumably will continue to play. Therefore, a secondary player may be permitted to participate in games of the primary player from that point forward. The casino may alert the secondary player that a primary player with desired characteristics has been found and that the secondary player may begin placing bets in the games of the primary player. Further, the casino may begin transmitting information about the games of the primary player to the secondary player.

1.19. A secondary player participates in a game where a progressive jackpot is won. In various embodiments, a secondary player may participate in a game for which the primary player is eligible to win a progressive jackpot. However, in various embodiments, a progressive jackpot constitutes a single pool of money, and therefore cannot be paid in its entirety to multiple different players.

1.19.1. The secondary player gets a fixed substitute. In various embodiments, when a primary player wins a progressive jackpot, a secondary player participating in the same game receives a fixed payment. The fixed payment may be some predetermined amount, such as $10,000.

1.19.2. The secondary player gets a fixed percentage. In various embodiments, when a primary player wins a progressive jackpot, a secondary player participating in the same game receives percentage of the progressive jackpot.

1.19.2.1. The primary player gets the full amount, or less so the secondary player can be paid. In various embodiments, when a secondary player receives a percentage of a progressive jackpot won by a primary player, the amount received by the primary player from the jackpot may be correspondingly reduced. For example, if the secondary player receives X % of a progressive jackpot, the primary player may receive 100%–X % of the progressive jackpot. In various embodiments, for each bet placed on a game with a progressive jackpot, a portion of the bet is contributed towards increasing the size of the progressive jackpot. Thus, when a primary player and a secondary player each place a separate bet on a game, a portion of the primary player's bet may add to the size of the progressive jackpot, and a portion of the secondary player's bet may contribute to the size of the progressive jackpot. For each game, a fixed contribution to the progressive jackpot may be required. Thus, if both a primary player and a secondary player participate in a game, the contribution from the primary player towards the progressive jackpot may be less for that game than if only the primary player were participating in the game. In various embodiments, the primary player may receive the full amount of the progressive jackpot. The amount received by the secondary player may be over and above the amount paid out to the primary player. Even so, the secondary player may receive an amount equal to a predetermined percentage of the progressive jackpot, such as 10% of the progressive jackpot.

1.19.3. Part of progressive amount is set aside for secondary players before it is paid out. In various embodiments, a progressive jackpot is divided into two or more portions. A first portion is available to be won by primary players. A second portion is available to be won by secondary players. If a progressive jackpot is won in a game, a primary player participating in the game would win the portion of the progressive jackpot available to primary players, and a secondary player participating in the game would win the portion of the progressive jackpot available to secondary players. If there is no secondary player for the game, then the portion of the progressive jackpot available for secondary players may remain unclaimed.

1.19.4. There is a progressive just for secondary players. In various embodiments, a progressive jackpot (other similar terms used herein may include "progressive prize", "progressive prize pool", "progressive pool", "progressive payout") may grow from the contributions of only secondary players. The progressive jackpot may be available to be won only by secondary players. For example, for each bet a secondary player puts on a particular type of game, a portion of the bet may be set aside and added to a progressive jackpot. If a secondary player participating in the particular type of game later wins the progressive jackpot, the jackpot may go to the secondary player. The size of the progressive prize pool may then go down to zero. In some embodiments, once a progressive prize pool has been claimed, the next pool may be seeded with some money by a casino, e.g., with $10,000, so as to garner interest from secondary players. In various embodiments, a display visible by a secondary player may track the size of a progressive. For example, a secondary player may participate in games using a mobile device (e.g., a mobile device as set forth in Nevada bill AB471). The mobile device may maintain on its display screen a running tally of the size of the progressive pool.

In various embodiments, two or more separate progressive jackpots may be available for secondary players. In various embodiments, a secondary player may be eligible to win a progressive prize based on the location or geographic region from which the secondary player participates in games. For example, a secondary player participating while seated in Casino A may be eligible for a first progressive prize pool of $10,000. Another secondary player participating while seated in Casino B may be eligible for a second progressive prize pool of $20,000. A progressive prize pool may be available to be won by a particular secondary player based on one or more characteristics or circumstances of the secondary player, such characteristics or circumstances including: (a) a demographic of the secondary player, such as an age, birthday, birthplace, marital status, educational status, and so on (e.g., there may be a first progressive pool for secondary players aged 60 or over and a second progressive pool for secondary players aged 59 or under); (b) the particular type of game the secondary player is participating in (e.g., there may be separate progressive prizes for slot machine games and video poker games); (c) the location or geographic region from which the secondary player is participating (e.g., there may be different progressive pools for different casinos, different cities, different states, etc.); (d) the time or date during which the secondary player is participating (e.g., there may be a different progressive prize offered during each six-hour period in a day); (e) the identity of the primary player (e.g., there may be a first progressive prize pool associated with the games of a first set of primary players, and a second progressive prize pool associated with a second set of primary players); (f) a characteristic or circumstance of the primary player (e.g., demographic, location, etc. of the primary player); (g) a bet being made by the secondary player (e.g., a secondary player may be eligible for a first progressive prize if his bet is more than $3, and a second progressive prize if his bet is less than $4); and so on. In various embodiments, a progressive prize pool may be associated with a given period of time. For example, a progressive prize pool may be associated with a particular day. The progressive prize pool may be associated with a guarantee that it will be won on its associated day (or its associated period of time). According to the guarantee, the progressive prize may be claimed by the first secondary player to achieve outcome A, the first secondary player to achieve outcome B if no secondary player achieves outcome A, the first secondary player to achieve outcome C if no secondary player achieves outcomes A or B, and so on. In various embodiments, a progressive prize pool may have its probability of occurrence set so that it is likely the pool will be won during an associated time period. For example, if it is anticipated that secondary players will play 10,000 games during a given time period in which they have a chance of winning a progressive, the probability of winning for each game may be set at 1/5000. The probability that the progressive will be won during the time period may then be approximately 86%. In some embodiments, as the casino may be aware in advance of the outcomes of games to be played by a secondary player, the casino may intentionally offer for play at least one game that will result in a progressive prize being won. One such game may be offered during every period in which a progressive prize is guaranteed to be won. In various embodiments, two or more progressive prize pools may be simultaneously available to be won by a secondary player. One progressive pool may be associated with a relatively shorter period of time, while another progressive pool may be associated with a relatively longer period of time. For example, a first progressive prize pool may be won, on average, once a year. In fact, the first progressive prize pool may be guaranteed to have a winner every year. A second progressive prize pool may be won, on average, once a day. A secondary player may be eligible to win either of the progressive prize pools in the same game. In some embodiments, a secondary player may win only the first progressive prize pool while participating in a first game. In some embodiments, a secondary player may be eligible to win only the second progressive prize pool while participating in a second game.

1.19.5. A secondary player cannot play games with progressives. In various embodiments, secondary players may not be allowed to participate in games with progressive payouts.

1.19.6. A secondary player wins the full amount of the progressive. In various embodiments, when a progressive payout is won in a game, the secondary player may receive the full amount of the progressive. For example, suppose a primary player wins a progressive jackpot in a game for which the progressive jackpot is $100,000. The primary player may receive $100,000. The secondary player may also receive $100,000.

1.19.7. Making up extra funds to pay secondary players. In various embodiments, a progressive payout (e.g., a progressive jackpot) may consist of funds held in reserve for a time when the jackpot must be paid out. If a progressive jackpot is won in a game where a secondary player is participating, the progressive jackpot may go to the primary player and additional funds must be obtained by the casino to pay the secondary player. In various embodiments, the casino may pay the secondary player out of a separate pool of funds, such as an account used by the casino for general business expenses. In some embodiments, the secondary player may receive a promise of payment. The secondary player may receive a portion of contributions towards future progressive payouts. For example, the secondary player may receive 50% of all portions of bets withheld for a subsequent progressive jackpot until such time as the subsequent progressive jackpot is won.

1.20. Anti-vulture provisions. A secondary player may be prevented from playing in games with a positive expected value. Various situations may arise with respect to a gaming device or with respect to a live table game where betting circumstances are favorable to a player. Favorable circumstances may include circumstances where a player might expect to receive, on average, more than 100% of his bet from winnings in a game. For example, if a progressive jackpot or other payout at a slot machine reaches a certain level, the slot machine may return, on average, more than 100% of an amount bet. In some slot machines, certain symbols, tokens, or other objects may be accumulated from game to game. For example, Double Diamond Mine® slots, made by IGT, allow a player to accumulate diamond symbols from game to game. Once 10 diamond symbols from a particular reel have been accumulated, the player wins a payout. A slot machine in which a number of such objects have been accumulated may return, on average, more than 100% of an amount bet. In games of blackjack, such as in live table games of blackjack, a game may return more than 100% of an amount bet if the cards remaining in a deck have a predominance of one type of card (e.g., of high cards).

In various embodiments, a secondary player may be allowed to search for historical games in which the expected payout is more than 100% of the bet. For example, the secondary player may search for games at a Double Diamond Mine® slot machine where nine diamond symbols for each reel have already been accumulated. In another example, the secondary player may be allowed to search for gaming devices in which a progressive jackpot has exceeded a certain threshold. The secondary player may be allowed to participate in such games. However, in some embodiments, the secondary player may be prevented from participating in games in which an expected payout is more than 100% of the bet. In some embodiments, a secondary player may only be allowed to participate in games returning more than 100% of an amount bet if such games arise during a longer sequence or session of play. For example, a secondary player may be allowed to participate in a Double Diamond Mine® slot game for which nine diamond symbols have accumulated for each reel only if the secondary player has already participated in immediately prior games that had occurred at the same slot machine.

Tracking of game data usage. In some embodiments, a game that was originally played at a first casino or other establishment may subsequently be recreated at a second casino or establishment. For example, a secondary player at a second casino may participate in a game that was originally played at a first casino. The second casino may derive revenue, profit, or other financial gain from the recreation of the game at the second casino. For example, when a secondary player places a bet on the game at the secondary casino, the secondary casino may expect to win some portion of the bet, on average. In some embodiments, the second casino may compensate the first casino for the privilege of using or recreating the game that was first generated or played at the first casino. In various embodiments, the use of games for participation by secondary players may be tracked. The tracking of such use may allow a first casino (e.g., the casino that originally generated a game) to track how much it is owed, and a second establishment (e.g., the casino that recreated the game for play by the secondary player) to track how much it owes. The use of a game at a casino may be tracked in a number of ways. Data related to the game, e.g., a game identifier, may be stored in a database. A time during which the game was recreated may be stored. Other items stored may include: (a) an identity of a secondary player who played the game; (b) an amount bet on the game; (c) an amount won or lost by the casino recreating the game; (d) a type of bet placed on the game; (e) a number of secondary players who participated in the game; (f) a location of a secondary player who bet on the game; (g) an amount owed to the casino that originally generated the games; and so on. Data about individual games may not be stored, in some embodiments. Rather, data about blocks or groups of games may be stored. For example, a casino may store a record indicating that a group of 1000 games was recreated during the afternoon of Aug. 17, 2010, and that a total of $40,000 was bet on the games.

In various embodiments, a casino that used or recreated one or more games may send a report about the use of the games to the casino that originally generated the games. For example, the casino that recreated the games may send a printed report with each line on the report detailing, e.g., a particular game, a particular time the game was recreated, an amount bet, and an amount owed to the casino that originally generated the games. The report may be a paper or electronic report. The report may be sent by postal mail, email, fax, via download from the Internet, or via any other means. A report may cover a single game or a group of games. A report may be sent in real time (e.g., a report about the use of a game may be sent to the casino that originated the game as the game is used or immediately after the game has been used), periodically (e.g., every hour), or once (e.g., at the end of a period for which the casino using the games is authorized to use the games by the casino that first generated the games).

Data stored by a casino relating to the use or re-creation of games within the casino may be obtained from devices used for play by secondary players. For example, a terminal at which a secondary player participates in a game may store and/or transmit various data to the casino server, such as amounts bet by the secondary player, which games the secondary player played, and so on.

In various embodiments, a casino that uses data about games originally generated at another casino may track or record the use of various images associated with the game. Based on the use of images, royalties may be paid to copyright holders of the image. Also, the casino that originally generated the game may track the use of images from the game.

1.21. Bucket shop paradigm. Under this paradigm an establishment hopes to invest the least amount possible in casino infrastructure, including games, and even licenses to be a casino operator. Instead, the establishment plans to just reuse data from a real casino, set up a nice façade, and open up for business. In various embodiments, an operator may set up a gaming facility which uses solely or predominantly games or outcomes that have already been generated. The operator may thereby save various costs, possibly including the costs of purchasing gaming equipment, costs of obtaining accounting software and other infrastructure, and costs associated with meeting various regulations. For example, by reusing outcomes that have already been generated, an operator need not buy expensive gaming machines to generate original outcomes. Further, the operator need not submit such gaming machines for regulatory approval or inspection. In some embodiments, an operator of a facility that only reuses games and outcomes already generated may not be required to obtain the same types of regulatory approval as does a facility that generates original games and outcomes. The operator of the facility that reuses games and outcomes need not, in some embodiments, submit devices used by secondary players to the same process of regulatory approval that ordinary gaming devices (e.g., slot machines) are subject to. Rather the regulatory approval process may be simpler for the devices used solely by secondary players. In some embodiments, an entire facility that only reuses games or outcomes may not be subject to the same regulatory processes as is a facility that generates original outcomes. Rather, the regulatory processes may be simpler for facilities that solely reuse games or outcomes.

In some embodiments, by using outcomes already generated, an operator may use accounting data that has already been generated to account for amounts received, won, and lost based on the outcomes. Thus, the operator may save on accounting software and other accounting infrastructure, such as networks or intranets for conveying accounting related information.

1.21.1. Use of shell machines that simply display outcomes from other machines. In various embodiments, an operator may install machines or devices with simplified functionality. The machines may include currency acceptors, credit card acceptors, or other acceptors for consideration to be used for betting purposes. The machines may include output devices, such as microphones for audio output and display screens for video or graphical output. The machines may further include dispensers for cash, coins, currency, tokens, chips, cashless gaming receipts, or other consideration. Consideration may be paid to a player based on amounts won while participating in games, or based on amounts remaining from an initial deposit made by a player. The machines may further include media players and/or media storage devices. For example, the machines may include DVD players or VHS players. The machines may include VHS tapes, DVDs, CDs, flash memory, or other media storage devices. The machines may further include buttons, handles, and touch screens for use by a player to input information, such as amounts to bet. The machines may further include network interfaces for sending and receiving information via a network, such as an intranet or internet. Network interfaces may include wireless network interfaces, such as antennae. Operationally machines according to various embodiments may receive a record of historical games, stored on a media device, such as a DVD. The machines may receive currency from a player. The machines may then receive an indication of an amount to bet. The machines may then receive an initiation signal for a game from the player. The player may convey the initiation signal, for example, by pressing a button labeled "spin" on the machine. The machine may then play for the player a video or other depiction of a stored game from the DVD. For example, the machine may play a 10-second video clip from the DVD, the video clip depicting a historical game that occurred at an actual slot machine. The machine may determine an outcome of the game. For example, the DVD may store, in association with each game, information about a payout or payout ratio associated with the game. Based on the information about the payout, the machine may pay the player. The player may be paid by, e.g., dispensing currency through a dispenser of the machine, or by adding to a balance of player credits stored on the machine. In various embodiments, the machine does not itself generate any outcomes or games. The machine merely replays games that have been previously generated. In various embodiments, the machine may recreate games based on a limited amount of information about the games. For example, the machine may receive information about the outcome of a game. The machine may then display an animated sequence depicting slot reels spinning and stopping to show the outcome. In some embodiments, the machine need not store information about prior games locally on the machine. Rather, the machine may receive information about historical games via the network. As information about historical games is received, the machine may recreate the historical games for the benefit of a secondary player at the machine.

1.21.2. Simplified regulatory license. An operator is just reusing data that's already been certified. There is no need to recertify data. In various embodiments, an operator using historical outcomes may operate without one or more licenses required of a typical gaming operator. A special license may be granted for operators who use only historical outcomes. A special license may be granted for operators who use only historical outcomes which have come from licensed gaming establishments.

1.21.3. Reuse of accounting data. There is no need for an operator to generate his own accounting data. In various embodiments, a casino operator may generate a number of original games or outcomes. Based on the outcomes, the casino may generate a record of amounts won, amounts lost, amounts collected, amounts owed in taxes, and so on. Such data may constitute accounting data. The casino operator may subsequently share such accounting data with a second operator who reuses the outcomes generated by the first casino operator. Since the outcomes used are the same, the accounting data required may be the same or similar. Therefore, in some embodiments, the second operator may receive the accounting data from the first casino operator, and reuse the accounting data for its own records.

1.21.4. Pre-inspection of the data is not allowed, as then the bucket shop could be accused of knowing the outcomes in advance. In various embodiments, an operator using historical games or outcomes is forbidden by law, regulation, convention, or other policy from obtaining knowledge about the games or outcomes prior to the participation in the games by a secondary player. In this way, the operator may be discouraged from selectively making available games or outcomes that are unfavorable to the operator.

1.22. Multi-Tiered Poker Game. In various embodiments, a poker game occurs. The poker game may include a number of live players at a table at a casino. The poker game itself may be referred to as a first tier game. Based upon the first tier game, a second tier game may be played. The second tier game may involve a different set of players. In some embodiments, the second tier game includes one player for each player in the first tier game. Each person in the second tier game may be associated or matched with a person in the first tier game. In various embodiments, a person in the second tier game may bet on what his associated player will do in the first tier game. For example, the player in the second tier game may bet that his associated player in the first tier game will check, bet, raise, call or fold. Further, the person in the second tier game may place a bet on the amount that the associated person in the first tier game will bet. For example, if Joe in the second tier game is associated with Sue in the first tier game, then Joe may bet that Sue will raise by at least 30 chips. In various embodiments, a person in the second tier game cannot communicate with his associated person in the first tier game. In various embodiments, no one in the second tier game can communicate with anyone in the first tier game, and vice versa. In various embodiments, a person in the second tier game knows the cards of the associated person in the first tier game, but does not know the cards of any other player in the first tier game.

In various embodiments, a person in the second tier game may also check, bet, raise, fold, or call against other people in the second tier game. He may bluff and hope other people in the second tier game will fold. Should two or more players remain in a second tier game once the first tier game has reached its conclusion, a pot in the second tier game may be awarded to a person in the second tier based on the results of the first tier game. Namely, if a person in a second tier game is associated with the person in the first tier game who won the first tier game, then the person in the second tier game will also win in the second tier game. In some embodiments, the result or outcome of the second tier game is decided as if each person in the second tier game held the cards of his associated person in the first tier game. In various embodiments, if a player in the first tier game folds, the associated player in the second tier game folds automatically, and thus loses in the second tier game.

In various embodiments, there may be higher tiers. For example a third tier may include the same number of players as are in the second tier (or, equivalently, the first tier). Each player in the third tier may be associated with a player in the second tier. Thus, the player in the third tier may automatically be associated with the person in the first tier to whom is associated the player in the second tier that is associated with the player in the third tier. In other words, one player in each tier may be associated with a particular hand of cards, and all such players may be associated with one another. Players in the third tier may place bets on what bets will be made by associated players in the second or first tiers, and on how much will be bet by such players. Further players in the third tier may make bets against one another to be decided by results of lower tiers. A player in the third tier may win a pot if he has not folded, his associated player in the second tier has not folded, his associated player in the first tier has not folded, and his associated player in the first tier has the best poker hand at the conclusion of the first tier game. However, if an associated player in the first or second tier folds, a player in the third tier is automatically folded. Note, however, that a player in the second tier is not automatically folded if an associated player in the third tier has folded. It will be appreciated that there may be any number of tiers, with fourth, fifth, sixth, etc., tiers operating in an analogous fashion to what has been described with respect to the first three tiers. In some embodiments, a person in a tier greater than the first tier may see the cards of all players in the first tier.

1.22.1. There may be time limits on people in higher tiers so they can't stall to see what happens in the actual game. In some embodiments, a player in tier two or above may have a time limit for making bets or other game decisions. The time limit may force a player in tier two or higher to take action before the game proceeds in tier one, and thus before the player in tier two or above discovers important information from watching the first tier players that might aid him in his game decision.

1.22.2. A higher tier game may not occur in a live environment. Thus higher tier players may bet after the fact. In various embodiments, tier two, tier three, and higher tier games may occur after the tier one game has occurred. Accordingly, a playback of the action in the tier one game may be halted until all appropriate actions have been taken in the higher tier games.

1.22.3. Tiers could form among people at the pool using handheld devices. In various embodiments, a second tier, third tier, or higher tier game may form amongst players that are remote from a poker table. For example, players located poolside at a casino may engage in a second tier game using handheld devices, such as personal digital assistants. Thus, the second tier players may benefit from the work of a dealer and from the use of physical cards, but without having to be physically present at a poker table.

1.23. In various embodiments, a first secondary player may receive an alert regarding the activities of a primary player and/or of a second secondary player. An activity that may trigger an alert may include: (a) the primary player inserts a tracking card into a gaming device; (b) the primary player inserts currency or other consideration into a gaming device; (c) the primary player presents a tracking card or other identification at a table game (e.g., at a blackjack game); (d) the primary player buys chips at a table game; (e) the primary player places a bet in a slot machine game; (f) the primary player places a bet in a game; (g) the primary player participates in a game; (h) the primary player receives a payout in a game; (i) the primary player checks into a hotel; (j) the primary player pays for a meal at a restaurant (thereby identifying himself with a credit card, for example); and so on. Similar activities by the second secondary player may trigger an alert for the first secondary player. An alert may be sent to the secondary player if the primary player was or is flagged for any reason, such as being of interest to the first secondary player. For example, the first secondary player may have indicated that the primary player is the favorite player of the secondary player. Thus, the first secondary player may wish to be alerted any time the primary player is playing or will begin playing so that the first secondary player may have the opportunity to participate in the games of the first primary player. An alert may be transmitted to a device of the second secondary player, including a cell phone, personal digital assistant, Blackberry®, laptop, personal computer, television, and so on.

An alert may also be transmitted to the first second secondary player under other triggering conditions. An alert may be sent to the first secondary player if a primary player of interest: (a) is playing a particular game (e.g., a favored game of the second secondary player); (b) has had a streak, such as a winning streak or losing streak (e.g., the primary player has won 10 games in a row; e.g., the primary player has lost games in a row); (c) the primary player has won a certain amount (e.g., the primary player has won more than $100); and so on. An alert may be sent to the first secondary player based on similar triggering conditions involving the second secondary player.

1.24. Embodiments disclosed herein need not apply only to casino gaming. Rather, where applicable, disclosed embodiments may apply to a wide variety of games, contests, sporting events, random events, unknowns, and so on. Where applicable, disclosed embodiments may apply to anything that may be the subject of a bet. Disclosed embodiments may apply to table games, video games, boxing matches, sporting events, the price movements of equities, the price movement of bonds, the movements of other market securities, the results of elections, the weather, the temperature, the average test scores of a body of students, and so on. For example, a secondary player may place a bet on whether a stock price will go up or down in the next ten minutes. Note that, in various embodiments, a primary player need not be explicitly present. For example, a secondary player may bet on the temperature a day in the future even though there is no primary player per se who effects the temperature.

1.25. Embodiments described herein need not apply only to complete games. Where applicable, embodiments described herein may apply to events within games. For example, a secondary player may bet on the next card that a primary player will receive in a game. A secondary player may bet on the next roll of the dice, on how many times a player will hit in a game of blackjack, on the point total of the dealer's hand in a game of blackjack, on the contents of a flop in a poker game of Texas Hold'em, and so on. A secondary player may be alerted when certain sequences of events have occurred. For example, a secondary player may be alerted when the last ten cards dealt in a game were red cards (i.e., hearts or diamonds). A secondary player may view historical data about events within a game or games. For example, the secondary player may examine historical data about the number of times the number 12 has been rolled in craps in the last 10 minutes.

1.26. A secondary player just watches a primary player. In various embodiments, a secondary player may wish to watch the play of a primary player, watch the games of a primary player, watch the facial expressions of the primary player, follow the strategies of the primary player, examine the historical results of the primary player, or otherwise track the primary player. The secondary player may wish to track the primary player without betting or risking any money on the games of the primary player. For example, a secondary player may wish to watch the games of a primary player who is a celebrity. Simply watching the celebrity player may provide entertainment for the secondary player.

A secondary player may search for a primary player based on any number of criteria, such as those mentioned above. A secondary player may search for a primary player based on a name (e.g., Ben Affleck); based on a demographic; based on a celebrity status (e.g., a name that generates more than 1000 hits in a Google search); based on a typical amount bet (e.g., a secondary player may search for any player who bets more than $100 per game); based on a history of wins or losses; based on strategies employed; based on facial expressions (e.g., a computer algorithm may score the expressiveness of a primary player's face and allow the secondary player to search for the most expressive faces); and/or based on any other criteria.

In various embodiments, a secondary player may pay a fee for watching the games of primary players. A fee paid by the secondary player may allow the casino to profit from the secondary player even if the secondary player does not place any bets. The secondary player may pay a fee per game watched, per time period during which he watches, or based on any other metrics. In various embodiments, the primary player may receive a portion of the fee paid by the secondary player.

In various embodiments, the primary player's permission must be obtained before a secondary player may track the play of the primary player.

2. Bet on a smaller aspect of someone else's game. For example, bet on what the next card will be, what the next roll of the dice will be, etc. In various embodiments, a person who does not directly participate in a game at a casino may nevertheless place bets on various events in the game. An event may include the rolling of a die, the drawing of a card, the spinning of a roulette wheel, the spinning of a reel of a slot machine, and so on. An event may come to a resolution in the form of a number revealed on the top face of a die, in the form of a rank or suit of a card drawn, in the form of a number achieved at a roulette wheel, in the form of a symbol appearing on a reel at a pay-line, and so on. An event may also include a decision or action made by a player who is directly involved in the game. For example, an event may include a player making a decision to hit or stand in blackjack, a player making a decision to bet or fold in poker, a player making a decision of which prize door to choose in a bonus round of a slot machine game, and so on. Such an event may come to a resolution in the form of an actual decision made. For example, a resolution may include an actual decision made by a player, such as "hit", "draw", or "fold". An event may include a dealer making a decision in a game. For example, in a game of Pai Gow poker an event may include an arranging of the dealer's seven cards into a two-card hand and a five-card hand. The resolution of the event may take the form of an actual five-card hand and an actual two-card hand that the dealer has arranged.

As used herein, the term "payout odds" may refer to a statement of an amount a player will receive, in the event of a win, per amount bet. For example, 3:2 payout odds means that a player will receive 3 units per 2 units bet (in addition to keeping his original bet), provided the player wins the bet. It will be understood that a payout ratio may be readily determined from payout odds and vice versa via mathematical operations. Therefore, it will be understood that embodiments described herein using payout ratios could readily be performed with payout odds, and vice versa.

For a given event, an appropriate set of payout ratios may be determined. For example, if a secondary player is betting on a two as the resolution of a roll of a six-sided die, the secondary player may stand to win five times his initial wager (a payout ratio of 5) if the two is in fact rolled. Note that the player is assumed to give up his bet initially, so his net profit would be 4 times his initial wager if a two occurs. A set of payout ratios may be determined based on the inherent probabilities of various possible resolutions of the event. In the above example, the inherent probability of a two being rolled is 1/6. Thus, a payout ratio of five seeks to provide the player with a payout commensurate with the inverse of the probability of the resolution that would be winning for the player, while still allowing for a casino profit, on average.

Once the event has resolved, it may be determined whether the secondary player has won. For example, suppose a secondary player has bet that the next card dealt in a game of poker will be the ace of spades. Once the next card has been dealt, it may be determined whether the card is in fact the ace of spades, and therefore whether the secondary player has won. If the secondary player has won, the secondary player may be paid according to the payout odds.

In various embodiments, an event on which a secondary player bets does not constitute a complete game for the primary player of the game. For example, a secondary player may bet on what the next card will be in a game of video poker. However, the outcome of the game of video poker is not solely based on the next card, but rather is based on at least four other cards making up a complete hand of poker. Thus, a primary player may place a bet and may be paid based on his bet and based on the resolutions of a first and a second event in a game. A secondary player may place a bet on the same game and may be paid based on his bet and based on only the resolution of the second event in the game.

In various embodiments, the secondary player may be remote from the game. For example, the primary player may participate in the game while physically present at a slot machine, video poker machine, table game, or other game location. However, the secondary player may be remote from the primary player, such as 50 feet away, such as in a different room, such as in a different building, such as in different city, and so on.

In various embodiments, the secondary player may bet on an event in a game after the game has been completed. For example, the secondary player may bet on an event in a game completed the prior week. The events of the game may be unknown to the secondary player, since the secondary player may not have been observing or participating in the game when it was originally played.

Figure 9:
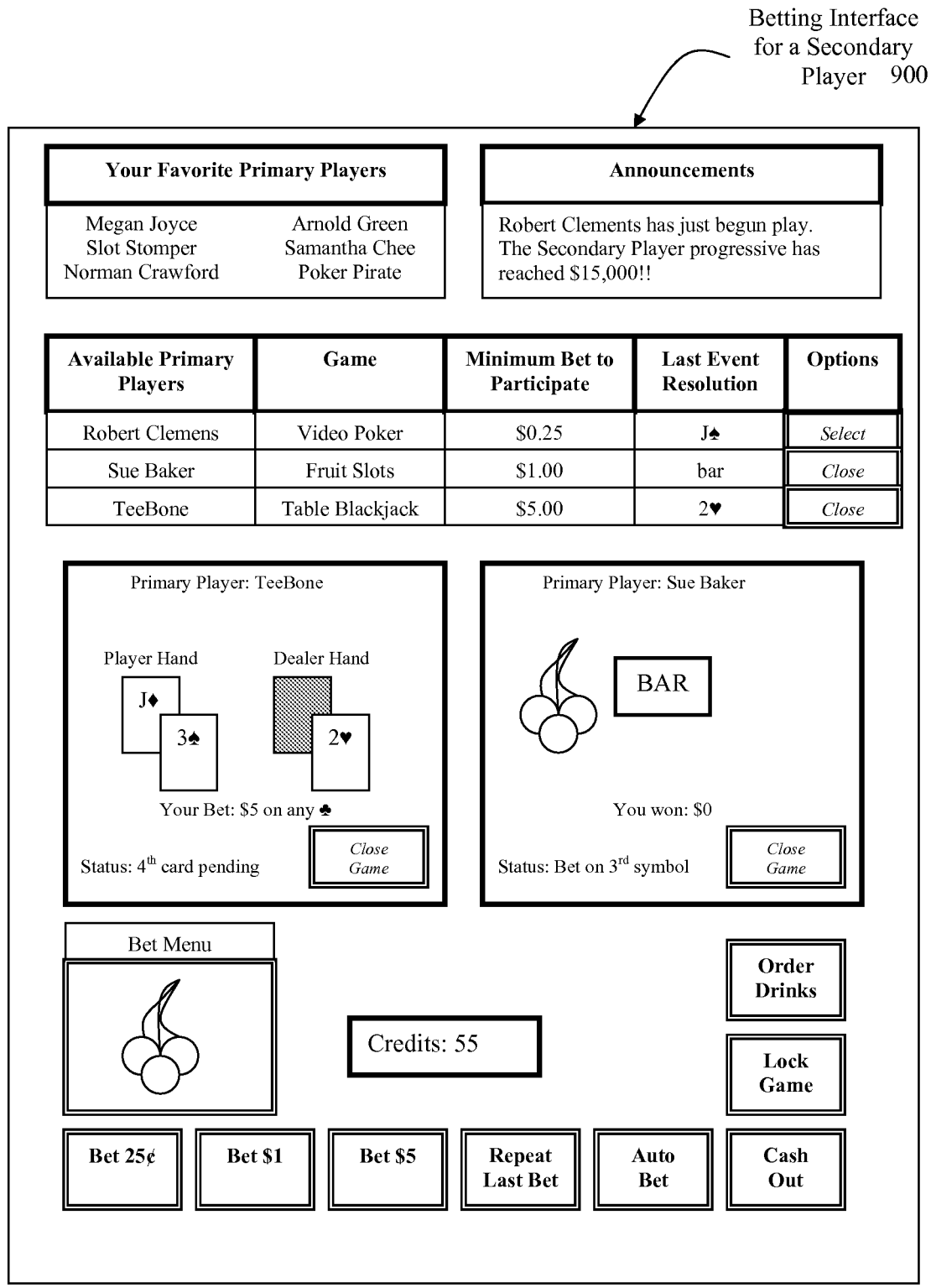
FIG. 9 shows a touch screen display for entering betting information and tracking the progress of a game, according to some embodiments.

2.1. Betting interface. In various embodiments, a secondary player may use a betting interface to make bets on events within a game. The betting interface may be a graphical user interface, and may include interactive features such as buttons, microphones, touch areas, mice, keyboards, and any other features for receiving designations of a secondary player's bet. An exemplary betting interface is shown in FIG. 9. The betting interface depicted in FIG. 9 includes an area where the names of available primary players are listed. The secondary player may elect to bet on events for the games played by these primary players. Next to each primary player is listed an indication of the last event resolution. For example, next to primary player Robert Clemens is listed the J♠, or the jack of spades. This indicates that in the most recent event of Robert Clemens' game, the event being the dealing of a card, the resolution to the event was that a jack of spades was dealt. Next to Sue Baker is listed a "bar". This indicates that in the most recent event of Sue Baker's game, the event being the random determination of a symbol to show in a viewing window of a slot machine game, the resolution to the event was that a bar occurred. In the case of TeeBone, the most recent card dealt was the two of hearts. The betting interface depicted in FIG. 9 includes two game windows in which a secondary player may bet on events within a game. In the game of TeeBone, the secondary player has just bet $5 that the next card dealt in the game will be a club. In the game of Sue Baker, two symbols have already appeared in the viewing window of the slot machine game in which Sue Baker is involved. The status of the game is such that the secondary player may bet on the third symbol that is yet to come in the same game of Sue Baker. The secondary player may use the "Bet Menu" area of the screen to select a symbol to bet on. At present, a "cherry" symbol appears in the Bet Menu area. The secondary player may, however, scroll through additional symbols in the menu and select (e.g., by touching three times in rapid succession) a symbol on which to bet.

2.2. Determining pay tables. In various embodiments, payout ratios may be determined for an event within a game. Payout ratios may be based on the probability that a bet on the event becomes a winning bet. Payout ratios may also be determined based on a number of other factors. Payout ratios may be displayed or otherwise presented for a secondary player. In some embodiments, payout ratios are displayed in the form of a pay table. The pay table may include a first column depicting various possible resolutions of an event, and a second column depicting the amount to be paid per amount wagered on each of the possible resolutions.

2.2.1. Determining appropriate odds. In various embodiments, payout ratios may be determined based on a desired average amount to be won by a casino per bet received by the casino (e.g., based on a desired house advantage), on a house advantage of the game within which the event is occurring, and/or based on jurisdictional rules pertaining to allowable house advantages.

2.2.1.1. A desired house advantage. In various embodiments, a casino may determine a desired house advantage for a bet on an event in a game. It will be appreciated that the casino may determine any number of equivalent desired metrics, where such equivalent metrics may be determined through deterministic mathematical transformations of a house advantage. For example, a casino may equivalently determine a desired average amount that a player will win per unit wagered. Exemplary house advantages may be 15%, 10%, and 5%. The desired house advantage may be determined based on any number of factors, including perceptions as to what house advantages would be attractive to players while still providing the casino with adequate profits.

2.2.1.2. Same as the gaming device. In various embodiments, a house advantage for an event within a game is determined based on the house advantage for the game itself. For example, the house advantage for a bet on an event in a game may be the same as for the house advantage for a bet on the game. In various embodiments, the house advantage for an event within a game may be close, but not identical to the house advantage of the game. For example, the house advantage of the event may differ by 2 percentage points from the house advantage of the game. Achieving identical house advantages may not be practical due, for example, to a requirement for integer payouts or to a limited number of possible resolutions of an event (e.g., there are only 6 resolutions to the roll of a die).

2.2.1.3. Amount wagered. In various embodiments, the house advantage for an event within a game may be determined based on the amount bet on the event. In some embodiment, the greater the amount bet, the less the house advantage. This provides the player with an incentive to bet more.

2.2.1.4. Jurisdiction minimum. In various embodiments, laws, rules, policies, or other conventions may dictate a maximum allowable house advantage for a gaming device. Accordingly, a house advantage for an event may be determined which is less than or equal to the maximum allowable house advantage.

2.2.2. Player preferences affecting the pay table. In various embodiments, an event in a game may have more than two possible resolutions. For example, the rolling of a die may have six possible resolutions, while the drawing of a card from a deck may have 52 possible resolutions. Payout ratios may be associated with each of the possible resolutions. Thus, a pay table may be formed for the event, where the pay table details payout ratios for one or more of the possible resolutions. In various embodiments, it may be possible to form many different pay tables for the same event. Further, many different pay tables may result in the same or similar house advantages. For example, a first pay table for a roll of a die may provide a payout ratio of 5 for a roll of a 6, and a payout ratio of 0 for any other roll. A second pay table for a roll of a die may provide a payout ratio of 3 for a roll of 6, a payout ratio of 2 for a roll of 5, and a payout ratio of 0 for any other roll. With the first pay table, the player may expect to win 5 times his wager with probability 1/6, yielding an expected payout of 5/6 times his wager, which yields a house advantage of $(1-5/6)/1=16.67\%$. With the second pay table, the player may expect to win 3 times his wager with probability 1/6, or two times his wager with probability 1/6, yielding an expected payout of $3/6+2/6=5/6$. Thus, the second pay table has the same house advantage of 16.67%.

2.2.2.1. Player selects pay tables from range of pay tables. In various embodiments, a secondary player may select among various possible pay tables to use for an event. For example, when betting on the draw of a card, a secondary player may choose a pay table which pays 48 times an initial wager only if an ace of spades is drawn, or the secondary player may choose a pay table which pays 12 times an initial wager if any ace is drawn. In one embodiment, a secondary player may choose between a pay table which provides a relatively high payout with a relatively low probability and a pay table which pays a lower payout or payouts, but with greater probability. Over a set of repeated games, the former pay table would tend to provide less frequent but greater rewards, while the latter pay table would tend to provide more frequent but smaller rewards. A secondary player might therefore decide on his preferred method of receiving rewards. A secondary player may be given the opportunity to select among a range or continuum of possible pay tables, each with approximately the same house advantage, but each having different maximum payouts and/or different frequencies for providing payouts. A player may select a pay table by selecting a maximum payout. Typically, though not necessarily always, a pay table with a relatively higher maximum payout ratio will tend to pay less frequently than does a pay table with a relatively lower maximum payout ratio. A player may also select a pay table based explicitly on a payout frequency associated with a pay table. In some embodiments, the player may adjust a dial, where one limit on the dial is associated with a pay table with one or more relatively high payouts and a relatively low frequency of payout, and an opposite limit of the dial is associated with a pay table with one or more relatively low payouts and a relatively higher frequency of payout.

2.2.3. Determining odds of a particular symbol in a slot machine on a reel. In some embodiments, a player may bet on the occurrence of a particular symbol or indicium during a game. In some embodiments, the probability of occurrence of a symbol may be determined. In some embodiments, the probability of occurrence of a symbol at a particular position may be determined. For example, the probability of occurrence of a particular symbol in the first position across a pay-line of a slot machine may be determined. The determination of a probability of occurrence of a symbol or of a symbol at a particular location may allow the determination of a payout ratio that is commensurate with the probability. For instance, if the probability is determined to be lower, then the payout ratio may be set relatively higher, and vice versa.

2.2.3.1. Monte Carlo. In some embodiments, the probability of occurrence of a particular symbol may be determined through a large number of trials, where each trial may include the playing of a game, or a simulated game. The game may be played at an actual gaming device, at a table game, or on a computer executing game software. The game may be played or run with actual money at risk (e.g., in the form of bets) or with no money at risk. For example, a game at a slot machine may be played ten thousand times. A program may track statistics of interest from the game, such as how often a "cherry" symbol occurred in the first position of the pay-line, how often a "bar" symbol occurred in general, and so on. The probability that a symbol occurs at a particular location on a payline may then be determined as the number of trials in which the symbol occurred at the particular location divided by the number of trials. Analogously, the probability of any an event coming to a particular resolution can be determined or estimated through a large number of trials in which the event occurs, and measuring the proportion of the trials in which the particular resolution occurred.

2.2.3.2. Going through virtual pay table. In some embodiments, the probability of occurrence of a particular symbol at a particular location on a payline may be deduced with reference to an internal algorithm used by a gaming device for generating game outcomes. In some embodiments, the algorithm used may employ one or more "virtual reels".

A virtual reel may comprise a table with one column of outcomes (e.g., a set of symbols), and with one column of ranges of numbers, each range of numbers corresponding to an outcome. A random number generator may generate a random number. The random number may then be matched to an outcome from the virtual reels based on the range of numbers in which the random number falls. Each outcome may thus be assumed to have a probability of occurrence that is proportional to the size of the corresponding range of numbers. For example, an outcome with a corresponding range of numbers of 100-299 is twice as likely to occur as an outcome with a corresponding range of numbers of 300-399, since the first range includes 200 numbers that may be generated by the random number generator, and the second range includes only 100 numbers that may be generated by the random number generator. With reference to the virtual reel, the probability of occurrence of each possible outcome may be determined. Then, the probabilities of all outcomes which include a particular symbol may be added up, thus yielding the probability of the occurrence of that symbol in a game. The probabilities of all outcomes which include a symbol in a particular location may similarly be added to determine the probability of occurrence of that symbol at that particular location. For example, to determine the probability that a "bell" symbol occurs at position 3 in an outcome, the probabilities of occurrence of all outcomes containing the "bell" symbol at position 3 may be added.

2.2.4. Odds of a particular card. In various embodiments, the probability that a particular card will constitute the resolution of a particular event may be determined as follows. First, the number of unknown or unrevealed cards may be determined. Unknown cards may include cards that have not already been shown face-up in a game. Provided the card of interest has not already been shown, the probability may be determined to be equal to one divided by the number of unknown cards.

2.3. Distinguishing between two dice. In various embodiments, a secondary player may wish to place a bet that would have an ambiguous resolution during conventional play of a game. For example, a secondary player may wish to bet that a particular die in a game of craps will show a six. However, the way craps is often played conventionally, it may be difficult or impossible to distinguish between the two dice used in a game. Thus, once the two dice land following a roll, it might conventionally be ambiguous as to which was the die that the player bet on.

2.3.1. Distinguishing two otherwise similar objects. In various embodiments, two or more similar objects used in the play of a game may be made to appear distinct. In a game of craps, two dice may be colored differently. For example, one die may be colored green, while the other is colored red. In this way, a secondary player would be able to bet on either the red die or the green die without worry of an ambiguous result. In a game with three dice, such as in Sic Bo, there may be three dice of different colors. In a game of roulette involving the use of two balls at once, the two balls may include different patterned markings. A player may thereby bet on, e.g., the striped ball or the spotted ball. In some embodiments, two or more similar objects may be made detectably distinct, even if the distinction cannot be made visually. For instance, radio frequency identification (RFID) tags may be placed in or on objects. Two dice with different RFID tags inside them would be distinguishable by an RFID tag reader from the differing signals coming from the tags.

2.3.2. Bet that the lower die will be above two. In some embodiments, a secondary player may place a bet on a resolution of one of several events, in which the one event becomes distinguishable only after all of the events have been resolved. For example, a secondary player bets that the higher of two dice rolled in a game of craps will show a 6. In this example, two events may be deemed to occur, each event constituting the rolling of a die. However, the actual die a player is betting on becomes clear only after both events have resolved. In other words, only after both dice have been rolled and have come to rest can it be determined which is the higher die. A secondary player may, in some embodiments, bet on the lower of two dice, on the middle die (e.g., in a game with three dice), on the roulette ball showing the highest number, and so on. In various embodiments, a secondary player's bet may comprise at least two parts. The first part may be a method to distinguish between two or more events to determine which of the two or more events the secondary player is betting on. The second part may be an indication of what will constitute a winning or losing resolution for the secondary player. For example, suppose that a secondary player bets that the higher of two dice will show a five. The first part of the bet is a way to distinguish the rolling of one die from the rolling of the other die, and indicating which of the now distinct events the secondary player has bet on. The second part of the bet indicates that a winning resolution will be for the die that the player has bet on to show a five.

2.3.3. Specify a position of a card. For example, the third card drawn is the Ace of spades. In some embodiments, in order to clarify the specific event that a secondary player is betting on, a position, location, sequence number, or other clarification may be specified. For example, rather than betting that "a" card will be an ace of spades, a secondary player may bet that "the third card dealt" will be an ace of spades. In a game of video poker, a secondary player may bet that a card in a specified position in a video poker hand (e.g., the fourth card in the final hand), will be of a certain rank and suit. In a game of a blackjack, a secondary player may bet, for example, on the first card dealt to a player, the second card dealt to a player, the third card dealt to a player, etc. The secondary player may also bet, for example, on the first card dealt to the dealer, the second card dealt to the dealer, etc. The player may also specify an event by means of an orientation. For example, in a game of blackjack, the secondary player may bet on the dealer card that is face down, or on the dealer card that is face up.

2.4. Receive aids in your prediction. In various embodiments, a secondary player may be provided with data, hints, or other aids in making bets on an event in a game. Data may include historical data relevant to the game at hand. For example, if a secondary player is to bet on the decision that will be made by a primary player, data about the decision of the primary player in prior games might aid the secondary player in his bet.

2.4.1. The sequence of what occurred in the past. In various embodiments, a secondary player may be shown or otherwise provided with data from games or events within games that were played prior to the game that includes the event on which the secondary player is betting. The data may help the secondary player to choose a resolution of the event which will constitute a winning resolution. A secondary player who is to bet on a particular event in a particular game played by a particular primary player may be shown data about other events that have occurred. Other events may include events that have occurred: (a) in games played by the same particular primary player; (b) in games under similar circumstances to those which are present in the particular game (e.g., the same initial two cards occurred in a prior game of blackjack as have in the particular game, and the particular event of interest is the dealing of the third card in the particular game); (c) in games played at the same gaming device that the particular game is or was played at; (d) in the recent past (e.g., events that have occurred in the five minutes prior to the time that the secondary player bets on the particular event); (e) just prior to when the particular event originally occurred (e.g., events occurring in games that had been played in the five minutes prior to the particular game); (f) in games played at the same gaming device that the particular game is or was played at, where such games constitute a sequence of games that immediately preceded the particular game (e.g., such games were the five games played before the particular game); and (g) in games played by the same particular primary player, where such games constitute a sequence of games that the primary player played immediately preceding the particular game.

2.4.2. What would perfect strategy be here? In various embodiments, a secondary player may be provided with an indication of a decision that would be made according to some strategy. For example, if a secondary player is betting on the decision that will be made by a primary player in a game of blackjack, the secondary player may be shown what decision would be made using Basic Strategy (i.e., the strategy used to maximize expected winnings without any special knowledge of what cards have already been dealt). For example, the secondary player may be told that the proper decision according to Basic Strategy is for the primary player to hit. As another example, if a secondary player is betting on what cards will be discarded by a primary player in a game of video poker, the secondary player may be told which combination of discards would maximize the expected winnings for the primary player. In various embodiments, the secondary player may be told what decision would be made according to a strategy that is not a perfect or optimal strategy. For example, a secondary player might be told which decision would be made according to a strategy that aims for the highest payout in a game.

2.4.3. What has this player done in similar situations? In various embodiments, a secondary player may be provided with an indication of what decisions a primary player has made in situations which are similar to the situation of the game in which the secondary player is participating. Games in which a primary player was in a similar situation may include games in which the primary player: (a) had the same cards; (b) had the same point total (e.g., in a game of blackjack); (c) had the same hand ranking (e.g., in a game of poker); (d) had the same sequence of initial events (e.g., in a game of craps, the primary player had the same three initial rolls as he does in the game situation under consideration); (e) was in the same seat position (e.g., the primary player was just to the left of the dealer); (f) faced the same opponent or opponents; (g) was at the same gaming device; (h) faced the same bet or bets from opponents (e.g., in a game of poker, the primary player may have faced the same bets that he does at present); and so on. Games in which the primary player was in a similar situation may include games in which the dealer had a similar hand (e.g., in a game of blackjack, the dealer had the same card showing), or games in which an opponent of the primary player had a similar card to what the primary player's opponent has in the game under consideration. In some embodiments, the secondary player may be provided with an indication of what the primary player did in games with similar external contexts, such as games played at the same time of day, games played at the same table, games played at the same casino, games played just after a big loss for the primary player, and so on.

2.4.4. What cards have been dealt already? In various embodiments, a secondary player may be provided with an indication of what cards have already been dealt in a game. For example, in a game of blackjack, the secondary player may be told what cards have been dealt from a deck in prior games where the deck was used. If, for example, the secondary player thinks the primary player has been counting cards, the secondary player may use information about prior cards dealt in order to predict the reaction by the primary player to the card count. In a game of poker, the secondary player may have the opportunity to view cards that have been dealt, e.g., as part of an initial hand. Looking at the cards of the initial hand may then help the secondary player to better predict a primary player's decision.

2.4.5. The secondary player is provided with a probability. In various embodiments, a secondary player may be provided with the probability of a particular resolution to an event. For example, if the secondary player is betting on the roll of a die, the secondary player may be told that the probability of a six being rolled is 1/6.

2.4.6. Regulatory requirements for hints. In various embodiments, regulations may dictate whether or not a hint must be provided. In some embodiments, regulations may dictate that the probability of a resolution be provided. In some embodiment, regulations may require that a secondary player be given a probability that an event comes to a particular resolution if there would be no way for the secondary player to know such a probability. For example, while it is possible for a secondary player to know the probability that a 6-sided die will land in a certain way, a secondary player may have no way of knowing that a reel of a slot machine will display a certain symbol since the reel may be controlled by a secret algorithm. In some embodiments, regulations may dictate that a hint not mislead a secondary player. For example, in game of video poker, a hint inform a secondary player of a decision that would be made by a primary player using a particular strategy. However, the strategy may not be a strategy that would typically be employed by any player, and thus the hint would not likely give the secondary player the proper direction. In some embodiments, regulations may dictate the form in which a hint must be provided. Regulations may require that a hint be given in multiple languages. Regulations might require that a player have the option of which language will be used to view the hint.

2.4.7. Form of hints (for example, secondary players are simply not allowed to make certain bets). In some embodiments, a hint may take the form of preventing a secondary player from making certain bets. Such bets may be disadvantageous for the secondary player or for the casino. For example, a graphical user interface may display options for what resolutions the secondary player can bet on. In a game of blackjack, such options may include a "hit" option for betting that a primary player will hit, a "stand" option for betting that a primary player will stand, and a "double down" option for betting that a primary player will double down. If the primary player has been dealt an initial hand with a point total of 10, then the "stand" option may be grayed out such that the secondary player cannot bet that the primary player will stand. This is because it would make no sense for the primary player to stand when the primary player can hit, increase his point total, and have no risk of busting.

2.5. Setting the odds on an event. In some embodiments, the casino may set the payout odds on an event by reference to historical data. Historical data may be used to arrive at a probability of a resolution of an event. For example, historical data may be used to determine the probability with which a primary player will make a particular decision in a game. This probability may be used, in turn, to provide payout odds to a secondary player who wants to bet that the primary player will make the particular decision.

2.5.1. Data not including the current game. In some embodiments, the casino may use data from historical games of primary players in order to determine a probability that a primary player will make a particular decision. For example, the casino may examine a set of historical games in which various primary players had hands with 16 points against a dealer's 10 points showing. The casino may determine the number of primary players who hit and the number of primary players who stood in order to arrive an estimated probability for what a primary player will do in a particular game under consideration. For example, the casino may look at 100 historical games and may find that 45 times the primary player hit, and 55 times the primary player stood. Thus, the casino may determine that there is a 45% chance that a primary player will hit and a 55% chance that a primary player will stand under a similar situation. Once the casino has an estimate of the probabilities of various outcomes, the casino may set payout odds in order to create a positive house advantage. For example, in the aforementioned example, the casino may set payout odds of 1:1 if the secondary player bets on "hit", and 3:4 odds if the secondary player bets on stand. In various embodiments, historical data may include data about historical games of the primary player who is involved in the particular game in question. For example, to determine the probability that a particular primary player will make a decision, the casino may look at historical data for that primary player.

2.5.2. Data including the current game. In some embodiments, payout odds may be set for a game based on a set of games which include that game. For example, the casino may use a set of games that include X (e.g., 1000) games in which a player had a pair of nines and the dealer showed an 8 in a game of blackjack. The casino may determine how many times the player with the nines split, and how many times the player just stood. The casino may thus know, with certainty, the probability that the nines would be split and the probability that the primary player would stand for a game randomly selected from the set of X games. Accordingly, the casino could then set payout odds for a bet on standing and a bet on splitting. The casino could set such payout odds in order to create a positive house advantage. The casino may then allow a secondary player to bet on a decision of a primary player in a game from the set of 1000 games, such as from a randomly selected game of the set of 1000 games.

2.6. Bet on a random action in the game. In various embodiments, a secondary player may bet on the resolution of any desired event. For example, in a table game of craps, the secondary player may bet that one die will bounce off the table. In a game of poker, the secondary player may bet that one of the primary players will throw his cards, that a primary player will get ejected from the game, that a primary player will bet out of order, or that any other resolution to an event will occur. In some embodiments, a secondary player may bet on any resolution that is external to the normal play of a game. For example, the secondary player may bet that a player will spill a drink at a gaming table.

2.7. Bet on a particular sub-outcome. There are many events on which a secondary player may bet. For each event, there may be one or more resolutions on which the secondary player may bet.

2.7.1. blackjack. In a game of blackjack a secondary player may bet on: (a) the rank or suit of a particular card, such as the first, second, third, etc. player card or the first, second, third, etc. dealer card; (b) a decision that will be made by a primary player (e.g., hit, stand); (c) a decision that will be made by a dealer; (d) whether a primary player will bust; (e) whether a dealer will bust; (f) whether the primary player will receive two identical cards; (g) whether the primary player will receive two or more cards of the same suit; (h) whether two primary players in a game receive the same cards; (i) a starting point total for a primary player; (j) a starting point total for a dealer; (k) whether a primary player's ending point total will fall within a particular range; and so on.

2.7.2. Roulette. In a game of roulette, a secondary player may bet on (a) red; (b) black; (c) a particular number; (d) a particular range of numbers; (e) the occurrence of a number in a particular sector of a wheel; (f) an amount that a primary player will bet; (g) a number that a primary player will bet on; (h) green; and so on.

2.7.3. Slot machines. In a slot machine game a secondary player may bet on: (a) the occurrence of a symbol on a reel; (b) the occurrence of a set of symbols on a set of reels (e.g., the secondary player bets that the first reel will show a "bar" and the second reel will show a "lemon"); (c) whether a bonus round will be reached; (d) the level of a bonus round that will be reached; (d) a decision that a primary player will make in a bonus round; (e) a resolution of a bonus round (e.g., how much money the primary player will win from the bonus round); (f) the amount that the primary player will bet; (g) the number of pay-lines that the primary player will bet; (h) the number of pay-lines that will win, and so on.

2.7.4. Card Games. In a card game, such as a game of poker, a secondary player may bet on: (a) the occurrence of a particular card in a hand of cards; (b) the occurrence of a particular combination of cards in a hand of cards (e.g., the occurrence of a pair); (c) an order in which cards are dealt (e.g., the secondary player may bet that each card dealt will have a higher rank than the last card dealt); (d) a position in which a card will be dealt (e.g., an ace will be dealt as the first card in a player's hand; and so on.

2.7.4.1. Poker. In a game of poker, a secondary player may bet on what bets will be made by primary players in the game. A secondary player may bet on whether a bet will be a check, call, bet, raise, or fold; on how much a primary player will bet; on how many callers there will be for a bet or raise; on how many times a pot will be raised; on how many rounds of betting there will be; on how many players will be all-in; and so on. In some embodiments, a secondary player may bet on the total size of a pot. In some embodiments, a secondary player may bet on whether there will be a tie. In some embodiments, a secondary player may bet on the size of a side-pot.

2.7.5. Dice Games. In a game of dice, a secondary player may bet on one roll of the dice. For example, the secondary player may bet that two dice rolled will total to 12. In a game of Sic Bo, a player may bet that one of the three dice rolled will show a 4.

2.8. Bet on length of the game. In various embodiments, a secondary player may bet on the length of a game.

2.8.1. Time. A secondary player may bet on the time that a game will last. A game may be counted to start when a primary player makes a bet, when a first random event occurs in a game, when a first card is dealt, when a first roll of the dice is made, when a first player decision is made, and so on. A game may be counted to end when a payout is made, when a player's bet is collected, when a last random outcome is generated, when objects used in a game are collected (e.g., when cards are collected), when a payout is announced), or when a subsequent game starts.

2.8.2. Number of cards required. In some embodiments, a secondary player may bet on the number of cards that will be dealt in a game. A secondary player may bet on the number of cards that will be dealt to a particular hand (e.g., to a player hand in blackjack; e.g., to a dealer hand in blackjack); or to a particular combination of hands (e.g., to the hands of both the player and the dealer; e.g., to three players in a game of blackjack). A secondary player may bet on the number of cards that will be dealt as common cards. For example, regarding a game of Texas Hold'em, the secondary player may bet that all five common cards will be dealt. In other words the secondary player may bet that at least two people will remain in the game until the fifth common card is dealt.

2.8.3. Number of rolls of dice required. In various embodiments, a secondary player may bet on the number of rolls of dice that will occur in a game. For example, a secondary player may bet that there will be seven rolls of dice in a game of craps. In other words, the secondary player may bet that the primary player will set a point and then take six additional rolls to either roll the point number again or achieve a seven.

2.8.4. Number of bonus round levels reached. In various embodiments, a secondary player may bet on the number of levels that a primary player will reach in a bonus round, e.g., in a bonus round of a slot machine game. A bonus round may have a plurality of separate levels. If a primary player does well in earlier levels, e.g., by correctly choosing the location of hidden treasures, the primary player may make it to later levels. However, if the primary player does poorly in earlier levels, the primary player may not reach later levels. Thus, the number of levels reached in a bonus round may be effectively random. In some embodiments, a secondary player may bet on the number of spaces a character will advance on a game board in a bonus round. For example, regarding a bonus round in a game of Monopoly®, a secondary player may bet on the number of spaces that a game character will traverse on the game board. In some embodiments, a secondary player may bet on the space or spaces on which a game character will land in a game. For example, a secondary player may bet that a game character will land on Boardwalk in a game of Monopoly®.

2.9. Bet on a different game within the game. E.g., bet on poker within blackjack. In some embodiments, a secondary player may bet on the occurrence of an outcome from a first game, but in the context of a second game. For example, a secondary player may bet that a primary player who is involved in a game of blackjack will receive cards that create a poker hand which is three-of-a-kind. In a game of Sic-bo, a secondary player may bet that two of three dice used will form a winning roll in a game of craps.

2.10. Bet on the order in which people will remain in the game. Various games include multiple primary players. In some multi-player games, players may be eliminated or may drop out of the games. For example, in a game of poker, players may drop out of the game as they fold. In various embodiments, a secondary player may bet on the manner in which primary players are eliminated.

2.10.1. Who will be the first one out? In various embodiments, a secondary player may bet on which primary player will be the first primary player eliminated. A secondary player may bet on who will be the second primary player eliminated, the third primary player eliminated, or who will be the primary player eliminated in any other spot.

2.10.2. Who will be the last two standing? In various embodiments, the secondary player may bet on which primary player will be the last one remaining. The secondary player may bet on who will be the second to last primary player remaining, who will be the third to last remaining, and so on. The secondary player may bet on who will be the last two primary players remaining. In various embodiments, the secondary player may bet on any combination of primary players and on any combination of places (e.g., last, second to last) in which primary players are eliminated. The secondary player may win the bet if the designated combination of primary players was eliminated in the designated combination of places. A secondary player may bet that a particular three primary players will be the last three remaining, regardless of the order in which they are eliminated after the final three. In some embodiments, the secondary player may bet not only that a particular group of primary players will be the last three remaining, but also on the order in which the last three will be eliminated (e.g., players A, B, and C will be the last three, player A will be the last, and player B will be the second to last remaining).

2.10.3. Who will be the three in after the flop? In various embodiments, a secondary player may bet on the number of primary players that will be remaining in a game at a certain point in the game. For example, a secondary player may bet on the number of primary players that will be remaining by the flop in a game of Texas Hold'em poker, or by fifth street in a game of seven-card stud poker. A secondary player may bet on how many primary players will be remaining in a game after X number of cards have been dealt in the game, regardless of whom the cards have been dealt to. A secondary player may bet that a particular primary player will remain in a game at a certain point in the game. For example, a secondary player may bet that primary player Joe Smith will be remaining in the game after the flop.

2.10.4. Which three people won't bust? In various embodiments, a secondary player may bet on a combination of people who will bust in a game of blackjack. For example, a secondary player may bet that, of a particular group of three primary players in a game of blackjack, all will bust. A secondary player may bet that one player will not bust. A secondary player may bet that of a group of primary players, none will bust during a game.

2.11. Bet on what the primary player himself will do. In some embodiments, a secondary player may bet on a decision that will be made by a primary player in a game.

2.11.1. The primary player will hit here. In some embodiments, a secondary player may bet on a decision that a primary player will make in a game of blackjack. A secondary player may bet that a primary player will do one or more of the following: (a) hit; (b) stand; (c) surrender; (d) split; (e) double down; (f) take insurance.

2.11.2. The primary player will draw to the flush. In some embodiments, a secondary player may bet on a strategy that a primary player will employ in a game of video poker. The strategy may be specified with a specification of which cards a primary player will discard. For example, the secondary player may specify that the primary player will discard the first, third, and fourth cards from a starting hand. In some embodiments, the secondary player may specify one or more cards that will be discarded while not excluding the possibility that additional cards might be discarded. For example, the secondary player may specify that the primary player will discard the second card in his hand. The secondary player may then win his bet if the primary player discards the second card, regardless of other cards that the primary player might discard. A secondary player may specify the strategy of a primary player in terms of a goal attributable to the strategy. For example, the secondary player might specify that the primary player will "draw to a flush" or "draw to a straight".

2.11.3. How much will the primary player bet? In some embodiments, a secondary player may bet on the amount that a primary player will bet. For example, the secondary player may bet that a primary player will bet $5 in a slot machine game. For example, the secondary player may bet that the primary player will raise by $25 in a game of poker.

2.11.4. What bet will the primary player make? In various embodiments, a secondary player may bet on a particular bet that a primary player will make in a game. For example, in a game of craps, there are many possible bets that a primary player can make, including a pass bet a don't pass bet, an "any seven" bet, an "any eleven" bet, a "horn bet", and so on. The secondary player may bet on which of these, or other possible bets, the primary player will make.

2.11.5. Which pay-lines will the primary player activate? In various embodiments, a secondary player may bet on whether or not a primary player will bet on a particular pay-line at a gaming device. For example, a gaming device may have three pay-lines. A secondary player may bet that the primary player will bet on the third pay line.

2.11.6. Bet on primary players' heart rate, breathing, and other bio signatures. In various embodiments, a secondary player may bet on a vital sign of a primary player. The secondary player may bet on the heart rate, breathing rate, blood pressure, skin conductivity, body temperature, pupil dilation, muscle tension, or any other indicator tied to the primary player. For example, the secondary player may bet that the peak heart rate of a primary player will be 120 during a game of poker. For example, a secondary player may bet that a primary player will take 5 breaths in the next minute. The secondary player, by betting on the vital signs of a primary player, may indirectly bet on the stress level of a game and/or the primary player's response to stressful stimuli.

2.11.7. When will the primary player stop playing? Now? After five games? In various embodiments, a secondary player may bet on the length of a playing session of a primary player. The length may be measured in terms of time, the number of games played, the number of bets made, the number of cards dealt during a session, the number of times dice are rolled, or in terms of any other metric. For example, a secondary player may bet that a primary player will play five more games before quitting. For example, a secondary player may bet that a primary player will play for 40 more minutes before quitting. A session may be defined as having ended after: (a) a primary player has stopped playing for X amount of time; (b) a primary player has left the location of a game; (c) a primary player has cashed out; (d) a primary player has exchanged chips for money; (e) a primary player has run out of money; and so on.

2.11.8. What drink will the primary player order? In various embodiments, a secondary player may bet on a service that the primary player will receive. A secondary player may bet on a drink a primary player will order, on the type of food the primary player will order, on the price of a primary player's food or drink, on the amount that a primary player will tip a casino representative, and so on.

2.11.9. How many pulls will the primary player complete in an hour? In various embodiments, a secondary player may bet on the speed with which a primary player plays. A secondary player may bet on: (a) the number of handle pulls that a primary player makes in an hour or in any period of time; (b) the time between two handle pulls; (c) the time between the start of two games of blackjack; (d) the time between the placing of a bet in a game and the time of the provision of a payout; and so on.

2.11.10. Any combination of what primary players will do. For example, five primary players split. In various embodiments, a secondary player may bet on any combination of decisions that will be made by primary players in a game. For example, a secondary player may bet that at least 3 primary players will split in a game of blackjack; a secondary player may bet that a particular group of three primary players will split in a game of blackjack; a secondary player may bet that exactly three primary players in a game of blackjack will hit and that exactly one will split; and so on. Regarding a game of poker, a secondary player may bet that exactly two primary player will call a particular bet. In various embodiments, a secondary player may bet that certain decisions will or will not be made without regard to who makes the decisions. For example, regarding a game of poker, a secondary player may bet that one primary player will bet and that three primary players will call, without specifying which primary players will be the ones to bet and call. The secondary player may win his bet if any primary player bets and if any three primary players call.

2.12. Bet only on the third pay-line. Unlike the primary player, the secondary player does not have to bet on pay-lines 1 and 2 before betting on pay-line 3. In various embodiments, a secondary player may bet on an event in isolation on which the primary player was not allowed to bet in isolation. For example, the secondary player may bet on only the third pay-line of a slot machine. However, the primary player may have been required to bet on the first and second pay-lines at the slot machine before he could bet on the third pay-line. In a game of craps, a secondary player may be allowed to make an odds bet even without making a pass-line bet. Often, a primary player must first make a pass-line bet before making an odds bet.

2.13. Bet on what ad shows on the gaming device. In various embodiments, a secondary player may bet on an advertisement that will be displayed on a gaming device. In various embodiments, a gaming device may display an advertisement. In various embodiments, a gaming device may display an advertisement occasionally or periodically. An advertisement may be displayed at random or according to a schedule that is unknown to the secondary player. Accordingly, the secondary player may bet on what advertisement will be shown at a gaming device. For example, a secondary player may bet that an advertisement for vitamin water will be displayed on a gaming device. An advertisement may take the form of text, a still image, a video, or any other output that serves to promote a product or service, either directly or indirectly. A secondary player may specify a bet on an advertisement by specifying the product that will be promoted. For example, a secondary player may specify that Triscuit crackers will be advertised. A secondary player may specify a bet in terms of a general product category, such as crackers or snack foods. A secondary player may specify a bet on an advertisement by specifying a brand for a product or a name of a manufacturer for a product. In some embodiments, a secondary player may specify a bet on an advertisement through a multiple choice selection, where the secondary player may specify from among multiple possible different products to bet on. In some embodiments, a secondary player may bet on the time until the next advertisement. In some embodiments, a secondary player may bet on when the next advertisement for a particular product will be.

2.14. Combine sub-outcomes from several games to form larger outcomes. In some embodiments, a secondary player may bet on the outcome of a game which is created synthetically using events from more than one game. For example, synthetic game may be created for the secondary player using a first set of cards that was dealt in a first game for a primary player, and a second set of cards that was dealt in a second game for the primary player. As another example, a synthetic game may be created using a first roll of two dice from a first craps game, and a second roll of two dice from a second craps game. As another example, a synthetic slot machine game may be created using the symbol appearing on reel 1 in a first game, the symbol appearing on reel 2 in a second game, and the symbol appearing on reel 3 in a third game. If, for example, all three symbols are "cherry", then the secondary player may be paid as if all three cherries had occurred on the same spin on adjacent reels.

2.15. Bet on a machine malfunction, or coin refill. In various embodiments, a secondary player may bet on the occurrence of a machine malfunction. For example, a secondary player may bet that a machine will malfunction within the next hour. In various embodiments, a secondary player may bet that a gaming device will need a coin refill. For example, the secondary player may bet that a gaming device will need a coin refill within the next 10 minutes.

Embodiments described herein with respect to complete games or outcomes may similarly apply to events within a game. For example, just as a secondary player may search for games having particular characteristics, a secondary player may search for events within a game having particular characteristics, or a secondary player may search for games with particular characteristics so as to bet on events within such games. A secondary player may search for particular primary players and bet on events within the games of such primary players.

In some embodiments, a secondary player may seek to view historical or current games. The secondary player may desire to participate in the games. The secondary player may, in some embodiments, perform a search for games which satisfy a first set of criteria. For example a secondary player may search for games which were played by a particular primary player. The search may yield a plurality of games. The games may then be sorted using a second set of criteria. The plurality of games may be sorted according to: (a) the time at which the games were played (e.g., the games may be sorted from the most recently played to the one played the furthest in the past); (b) the amounts won in the games (e.g., the games may be sorted from the game with the highest payout to the game with the lowest payout); (c) the amounts bet on the games; (d) the rankings of hands dealt in the games (e.g., games of poker may be sorted according to the poker ranking of the initial hand; e.g., games of blackjack may be sorted according to the point total of the final hand); (e) the results of the games (e.g., the primary player won; e.g., the dealer won); (f) the initial number rolled on a die in each game of the games; (g) the location in which the games were played (e.g., games may be sorted according to the floor in the casino where the games were played); (h) the name of the gaming devices on which the games were played (e.g., games may be sorted such that the gaming devices on which the games were played are in alphabetical order); (i) the name of the primary players who initially played the games; (j) the number of secondary players who participated in each of the games; and so on.

Any physical game described herein may be implemented electronically in various embodiments. For example, embodiments pertaining to the play of blackjack at a physical card table may pertain as well to a game of blackjack played over an electronic network. For example, a primary player may play blackjack using a video blackjack device. As another example, a primary player may play blackjack over the Internet. A secondary player may bet on the outcomes of the game of the primary player and/or on events within the game of the primary player.

In various embodiments, a secondary player may participate in the game of a primary player, but take the game in a different direction from the direction in which the primary player took the game. For example, the primary player may be involved in a game which requires a decision on the part of the primary player. The primary player may make a first decision in the game. The secondary player, meanwhile, may be participating in the game, but may prefer a different decision from the decision made by the primary player. Thus, the secondary player may have the opportunity to complete the game in a different fashion than does the primary player. For example, the outcome based on which the secondary player is paid may be different from the outcome based on which the primary player is paid. Note that the secondary player may participate in a game after the primary player has participated in the game. Thus, the secondary player may participate in a historical game. The secondary player may, nevertheless, seek to take a different direction in the game than what happened in the original game.

The following is an example of some embodiments. A primary player begins play of a game of blackjack. The primary player is dealt a nine and a three as his initial hand. The dealer shows a two face up. The primary player decides to hit. The primary player is dealt a ten and therefore busts because his point total is now 22. The secondary player, prior to seeing the ten which was dealt to the primary player, decides he would rather stand than hit. At this point, the casino server determines what would have happened had the primary player stood. The casino server may then play the dealer's hand, or at least a simulated version of the dealer's hand. The casino server may reveal the dealer's down card to be a 10, providing the dealer with an initial point total of 12. The casino server may then make a hit decision on behalf of the dealer. The casino server may then deal a 10 to the dealer (the same 10 that had gone to the primary player before). The dealer then busts, and the secondary player wins. Thus, both the primary player and the secondary player have started from the same game. However, the primary player and the secondary player have taken the game in different directions by making different decisions at a juncture in the game. As a result, the primary player has lost but the secondary player has won.

3. In various embodiments, a secondary player may replay and/or redo some aspect of a game of a primary player.
   3.1. A secondary player may redo a game knowing different information from what the primary player knew. When facing a decision in a game, a primary player may have a given amount of information available to him. For example, in a game of blackjack, a primary player facing a decision to "hit", "stand", "double down", "split" or "surrender", may know his own two cards and one of the dealer cards. However, the primary player may not know other potentially valuable information, such as the dealer's face-down card, or the next card to be dealt at the top of the deck. In various embodiments, a secondary player participating in the game of a primary player may have access to additional information that the primary player does not or did not have at the time the primary player originally plays or played the game.

3.1.1. Know the cards yet to come. In various embodiments, a secondary player participating in the game of a primary player may be presented with information about a card that was unknown to the primary player at the same juncture in the game. For example, a secondary player participating in a game of video poker may be presented with information about the next card to be dealt in the deck. In various embodiments, a secondary player may be presented with information about a card: (a) in the dealer's hand; (b) in an opponent's hand (e.g., in the hand of an opponent in a game of Texas Hold'em); (c) in another primary player's hand (e.g., in the hand of another primary player in a game of blackjack in embodiments where primary player hands are not dealt completely face up); (d) that was burned; (e) that will not be dealt (e.g., a card at the bottom of a deck of cards may have no chance of being dealt in a game); (f) that is unlikely to be dealt (e.g., a card that is in the middle of a deck may be unlikely to be dealt in a game); and so on. Information about a card may include information about a suit of the card, and information about a rank of a card. For example, a secondary player may be told that a card is a heart, or that a card is not a spade. For example, a secondary player may be told that a card is a 10-point value card (e.g., in a game of blackjack). For example, a secondary player may be told that a card's rank is between two and six, or that a card is not a seven. In various embodiments, a secondary player may be told the exact rank and suit of a card, such as a queen of diamonds.

3.1.2. Know the primary player made a losing decision. In various embodiments, a secondary player may be given information about the consequences of a primary player's decision in a game. For example, the secondary player may be told that the primary player's decision resulted in the primary player losing a game. For example, if a primary player in a game of blackjack decided to hit and busted, a secondary player may be told that the primary player's decision led to the primary player busting. A secondary player may be told that a primary player's decision did not achieve the best possible outcome of a game. Even if a primary player's decision led to a winning outcome, the secondary player may still be told that the primary player's decision did not lead to the best possible outcome. For example, in a game of video poker, if a primary player drew three cards and made a three-of-a-kind, the primary player may have had the potential to draw three cards in a different way and to make a straight-flush. Thus, the primary player may not have obtained the best outcome that he could of. Of course, the primary player may have made the correct decision from his point of view since he did not know that he would have been able to successfully draw to the straight-flush. In various embodiments, a secondary player may be informed of the relative merits of the primary player's decision or strategy in relation to other possible decisions or strategies. For example, regarding a game of video poker, a secondary player may be told that the primary player made the second best possible decision in terms of what outcomes the primary player could have achieved. In various embodiments, the secondary player may be told the merits of a primary player's decision or strategy assuming the primary player had perfect information about what the results of the various decisions or strategies would be. In some embodiments, the primary player will not have or have had perfect information about the consequences of his decisions, so that pronouncements on the merits of the primary player's decisions would not necessarily indicate that the primary player made a bad or wrong decision. In some embodiments, a secondary player may be provided with an indication of the merits of a strategy or decision, whether or not the primary player chose such a decision or strategy. For example, in some embodiments, a secondary player may be told that a particular strategy is a good strategy but not the best possible strategy. For example, a secondary player may be told that a particular strategy is a losing strategy. In various embodiments, the casino may have knowledge about cards that would be unknown to the secondary player in a game. Thus, the casino may be able to inform the secondary player based on such knowledge and thereby provide useful strategy recommendations to the secondary player without explicitly sharing the knowledge.

3.2. A secondary player may redo a game with the same ordering of a deck of cards, or with a different ordering. In various embodiments, the consequences of all possible primary player decisions are determined in advance, e.g., at the beginning of a game or prior to a decision of a primary player. For example, in a game of video poker, the shuffling and ordering of a deck of cards before a game serves to determine the consequences of any decision the primary player may make in a game. For example, the shuffling leads to a particular order of the deck such that any new cards that the primary player may decide to draw can be determined deterministically by dealing cards from the top of the deck. In various embodiments, the consequences of all combinations of primary player decisions in a game may be determined in advance. For example, in a game of blackjack, the shuffling of a deck before a game may place the cards to be dealt to primary players in a deterministic order. Thus, for a given set of primary player decisions (and given rules dictating what decisions must be made by the dealer), an outcome of the game for each set of primary player decisions may be determined deterministically from the ordering of cards in the deck. In various embodiments, the symbols that will be revealed on each reel of slot machine are determined in advance and prior to the revelation of even a single symbol. For example, the symbol that will be revealed on the third reel of a slot machine may be determined even before the symbol on the first reel of the slot machine is revealed. In various embodiments, the advanced determination of all possible consequences of a primary player's decision may or may not also apply to a possible alternate decision by a secondary player. In various embodiments, the advanced determination of one or more symbols in a game may or may not apply to the secondary player prior to the revelation of the symbols to the primary player or to the secondary player.

3.2.1. Same ordering. In various embodiments, the advanced determination of all possible consequences of a primary player's decision may apply in the same way to the possible consequences of a secondary player's decision. In other words, suppose the primary player is or has played a game, and the secondary player is participating in the game. At a given juncture in the game, a particular decision by the secondary player (e.g., "hit") will have the same consequences for the secondary player as the same particular decision made by the primary player would have for the primary player. For example, a decision by the secondary player to "hit" would result in the secondary player being dealt a four of diamonds. Likewise, a decision by the primary player to hit would result in the primary player being dealt the four of diamonds. It should be noted that for the primary player and the secondary player to experience the same consequence given the same decision may mean that the primary and secondary players will experience the same outcomes or will receive the same symbols or indicia. The actual payouts received by the primary player and the secondary player may differ, in some embodiments, due to differing bets by the primary and secondary players.

In various embodiments, a secondary player may decide to continue a game that has already been started. The secondary player may decide to join a game, for example, after an event within the game has been resolved. For example, a secondary player may decide to join a game after a first symbol on reel of a slot machine has been revealed, but before symbols on a second reel or on a third reel have been revealed. Once the secondary player decides to join the game, the game may proceed exactly as it had for the primary player who originally played the game (or exactly as it will for the primary player currently involved in the game). In other words, once the secondary player joins the game, the secondary player may receive the same outcome of the game that the primary player does or has. This may occur by virtue of the outcome of the game having been determined in advance, even before the revelation of the first symbol, for example.

3.2.2. Different ordering. In some embodiments a secondary player may participate in the game of a primary player, make all the same decisions as does the primary player, yet achieve a different result. The consequences of secondary player decisions may not be the same as the consequences of primary player decisions. In some embodiments, the consequences of a secondary player's decisions are determined after the start of a game. For example, the consequences of a secondary player's decisions are determined at the juncture in a game where a secondary player makes a decision, just prior to when a secondary player makes a decision, or even after a secondary player makes a decision. The consequences of possible decisions to be made by a secondary player may be determined by shuffling a remaining portion of a deck of cards from which cards will be dealt in the game in which the secondary player is participating. For example, suppose a primary player has been involved in a game of blackjack and has received an initial two-card hand. The primary player may decide to hit, and may thereby receive a king of clubs dealt from the top of the deck. A secondary player may participate in the same game. The secondary player may also decide to hit after the initial two-card hand has been dealt. However, prior to the second player receiving a new card in his hand, the remaining portion of the deck of cards may be reshuffled. Thus, the secondary player may receive a different card than did the primary player, e.g., the secondary player may receive the five of hearts. Thus, the consequences of the secondary player's decision to hit will have been determined only after the secondary player has made his decision, the determination being made through the reshuffling of the deck of cards.

In embodiments where the secondary player does not make the same decision as does the primary player, the consequences of the secondary player's decision may not necessarily be determined at the beginning of the game. For example, in a game of video poker, a primary player may decide to discard the fourth and fifth cards from a starting hand. The secondary player, who is participating in the same game as the primary player and therefore has the same starting hand, may instead decide to discard the first and second cards from the starting hand. The primary player may be dealt a ten of diamonds and a queen of clubs. The secondary player may be dealt a jack of hearts and a nine of hearts. The secondary player may receive different cards than does the primary player because the cards to be dealt to the secondary player after the initial hand may be determined using a separate randomization process from that used to determine the cards dealt to the primary player after the initial hand. For example, after the initial cards in a game of video poker have been dealt, the remaining cards in the deck may be reshuffled from the order they had in the deck used in the game of the primary player. In some embodiments, the remaining cards in the deck may be reshuffled in both the game of the primary player and in the game of the secondary player. The two reshufflings may be different from one another, however, so that the order of the remaining cards in the deck for the primary player is different from the order of the remaining cards in the deck for the secondary player. In various embodiments, a copy of a game, a deck, or of other game elements may be used in completing a game of a secondary player. For example, when a primary player begins a game, the deck of cards used in the game of the primary player may be copied. The deck may be copied so that the order of the cards within the deck is copied as well. The primary and the secondary player may then play out the remainder of the game from the two separate copies of the deck, without interfering with one another. In one embodiment, both the primary player and the secondary player start out using the same deck to generate, e.g., an initial hand. Thereafter, the remaining portion of the deck (e.g., the part of the deck that hasn't been dealt yet), is copied. This part of the deck may then be reshuffled, or it may not be reshuffled. The secondary player may then play out the remainder of the game using the copied portion of the deck. Thus, the secondary player may play out the remaining portion of the game separately from the primary player without interfering with the game of the primary player.

In various embodiments, a secondary player may participate in slot machine game. A first symbol from the slot machine game may be revealed. The secondary player may wish to continue the game from the point after the first symbol has been revealed. However, the secondary player may wish to continue the game in a different fashion from that in which the primary player has continued the game. In other words, the secondary player may want the remaining symbols of his outcome to be generated randomly using a different random process than that used to generate the remaining symbols for the primary player. Thus, in some embodiments, the casino (or the gaming device working on behalf of the casino) may randomly determine additional symbols to generate and display for the secondary player, where such symbols need not necessarily be the same as those generated and displayed for the primary player. In various embodiments, a casino may randomly determine a way to generate additional symbols as follows. A casino may determine all outcomes containing the one or more symbols that have already been generated. Such outcomes may be probability weighted so that, for example, it is understood that some are more likely to occur than others. The casino may then select from among the probability weighted outcomes randomly and in proportion to their weightings. Thus, for example, an outcome with twice the probability weighting of another outcome would be twice as likely to be selected.

3.3. A secondary player may redo the game after the fact. In various embodiments, a secondary player may replay a game from a certain juncture after the game has already been completed. For example, one hour after a game of video poker has been completed, a secondary player may replay the game starting after the initial hand has been dealt but before any decision has been made as to which cards to discard. As described above, a secondary player may replay a game with different outcomes or consequences than those experienced by the primary player, even if the secondary player and the primary player made the same decisions in the game. This is because the replayed game may be replayed with a different randomization process used than was used for the original game.

3.3.1. Replay a live game. In various embodiments, a secondary player may replay a game that was originally played with multiple primary players. For example, the secondary player may replay a game of Texas Hold'em poker in which there were originally 9 primary players. The secondary player may wish to play the hand of one of the 9 players.

3.3.1.1. The casino uses AI. In various embodiments, in order for the secondary player to have the opportunity to replay a multi-player game, other entities may take the positions of primary players other than the player who the secondary player has replaced. Thus, in some embodiments, the casino may use computer algorithms to take the place of the other primary players. The computer algorithms may be programmed to make decisions in a game, such as in a game of poker. For example, the computer algorithms may include a set of rules detailing what actions to take for any given game situation. When replaying the game, the secondary player may thus play against one or more computer algorithms. In some embodiments, the casino may disclose to the secondary player one or more attributes of a computer algorithm used in a multi-player game. The casino may disclose the rules used by the computer algorithm. The casino may disclose a personality of the algorithm, such as "aggressive" or "tight". In various embodiments, the casino may be required to disclose one or more attributes of a computer algorithm. The requirements may come from casino regulators, for example.

3.3.1.2. Secondary player plays against other secondary players. In various embodiments, if a first secondary player replays a game involving multiple primary players, the positions of other primary player may be filled with other secondary players. Thus, in some embodiments, the first secondary player may replay a game against other secondary players. In some embodiments, a first secondary player may replay a game against one or more other secondary players and against one or more computer algorithms.

3.3.1.3. Other players are not opponents. In some embodiments, a secondary player may replay a game that included multiple primary players. However, the primary players may not have been opponents of one another. For example, a secondary player may replay a game of blackjack from a live table game which originally included 6 primary players. The primary players were not opponents, but rather were competing against the casino. When the secondary player replays the game, the secondary player may wish for positions of the other primary players at the game to be filled as well. Thus, in some embodiments, computer algorithms may fill the places of other primary players. In some embodiments, other secondary players may fill the places of other primary players.

3.4. A secondary player may make a different decision in real time and diverge into a different game. In various embodiments, a secondary player may participate in a game that is currently being played by a primary player. Thus, the secondary player may participate in a game of a primary player in real time. However, at a particular point in a game, the secondary player may wish to diverge from the course of the primary player. For example, the secondary player may wish to make a different decision in the game than does the primary player. In some embodiments, the secondary player may not know which decision the primary player will make. However, the secondary player may wish to make his own decision anyway, even if it turns out that the decision of the secondary player will be the same as the decision of the primary player. Once the games of both the primary player and the secondary player have finished, the secondary player may rejoin the primary player for the next game. In other words, the secondary player and the primary player in the next game may receive the same symbols, indicia, or other event resolutions. If the primary player finishes his game before the secondary player does, the primary player may be delayed by the casino until the secondary player has an opportunity to bet on the next game.

3.5. Searching for games with certain characteristics. In various embodiments, a secondary player may search for games with particular characteristics. As described elsewhere herein, a secondary player may search for the games of a particular primary player, for games played at a particular gaming device, for games played at a particular time of day, for games played at a particular casino, for games played right before a big win, and so on. However, the secondary player may also search for games which would give the secondary player an opportunity to proceed from a certain starting point in a beneficial fashion. Once the secondary player finds a game in a search, the secondary player may have the opportunity to play out the game from a certain point in the game, such as from a decision point in the game.

3.5.1. The wrong decision was made. In some embodiments, a secondary player may search for a game in which a primary player made a decision that met or failed to meet one or more criteria. A secondary player may search for a game in which the primary player: (a) did not make a decision which generated the highest expected winnings for the primary player; (b) did not make a decision which made the primary player eligible for the highest paying outcome that the primary player could have been eligible for; (c) did not make a decision that followed a generally recommended strategy (e.g., the primary player did not make a decision in blackjack that followed basic strategy); (d) did not make a decision that followed a strategy of interest to the secondary player; and so on. For example, a secondary player may search for a game of blackjack in which the primary player has a point total of 13 with no aces, in which the dealer shows a 3 up-card, and in which the primary player chose to stand. The secondary player may choose to search for such games because, under various rules, the basic strategy recommendation would be to hit. Thus the secondary player will have searched for a game in which the primary player has not made the correct decision according to the recommendations of basic strategy.

3.5.2. There is a certain starting hand. In various embodiments, a secondary player may search for a game of a primary player in which there was a particular starting hand or in which there was a particular category of starting hand. For example, a secondary player may search for a game of a primary player which was a game of video poker and which included an initial hand with exactly four hearts in it. A secondary player may search for a video poker game in which the primary player has an initial hand with a pair of jacks. A secondary player may search for a video poker game in which the primary player has an initial hand which includes the ace of spades, king of spades, queen of spades, jack of spades, and the four of hearts. A secondary player may search for a game of blackjack in which the primary player had a particular point total, such as 11. A secondary player may search for a game of blackjack in which the primary player had a first point total or a first combination of cards, and in which the dealer showed a second card. For example, the primary player had a point total of 14 and the dealer showed a 4. A secondary player may search for a game of blackjack in which the primary player had already hit twice and still had a point total of less than 14. In various embodiments, a secondary player may search for a game in which one or more symbols occurred at a slot machine. In replaying the game, the secondary player may have the opportunity to obtain additional symbols where such symbols differ from the ones obtained by the primary player in the same game.

3.5.3. A primary player had a near miss. In various embodiments, the secondary player may search for games in which the primary player had a near miss. The secondary player may search for games in which: (a) an outcome obtained by the primary player differed by X or fewer symbols from a high-paying outcome (e.g., there was only one symbol different between the outcome achieved by the primary player and a jackpot outcome); (b) a primary player had four cards to a royal flush in video poker but did not obtain the fifth card; (c) an outcome obtained by a primary player differed by one symbol from a jackpot outcome, and the symbol necessary for the jackpot outcome was just one position removed on a reel from the pay-line; and so on. A secondary player may keep the symbols of an outcome from a game of a primary player that would contribute to a high-paying outcome, and may have any additional symbols regenerated in an attempt to obtain all the symbols necessary for obtaining the high-paying outcome.

3.6. Adjust the odds of a game based on what situation the secondary player is starting from. In various embodiments, a secondary player who begins play from the middle of a game, or who begins play in a game after finding out any information about a possible final outcome of the game, may have different probabilities of achieving a given final outcome from what any player would have had at the start of a game. For example, if a secondary player starts a game of video poker at the midpoint after an initial hand with four cards to the royal flush has been dealt, the secondary player will have a greater chance of achieving the royal flush than if the secondary player were starting the game from the beginning. As described herein, a house advantage may be derived from the products of payout ratios and probabilities corresponding to outcomes. Thus, in some embodiments, if the probabilities of paying outcomes go up, then the payout ratios associated with such outcomes must go down in order to maintain a constant house advantage, or in order to maintain any house advantage at all. Thus, in some embodiments, the payout ratios associated with an outcome may change when a secondary player begins a game after some information has been revealed in the game. For example, a payout ratio for a royal flush may be 500 for a game of video poker in which a player starts from the beginning. However, if a player starts the game with an initial hand that contains the ace of spades, king of spades, queen of spades, jack of spades, and 3 of hearts, then the payout ratio for the royal flush may be set to 25 rather than 500. In various embodiments, payout ratios for outcomes may be adjusted for a game started in the middle so that the house advantage for the game started in the middle is the same (or nearly the same) as for the same game started from the beginning. For example, suppose the house edge on a game of video poker is 2% with perfect play. If a secondary player is allowed to start in the middle of a game (e.g., after an initial hand of poker is dealt), then payout ratios for one or more outcomes may be adjusted so that the house advantage over the secondary player is still approximately 2% (e.g., between 1% and 3%). As will be appreciated, the payout ratio for a game may be adjusted in several ways, any of which are contemplated in various embodiments. In various embodiments, a payout ratio may be changed by changing a required bet from a secondary player while maintaining constant payouts on outcomes. In various embodiments, a payout ratio may be changed by changing the payouts for one or more outcomes while maintaining the same required bet amount. In various embodiments, a payout ratio may be changed by changing both the payouts for one or more outcomes, and the amount of a required bet.

3.6.1. Odds adjustments in a game of Hold'em. In various embodiments, a secondary player may wish to participate in a game that involves multiple primary players. The secondary player may wish to take the place of a first primary player in the game and to make one or more decisions in the game going forward from a particular point. However, probabilities for possible outcomes of a multi-player game may not be readily quantifiable since the outcomes may depend on the actions of human beings, each with their own independent wills. As such, it may be difficult for the casino to set a payout ratio for a secondary player who is joining in the middle of a multi-player game. Further, the secondary player will not necessarily be interacting with the other primary players in the game (e.g., the primary players in the game other than the primary player whose place the secondary player has taken), since the game may have been played in the past, or since the primary player whose place the secondary player will be filling may still be in the real game. Thus, the secondary player may complete the remainder of the game against computer algorithms which fill in for other primary players. The secondary player may complete the remainder of the game against other secondary players who fill in for other primary players.

3.6.1.1. Assume all players will stay in and then decide? In some embodiments, a probability that a secondary player wins a game may be derived or estimated based on an assumption that all other players in a game (e.g., all algorithms filling in for primary players; e.g., all secondary players filling in for primary players) remain in the game. In other words, there may be an assumption that no player folds after the point at which the secondary player has joined the game. Based on an assumption that no further player will fold in a game, the probability that a secondary player will win can be derived in a straightforward fashion. In one embodiment, all possible combinations of additional cards to be dealt can be tested. For example, in a game of Texas Hold'em in which the flop has been dealt already, all possible combinations of turn and river cards may be tested. The proportion of the combinations that lead to a win for the secondary player may then be used to determine the probability that the secondary player will win. In some embodiments, a large number of deals of additional cards in the game may be simulated in order to determine the proportion of such simulations which the secondary player wins. Such a proportion may be used to estimate the probability that the secondary player will win. It will be appreciated that a probability that the secondary player will tie may be determined in a similar fashion to the way a probability of winning may be determined. For example, all possible combinations of additional cards to be dealt may be tested, and the proportion of such combinations which lead to a tie may be used to estimate the probability that the secondary player will tie.

3.6.1.2. Do a simulation with good AI players? In some embodiments, a probability that a secondary player will win in a multi-player game may be determined using a simulation in which computer algorithms fill in for each of the primary players in the original game. For example, 1000 simulated games may be run using computer algorithms filling in for each of the primary players. The proportion of the time that the computer algorithm wins while filling in at the position desired to be played by the secondary player may be used to determine the probability that the secondary player will win. In some embodiments, the average amount won or lost by the computer algorithm filling in at the position desired to be played by the secondary player may be used to estimate an expected amount that will be won or lost by the secondary player in the game. In various embodiments, once a probability that a secondary player will win and/or tie in a game is determined, a payout ratio for the game may be determined. In various embodiments, once an expected amount that a secondary player will win or lose is determined, a required bet amount for the secondary player may be determined. A payout ratio or required bet amount may be determined for any manner in which a secondary player completes a game from the point or juncture at which the secondary player joins. For example, a payout ratio or required bet amount may be determined whether a secondary player completes a game against other secondary players, whether a secondary player completes a game against computer algorithms, or whether the secondary player completes a game against any combination of the two.

3.7. If a secondary player does diverge in time, then there may be some catch-up, or the secondary player may skip to the current outcome. For example, the secondary player may be busy on a bonus round while the primary player goes off playing more games. In various embodiments, a secondary player may complete a game in a different manner from the way in which a primary player completes the game. For example, a secondary player may be participating in real time in a game of a primary player. At some point in the game, the primary player may make a first decision and the secondary player may make a second decision. As a result of the different decisions, or for any other reason, the game of the secondary player may last longer than does the game of the primary player. For example, in a game of blackjack, a decision to "hit" by a primary player may lead to the primary player busting, and thereby to an immediate end to the game of the primary player. On the other hand, a decision to "stand" by the secondary player may cause the dealer in the game of the secondary player to make one or more decisions, thereby prolonging the game of the secondary player. If the game of a secondary player lasts longer than the game of a primary player in whose games the secondary player has been participating, then the primary player may on occasion begin a new game before the secondary player has completed an old game.

3.7.1. The secondary player sits out the next game and joins a future game. In some embodiments, if a primary player begins a new game before a secondary player has completed a prior game he started with the primary player, then the secondary player may sit out the new game. The secondary player may sit out any number of new games until the old game of the secondary player has finished. The secondary player may then join in the next game to be started by the primary player.

3.7.2. The secondary player gets involved in two games simultaneously. In some embodiments, even if a secondary player has not completed a prior game, the secondary player may still participate in a new game of a primary player. For example, the secondary player may follow the progress of his old and new games using a split-screen view on his terminal. As will be appreciated, the secondary player may be involved in more than one old game even as a new game is started. The secondary player may potentially view the progress of one or more old games along with the new game.

3.7.3. The old game is finished quickly. In various embodiments, once when a primary player finishes a first game and/or begins a second game, the older game of the secondary player (e.g., the offshoot from the first game of the primary player) may be sped up. For example, the casino may cause outcomes to be generated or displayed more rapidly or instantaneously. For example, rather than showing renditions of cards being dealt, the house may show cards appearing instantly in the hand of the secondary player. In various embodiments, the house may make decisions for the secondary player automatically. For example, the house may make decisions for the secondary player according to one or more strategies, such as according to optimal strategy or according to basic strategy.

3.7.4. The games of the primary player are stored and the secondary player can participate in the games later on. In various embodiments, a secondary player who is still involved in an older game may not immediately participate in a new game of a primary player. However, data about the new game may be stored by the casino. The secondary player may then, at a later time, choose to participate in the game. The casino may store a record of which games of the primary player the secondary player missed and may then give the secondary player the option of participating in such games.

3.7.5. The secondary player gets the EV of a game. In various embodiments, a secondary player may not complete a game in the standard fashion, but may rather receive a settlement payment. The settlement payment may be based on an average amount that the secondary player might have expected to win had he completed the game. In various embodiments, a secondary player may be involved in a bonus round (e.g., the bonus round of a slot machine game). The secondary player, rather than playing out the bonus round, may receive a settlement amount for the bonus round. The secondary player may thereby save the time of playing through the entire bonus round, and may therefore be able to participate in a new game that the primary player would otherwise have started without the secondary player's participation.

3.8. The secondary player may bet different pay-lines. In various embodiments, a secondary player may choose to bet on different pay-lines from those on which the primary player bet or bets. For example, the primary player may bet a first pay-line and a second pay-line at a slot machine while a secondary player bets only the first pay-line. For example, a primary player may bet a first pay-line at a slot machine while a secondary player bets a first pay-line and a second pay-line. For example, a primary player may bet a first and second pay-line while a secondary player bets a second and third pay-line. For example, a primary player may bet a first pay-line while a secondary player bets a second pay-line at a slot machine.

3.9. The secondary player may bet different amounts than did the primary player. For example, the secondary player may bet the full three coins rather than just one. In various embodiments, a secondary player may bet a different amount than does a primary player. For example, in a game of poker, such as in a multiplayer game of Texas Hold'em, a secondary player may decide he would rather raise by $20 instead of the $10 raise made by a primary player. Accordingly, the secondary player may play out the remainder of the game, taking the position of the primary player, and playing against computer algorithms taking the place of other primary players. In various embodiments, a primary player may bet a first amount at the start of the game, while the secondary player may bet a second amount on the same game.

Embodiments described herein, where applicable may be performed based on games played electronically as well as based on games played using physical tokens, devices, instruments, tables, etc. In various embodiments, a primary player may play a game using physical tokens (e.g., physical cards and chips), while a secondary player may participate in the game and view an electronic version of the game. In some embodiments, a primary player may play an electronic version of a game and a secondary player may participate in the game via an electronic version of the game. In some embodiments, primary player may play a physical version of a game and a secondary player may participate in the game using physical tokens. For example, when a secondary player makes a decision in a game that is different from the decision made by the primary player, the a deck of cards used in the primary player's game may be duplicated by taking another physical deck of cards and putting the cards in the same order as are the cards in the deck used in the game of the primary player.

4. Aggregate and display all data from across the casino. Allow people to make bets accordingly. For example, show all the reds and the blacks across all the roulette games. This might then influence how people bet in the future on red and black. Cumulative wins and losses in blackjack can be displayed. For instance, players have won 500 hands and lost 510. In various embodiments, data about two or more games at a casino may be gathered. The data about two or more games may be combined or aggregated. In some embodiments, a single statistic may be used to describe data about two or more games. In some embodiments, more than one statistic may be used to describe data about two or more games. In some embodiments, statistics used to describe data about two or more games may represent a compression or condensation of the data. Statistics may represent a way to allow a human being, such as a secondary player, to gain an understanding about large amounts of data about games. Exemplary statistics may indicate an average amount won in a set of games, a prevalence of a particular outcome in a set of games, an excess occurrence of a first outcome over a second outcome in a set of games, and so on. Statistics may be presented to players. For example, a prominent display screen at a casino may indicate the total number of occurrences of "red" in roulette in the entire casino during the last 10 minutes. Data about games may be presented to a player in many different forms. Data may also be presented to a casino representative, such as a casino employee. Data may also be presented to a regulator, such as a gaming regulator. Data may be presented in graphical form. For example, a bar graph may show the number of "red" outcomes, the number of "black" outcomes and the number of "green" outcomes in roulette as three separate bars on a graph. Data may be presented in the form of highlights or fast action replays. For example, video footage of outcomes may be shown sped up to 10 times the original speed. Data about games may aid players in deciding which bets to make in the future. For example, a player may believe that a "red" outcome is likely to follow a long string of "black" outcomes. Accordingly, the player may be interested in viewing data or summary statistics about games of roulette.

4.1. Types of data. In various embodiments, many types of data may be gathered, generated, recorded, displayed, presented and/or stored. Data about different games may be gathered. Data about different players may be gathered. Data about gaming devices may be gathered. Data about casinos may be gathered.

4.1.1. Number of times primary players have won/lost. For an individual game, win, loss, or tie data may be gathered. A game may be considered a win for a primary player if the primary player receives any positive payout and/or if the primary player receives a payout that is greater than the amount he bet on the game. A game may be considered a win if a primary player receives more than an average amount that would typically be paid in a game. Other criteria may be used in considering whether a game is a win or not. For example, if the particular rules of a game indicate that a primary player is a winner, the game may be considered a win for the primary player. For example, in a game of blackjack, a primary player may be considered the winner if the point total of his hand is 21 or less, and if the dealer has busted or has a point total less than that of the primary player. A game may be considered a tie if a primary player receives a payout that is equal to the amount he bet on the game. A game may be considered a tie if a primary player neither wins nor loses money in a game. A game may be considered a tie if the rules of the game indicate that the game is a tie. A game may be considered a loss if a primary player receives no payout for the game. A game may be considered a loss if a primary player receives a payout that is less than the amount he bet on the game. A game may be considered a loss if a primary player receives less than an average amount that is typically paid in a game. A game may be considered a loss if it is not considered a win or a tie. In some embodiments, each pay line within a game may be considered separately. For example, a primary player may bet 1 coin and win 3 coins on a first pay line. The primary player may bet 1 coin and win 0 coins on a second pay line. In this example, the results of the bet on the first pay line may be considered a winning game, while the results of the bet on the second pay line may be considered a losing game. Thus, in some embodiments, the placing of a bet, the generation of an outcome, and the collecting of winnings for a given pay line may be considered a complete and separate game, even if multiple pay lines were enabled for a given spin of a slot machine. In some embodiments, each hand of video poker played may be considered a separate game. For example, if a primary player plays 3 hands of video poker at a time, the three hands of video poker may be considered separate games. In some embodiments, even if 3 hands of video poker each include the same starting hand (e.g., the initial five cards are the same for each hand), the hands may still be considered to be separate games. In some embodiments, each bet made is considered to define a separate game. For example, a bet on a first pay-line of a slot machine may define a different game from a bet on a second pay-line for the slot machine. In some embodiments, two bets are considered to constitute separate games if the payouts from the bets are not perfectly correlated. For example, if the payout stemming from a second bet cannot be determined with certainty even knowing the payout stemming from a first bet, then the two bets may be considered to define separate games. In some embodiments, two bets made at a craps table may be considered to define separate games even if payouts for both bets are dependent on the same roll or rolls of the dice. For example, a pass bet may be considered to define a different game from a hard way bet.

Win, loss, and tie data may be aggregated over two or more games. The aggregated data may be stored and/or presented as a statistic, as a graph, or in any other fashion. In some embodiments, a statistic may indicate the number of games won by one or more primary players over the last X games (e.g., over the last 100 games). In some embodiments a statistic may indicate the number of games lost by one or more primary players over the last X games (e.g., over the last 100 games). In some embodiments, a statistic may indicate the number of games tied. In some embodiments, a statistic may indicate the difference between the number of games won and the number of game lost by one or more players over the last X games. For example, a value of a statistic at −7 may indicate that over the last 100 games, a set of primary players has lost seven more games than they have won. As will be appreciated, data may be aggregated over any number of games, such as the last 100, the last 1000, all the games of the day, all the games of a year, etc. As used herein, the term "last" need not necessarily reference the present time. For example, a statistic that describes the number of primary player wins over the "last" 100 games may describe the number of primary player wins out of 100 games leading up to some point in the past. Thus, the term "last" may be used with reference to the point in the past. The point in the past may be, for example, the time during which a statistic was created. In various embodiments, data may be aggregated for a single primary player. For example, a statistic may indicate the number of games won by a particular primary player during the past three days. In some embodiments, data may be aggregated over multiple primary players. For example, a statistic may indicate the number of games won in the last hour by all primary players at a particular blackjack table. In various embodiments, data may be aggregated for games meeting one or more criteria. For example, win/loss/tie data may be aggregated for games meeting one or more criteria. Such criteria may include: (a) the games were played during a particular period of time; (b) the games were played most recently; (c) the games were played by a particular primary player; (d) the games were played by one of a set of primary players; (e) the games were played by any primary player having a particular characteristic (e.g., the games were played by any primary player who is a small business owner); (f) the games were played at a particular gaming device; (g) the games were played in a particular area of a casino; (h) the games were played in a particular casino; (i) the games were of a particular type (e.g., slot machine; e.g., video poker; e.g., Addam's Family slot machine); (j) the games had a certain minimum bet required (e.g., the games required a $1 minimum bet); (k) the games each had a bet of a particular amount placed on them (e.g., the games all had bets of $0.25 placed on them); and so on.

4.1.2. Amounts of money won/lost. For an individual game, data may be gathered for the amount of money won or lost by a player. For an individual game, data may be gathered for the amount of money won or lost by the house. For example, in a game with multiple primary players against the house, the winnings of a given player are not necessarily the inverse of the winnings for the house. Data may be gathered in relation to gross winnings. In other words, data may be gathered for winnings without regard to any amounts paid by the player, e.g., in the form of a bet. For example, if a primary player inserts $1 into a slot machine as a bet and receives a payout of $5, the primary player has gross winnings of $5. Data may be gathered in relation to net winnings. In other words, data may be gathered for winnings after accounting for amounts paid by the primary player. In the prior example, after having bet $1 and receiving a payout of $5, the primary player may have net winnings of $4. In a similar fashion, data may be gathered for gross and net winnings of a casino. Data related to winnings and losses may be aggregated over multiple games. A statistic may describe the gross winnings of one or more primary players over multiple games. For example, a statistic may take the value of $83, indicating that a primary player has received payouts totaling $83 during the last 100 games. A statistic may describe the net winnings of one or more primary players over multiple games. For example, a statistic may take the value of −$17, indicating that a primary player has paid $17 more in bets than he has received in winnings over the last 100 games. A statistic may describe the winnings and losses of multiple primary players. For example, a statistic may take the value of $25, indicating that a group of 20 primary players who have played blackjack have average net winnings of $25 over the last hour. In some embodiments, data about winnings and losses may be displayed graphically. For example, the size of a primary player's bankroll may be graphed over time. As the primary player wins, the graph may move upwards. As the primary player loses, the graph may move downwards. The primary player's bankroll may start at an arbitrary value, such as zero, or at a value equal to the amount for which the primary player has bought in to a game.

4.1.3. Number of hands/games played. In some embodiments, data may be gathered describing the number of games played. For each game played, a statistic may be incremented. The statistic may be a simple counter of the number of games played. In some embodiments, a statistic may keep track of the number of games played over a particular period of time. Thus, for every game played, an associated time may be stored, e.g., in a database of the casino server. Once a game has been played more than X hours in the past, the statistic may be decremented by one to reflect that the game was no longer played in the last X hours, which are the hours covered by the statistic. Data about the number of games played may be aggregated over multiple players. For example, a statistic may describe the number of games played by all roulette players in a casino over the last 20 minutes. In some embodiments, data about the number of hands played may be kept. In some embodiments, data about the number of pay-lines may be kept. In some embodiments, data about the number of outcomes generated or received may be kept. For example, a statistic may track the number of outcomes generated for a player at a slot machine, with each pay-line enabled counting as a separate outcome.

4.1.4. Number of a particular outcome obtained. For example, number of jackpots, number of payouts over X, etc, number of cherry-cherry-cherry outcomes, etc. For an individual game, outcome data may be recorded. Outcome data may include data describing what symbols were generated for a game. Outcome data may include data describing what symbols were used in determining a payout for a player. An outcome may include a set of symbols, such as "cherry-cherry-cherry" or "bar-bell-lemon". Outcome data may include a payout amount. For example, a payout of $1 may be an outcome. Outcome data may include a point total. For example, in a game of blackjack, an outcome may be that the player received 21 points. Outcome data may include a point total for a dealer and/or for an opposing primary player. In a game of blackjack, outcome data may include data describing the point total of the dealer. In a game of poker, outcome data may include data describing the hands of other primary players against whom a primary player of interest is competing. Outcome data may further include data describing one or more common symbols. For example, in a game of Texas Hold'em, outcome data may include data about what cards were dealt on the flop, turn and/or the river. Outcome data may include the results of rolls of the dice. For example, outcome data may describe the numerical total of rolls of the dice in a game of craps. In a game of roulette, outcome data may include data describing the number that came up when the wheel was spun. In various embodiments, outcome data may be aggregated over a plurality of games. The games may include the games of one or more primary players. In some embodiments, a statistic may describe the number of times a particular outcome has occurred. For example, a statistic may describe the number of times the outcome "cherry-cherry-cherry" has occurred. For example, a statistic may describe the number of times "black" has occurred at a roulette wheel. A statistic may also describe the number of times an outcome has occurred per unit time or per game. For example, a statistic may take the value of 48, indicating that a roulette wheel has generated a "red" outcome 48 times in the last 100 spins. In some embodiments, a statistic may express the occurrence of an outcome per spin in terms of a percentage. For example, a statistic may indicate that an outcome of "flush" or better has occurred in 4% of the last 1000 games in a game of video poker. In various embodiments, data about outcomes may be aggregated over multiple primary players. For example, a statistic may describe that a group of primary players has obtained 100 blackjacks during the last hour, or out of the last 2000 hands played by primary players in the group. In various embodiments, data about outcomes may be aggregated over multiple tables, gaming devices, or other outcome generators. For example, a statistic may indicate that, at a group of gaming devices, 3 jackpot outcomes have occurred in the last month. For example, regarding a group of 5 roulette tables in a casino, a statistic may indicate that the number 12 has come up 5 times in the last hour. In various embodiments, a statistic may indicate a comparison between the number of occurrences of a first outcome and the number of occurrences of a second outcome. For example, a statistic may indicate a difference in the number of occurrences of straights versus flushes in a game of video poker over a given period of time. For instance, a value of a statistic of 10 may indicate that 10 more straights than flushes have occurred in the past hour at a group of video poker machines.

4.1.5. Number of a particular symbol obtained. For an individual game, data may be obtained regarding what symbols occurred during the game. For example data may be obtained that an ace of spades, jack of hearts, king of diamonds, queen of clubs, and seven of hearts was obtained as an initial hand in a game of video poker. For example, data may be obtained that a "cherry" symbol was obtained in a reel slot machine game. In various embodiments, such data may be aggregated, such as over multiple games, over multiple primary players, and/or over multiple gaming devices. For example, a statistic may describe the number of times an ace of spades has been dealt at a video poker machine in the past hour. For example, a statistic may describe the number of times any player from California in a casino has obtained a red card in any game of cards in the past 20 minutes. For example, a statistic may describe the number of times a bell symbol has been generated at any slot machine in a bank of slot machines in the last day. For example, a statistic may describe the number of times a six has been rolled in a game of craps. In various embodiments, a statistic may indicate a comparison between the number of times a first symbol has occurred and the number of times a second symbol has occurred. For example, a statistic may indicate that a "lemon" symbol has occurred X more times than has a "plum" symbol in a given period of time. In various embodiments, positional data may be obtained. Positional data may include data describing the position of a symbol within an outcome, within a display area, or within any other area. In various embodiments, positional data may include data about whether a symbol was the leftmost symbol in an outcome, the middle symbol in an outcome, or the rightmost symbol in an outcome, e.g., as displayed in the viewing window of a gaming device. For example, in the outcome "lemon-bell-bar", the "lemon" symbol may be considered to be in the first position, the "bell" symbol in the second position, and the "bar" symbol in the third position. In various embodiments, data about a symbol may be recorded even if the symbol does not form part of an outcome. For example, data about a symbol may be recorded even if the symbol does not contribute to the determination of a payout for a player. For example, a viewing window of a slot machine may show a grid of 3 by 5 symbols, whereby each of 5 reels has 3 symbols visible. The player of the slot machine may have enabled only one pay-line so that only the symbol visible in the middle of each reel is applicable to the payout determined for the player. Nevertheless, data indicative of the other symbols may still be recorded. For example, the fact that a "dog" symbol was visible at the top of the first reel may be recorded even if the "dog" symbol did not contribute to the payout determined for the primary player. In various embodiments, data about symbols that were not visible may also be obtained and/or recorded. For example, data about symbols that occurred one position above a viewing window on a reel may be recorded. Such symbols may not have been visible to a primary player at the conclusion of a game. However, such symbols may still have been present on a reel, e.g., in the form of a printed graphic or in the form of data in the memory of a gaming device describing the composition of a virtual or electronic reel. For example, a gaming device may maintain a data structure describing all the symbols on a reel, even if there is no physical embodiment of the reel. Thus, although not all of the symbols on the reel are displayed at one time (e.g., on the display screen of the gaming device), the positions of all symbols relative to the displays screen (e.g., the viewing window) of the gaming device may be known to the gaming device. In various embodiments, data about positional information may be aggregated. Data may be aggregated, for example, over multiple games, over multiple primary players, over multiple gaming devices, over multiple locations, over multiple time periods, and so on. For example, a statistic may indicate the number of times that a cherry symbol has occurred in the second position of an outcome at a particular gaming device in the last hour. For example, a statistic may indicate the number of times that the third card in an initial hand of video poker has been a jack for a group of primary players in the last hour. In various embodiments, a statistic may indicate the number of times that a "Yosemite Sam" symbol has occurred in the upper right hand corner of a viewing window of a gaming device in the last hour. In various embodiments, data about a chronological order in which symbols occur may be obtained and/or stored. In a game of cards, data about which card was dealt first, which card was dealt second, and so on, may be kept. A statistic may describe the number of times a particular symbol appeared in a particular chronological order. For example, a statistic may describe the number of times that an ace was the tenth card dealt in a table game of blackjack over the last two hours.

4.1.6. Data about the ordering of a deck, order of symbols on a reel. In various embodiments, data may be obtained about the order of cards in a deck. For each card in a deck, a position may be recorded. For example, a position of the two of clubs may be recorded as "10", indicating that the tenth card from the top of a deck was the two of clubs. Data about the position of a card in a deck may be obtained or stored even if such card never appeared in a game. For example, regarding a game of video poker, the rank and suit of the card at the bottom of the deck may be recorded, even though the card may have no chance of being dealt in the game of video poker. In various embodiments, data may be obtained or recorded about the order of symbols on a reel of a gaming device. For example, from an arbitrary location on a reel, each symbol on the reel may be attributed to a different position. For example, a "lemon" symbol is in the first position. An adjacent "cherry" symbol is in the second position. An adjacent "plum" symbol is in the third position, and so on. In various embodiments, data about the order of symbols may be aggregated. For example, a statistic may indicate the number of times that the jack of hearts has been in the fifth position of a deck of cards in that last 200 game of video poker.

4.1.7. Top performing players. E.g., players who have won the most in the last 100 outcomes, the last hour, etc. For an individual game, data about a primary player's performance may be gathered. Data about performance may include data indicating a gross amount won, a net amount won, an outcome obtained, a strategy used, and so on. Data about performance may be aggregated over multiple games, over multiple players, over multiple gaming devices, and so on. In some embodiments, a numerical score may be assigned to the strategy used by a primary player in a game. For example, a primary player who uses an optimal or a recommended strategy may receive a high score. A primary player who uses a strategy that is not recommended or not optimal may receive a lower score. For example, in a game of video poker, a primary player may receive an integer score from 1 to 32, each score corresponding to a possible strategy that could be used by the primary player in the game of video poker. It should be noted that in a game of video poker where primary players can discard any combination of cards from an initial five-card hand, there are two to the fifth power, or 32 possible ways in which the primary player may choose cards to discard. Thus, each way in which the primary player may select discards may be considered a separate strategy, and may therefore correspond to a different score. The strategies may be ranked according to which provide the highest expected winnings for the player. The strategy which provides the highest expected winnings may correspond to a score of 32. The strategy which provides the next highest expected winnings may correspond to a score of 31, and so on. As will be appreciated, scores need not be integers or any other particular numbers. In various embodiments, data about the strategies used by a player over multiple games may be aggregated. In various embodiments, scores assigned to a player based on his choice of strategy in a game may be aggregated. For example, the scores obtained by a primary player during individual games may be added up to describe an aggregate score over multiple games. In some embodiments, scores obtained by a primary player during individual games may be averaged. As will be appreciated, in various embodiments, low scores might correspond to good strategies while high scores might correspond to poor strategies. In various embodiments, a data may be recorded about a primary player's choice of strategy during a game of blackjack. Such a primary player may be given a relatively high score, for example, if he follows the recommendations of basic strategy, and relatively low score, for example, if he does not.

Data about other performance metrics may be aggregated, in various embodiments. In various embodiments, data about amounts won may be aggregated over multiple games. A statistic may indicate the total amount won by a primary player, for example. A statistic may indicate the total number of times a primary player has won.

In various embodiments, data about the performance of multiple primary players may be aggregated. A statistic may indicate which primary player or players has had a distinguishing performance from among a group of primary players. For example, a statistic may indicate which primary player from a group of primary player has had the best performance, according to some metric. For example, a statistic may indicate which primary player has had the highest gross winnings over the last hour, or which primary player has used the best strategy over the last hour. In various embodiments, the top X primary players may be listed according to some performance metric. In some embodiments, the bottom Y primary players may be listed according to some performance metric.

In various embodiments, the top performing primary player may be periodically determined. The top performing primary player may be determined using any metric, such as gross winnings, net winnings, best strategy, or any other metric or combination of metrics. The top performing primary player may be determined, for example, every minute, every ten minutes, every hour, etc. In various embodiments, the top performing primary player may be determined after each game played by any primary player. For example, after a primary player completes a game, the casino server may determine whether that primary player has just accumulated enough gross winnings to become the top performing primary player. In various embodiments, the top performing primary player is determined at irregular intervals. For example, a first top performing primary player may be determined. Five minutes later, a second top performing primary player may be determined. Nine minutes later, a third top performing primary player may be determined. It will be appreciated that as primary players continue to gamble, their relative performance may change, and thus a primary player who used to be an average performing primary player may become the top performing primary player. For example, a primary player may win a large jackpot and thereby become the top performing primary player.

In various embodiments, a secondary player may participate in the games of the current top performing player. A secondary player may be continuously or periodically informed of who is the top performing primary player. For example, a name or other identifier of the top performing primary player may be displayed on the display screen of the secondary player's terminal or mobile gaming device. The name of the primary player may remain displayed on the display screen of the secondary player until a new top performing primary player is determined. The secondary player may elect or decide to participate in the games only of the current top performing primary player. In various embodiments, the secondary player may elect to automatically participate in the games of the current top performing primary player. For example, the secondary player may make a bet. It will then be understood by the casino server that the bet is to be applied to a game of the currently top performing primary player. Thus, for example, if the currently top performing primary player wins, the secondary player may win as well. If the currently top performing primary player loses, the secondary player may lose as well. In various embodiments, the casino server may make it easiest or most convenient for the secondary player to participate in the games of the currently top performing primary player. For example, the casino server may allow the secondary player to press only a single button in order to place a bet and participate in the game of the currently top performing primary player. The secondary player may be able to participate in the games of other primary players as well, but may be required to perform extra steps in order to do so. Thus, in various embodiments, participation in games of the top performing primary player may be the default option for a secondary player.

In various embodiments, an identifier (e.g., a name; e.g., a handle) of the top performing primary player who is currently active may be displayed. The casino server may allow a secondary player to readily participate in the games of such a primary player, (e.g., by making participation the default option for the secondary player). A primary player who is currently active may include a primary player who has recently played a game. For example, a primary player who is active may include a primary player who has played a game in the last 10 seconds, the last minute, or within the most recent predetermined time interval. In various embodiments, a primary player who is currently active may include a primary player who has a credit balance in a gaming device. In various embodiments, a primary player who is currently active may include a primary player who has been playing at a certain rate (e.g., at 30 or more games per minute). It will be appreciated that the top performing primary player who is currently active may include vary from moment to moment. For example, a first primary player may initiate a game and may thereby be the top performing currently active primary player. That primary player may then pause for a few moments after his game. Another primary player may, in the meantime, initiate play of a game. That other primary player may, as it happens, then be the top performing currently active player.

In various embodiments, a secondary player may place a bet. The bet may then count for the first game to be initiated from among a group of primary players. For example, a secondary player may place a bet of $1. The casino server may determine which are currently the top five performing primary players. The bet of the secondary player may count towards the game of the first of the five primary players to initiate a game. In this way, the secondary player may enjoy a fast paced gaming experience. Rather that following the pace of a single player, the secondary player may participate in the first game to start from any of a group of players. The group of primary players may be defined by other characteristics than just performance. For example, a group of primary players may include a five players from Mississippi. The secondary player may make a bet which counts towards the first game to be initiated by any of the five primary players. After the first game has come to a conclusion, the secondary player may place a second bet. The second bet may again count towards the first game to be initiated by one of the five primary players from Mississippi following the placement of the second bet. However, the second bet may count towards a game of a primary player other than the primary player for whose game the first bet counted.

In various embodiments, a secondary player may participate in the games of the second highest performing primary player. For example, the secondary player may participate in the games of the primary player who has won the second most amount of money in the last hour. In various embodiments, a secondary player may participate in the games of the third highest performing primary player. It will be appreciated that a secondary player may participate in games of a primary player who falls anywhere in the rankings according to some metric, such as winnings, etc. In various embodiments, a secondary player may automatically participate in a game of a primary player who is second in the rankings (e.g., second in terms of net winnings). For example, the secondary player may place a bet and then participate in the game of whatever primary player happens to be second in terms of gross amounts won in the last ten minutes. As another example, the secondary player may have a bet placed for him automatically (e.g., by the casino server) for a game of a primary player who is third among all primary players in terms of consecutive games won.

In various embodiments, a secondary player may participate in a game of a primary player who is the best performer among a subset of all primary players. The subset of primary players may include primary players of a particular demographic, primary players playing a certain type of game (e.g., video poker), primary players located in a certain area of the casino (e.g., on the first floor), primary player located in a particular casino, primary players located in a particular geographic region (e.g., in a particular city; e.g., in a particular neighborhood), and so on. The best performing primary player among the subset may be identified and displayed to the secondary player. The secondary player may automatically participate in the games of such a primary player.

In various embodiments, the secondary player may automatically participate in a game of a primary player who is the top performing primary player among primary players playing a particular game of interest. For example, the secondary player may wish to participate in a game of blackjack. Accordingly, the secondary player may place a bet which automatically counts towards a blackjack game of a primary player who uses the best strategy (e.g., as compared to optimal basic strategy) in blackjack. In various embodiments, a top performing primary player who is playing a particular game may be identified and/or displayed to the secondary player. The secondary player may then decide whether to participate in the game of the primary player. In various embodiments, the secondary player may participate in the games of a top performing primary player among primary players playing a particular denomination of game. For example, the secondary player may wish to participate in games being played at dollar denomination gaming devices. The secondary player may thus participate in the top performing primary player of all primary players at dollar denomination gaming devices.

In various embodiments, a secondary player may participate in the games of a top performing primary player not just of the present, but of times in the past as well. For example, a secondary player may participate in the games of a primary player who played the prior day. The primary player may have had the best performance during a one-hour period of any primary player during the past week. Accordingly, the secondary player may participate in the games of the primary player. The secondary player may participate in the games of the primary player which occurred subsequent to the one hour of top performance. For example, the secondary player may participate in the game played by the primary player immediately after the one-hour period in which the primary player recorded the best performance of any primary player during the past week.

In various embodiments, a secondary player may participate in the games of a primary player who is currently playing and who had the top performance during some time in the past. For example, the secondary player may participate in the games of a primary player who was the best performing primary player over a day-long period of any primary player within the past week. The primary player may not necessarily be the best performing player during the current day or during the most recent day. Nevertheless, the secondary player may participate in the current games of the primary player.

In various embodiments, a secondary player may automatically participate in the current games of primary players who were the top performers during some moving window of time in the past. For example, suppose the current time is 4:00 pm. The secondary player may participate in a game of the currently active primary player who was the best performer the prior day in the hour from 3:00 pm to 4:00 pm. At 4:01 pm, the secondary player may participate in a game of the currently active primary player who was the best performer the prior day in the hour from 3:01 pm to 4:01 pm, and so on.

In various embodiments, the secondary player may participate in games of the worst performing primary player. The secondary player may, for example, expect that the luck of the worst performing primary player will change. The secondary player may, for example, bet against the worst performing primary player. In various embodiments, a secondary player may automatically bet against the currently worst performing primary player. In various embodiments, the casino server may make it easy for the secondary player to bet against the currently worst performing primary player. For example, the casino server may allow the secondary player to bet against the currently worst performing primary player with only a single button press.

In various embodiments, a secondary player may automatically bet on a primary player who meets certain criteria. The secondary player may bet without the necessity of taking any action prior to the game. For example, at the beginning of an hour, the secondary player may indicate that he wishes to place one bet every ten seconds for the next hour. The bet is to be placed on a game of a primary player who is the top performing primary player as of the time the bet is placed. Thus, for the next hour, bets may be made for the secondary player automatically without any further input from the secondary player. As will be appreciated, the secondary player may bet automatically on the best performing player from a subset of players, on the second best performing player, on the worst performing player, against the worst performing player, and so on.

In various embodiments, a secondary player may bet on best performing game, the best performing gaming device, the best performing dealer, the best performing table, the best performing sector of the casino, and so on. For example, a secondary player may place a bet on the gaming device that has paid the most in the last hour. The secondary player may thus bet on different gaming devices at different times. The secondary player may automatically bet on the best performing gaming device. For example, at the beginning of an hour, the secondary player may indicate that he wishes his bets to be placed automatically in games of the best performing gaming devices. The secondary player may thus not be required to make any further inputs for the next hour. As another example, the casino server may make it especially easy to place a bet on the best performing gaming device at any given time. However, the secondary player may be required to take some action, even a minimal action, such as pressing a button.

In various embodiments, primary players meeting one or more criteria may be listed. For example, the top ten performing primary players may be listed. The primary players may be listed, for example, on a prominent display screen in a casino, or on a display screen of a terminal used by a secondary player. A listing of a primary player may reveal various information about the primary player. For example, the listing may reveal the first name of the primary player, the last name of the primary player, the full name of the primary player, an alias for the primary player, an amount won by the primary player, and any other information about the primary player.

In various embodiments, a primary player may indicate how much information he is willing to reveal about himself. Information that may be displayed or otherwise revealed about a primary player may include: (a) a name; (b) a first name; (c) a nickname; (d) a maiden name; (e) a last name; (f) a middle name; (g) a full name; (h) an initial; (i) an age; (j) a place of residence; (k) a picture (e.g., a picture of the primary player); (l) a performance metric of the primary player (e.g., gross winnings; e.g., net winnings; e.g., number of consecutive wins; e.g., largest amount won; e.g., current credit balance); (m) a handle that that the primary player has chosen (e.g., "Topdog"; e.g., "Sportsnut"); (n) an alias for the primary player; (o) a player tracking number; (p) a date of birth; (q) a social security number; (r) a handle that the casino server has generated for the primary player (e.g., "player 1032"); (s) a handle that the gaming device of the primary player has generated for him (e.g., "slot player 125"); (t) a gaming device identifier (e.g., an identifier for the gaming device at which the primary player is playing or has played); (u) an amount of profits that the primary player has made; and any other information.

In various embodiments, the primary player may indicate information he is willing to reveal in various ways. For example, the primary player may check off boxes next to information he is willing to reveal. In various embodiments, the primary player may fill out a profile, such as a form with blank spots for receiving information about the primary player. In various embodiments, the primary player may inform a casino representative about which information he is willing to reveal.

Either before, during, or after a primary player indicates information he is willing to reveal, the casino may verify that the primary player truly wishes to reveal such information. The casino may verify that the primary player is competent to reveal such information. In various embodiments, the casino may verify that the primary player is of a certain minimum age before presenting information about the primary player to others (e.g., to secondary players). For example, a representative of the casino may ask to see a driver's license in order to verify the age of the primary player. In various embodiments, the casino may verify that the primary player is sober. For example, the casino may give the primary player a sobriety test. In various embodiments, the casino may reveal information indicated by the primary player only if the primary player is sober. In various embodiments, the casino may reveal information indicated by the primary player only if alcohol levels of the primary player fall within certain limits (e.g., are less than a certain level). In various embodiments, the casino may verify that the primary player is not sick. For example, the casino may have a doctor examine the primary players, or may ask the primary player basic health questions. In various embodiments, the casino may verify that the primary player is in a sane or competent state of mind. For example, the casino may administer a cognitive test to the primary player. The casino may only present information about the primary player if the primary player passes the cognitive test, for example. In various embodiments, the casino may use other criteria for determining whether to present information that a primary player has indicated he is willing to reveal. In various embodiments, the casino may use various criteria, such as those described above, to determine whether or not to ask the primary player to reveal information in the first place.

In various embodiments, once a primary player has indicated which information he is willing to reveal, the primary player may be asked to confirm one or more times. For example, the primary player may be presented with a list of information about himself that will be revealed. The primary player may then be asked to press a button, sign an area of a touch screen, apply a thumb print, or to provide any other indication that he agrees to reveal the information. In various embodiments, the primary player may be presented with a display that shows how his information will appear to others (e.g., when displayed on a public display screen; e.g., when displayed on the terminal of a secondary player). The primary player may be asked to confirm whether he really would like his information displayed, and/or whether he would like his information displayed in such a manner. The primary player may then have the opportunity to confirm or not.

In various embodiments, when a primary player gives permission for information about himself to be revealed, the permission may remain valid for a limited period of time. For example, permission may remain valid for a day. After the permission has expired, any information for which the permission applies and which is currently being displayed (e.g., on the terminal of a secondary player) may be taken down. In various embodiments, there may be a default period of validity for permission to reveal information about a primary player. For example, the default period may be 1 hour.

In various embodiments, a primary player may indicate limitations on how his information will be revealed. For example, the primary player may allow information to be displayed on individual terminals or mobile gaming devices, but not on more prominent public display screens. The primary player may allow his information to be displayed in certain areas of a casino but not in others. For example, the primary player may only give permission for his information to be revealed in high-limit areas of the casino.

In various embodiments, the primary player may indicate people to whom information may or may not be revealed. For example, a primary player may only wish information to be revealed to secondary players of a certain gender. For example, a primary player may only wish information to be revealed to people from a particular state. For example, a primary player may wish that no person from his home state be able to see certain information about him.

In various embodiments, a primary player may be paid based on the information he reveals. A primary player may be paid for each piece of information he allows to be revealed. A primary player may be paid based on the length of time that he allows information about himself to be presented. A primary player may be paid based on the forum in which he allows information to be presented. For example, the primary player may be paid extra for allowing information to be displayed on a prominent public display screen.

In various embodiments, a primary player may reveal information gradually, and/or over time. For example, a primary player may reveal a nickname. The primary player may later decide to reveal his first name. Later, the primary player may allow the revelation of his first and last name. For example, as the primary player achieves better performance, the primary player may take pride in revealing his identity as a top performer.

In various embodiments, the primary player may be prompted to reveal more information. For example, if a primary player breaks into the top ten in terms of performance, the casino may ask him whether he would like to reveal more information. In various embodiments, the casino may prompt the primary player to reveal performance metrics, such as an amount won.

4.1.8. Top performing machines or dealers. E.g., the dealer that is dealing the best hands for the player. For an individual game, data about the performance of a gaming device may be gathered. Performance data about a gaming device may describe whether an outcome was a winning outcome or a losing outcome, the amount paid for an outcome, the amount paid for a game, the number of winning outcomes that occurred during a game (e.g., the number of pay-lines that included winning outcomes), whether or not a gaming device was played, and so on. Performance data about individual games at a gaming may be aggregated over multiple games at a gaming device. A statistic may indicate a total amount paid out by a gaming device over a period of time or over some number of games. A statistic may indicate a gross amount of winnings paid out or a net amount of winnings paid out over a period of time or over some number of games. A statistic may indicate how many games were played at a gaming device over some period of time. A statistic may indicate a total number of winning outcomes or a total proportion of winning outcomes over some number of games or over some period of time. In some embodiments, data about a player may be recorded for an individual game. An aggregate statistic may indicate the number of different players who have played a gaming device over some period of time. A statistic may indicate the average number of games played by a player at the gaming device over some period of time. For example, in the last day, the average number of games played by a player at a gaming device may be 60. In various embodiments, data about the performance of multiple gaming devices may be aggregated. Top performing gaming devices may be listed. For example, the 10 gaming devices which have paid the most in the last hour may be listed. For example, the 10 gaming devices which have paid the most as a multiple of the average amounts bet may be listed. For example, the 10 gaming devices which have paid out the least in the last 3 hours may be listed. For example, all the gaming devices which have made payouts of more than X amount in the last hour may be listed.

In various embodiments, performance data about a game with a particular dealer may be gathered. Performance data may include data describing the payouts provided for a game with the dealer, the net winnings for one or more primary players in the game with the dealer, the speed of the game with the dealer, the presence of high-paying outcomes in the game of the dealer, the amount of a tip or tips given to the dealer, and so on. Performance data about a dealer may be aggregated over multiple games. For example, a statistic may indicate the average number of games dealt per unit time for the dealer. A statistic may indicate the total payouts received by primary players who have been in the games of the dealer during the last hour. A statistic may indicate the total amount of tips given to the dealer in the last half hour.

4.1.9. Top performing sectors of a casino. E.g., the slot machines in this bank have done the best. In various embodiments, data about games which have occurred in a sector or region of a casino may be aggregated. Data may be aggregated for games played at a group of slot machines, such as for a group of slot machines at a bank of slot machines. Data may be aggregated for a set of gaming tables, such as for a set of tables overseen by a single pit boss or other casino employee. Data may be aggregated for a floor of a casino or for a room of a casino. For example, data related to the games played in a high-limit slot machine room may be aggregated. In some embodiments, data may be aggregated for slot machines of a given betting denomination. For example, data may be aggregated for all nickel slots. Data may be aggregated for all slot machines with particular types of payouts. For example, data may be aggregated for slot machines with progressive payouts. For example, data may be aggregated for slot machines with top payout ratios of 800 or more. In some embodiments, data may be aggregated for slot machines of a particular type. For example, data about games at mechanical slot machines may be aggregated. For example, data about games at video slot machines may be aggregated. Data may be aggregated for slot machines which feature a particular game. For example, data may be aggregated for all slot machines with a Scrabble™ theme. Thus, for example, the five video poker machines which have paid the most in the last hour may be listed. The five nickel slot machines which have provided primary players with the highest winnings in the last hour may be listed.

4.1.10. A list of current progressive amounts. In some embodiments, data related to a current amount of a progressive prize may be gathered. The size of one or more progressive prizes at a given moment in time may be listed. Progressive prizes may be listed in order of size. For example, the Jumbo Bucko's progressive prize may be listed as $50,149.75. The Super Gold Vein progressive prize may be listed as $40,984.05, and so on.

4.1.11. Number of people at a casino or in particular areas of a casino. In various embodiments, data about the number of people at a casino or within a given area of a casino may be gathered. Data may be gathered about: (a) the number of people at a particular bank of slot machines; (b) the number of people at a table game; (c) the number of people in a restaurant; (d) the number of people on a particular floor of the casino; (e) the number of people in the lobby of the casino hotel; (f) the number of people at the casino swimming pool; (g) the number of people in the room of the high limit slot machines; (h) the number of people in the poker room of the casino; (i) the number of people attending a show; (j) the number of people at a boxing match at a casino; and so on. In various embodiments, data may be gathered in relation to the number of people with a certain characteristic. For example, data may be gathered describing the number of people from New Mexico, or the number of people between the ages of 40 and 50 at a casino.

4.1.12. Slot machines that are most popular—e.g., most heavily occupied. In various embodiments, data may be gathered describing the use of a gaming device, such as a slot machine or video poker machine. The number of games played at a gaming device may be tracked. The number of games played at a gaming device in a particular period of time may be tracked. The amount wagered at a gaming device may be tracked. Other items that may be tracked may include: (a) the number of pay lines played; (b) the average number of coins bet per pay-line; (c) the number of primary players who play a gaming device in a particular period of time; (d) the duration of a waiting period between when one player gets up from a gaming device and when the next player sits down; (e) the number of people in the vicinity of a gaming device; and so on. In various embodiments, data about the use or popularity of a gaming device may be aggregated over multiple gaming devices. The aggregation may occur over gaming devices that feature the same game; over gaming devices that feature the same betting denomination; over gaming devices from the same manufacturer; over gaming devices with the same broad theme (e.g., over gaming devices featuring any Monopoly® related game); over gaming devices falling within the same broad category (e.g., over video poker machines; e.g., over mechanical slot machines; e.g., over video slot machines; e.g., over video bingo machines); over gaming devices in the same area of a casino; and so on. In some embodiments, a statistic may describe the percentage of time that a particular type of slot machine was occupied during the last day. For example, a statistic may indicate that video poker machines were occupied 40% of the time, on average, over the last hour. In some embodiments, a statistic may describe the average amount won at all dollar denominated gaming devices in a casino in the last three hours. In some embodiments, a statistic may describe the average amount of money won by the casino per machine for all machines based on the Wheel of Fortune® theme. In some embodiments, a statistic may indicate the average amount of time that elapsed between when one player got up and when the next player sat down at a particular group of progressive slot machines. In various embodiments, information about slot machine utilization may be transmitted to one or more financial markets for use in evaluating the performance of a slot machine manufacturer.

4.1.13. All manners in which the player interacted with the machine. In some embodiments, data may be gathered describing how a primary player interacted with a gaming device. Such data may provide insight into the mood of a player. For example, a player who is slamming the button of a gaming device may be frustrated or impatient.

4.1.13.1. He pressed the button hard. In various embodiments, data may be gathered about how much physical pressure a primary applied to a gaming device. A primary player may apply pressure to a "spin" button, to another button, to a handle, or to a touch screen, for example. Pressure sensors or other sensors in the gaming device may sense the pressure applied by a player. Pressure may be detected as applied to any other surface of a gaming device. For example, the pressure of a drink or the pressure of a primary player leaning on the surface of a gaming device may be detected with pressure sensors. Sensors may detect strikes or blows to the gaming device as well. For example, pressure sensors or vibration sensors may detect kicks to the base of the gaming device. Data about pressure may be aggregated over multiple games, gaming devices, players, etc. For example, a statistic may indicate that the average pressure applied to a button was X pounds per square inch for all gaming devices across the casino in the last hour.

4.1.13.2. What is the precise time at which he presses the button? In various embodiments, the time may be recorded as to when a button was pressed at a gaming device. For example, data may indicate that a button was pressed at 11:45:02 AM. Data about the times when buttons were pressed may be aggregated over multiple games. For example, data about the times buttons were pressed may allow the derivation of a statistic describing the average length of time between games at a gaming device. In some embodiments, a graph may show the number of button presses across a casino as a function of time. For example, each bar on the graph may represent the number of button presses at a casino over a period of time. The graph may indicate times of heavy activity and times of light activity at a casino. For example, activity may die down near the end of an hour as gamers stop to make an appointment or find an activity starting on the hour.

4.1.13.3. Does he press the button or pull the handle? In some embodiments, data for a game may be gathered describing how a primary player initiated play of the game. Data may indicate whether a primary player pressed a button, pulled a handle, had a game initiated automatically on his behalf, or otherwise initiated a game. Data about the way in which a game may be initiated may be aggregated over multiple games. Such data in aggregated form may be described by a statistic. For example, a statistic may describe the number of times a particular primary player pressed the button to initiate a game during a particular period of time. For example, a statistic may describe the number of times any primary player in a casino pulled a handle to initiate play at a gaming device during the day of Jan. 14, 2003.

4.2. How quickly does he pull the handle? In various embodiments, data for a game may be gathered describing how quickly a primary player initiated a series of games at a gaming device. Data may include the time at which a primary player initiated play of a game. Data may include a time difference between the initiation of a first game and the initiation of a second game. Data may be aggregated over multiple game intervals. For example, a statistic may describe the average time between when a primary player initiates a first game and when the primary player initiates a second game. Data may be aggregated over multiple primary players. For example, a statistic may describe the average time between game initiations for a group of primary players. In various embodiments, data may be gathered for the time at which a payout is made, the time when an outcome appears on the screen or in the viewing window, or for any other event during a game. A time between games may thereby be derived.

4.3. API. In various embodiments, APIs may be used to facilitate data exchange and system interaction in accordance with various embodiments. Sensors used to gather data may communicate data gathered via APIs. For example, a software application may use an API associated with a camera to retrieve image data from the camera. A software application may use an API associated with a pressure sensor to retrieve data from the sensor, e.g., data about the weight of chips placed over the sensor. A software application may use an API associated with a card reader to retrieve data about the cards that have passed over the reader. For example, the reader may be attached to a card shoe and may thereby gather data about the cards dealt from the card shoe. In various embodiments, a display may include an API. A software application may interact with the display's API in order to cause the display to display text, graphics, or animations.

4.4. Betting on aggregates of data. E.g., more than 200 reds on roulette in a day, or 100 blackjacks. In various embodiments, a secondary player may place a bet that a statistic will take a certain value or range of values. The statistic may represent an aggregate of data from two or more games. For example, a secondary player may bet that a statistic describing the number of "red" outcomes at any roulette wheel across a casino in the next hour will have a value in the range of 200 to 250. In other words, the secondary player may bet that there will be between 200 and 250 "red" outcomes at any roulette wheel in the casino over the next hour. If, in the next hour, there are in fact between 200 and 250 "red" outcomes, the player may receive his bet back plus an additional payout. The additional payout may be some function of the bet size, such as one times the bet size, two times the bet size, or any other multiple of the bet size.

Embodiments described herein may apply to statistics about the future or to historical statistics. For example, a secondary player may bet that in the next hour, there will be two payouts won at a casino exceeding $1000. Such a bet may constitute a bet on a statistic about the future. As another example, a secondary player may bet that between the hours of 3:00 pm and 6:00 pm on Oct. 12, 2003, at a particular machine at a particular casino, there were 200 losing outcomes generated. Such a bet may constitute a bet on a statistic about the past. Although a secondary player may make a bet about the past, the bet may still be based upon a random or uncertain set of events, since the secondary player may not be aware of what happened in the past which was relevant to the statistic. Embodiments described herein may apply to statistics about the present. For example, a secondary player may bet that, for all video poker games currently in progress, there are twenty games in which the initial five-card hand dealt contains three-of-a-kind or better. Embodiments described herein may apply to statistics that encompass the past and the present, to statistics that encompass the present and the future, to statistics that encompass the past and the future, and to statistics that encompass the past, present and future. For example, a secondary player may bet that at a point in time 30 minutes into the future, there will have been twenty bonus rounds achieved at a bank of slot machines in the past 50 minutes (i.e., in the period beginning 20 minutes before the present and stretching to 30 minutes into the future).

4.4.1. Times and statistic initiations. In various embodiments, a bet may be based on the value of a statistic at certain times. In some embodiment, the bet is based on an initialization value for a statistic. A statistic may take an initial value of 0, for example. A statistic may take a certain initial value at a designated time. The designated time may be, for example, the time at which the bet is placed, one minute after the bet is placed, the start of the next hour (e.g., 8:00; e.g., 2:00), the start of the next day, the start of the next month, and so on. For example, a statistic may represent the number of times a royal flush has been dealt at any video poker machine in a bank of machines. The statistic may be initialized to zero at a designated time and date, such as at 12:00 am on Oct. 1, 2010. The statistic may then increment by one for each royal flush dealt at the bank of machines. In various embodiments, a bet may be based on a second value of a statistic. The second value of the statistic may be the value of the statistic at a designated time. For example, the second value of the statistic may be the value the statistic takes one hour after the time of the initialization value of the statistic. The second value of the statistic may be the value the statistic takes three hours, two days, or any designated time after the initialization value of the statistic. To continue with a prior example, the statistic which was initialized to 0 on Oct. 1, 2010 may take its second value at 12:00 am on Nov. 1, 2010. Thus, a secondary player may bet that a statistic which is initialized to the value of 0 at 12:00 am on Oct. 1, 2010 will take a value of between 30 and 40 at 12:00 am on Nov. 1, 2010.

In various embodiments, a secondary player may bet on the value that a statistic will take at a certain period of time, without any initialization time or value being specified. The statistic may represent an ongoing statistic, for example, that is updated generally whether or not any bets are placed on the value of the statistic. For example, a statistic may describe the value of a particular progressive jackpot. A secondary player may bet that the value of the statistic (and thus, the value of the progressive jackpot) will be over $1.2 million at 3:00 pm on Oct.

4, 2010. In some embodiments, a casino may keep track of the number of "red" outcomes and the number of "black" outcomes that occur at all roulette wheels at a casino. For example, at a particular point in time, a statistic describing the number of "red" outcomes (e.g., since the beginning of the week) may read "1204", and a statistic describing the number of "black" outcomes may read "1154". A secondary player may place a bet which wins if the statistic describing the number of "red" outcomes reaches 1300 in the next hour. A secondary player may place a bet which wins if the difference between the value of the "red" statistic and the value of the "black" statistic is more than 100 one hour after the bet is placed. In some embodiments, an ongoing statistic may be transformed into a statistic with a desired initialization value, e.g., through a simple mathematical transformation. For example, a second statistic may be defined as the value of a first statistic less 1204. Thus, the aforementioned statistic indicating that 1204 "red" outcomes had occurred at a casino in some prior period may be converted into a second statistic which will describe the number of "red" outcomes to occur at a casino going forward from the time the second statistic has been defined.

In various embodiments, a secondary player may bet that the value of a statistic will fall into a non-continuous range. For example, a secondary player may place a bet on the value of a statistic describing the number of times a dealer busts at any blackjack game in a casino during the next hour. The secondary player may bet that the dealers will bust a total of between 50 and 75 times, or between 100 and 125 times. Thus, the secondary player may win if the dealers bust 60 times or 110 times, but not if the dealers bust 90 times, for example.

4.4.2. Bets on statistical values at multiple times. In various embodiments, a secondary player may bet that a statistic will take on different values at different times. In various embodiments, a secondary player may bet that a statistic will fall into different ranges of values at different times. In various embodiments, a secondary player may bet on a path that a statistic will take. For example, if the value of a statistic is plotted as a function of time, the secondary player may bet that the plot will follow a certain path and/or take a certain shape. In various embodiments, a secondary player may bet that the value of a statistic will fall within a first range at a first time and within a second range at a second time. In various embodiments, a secondary player may bet that the value of a statistic will fall within a first range at a first time, within a second range at a second time, and within a third range at a third time. For example, a secondary player may bet that a statistic describing the number of sevens rolled at a craps table starting from 8:00 am will fall between 15 and 20 at 9:00 am, and between 40 and 50 at 10:00 am. Thus, the secondary player will win his bet if there have been 18 sevens rolled at 9:00 am and 44 sevens rolled at 10:00 am. However, the secondary player will not win his bet if there have not been between 15 and 20 sevens by 9:00 am or if there have not been between 40 and 50 sevens by 10:00 am. In some embodiments, a secondary player may win a bet if the value of a statistic satisfies a first condition at a first time or a second condition at a second time. For example, suppose that a statistic describes the number of times any primary player has received a blackjack at a particular blackjack table since 4:00 pm. The secondary player may place a bet which wins if the statistic has a value between 10 and 20 at 4:30, or which wins if the statistic has a value between 30 and 40 at 5:00.

In various embodiments, a secondary player may place a bet which wins based on the value of the statistic meeting any defined condition or combination of conditions. For example, a secondary player may win a bet if a statistic satisfies any 3 of 4 defined conditions.

In various embodiments, a secondary player may bet that a statistic will take on a particular value during a particular period of time. For example, a secondary player may bet that the total number of "bell" symbols to appear at a particular slot machine since 7:00 pm will reach 40 between 8:00 pm and 8:10 pm. If the value of the statistic reaches 40 at 8:01 pm, for example, then the secondary player will win. However, if the value of the statistic reaches 40 at 8:13 pm, then the secondary player will lose. In various embodiments, a secondary player may bet that the value of a statistic will fall within a certain range of values during a certain time period. For example, a particular statistic may describe the number of outcomes with payouts of more than 30 coins that have occurred at a particular slot machine since 9:00 am. The secondary player may bet that the value of the statistic will be in the range of 5 to 10 sometime between 9:30 am and 9:35 am. The secondary player would win his bet, for example, if the value of the statistic was at 5 at 9:35 am, or was at 10 at 9:30 am. However, the secondary player would lose his bet, for example, if the value of the statistic had already reached 11 by 9:30 am, or hadn't yet reached 5 by 9:35 am.

4.4.3. Bets on combinations of statistics. A first statistic will take a first range of values and a second statistic will take a second range of values. In some embodiments, a secondary player may bet on the values of two or more statistics. For example, a secondary player may bet that a first statistic will reach a first value and that a second statistic will reach a second value at a designated time. For example, a secondary player may bet that the ace of spades will be dealt 200 times in the next hour at a bank of video poker machines, and that the ace of hearts will be dealt 210 times in the next hour at the same bank of machines. The secondary player may win his bet if both the ace of spades is dealt 200 times in the next hour and the ace of hearts is dealt 210 times in the next hour. If the ace of spades is not dealt exactly 200 times, or the ace of hearts is not dealt exactly 210 times, then the secondary player may not win the bet. In some embodiments, a secondary player may bet that either a first statistic will reach a first value or a second statistic will reach a second value. For example, a secondary player may bet that either the number 3 will occur 20 times at a roulette wheel in the next day, or that the number 7 will occur 20 times at a roulette wheel in the next day. In various embodiments, a secondary player may bet that any combination of conditions will be met by a set of one or more statistics. For example, a secondary player may place a bet involving four statistics in which a separate condition applies to each statistic. The secondary player may win the bet if at least two of the conditions are met. For example, the secondary player may win a bet if at least two of the following are true: (a) there are at least 20 outcomes that occur at a gaming device between 3:00 pm and 4:00 pm that pay more than 20 coins; (b) there are at least 3 bonus rounds that occur at the gaming device between 3:00 pm and 4:00 pm; (c) the net winnings of a primary player at the gaming device between 3:00 pm and 4:00 pm are less than 5 coins; and (d) there are between 20 and 30 payouts at the gaming device between 3:00 pm and 4:00 pm that consist of an odd number of coins.

4.4.4. Conditional bets. The player bets there will be between 95 and 105 reds if there are 200 spins. In some embodiments, a secondary player may make a bet that pays based on a statistic having a particular range of values, but which is conditional on some other circumstance. For example, a secondary player may bet that there will be between 200 and 250 losing outcomes at a gaming device during the period between 4:00 pm and 5:00 pm on Nov. 12, 2001, but only if there are at least 300 games played at the gaming device. If the condition is not met, then the bet may be considered void or a tie. If the condition is not met, then a different condition may apply. For example, a secondary player may bet that there will be between 200 and 250 losing outcomes if there are at least 300 games played, and that that there will be between 100 and 125 losing outcomes if there are less than 300 games played.

4.4.5. The statistic may pay differently for different values. In various embodiments, a secondary player may make a bet which pays a first amount if a statistic has a first value, a second amount if a statistic has a second value, and a third amount if a statistic has a third value. For example, a secondary player may bet on a statistic describing the number of times the banker wins in a game of baccarat during a particular one-hour period. If the banker wins between 15 and 20 times, the secondary player may receive his bet back plus an additional amount equal to his bet. If the banker wins more than 20 times, the secondary player may receive his bet back plus an additional amount equal to twice his bet. If the banker wins less than 15 times, the secondary player may lose his bet. In some embodiments, a secondary player may win an amount that is a linear or affine function of a statistic over a certain range of possible values of the statistic. For example, a secondary player may bet on the number of times that a particular primary player's two-card hand in a game of pai gow poker will beat the banker's two-card hand, in a particular one-hour period. The secondary player may win an amount equal to $B \times 0.1 \times (N-15)$, for any $N>15$, where N represents the number of times that the particular primary player's two-card hand wins, and B represents the bet amount made by the secondary player. For example, if N is equal to 25, then the secondary player will win $B \times 0.1 \times (25-15)$, or B. If $N<=15$, then the secondary player may win nothing and, e.g., lose his bet. It will be appreciated that a statistic could simply be defined to equal $B \times 0.1 \times (N-15)$, or any other function of a simpler statistic. In the former case, the secondary player's payout might be defined by the statistic.

In various embodiments, a secondary player may make a bet. The bet may designate a particular value of a statistic. For example, a statistic may represent the number of times that the banker wins during a particular hour at a particular table of pai gow power. The designated value of the statistic may be 20. The payout to the secondary player may increase by a certain amount for each unit by which the statistic exceeds the designated amount. For example, for each number of times above 20 that the banker wins, the secondary player's payout may go up by $1. In some embodiments, the payout to a secondary player may increase for each unit below a designated value that a statistic falls. For example, a statistic may represent the number of times that a war is initiated in the game of casino war at a particular table during a particular three-hour period. The designated value may be 10. A payout to a secondary player may increase by $5 for each unit below 10 that the statistic falls. For example, if the value of the statistic is 9, then the secondary player may win $5. If the value of the statistic is 8, the secondary player may win $10, and so on. If the value of the statistic is 10 or above, then the secondary player may win nothing. The secondary player may lose his bet.

In various embodiments, a secondary player may lose more than the amount of his bet depending on the value of a statistic. For example, if a statistic reaches a certain value, the secondary player may lose twice the amount of his bet. Thus, the secondary player may lose the original amount of his bet and may be further obligated to supply an additional amount equal to the original amount of his bet. In various embodiments, a secondary player may lose more money the further the value of a statistic departs from a designated value. For example, a designated value for a statistic may be 20. The secondary player may lose $1 if the actual value of the statistic is 19, $2 if the actual value of the statistic is 18, $3 if the actual value of the statistic is 17, and so on.

In various embodiments the secondary player may make a spread bet based on the value of a statistic. A spread bet may include a designated value of the statistic. If the actual value of the statistic is greater than the designated value, then the secondary player may be paid in proportion to the amount by which the actual statistic is greater. If the actual value of the statistic is less than the designated value, the secondary player may lose an amount that is proportional to the amount by which the actual statistic is less. A secondary player may also lose if the actual value of a statistic is greater than a designated value, and win if the actual value of the statistic is less than the designated value. For example, a secondary player may win an amount that is proportional to the amount by which the actual value of the statistic is less than the designated value of the statistic. The secondary player may lose an amount that is proportional to the amount by which the actual value of the statistic is greater than the designated value of the statistic.

In various embodiments, a spread bet may include a constant that is added to a payout or to an amount owed by a secondary player. For example, a secondary player may be paid an amount which is proportional to the difference between an actual value of a statistic and a designated value of a statistic plus a constant. The constant may be positive or negative. For example, a secondary player may be paid an amount equal to $\$1 \times (A-D)+c$, where A is the actual value of a statistic, D is the designated value of the statistic, and c is a constant. In various embodiments, the secondary player may be paid an amount equal to $1*k*(A-D)+c$, where k is a constant. In various embodiments, the secondary player may be paid $1*k*(A-D)+c_1$ if $A>D$, and $1*k*(A-D)+c_2$ if $A \leq D$, where $c_1$ and $c_2$ are two different constants. In various embodiments, the secondary player may be paid $1*k*(A-D)+c_1$ if $A>D$, $1*k*(A-D)+c_2$ if $A<D$, and $c_3$ if $A=D$, where $c_1$, $c_2$, and $c_3$ are three different constants.

4.4.6. Betting on the aggregation of craps rolls. In various embodiments, a statistic may describe a summation of numbers that arise from two or more games or from two or more events. For example, a statistic may represent the sum of the point totals a player has achieved in three games of blackjack. For example, if a player achieves a hand with a point total of 16 in a first game of blackjack, a hand with a point total of 21 in a second game of blackjack, and a hand with a point total of 14 in a third game of blackjack, then the value of the statistic may be 51. A statistic may represent the sum of point totals from two or more primary players in a single game of blackjack. For example, a statistic may represent the sum of point totals from the hands of Bob, Joe, and Sam, all of whom participate in the same game at a particular gaming table in a casino. In some embodiments, a statistic may represent the sum of point totals for both player and dealer hands. In some embodiments, a statistic may represent the sum of dealer point totals from multiple games. In some embodiments, a statistic may represent a sum of card point totals. For example, a statistic may represent the sum of points from every card dealt during a game, or for every card dealt during a plurality of games.

In some embodiments, a statistic may represent the sum of numbers revealed on tiles or dominoes in a game. For example, a statistic may represent the sum of numbers revealed on dominoes in the game of pai gow.

In some embodiments, a statistic may represent the sum of numbers achieved during two or more rolls of dice. Such dice rolls may occur in craps, in sic bo, or in any other game. In a game of craps, a statistic may represent the sum of two or more dice rolls during a game. For example, a statistic may represent the sum of all dice rolls made between when a pass-line bet is made and when the pass-line bet is resolved (e.g., in the player's favor, e.g., in the dealer's favor). As another example, a statistic may represent the sum of a fixed number of rolls made during a game. For example, a statistic may represent the sum of the first three rolls made during a game of craps. In some embodiments, a statistic may represent the sum of rolls made in two or more separate games. For example, a statistic may represent the sum of the rolls made in five consecutive games of craps.

In various embodiments, a secondary player may place a bet with a payout that depends on the value of statistic representing the sum of points, dice rolls, or any other numbers. For example, a secondary player may place a bet that a statistic representing the sum of three dice rolls in craps will have a value in excess of 21. The secondary player may win the amount of his bet if the value of the statistic exceeds 21, and lose the value of his bet otherwise. Suppose, to continue the above example, that the three dice rolls are 10, 6, and 8. The value of the statistic would then be 24, which is the sum of 10, 6, and 8. The secondary player would therefore win the amount of his bet.

In another example, a secondary player may place a bet on the value of a statistic that represents the sum of the first roll of the dice from each of the next five craps games. The player may win if the value of the statistic is less than 32, but lose otherwise. Suppose, for the next five games, the first rolls occur as follows: 4, 7, 9, 5, 9. Accordingly, the value of the statistic would be 34. Thus, in this example, the secondary player would lose.

In various embodiments, a statistic may represent the sum of rolls from multiple different craps tables. For example, a statistic may represent the sum of all rolls at every craps table at a casino during a given five-minute period. For example, a statistic may represent the sum of the next roll at each of five craps tables.

In various embodiments, a statistic may represent the sum of numbers rolled on individual dice. For example, a statistic may represent the sum of the lowest die in each of the next three rolls. For example, let the ordered pair (x, y) represent a single roll with x representing the number on one die in the roll and y representing the number on the other die in the roll. Suppose the next three rolls occur as follows: (3, 5); (6, 4); (1, 3). The value of the statistic would be equal to the sum of 3, 4, and 1, which is equal to 8.

In various embodiments, a statistic may represent any function of points, rolls of the dice, or other numbers. For example, a statistic may represent the product of dice rolls. For example, if three dice rolls are 4, 3, and 10, the statistic may take the value of 120, which is equal to the product of 4, 3, and 10.

In various embodiments, a secondary player may make a bet whose payout depends on the actual value of a statistic relative to a designated value. In some embodiments, a secondary player may make a bet whose payout is proportional to a difference between the actual value of a statistic and a designated value of the statistic. Such a bet may be referred to as a spread bet, in some embodiments. For example, a secondary player may place a bet on the value of a statistic representing the sum of three rolls of dice in a game of craps. The designated value may be 21. The player may receive $1 for every unit that the actual value of the statistic exceeds the designated value of 21. For example, if the actual value of the statistic turns out to be 24, then the player may receive $3. In some embodiments, a secondary player may owe an amount that is proportional to the amount by which the actual value of the statistic is less than the designated value. For example, if the actual value of the statistic turns out to be 14, then the player may owe an amount equal to $10. Any amount previously provided by the secondary player may count towards the amount owed. For example, the amount of a bet previously placed by the secondary player may count towards the amount owed.

Mobile Device Interacts with a Proximate Game

In various embodiments, a player (e.g., a primary player; e.g., a secondary player) may carry a mobile device. The mobile device may provide an interface via which the player may participate in a game. The mobile device may receive data from a casino server, from a gaming device, from a gaming table, or from any other source. The data may include game data. Based on the data, the mobile device may create or recreate a depiction of a game. For example, the data received by the mobile device may include data indicating cards that have been dealt in a game, numbers that have been rolled on dice, numbers which have been determined in a roulette game, and so on. Based on the data, the mobile device may create or recreate a depiction of a slot machine game, a video poker game, a roulette game, or any other game. In some embodiments, the mobile device may indicate, e.g., via text on a display screen, the events that occurred in a game without graphically depicting the game. The mobile device may include input devices such as buttons, touch pads, track balls, keys, touch screens, microphones, and so on. The mobile device may accept commands and other inputs from the player via the input devices. The mobile device may receive from the player inputs indicating an amount to bet on a game, a strategy to be used in a game, a decision to be made in a game, a bet to be made in a game, and so on. The mobile device may transmit any inputs received from the player to the casino server, to a gaming device (e.g., to a slot machine), to a gaming table, to a dealer, to a croupier, or to any other entity that is conducting a game. The mobile device may communicate via an intermediary with an entity conducting a game. For example, the mobile device may transmit data to and receive data from a casino server. The casino server may, in turn, transmit data to and receive data from a table game. In this way, the table game and the mobile device may communicate through the casino server.

Using the mobile device, the player may participate in a live game. If the player is acting as a primary player, then the player may initiate the play of the game and make decisions in the game. If the player is acting as a secondary player, then the player may place a bet on a game of a primary player.

In various embodiments, the mobile device may be configured to select an entity conducting a game based on the location of the entity and/or based on the location of the game. For example, a mobile device may be configured to select a table game of blackjack that is located within 100 feet of the mobile gaming device. Accordingly, the mobile device may begin receiving data from the table game and transmitting data to the table game. The mobile device may transmit to the table game an indication that the player wishes to make a bet and start a new game. A dealer at the table game may receive instructions from the mobile device. For example, a wireless receiver at the table game may receive instructions from the mobile device and cause them to be displayed on a monitor at the table game. The dealer may follow the instructions. For example, the dealer may deal cards at a new position at the table. The position may remain physically unoccupied. Nevertheless, the cards may represent the cards of the player who is playing via the mobile device. As events occur in the table game, data about such events may be transmitted to the mobile device. For example, the cards dealt to the hand of the player may be read by a reader on the card shoe as they are dealt. Data indicative of the cards may be transmitted to the mobile device via a wireless transmitter at the table. The mobile device may receive the data and display game information to the player based on the received data. The player may input game decisions, such as hit or stand decisions, after which such decisions may be transmitted back to the game table by the mobile device. The process may continue through one game or through a whole series of games.

In various embodiments, a mobile device may initiate communication with a table game, gaming device, or other entity that is most proximate to the mobile device. For example, the mobile device may determine that a particular slot machine is the closest slot machine to the mobile device. Accordingly, the mobile device may initiate communication with the slot machine. The player with the mobile device may then participate in the games of the slot machine. The player may participate as a primary player or as a secondary player, in various embodiments. If the player participates as a primary player, the mobile gaming device may receive an amount of a bet from the player and then transmit a signal to the gaming device, thereby triggering the gaming device to generate an outcome. Thus, the gaming device may be triggered to spin and generate an outcome without the physical presence of a player directly in front of the gaming device. For example, the player may be located ten feet away from the gaming device, yet the gaming device may initiate a game and generate an outcome in response to a signal from the mobile device.

In various embodiments, the mobile device may initiate communication with a table, gaming device, game, or other computing device that relays information to and from a game, based on the proximity of the game and based on the type of game. For example, the mobile device may initiate communication with the closest game that is a video poker game. For example the mobile device may initiate communication with the closest game that is a blackjack game. For example, the mobile device may initiate communication with the closest game that is a craps game.

In various embodiments, the mobile device may initiate communication with a game based on the presence of a primary player at the game. For example, the player with the mobile device may wish to act as a secondary player in a game of blackjack. Accordingly, the player may wish to find the nearest game of blackjack in which there is already a primary player participating. The player with the mobile device may then act as a secondary player and participate in the game of the existing primary player. In various embodiments, if the player with the mobile device wishes to act as a primary player, the mobile device may initiate communication with a game where there is a spot available for a primary player. For example, a player with a mobile device may wish to participate in a game of blackjack as a primary player. The mobile device may initiate communication with a blackjack table at which at least one seat is unfilled. The player with the mobile device may play in the game of blackjack as a primary player. However, in various embodiments, the player with the mobile device need not actually sit down at the table. The dealer may simply deal cards to a particular spot which is understood to belong to the player with the mobile device. The player with the mobile device may make game decisions and key them into the mobile device. The mobile device may communicate the decisions to the blackjack table (e.g., to a computing device with transmitting/receiving antenna situated on the blackjack table). The decisions of the player may then be communicated to a dealer who may then act based on the decisions, e.g., by dealing or not dealing cards.

In various embodiments, a mobile device may initiate communication with a game, a gaming device, a device which is associated with a game, etc., based on a number of factors. A mobile device may communicate with a game based on: (a) the type of game (e.g., poker; e.g., blackjack; e.g., slot machine); (b) based on the amount of the bet required at the game (e.g., the mobile device may initiate communication with a game only if the minimum bet required is less than $25; e.g., the mobile device may initiate communication with a game only if the minimum bet required is greater than $1); (c) the availability of a spot at the game; (d) based on the presence of a particular dealer (e.g., the mobile device may initiate communication with a game if dealer Joe Smith is dealing); (e) based on historical outcomes of the game (e.g., the mobile device may initiate communication with a game if the last 5 games played were winning games; e.g., the mobile device may initiate communication with a game if primary players at the game have lost more than $100 in the last hour); (f) based on the proximity of the game to the mobile device; (g) based on the location of the game; (h) based on the location of the mobile device; and so on.

In various embodiments, the mobile device may initiate communication with a game automatically once a triggering condition has been met. For example, when the mobile device comes within ten feet of a blackjack game, communication may be automatically initiated between the game and the mobile device. Communication may be triggered without input from the player with the gaming device. The triggering conditions may, however, have been previously entered or defined by the player with the mobile device.

The mobile device may have various ways of determining if the mobile device is proximate to a game. The mobile device may include a location sensor or detector. For example, the mobile device may include a GPS reader. For example, the mobile device may receive signals from multiple fixed beacons with known locations and triangulate its own location based on arrival times of the signals from the fixed beacons. The mobile device may store records of the locations of various games. For example, the mobile device may include an internal map detailing the locations of various games. If the mobile device determines that it is at a particular location, and finds that the particular location happens to be close to the location of a game (e.g, as determined from the internal map), then the mobile device may determine that the mobile device is proximate to the game. The mobile device may thereby initiate communication with the game.

In various embodiments, a game (e.g., a gaming device; e.g., a table game) may include a beacon or antenna that broadcasts signals within a short range. For example, a game may include a radio frequency identification (RFID) tag. The signal broadcast by the game may be detectable within a certain radius of the game. The mobile device may include a receiver which is capable of detecting the signal broadcast from the game. If the mobile device detects the signal, the mobile device may initiate communication with the game.

In various embodiments, a game (e.g., a gaming device; e.g., a table game) may initiate communication with a mobile device. In various embodiments, a game may detect when the mobile device is proximate. For example, the mobile device may contain an antenna that broadcasts signals within a short radius of the mobile device. For example, the mobile device may include a radio frequency identification (RFID) tag. A game may detect the presence of the tag and may initiate communication with the mobile device.

In various embodiments, the mobile device may broadcast signals. The signals may be detected at fixed detectors at known locations, e.g., at known locations in a casino. The position of the mobile device may then be triangulated using methods well known to those skilled in the art. For example, based on the travel time of the signal to a fixed detector, a circle may be drawn around the detector indicating possible locations of the mobile device. With several detectors in place, multiple circles may be drawn. The mobile device may be assumed to be located where the circles all intersect, or come close to intersecting. The casino server may be in communication with the detectors. The casino server may thereby derive the location of the mobile device. The casino server may compare the location of the mobile device to known locations of a game. If the mobile device is found to be proximate to a game, the casino may alert the game and/or the mobile device of the proximity. The mobile device may thereupon initiate communication with the game or vice versa.

In various embodiments, a player may participate at a table game via a mobile device. The player may enter bets into the mobile device. The player may have an account balance with the casino. For example, the player may have $10,000 on deposit with the casino. As the player enters a bet, the amount of the bet may be deducted from the player's account balance. When the player wins money in a game, the amount of the win may be added to the player's account balance. In various embodiments, the player may place bets through the mobile device without such bets being revealed to other players. For example, the player with the mobile device may enter bets into the mobile device (e.g., by keying in an amount of the bet) without having to actually place chips on a gaming table. The player with the mobile device thus avoids a situation where other players can see how many chips are being bet by the player with the mobile device. The ability to place a bet without the amount of the bet being revealed to other players (or to spectators) may be important to a player. A player who is betting a lot of money may wish to avoid attracting attention of potential thieves, for example. A player may also benefit from not having to carry large amounts of money away from a table. For example, a player may win $40,000 at a table. Rather than gathering his $40,000 in chips and leaving, the player may have his winning stored in his account with the casino, where they cannot easily be stolen.

The ability of a mobile device to communicate with a game and to allow the player with the mobile device to participate in the game may offer additional benefits. In some embodiments, a table game may be full. For example, every seat at a blackjack table may be currently occupied by players. The player with the mobile device may nevertheless be able to participate in a game at the table. For example, the dealer may deal an extra hand for the player with the mobile device and place such a hand in a spot with no seat in front of it (e.g., in a spot close to the dealer).

In various embodiments, a player may use a handheld device whether the device is used to play a primary game (e.g., against the dealer) or whether the device is used to play a secondary game.

In various embodiments, a player participating in table game using a mobile device may send a tip to the dealer of the game using the mobile device. For example, the player may use input devices (e.g., keys; e.g., a touch screen) on the mobile device to indicate a desire to provide a tip and to indicate an amount of a tip. The amount of the tip may be deducted from an account balance that the player has with the casino. The amount of the tip may be credited to an account of the dealer. The dealer may be authorized to take an amount of chips equal to the tip from the table and put such chips in his pocket, for example. Using a mobile device, a player may indicate: (a) an amount of a tip to provide; (b) a message to be associated with the tip (e.g., "Hi, this tip is from Joe"; e.g., "Hi, thanks for the cards last hand!"); (c) a dealer to which to provide the tip (e.g., the player may be simultaneously participating in games at two or more tables and may need to specify a dealer); (d) whether or not the tip will be provided anonymously; and so on. In various embodiments, when a tip is sent to a dealer, the dealer is informed of the originator of the tip. In this way, the player sending the tip can receive his due appreciation from the dealer. A screen at a game table may provide a message indicating who provided the tip. For example, the screen may display a message for the dealer saying, "John Brown just gave you a $5 tip." In some embodiments, the dealer may view a picture of the player providing the tip. In this way, the dealer may be able to see visually who among the players standing near the table provided the tip. In various embodiments, a dealer may receive a message saying that a tip came from a mobile device player in the area. For example, the message might say, "a mobile device player in the area has just given you a tip of $1".

In various embodiments, a player may participate in a game via a remote device or terminal. A player may participate via a fixed terminal containing a display screen, processor, memory and communication device, for example. A player may also participate via a mobile device. In various embodiments, a remote terminal can play a game on behalf of the player. In various embodiments, a remote device may make game decisions on behalf of the player. Such game decisions may include decisions of whether to hit or stand in blackjack and decisions on which cards to draw in a game of video poker. In various embodiments, a remote device may make decisions as to how much to bet. Decisions about amounts to bet may include decisions about how much to bet at the start of a game, decisions about whether or not to add to a bet (e.g., decisions about whether to double down in a game of blackjack) and decisions about how much to bet during the course of a game (e.g., during the course of a game of poker).

The player at the remote terminal may authorize the remote device to make decision in a game on his behalf. The player may, for example, type in his initials to indicate that he is authorizing the terminal to make game decisions on his behalf. The player may specify constraints or parameters for the decisions. For example, the player may specify an amount of a bet to be made on any given game, a maximum amount of a bet to be made on any given game, a total number of games to be played, and so on. In some embodiments, a player may authorize the remote device to make bets on games until the player has won or lost a certain amount. For example, the player may authorize the device to continue betting on behalf of the player until the player has either doubled his current bankroll (e.g., an amount the player has on deposit with the casino) or until the player has lost half of his bankroll. In various embodiments, the player may specify a strategy to be used in a game. For example, the player may specify what action should be taken in a game of blackjack should the player have 10 points and should the dealer have a three face up. In some embodiments, the player may select from two or more pre-defined strategies. For example, a player may tell indicate that he wishes to use a predefined "risky" strategy or a predefined "conservative" strategy. In some embodiments, the player may authorize the terminal to play according to an optimal strategy and/or to play according to a strategy that maximizes a parameter, such as an expected amount to be won from a game.

A player at a remote terminal may specify various rules for betting. Rules for betting may include one or more of the following; (a) the terminal is to bet a fixed amount on every game (e.g., $2 on every game); (b) the terminal is to bet an amount on a given game which depends on the result (e.g., win, lose) of the prior game; (c) the terminal is to bet an amount which doubles after every loss, but which is $1 after every win; (d) the terminal is to bet until X amount in total is won; (e) the terminal is to bet until X amount in total is lost; (f) the terminal is always to bet the maximum possible amount; (g) the terminal is to bet X pay-lines (e.g., in a slot machine game); and so on. Rules for betting may further include a number of games to play at once (e.g., 3 games are to be played at once; an amount of time to wait between playing games, and so on. If the player at the remote terminal is a secondary player, rules for the terminal to follow may include rules detailing the way primary players will be selected. Rules for selecting primary players may include rules for selecting primary players based on demographic information; rules for selecting primary players based on the games being played by the primary players; rules for selecting primary players based on historical outcomes of the players; rules for selecting primary players based on amounts being wagered by the primary players; rules for selecting primary players based on a strategy being used by the primary players, and so on.

In various embodiments, a mobile device may allow a player to participate in a nearby game (e.g., as a secondary player), or to play in a nearby game as a primary player. A mobile device may also allow a player to view statistics about a nearby game, such as who is playing, how many hands have been won by players at the table in the last hour, how many hands have been won by dealers in the last hour, how much money in tips the dealer has received in the last 15 minutes, what the combined gross winnings are for the table over the last hour, and so on.

A mobile device may indicate to a player which games are nearby and/or which games are available for the player to play in or participate in. The mobile device may provide a list of available games for the player to play or participate in. For example, the mobile device may display the following text: "$25 Blackjack game with four primary players; $10 blackjack game with 6 primary players; $5 roulette table with 5 primary players; $1 Monopoly Slot Machine; $0.25 Video Poker Machine . . . " Thus, the player holding the mobile device may be able to choose one of the list tables or gaming devices so that he may participate in the games at such tables or gaming devices. Once the secondary player has chosen a game or table, he may also be able to choose a particular primary player in whose games to participate. For example, after the player has chosen a table, the mobile device may provide a list of the names of primary players at that table along with one or more data points or statistics about the primary players (e.g., net winnings in the last hour; e.g., age). The player with the mobile device may then get a chance to choose a primary player in whose game to participate. In various embodiments, a player with a mobile device may also view a list of games where he can play as a primary player. For example, a list may read, "$10 Craps Table, one spot open; $5 Blackjack Table, 3 spots open . . . ." In various embodiments, if there are games or tables nearby but no available spots, the player with the mobile device may have the opportunity to join a waiting list to either player in a game or participate in a game. A player may then have the opportunity to periodically view his place on the waiting list, e.g., by clicking on a "view waiting list" button on his mobile device.

A list of nearby games or tables may be presented in various formats to a player holding a mobile device. Some formats of the list may include text, such as text descriptions of the various games. Some formats of the list may include visual representations of a game, of a primary player at the game, of a dealer, or of any other aspect of a game. For example, a mobile device may present to a player holding a mobile device a list consisting of a set of pictures of dealers. The dealers shown in the pictures may be the very dealers who are currently working at nearby games available for the player's participation. A mobile device may present a list of games by presenting: (a) pictures of dealers; (b) pictures of primary players at the games; (c) pictures of the games themselves (e.g., pictures of gaming tables taken from overhead; e.g., pictures of gaming devices); (d) pictures of games in progress (e.g., pictures of hands laid out after each primary player has received cards in a game of blackjack); (e) avatars or other simulated depictions of dealers or primary players; (f) simulate depictions of games; (g) pictures of game indicia; (h) simulated representations of game indicia; or any other visual representation of a game, or any other visual representation of an aspect of a game, or any other visual representation. In various embodiments, a list of nearby games may include video feeds from the games. For example, a list may include a series of small windows or icons. Inside the windows may be playing video feed from the action at the games represented. For example, a first window may contain a miniature video feed from a first blackjack table which is near to the mobile device. A second window may contain a second miniature video feed from a second blackjack table which is near to the mobile device. A third window may contain a third miniature video feed from a slot machine that is near to the mobile device. Windows may also include simulated renditions of games. A player holding a mobile device may have the opportunity to click on any of the windows and to join or participate in the game shown in the window.

In various embodiments, when a player with a mobile device participates in a game at a nearby table or game, the player may get a video feed showing the action at the table. The video feed may come from a camera which is over the table and looking down upon the table, for example. The player may also watch on his mobile device a simulated reenactment of the action that transpires at the table. A player holding a mobile device may also watch on the device a video feed of a gaming device (e.g., a slot machine) in whose games he is participating. A player holding a mobile device may also play as a primary player in a game at a table, such as in a game of a nearby table. The player may similarly view video feeds of the action at the table, and/or may view simulated renditions of the action at the table. A player holding a mobile device may, in various embodiments, see text description of the action in games in which he is playing or participating. For example, the mobile device may display, "Your primary player just got a Jack of Spades and 5 of hearts, for a starting hand of 15 . . . "

In various embodiments, a player holding a mobile device may link to a nearby table or gaming device. The player may play games which are based on the games of the nearby table or gaming device. However, the player's games may not necessarily be based on the final outcomes which occur at the nearby table or gaming device. Rather, the player's games may utilize intermediate outcomes or other random or non-random occurrences from the games at the table or gaming device. For example, the numbers rolled on a pair of dice at a nearby craps table may be used as a random number to select a roulette outcome for the player with the mobile device. As another example, a random number generated at a nearby slot machine may be used to generate a different outcome on the mobile device from the outcome ultimately generated at the slot machine. Thus, a player may utilize some information from nearby games, but may ultimately play a unique game himself.

Random Generators

In various embodiments, a card shoe may automatically deal cards. In various embodiments, a card show may automatically deal cards that are face up so that the cards are visible to a camera that is located above the cards. In various embodiments, cards may be placed into a card shoe face-up. In this way, the cards may be automatically dealt face-up. In various embodiments, a card shoe may show cards without expelling the cards from the shoe. The card shoe may, for example, maintain two internal stacks of cards. Cards may be transferred from the first stack to the second stack, each card shown through a viewing window of the shoe as it is transferred. Once the first stack is depleted, the second stack may be shuffled and put in the place of the first stack. The card from the newly shuffled first stack may then be transferred once again to the place of the second stack. In this way cards may be repeatedly shuffled and dealt without the necessity of a human gathering up expelled cards and placing them back into the shoe. As will be appreciated, many other card shoes may be used. Any card shoe capable of automatically dealing cards may be used, for example. Further, a card shoe may be used in conjunction with any device which can make cards visible to a camera, e.g., by flipping cards over once dealt. A card shoe may be used in conjunction with a card reader. Cards may contain special markings, such as bar codes or other patterns which are machine readable and which serve to identify the rank and suit of the cards. Cards may contain RFID tags which offers signals that identify the rank and suit of the cards.

In various embodiments, a card shoe may deal or reveal cards with variable speed. For example, a card shoe may be capable of dealing cards at a rate between 5 cards per second and 1 card every 3 seconds. The card shoe may include controls which allow a human and/or a computer to increase or to decrease the rate at which cards are dealt. In various embodiments, a card shoe may be slowed down if the card shoe is generating cards for a game with a relatively slow pace. For example, a card shoe may be slowed down when a game using the cards is a high stakes baccarat game. A card shoe may be sped up when a game using the cards is a game of blackjack with many experienced players.

In various embodiments, the cards dealt by a card shoe may serve as a basis for the play of one or more games. For example, a remote player may be involved in a game of video poker. The cards used in the game of video poker may first be dealt from the cards shoes. The rank and suit of the cards dealt may be captured, e.g., by an overhead camera. Depictions of the cards may then be recreated at a remote terminal of the player.

In various embodiments, a card shoe may be under manual control. For example, a human or computer may indicate to the card shoe when to deal a new card. In this way, a new card may be dealt only when necessary in a game. For example, if a player is using the cards dealt from a card shoe for a game of video poker then the remote terminal of the player may instruct the card shoe to deal new cards only when the player has indicated which cards to discard from an initial hand. The cards dealt from the shoe may then be used as replacement cards for the cards discarded. Further, the shoe may be instructed only to deal as many cards as are needed to replace the cards being discarded by the player.

In various embodiments, a card shoe may deal cards at a constant rate. In various embodiments, a card shoe may deal cards according to a set schedule. The card shoe may, for example, deal one card every second. Any player and/or any game may be welcome to access the cards dealt from the card shoe. For example, a player at a remote terminal may require 10 cards for a game of blackjack. The terminal may then retrieve data about the next 10 cards dealt from a card shoe. The data about the cards may then be used to recreate images of the cards, to deal representations of cards, and to determine whether the player won in the game of blackjack or not.

In various embodiments, data about cards dealt from a card shoe may be stored. The data may be stored at a casino server, at a remote terminal conducting games for players, or at any other location. When data about cards are needed for a game, the data may be retrieved. Data may be retrieved about cards that had been dealt in the past, such as 10 minutes prior to a game being conducted, such as 1 day prior to a game being conducted, or such as a year prior to a game being conducted.

Cards dealt from a card shoe may be read in various ways. Image processing algorithms may recognize the characteristic card patterns or images. For example, an image processing algorithm may be used to count the number of pips on a card and/or to determine the suit of the card from the shape of the pips. For example, optical character recognition technology may be used to discern the rank of a card based on a letter or numeral printed on the card. In various embodiments, a card may include a bar code or other pattern. A laser may be used to read the bar code. A card may contain an RFID chip or other signaling device for communicating the identity of the card.

In various embodiments, a live human dealer may deal cards. The dealer may deal cards for a live game at a casino. In various embodiments, a dealer may simply deal cards. There may be no live players, e.g., primary players, near the dealer. However, the cards dealt by the dealer may be used as the basis for other games, such as for remote games. Accordingly, in some embodiments, a human dealer may deal cards face up. The cards may be read by a camera or other device. In some embodiments, the dealer may key in the identities of the cards. The cards may then be used in the games of remote players.

In some embodiments, multiple card shoes, live human dealers, or other card dealing entities may deal cards. In some embodiments, a first remote game may use cards from a first card shoe and a second remote game may use cards form a second card shoe. In some embodiments, a first remote game may use cards from two or more card shoes. For example, a remote game may use three cards dealt from a first shoe and two cards dealt from a second shoe in order to create an initial hand of poker. It will be appreciate that the use of cards from multiple shoes may result in the possibility of different outcomes. For example, if cards are used from a single shoe containing only one deck in a game of poker, hands with five-of-a-kind may not be possible. However, if cards are used from two different shoes, then a five-of-a-kind hand may be possible even if both shoes are only dealing a single deck of cards.

In some embodiments, a game and/or a player may use cards in alternating fashion from two shoes. For example, a game may use the first, third, and fifth cards dealt from a first shoe, and a second and fourth cards dealt from a second shoe. In various embodiments, a single game may use cards from any number of shoes, such as from five different shoes. In various embodiments, a the same card may be used in two different games. For example, a card dealt from a shoe may be used in a remote game of blackjack and in a remote game of video poker. In various embodiments, a card dealt from a shoe may be used in a first game of blackjack and in a second game of blackjack. In various embodiments, historical data about cards dealt from a shoe or about cards dealt by a human dealer may be recorded. The historical data may be made available for viewing, for searching, for analysis, or for any other use by a player. A player may select a shoe to use for a game. For example, a player may view data about the last 100 cards dealt at each of two shoes. The player may decide that the second shoe is the luckier shoe because it has dealt cards that have lead more often to player wins in a game of blackjack.

In various embodiments, a card shoe may deal to a certain penetration and no more. For example, a card shoe may contain 312 cards. However, following a shuffle, the card may deal less than the full 312 cards in the shoe. This may prevent a player from counting cards. For example, a card shoe with 312 cards may only deal 100 of the cards before reshuffling. In some embodiments, a card shoe may continuously shuffle cards. For example, following the deal of a set of cards, each card may be randomly inserted into the remainder of the deck. For example, following each deal, the entire deck of cards may be reshuffled.

In various embodiments, a card shoe or other card dealing device may have an associated applications programming interface (API). The API may include various commands that may be given by remote terminals to the shuffler. There may be commands for dealing a new card, for shuffling, for increasing the dealing speed, and for decreasing the dealing speed, among other commands. In various embodiments, an API may define the way in which a card shoe will communicate to a remote terminal which cards have been dealt. For example, the API may allow a remote terminal to understand a particular sequence of data as the ace of spades.

In various embodiments, one or more APIs may define the communication between a card shoe and a casino server. The casino server may, in turn, relay information about cards dealt to a terminal which is conducting a game for a player. In various embodiments, one or more APIs may define the communication between a server and a terminal. The APIs may define commands by which the terminal can request a card from the server, can request an increase in dealing speed, can request a decrease in dealing speed, or can make any other command or request.

Various games employ the use of dice. Examples include craps and Sic Bo. In various embodiments, machines may be used to roll dice automatically. A reader may determine the results of the dice rolls. For example, an image may capture the rolls of the dice and may determine what number has been rolled on each die. Data about what number has been rolled on a die or dice may be transmitted to a remote terminal. The remote terminal may conduct a game using data from the dice. For example, the remote terminal may use data about what numbers were rolled on three dice in order to allow determine the results of a game of Sic Bo played by a remote player.

In various embodiments, a basket may include one or more dice. The basked could be a cylinder, a tube, a parallelepiped, or any other enclosure, including any enclosure with two flat opposing surfaces. The basket may be transparent in one or more of its surfaces. In various embodiments, the entire basket may be transparent. In various embodiments, the basket may include two normal resting positions. In a first resting position, one of two flat opposing surfaces is parallel to the ground and is the closest surface to the ground. In a second resting position, the other of the two flat opposing surfaces is parallel to the ground and is the closest surface to the ground. As will be appreciated, in each of these two resting positions, the dice within the basket will most likely come to rest on the lower of the two flat opposing surfaces (i.e., the surface closest to the ground). When the basket has come to one of the normal resting positions, the dice within the basket may be read by a reader. Once the dice have been read, the basket may be flipped 180 degrees so that the surface that was closest to the ground is now closest to the sky, and the surface that was closest to the sky is now closest to the ground. The flipping of the basket should then cause the dice to fall to the surface that is now closest to the ground. The dice will presumably fall in a chaotic or unpredictable way so that when they land on the new bottom surface, a new set of random numbers will have been generated. In various embodiments, the basket may be controlled by a stepper motor. The stepper motor may accurately control the flipping of the basket so that, at rest, the opposing flat surfaces can be parallel to the ground. It will be appreciated that in various embodiments, other basket shapes may be used. For example, the basket may include a single surface which is always held substantially parallel to the ground. To randomize the dice, the basket may be shaken. In various embodiments, the dice contained in the basket may include RFID tags. Each face of the die may include its own RFID tag, for example, a detector located above the basket may detect which RFID tag is the closest of the six on a given die, and may thereupon determine which number has been rolled on the die, for example.

In various embodiments, a random event may be used to supply data for use in one or more games. For example, as described herein, the shuffling and dealing of cards may determine a number of random events. The results of the random events may include which cards end up being dealt. In various embodiments, the random events may generate results from a limited set of enumerated outcomes. For example, the result of the roll of a die is an outcome from the set of integers 1, 2, 3, 4, 5, and 6. For example, the result of the dealing of a card from a standard set of 52 cards is a card that with one of only 52 unique identities. In various embodiments, data describing one of a first set of enumerated outcomes may be transformed into data describing one of a second set of enumerated outcomes. In various embodiments, several outcomes from a first set may be combined to create one outcome from a second set of possible enumerated outcomes. In various embodiments, one outcome from a first set of enumerated outcomes may be decomposed into several outcomes from a second set of enumerated outcomes. For example, a first random event may be the dealing of a card. A card may be used to generate the outcomes of two dice. For example, the two of clubs may correspond to a roll of two dice where each die shows the number 1 on its top face.

In another example, three dice are rolled. The three dice are used to define the rank and suit of a card. For example, a first die is rolled. If the first die shows a one, then the card is a club. If the first die shows a two, then the card is a heart. If the first die shows a three, then the card is a diamond. If the first die shows a four, then the card is a spade. If the first die shows a five or a six, then the die is rolled again until it shows a 1 through 4. The second die is then rolled. If the second die shows a one, two, or three, then the third die is rolled. If the second die shows a four, five, or six, then the second die is rolled again. The second die is continually rolled until the second die shows a 1 through 3. If the second die shows a three and the third die shows a 2 through 6, then the second and third die are rolled again. In other words, the second die will have to be rolled again until it shows a 1 through 3. The third die will also be rolled again under the same circumstances as it had been originally. If, however, the second die shows a three and the third die shows a 1, then the rolling stops. In the end, if the second die shows a 1, then the card rank will be ace if the third die shows a 1, 2 if the third die shows a 2, 3 if the third die shows a 3, four if the third die shows a 4, five if the third die shows a 5, and six if the third dies shows a six. If second die shows a 2, then the card rank will be 7 if the third die shows a 1, 8 if the third die shows a 2, 9 if the third die shows a 3, 10 if the third die shows a 4, jack if the third die shows a 5, and queen if the third die shows a six. If the second die shows a 3 and the third die shows a 1, then the rank of the card will be king. No other dice combinations are possible since the dice would have been re-rolled if such combinations occurred.

It will be appreciated that there may be many other algorithms for transforming data describing one set of enumerated outcomes into data describing another set of enumerated outcomes. Any other such system may be used. Thus, in various embodiments, cards dealt from a shoe may be used to conduct a game of craps. Dice rolled in a basket may be used to conduct a game of video poker. Coin flips may be used to conduct a game of Sic Bo or casino war. In general, any set of outcomes may be used, either individually or in combination, to generate data describing any other set of outcomes.

Verification of Random Event Generators

In various embodiments, a player may be engaged in a game that relies upon data from random events. The random events may occur at a location separate from the location of the player. For example, the player may play a game on his mobile gaming device in New Jersey, where such game relies upon random events that occurred in Nevada. The random events may also occur at a different time from the time when the player is playing. For example, a player may play a game of video poker. The cards the player receives may be based on cards dealt three weeks ago from a card shoe in a casino warehouse. The random events may also occur in a different type of game than that being played by the player. For example, the random events may occur in a game of craps, while the player is playing a game of blackjack.

In various embodiments, a player may wish to verify the authenticity of random events which determine the outcomes and payouts of the player's game. For example, if the player repeatedly loses games, the player may come to suspect that the outcomes of his games where not generated fairly. The player may therefore wish to receive some assurance that the outcomes were, in fact, generated fairly.

In various embodiments, a player may request to see verification of an outcome, payout, and/or result of a random event. The player may use one or more input keys, buttons, or devices to request authentication. For example, an area on the touch screen of a player's mobile gaming device may include a button. The button may be labeled "authenticate", "verify game outcome", "check outcome", "view source of outcome", or other labels. The player may touch the button in order to view or otherwise receive information about the outcome, payout and/or result of his game.

In some embodiments, video may be generated depicting the manner by which random events generated the results used in the player's game. For example, when random events are used to generate results, the events may be filmed. For example, the rolling of dice may be filmed. As another example, the dealing of cards may be filmed. The film may be stored, e.g., as a digital file in a database of the casino. The film may be indexed or otherwise labeled in such a way that it is associated with a particular result or event. For example, the file name of a video file may be "Event 93048200 of Dec. 13, 2010".

In various embodiments, a player may request to see video depicting the random events which generated the results used in the player's game. The player may then be shown the video. The video may show cards being dealt, dice being rolled, roulette wheels being spun, or whatever was the source of the results that led to the outcome of the player's game. The video may be transmitted from the casino server to the player's mobile gaming device, for example. The mobile gaming device may show the video to the player on its display screen.

Variable Inputs to Outcome Generators

In various embodiments, a machine, device, or other entity that generates random outcomes may be under the control of a player. The control may be either direct or indirect. For example, a player may have the opportunity to physically spin a roulette wheel so as to generate a random roulette outcome. For example, the player may have the opportunity to physically jostle a basket with dice so as to generate a new roll of the dice. A player may exert indirect control over a machine that generates random outcomes by sending commands to the machine. Commands may be sent via a terminal, such as via a mobile device. For example, a player may press a button at a remote terminal that instructs a machine-controlled roulette wheel to spin. The remote terminal may relay the request of the player to the casino server. The casino server may, in turn, instruct the machine controlling the roulette wheel to spin the roulette wheel.

In various embodiments, a player may not only issue commands to generate an outcome, but may also issue commands as to how the outcome should be generated. The player may specify, for example, a degree of physical force that will be applied with an outcome generating device. For example, a player may specify that speed (e.g., in terms of revolutions per second) with which a roulette wheel will be spun. A player may specify that amount of time that a basket with dice will be shaken before the dice are allowed to come to rest. A player may specify the amount of time cards must be shuffled before they can be dealt. Thus, in various embodiments, a player may specify inputs that fall along a range of possible inputs. For example, the speed or the force with which a roulette wheel is spun may vary over a continuous range. The player may specify a speed or force. The player may specify a force using a dial, a mouse, or another input device which can provide a continuous range of inputs. For example, a player may use a mouse to manipulate the level of a bar on a display screen of the terminal. If the bar is at a high level, then a roulette wheel will be spun with a high initial speed. If the bar is at a low level, then the bar will be spun with a low initial speed.

In various embodiments, a player's status may determine what kind of control he is allowed to exert over an outcome generating device. For example, in various embodiments, if a player is a high-roller (e.g., if the player places more than a predetermined total amount of wagers per visit to a casino), then the player may be allowed to define a variable input into an outcome generating device. However, a player who is not a high-roller may be allowed only to tell a device whether or not to generate an outcome.

Index of Gaming Data

In various embodiments one or more statistics may be used to summarize a set of games, outcomes, player earnings, or other occurrences at a casino. The statistic may be called an index. Thus, for example, there may be a "Roulette Red Index" which summarizes the proportion of the time that roulette wheels across the casino have landed on red in a given time period. There may be a "Blackjack Index" which summarizes the proportion of times that a Blackjack has been dealt to a player across the casino. Other indexes may summarize data about: (a) the number of times a particular outcome has occurred (e.g., the number of times the a jackpot outcome has occurred); (b) the amount of money one or more players have won (e.g., the average amount of money slot machine players have won in the last hour); (c) the number of times a particular symbol has occurred (e.g., the number of times a "cherry" symbol has occurred at a bank of slot machines); (d) the number of times a particular intermediate outcome has occurred (e.g., the number of times a particular starting hand of video poker has occurred); (e) the number of times a player has achieved a certain hand (e.g., the number of times a player of Texas Hold'em has achieved a full-house; e.g., the number of times a player at blackjack has achieved a point total of 20); (f) the number of times a dealer has achieved a certain outcome (e.g., the number of times a dealer has achieved a point total of 20 in a game of blackjack); (h) the number of times a particular score has been reached in a game of sports (e.g., in a game of sports on which players can bet in a sports book); (i) the number of number of players who have won more than $100; and so on. An index may summarize data from a given time period, such as from the current day. For example, an index may summarize the proportion of times that a seven has been rolled on the first roll in craps during the current day. An index may summarize data in absolute numbers. For example, an index may describe the total number of spins at a roulette wheel that have resulted in the number 12 during the current day. Such an index may be called the "12" index, for example. An index may summarize data as a proportion. The index may indicate a ratio of the occurrence of one outcome to the occurrence of another outcome. The index may indicate the ratio of the occurrence of one outcome to a number of games played. For example, an index value of 2.7% may indicate that the number 12 has occurred in 2.7% of roulette spins during the current day.

In various embodiments, an index may summarize data from a particular area of a casino. For example, an index may summarize player winnings from the first floor of a casino, or from a particular bank of slot machines. An index may summarize data from a particular type of machine. An index may summarize data from slot machines. An index may summarize data from video poker machines. An index may summarize data from table games. An index may summarize data from progressive slot machines. An index may summarize data from video slot machines.

In various embodiments, an index may include a weighting of certain events, games, or outcomes over others. An outcome may be weighted depending on the number of bets that have been placed on it. For example, if the number 17 occurs at a roulette wheel with 5 people playing, the "17" index may increase by 5 times as much as does the "8" index when it occurs at another roulette wheel at which only one person is betting. In various embodiments, game or outcome may be weighted in the index based on the size of the wager placed on the game or index. For example, if a person bets $100 and receives a blackjack, a "blackjack" index may go up by 10 times as much as it would when a person places a $10 bet and receives a blackjack. A game or outcome may also be weighted according to the size of one or more payouts that are possible in the game. For example, an outcome at a game which has a jackpot of $10,000 may receive twice the weighting as does an outcome which has a jackpot of $5,000.

In various embodiments, there may be an index associated with a particular player. For example, a primary player may have an index. A secondary player may decide whether or not to participate in the games of the primary player based on the level of the index.

In some embodiments, there may be an index for a group of players. For example, there may be an index for all players within a certain age range, for all people from a certain geographic location, for all people of a certain gender, for all people that prefer a particular type of game (e.g., blackjack), and so on. In some embodiments, there may be an index for groups of players based on their amounts wagered. For example, a "large cap" index may summarize statistics about players who bet $25 or more per game. A "small cap" index may summarize statistics about all other players.

Improved Odds and Commission

In various embodiments, a player may be given improved payout odds on a game in return for paying a fixed commission. For example, in a game of roulette, a player who has bet $1 on a winning number might typically receive his $1 back plus an additional $35. In some embodiments, the payout for achieving a winning number in a game of roulette might increase to $37. In this way, a player could expect to lose $1 with probability 37/38, and to make $37 with probability 1/38, assuming an American roulette wheel with 38 spaces on it. The player would thus have expected winnings and expected losses of 0, making the bet a bet with true odds. However, in general, a casino may wish to maintain a house advantage on a bet so as to generate profits for the casino. Accordingly, the casino may offer a payout of $37 when the player wins, but may charge the player a $2 commission whenever the player wins. Thus, the casino may maintain a house advantage by charging a commission even though the bet was made at true odds.

Thus, in various embodiments, a player may place a bet with true odds. In other words, a player may place a bet such that his expectation from the game is zero. However, for one or more outcomes, the player may owe a commission to the casino. The commission may be deducted from the amount paid in a winning outcome.

In various embodiments, a player may make a bet with a positive expectation. In other words, the player may make a bet such that the player has an advantage, i.e., such that the player can expect to win, on average, more than the amount of his bet. However, the house may profit from the game by charging a commission to play the game. The commission may exceed the amount that the player might expect to profit from the game. For example, a player may make a $1 bet in a game in which the player can expect to win $1.05, on average. Thus, the player has an advantage in the game. However, the casino may charge the player a $0.10 commission to play the game. Thus, accounting for the commission, the casino will still be able to profit from the game, on average.

In some embodiments, a player may make a bet in a game in which the player is guaranteed to win back more than the amount of his bet. For example, if the player places a bet of $1, the player may be guaranteed to win back at least $1.05, for a net profit of $0.05. However, the player may be charged a commission for the game. For example, the commission may be equal to $1.05. The commission may serve to make the game profitable for the casino when the commission is taken into account.

Displaying Data

Any data generated or gathered at a casino or from any other source may be displayed to one or more players. The data may also be displayed for viewing by one or more casino representatives. Data may also be communicated in other ways, such as through announcements over a public address system, or such as over radio waves. As described herein, the data displayed may include data about historical outcomes, summary statistics, data about the performance of one or more players, data about the performance of one or more gaming devices, data about the performances of one or more dealers, data about the size of one or more jackpots, data about data trends, data about one or more outcomes, data about one or more historical outcomes, and so on.

Data may be displayed in a number of areas. Data may be displayed: (a) on the display screens of gaming devices (e.g., on the display screens of gaming devices that are not currently in use); (b) on wall-mounted monitors; (c) on electronic signs; (d) on walls, ceilings, or other services via projection displays; (e) on the screens of terminals at which secondary players participate in games; (f) on the screens of mobile devices; (g) on the televisions screens of hotel-room televisions; (h) on display screens inside elevators; and so on. Data or representations of data (e.g., graphs, tables, etc.) may be printed on paper or other materials, and may be distributed or otherwise made available. Data may be printed on restaurant menus. For example, a restaurant menu may feature the name of the primary player who won the most consecutive games of blackjack during the day. Data may be posted on signs located above gaming devices. For example, a sign above a gaming device may indicate that the gaming device has paid out more than $2000 in the past 24 hours. Data may be displayed on signs located above banks of gaming devices. For example, above a bank of gaming devices, a sign may indicate the name of the player who has had the best record of winnings at the bank of gaming devices within the past 24 hours.

In various embodiments, data gathered or recorded may be made available on a network, such as on the Internet. A person may access the data by going to a particular address on the network, such as to a particular Uniform Resource Locator (URL) address. The address may contain data viewable in a particular format, such as in HTML format. The data may be accessible by an Internet browser, such as via Internet Explorer®. In various embodiments, data may be accessible through various links. Each link may lead to a different address on the network. A given link may provide access to data of a certain type. For example, a given link may lead to data about individual players' performances. Another link might provide access to data about the performances of gaming devices. Another link might provide access to data about the performance of a dealer. In various embodiments, a first link might lead to data gathered at a first casino (e.g., data about games at the first casino) and a second link might lead to data gathered at a second casino.

In various embodiments, a casino that is associated with a hotel might transmit gaming data over one or more television channels. For example, a channel on a cable television system might be devoted to providing or displaying casino data. In some embodiments, a first channel might be devoted to a first type of data, a second channel to a second type of data, and so on. For example, a first channel might display data about the outcomes generated at a set of blackjack tables. A second channel might display data bout the outcomes generated at a set of roulette tables.

In various embodiments, data may be displayed with a certain prominence if the data is of a certain level of significance. For example, a casino may contain a large sign in a central location that is widely visible throughout the casino. The sign may be used to display only the most significant data. For example, the sign may display the last ten people to have won more than $1000. The casino may contain further signs in less prominent locations. For example a digital sign may be visible only in the general area of a particular bank of slot machines. The sign may display the names of the last ten players to win more than $100 at the bank of slot machines. Thus, in various embodiments, data may be displayed at a particular location if the data has been gathered in the vicinity, such as at nearby gaming devices or table games.

In various embodiments, deductions or conclusions based on data may be displayed. For example, suppose that during the last 15 minutes, blackjack players across a casino have won 60% of the blackjack games played. The deduction may be made that blackjack players in general are on a hot streak. Thus, a message may be displayed (e.g., on a sign; e.g., on the screen of a mobile device; e.g., on the screen of a terminal) that blackjack players are hot. Examples of other messages include, "Dealer Joe Smith is dealing great hands tonight", "Sue Baker is having the night of her life", "Red is the in color at roulette", "Billy Bob just won a doozy of a jackpot at slots", "Sue Smith is going home rich tonight", and so on.

In various embodiments, data may be printed on pamphlets, receipts, or other paper document or material. A player or other person may desire a certain type of data. For example, a player may wish to have a record of his own outcomes for a period of time. For example, a player may wish to have a record of all the hands of video poker he has been dealt throughout the day. Accordingly, the player may request such a record. For example, the player might go to a casino cage and provide identification (e.g., in the form of a player tracking card). The casino cage may access data stored about the player on the casino server. The casino may then print out data about the player's outcomes from the day. The casino may then provide the player with the records. In various embodiments, a first person might wish to have a record of data about one or more other people. For example, the person might want a pamphlet showing the results of the top 100 players at the casino for the day. The pamphlet might show a name or alias of each of the 100 people together with an amount won by each person. In various embodiments, a person might want a record about a particular machine, a particular dealer, a particular sector of a casino, a particular gaming table, or a particular group of people. The record may contain data about the requested people, device, or entity, such data including outcomes achieved, winnings, losses, number of games won in a row, number of games lost in a row, strategy used, and so on.

In various embodiments, an alert may be generated based on events or outcomes that occur in a game or at a casino. For example, a secondary player may wish to be alerted when any primary player has won more than 5 games in a row at a slot machine. Accordingly, the casino server, the device of the secondary player (e.g., a mobile gaming device), or any other device, may track data as it is received (e.g., from gaming devices). The casino server may process the data and determine whether alert criteria have been met. For example, the casino server may determine whether a win for a primary player constitutes a fifth consecutive win by examining data from the most recent game of the primary player plus data from the four prior games of the primary player. If all of the games were winning games for the primary player, then the casino server may generate an alert for the secondary player. An alert may take the form of a message transmitted to a secondary player. For example, a text message may pop up on the screen of a mobile gaming device of the secondary player. An alert may also be displayed or broadcast for a wider audience. For example, an alert may be broadcast on an electronic sign hanging in a casino. An alert may also be broadcast over radio or other channel for audio broadcasts.

Trends

In various embodiments, a trend may comprise a set of games or outcomes that have a common characteristic and which occur proximate in time and/or which occur consecutively. Common characteristics of outcomes may include: (a) the outcomes are all the same; (b) the outcomes have one or more common symbols; (c) the outcomes have the same associated payout; (d) the outcomes have a positive associated payout; (d) the outcome all have a payout above a certain level (e.g., above 10 units); (e) the outcomes all lead to bonus rounds; (f) the outcomes are all losing outcomes; (g) the outcomes are all winning outcomes; (h) the outcomes are all near-misses; and so on. Common characteristics of games may include: (a) the games have the same outcome; (b) the games have the same payout; (c) the games have a common intermediate outcome (e.g., games of video poker all start out with three cards to a flush); (d) the games all have winning payouts; (e) the games all have losing payouts; (f) the games each contain multiple winning outcomes; (g) the games all reached bonus rounds; (h) the games were all near-misses, and so on.

In various embodiments, a player may bet that a trend will continue. A player may bet that an outcome which will be generated in the future will share a common characteristic with a set of outcomes that had been generated in the past. For example, a player may bet that the same outcome which has occurred in the last five games at a craps table (e.g., the pass line has won) will occur in the sixth game. For example, a player may bet that a point total that a dealer has achieved in the last 5 games of blackjack (e.g., a point total of 18) will be achieved by a dealer in the next game of blackjack. In various embodiments, a player may bet that a trend will continue for a particular length of time. For example, a player may bet that a trend will continue for three more games. A player may bet on the exact number of games for which a trend will continue. For example, a player may bet that a trend will continue for the next two games before the trend is broken. A player may bet on a minimum number of games for which a trend will continue. For example, a player may bet that a trend will continue for a minimum of the next five games. A player may also bet on the maximum number of games that a trend will continue. For example, a player may bet that a trend will continue for no more than 3 games. In various embodiments, a player may bet that a trend will not continue. The player may bet that an outcome which will be generated in the future will not share a common characteristic with a set of outcomes that had been generated in the past.

In various embodiments, a player may bet on the continuance or discontinuance of a trend that had occurred in the past. For example, a secondary player may find a series of consecutive games of roulette played by a primary player in which the outcome was red for 10 consecutive games. The secondary player may not be informed of the results of the game following the 10 consecutive games of red. However, the results of the $11^{th}$ game may be on record (e.g., in a memory of the casino server). The secondary player may then place a bet on the continuance of the trend. For example, the secondary player may place a bet that the $11^{th}$ game also resulted in a red outcome. For example, the secondary player may place a bet that the next five games also resulted in a red outcome. The secondary player may also bet on the discontinuance of the trend. For example, the secondary player may bet that the $11^{th}$ game would not result in a red outcome.

In various embodiments, a trend may describe a number of consecutive wins or a number of consecutive losses. The consecutive wins or losses may represent those of a player, those of a dealer, those of a particular gaming device and/or those of a particular type of game. For example, a statistic may describe the number of consecutive games that have been won at a particular slot machine, regardless of who has played those games. For example, a statistic may describe the number of consecutive games that a dealer has won at a blackjack table. A player, such as a secondary player, may bet on the continuance or the discontinuance of a trend of consecutive winnings and losses. For example, a secondary player may bet that a primary player who has just lost 10 games in a row will lose the $11^{th}$ game in a row. For example, a secondary player may bet that a craps game will end up with the pass-line bet losing even though the pass-line bet has won for the past 10 games.

In various embodiments, a trend may describe a regular pattern of characteristics among a series of outcomes. The pattern of characteristics need not be such that each outcome has the same characteristic. Rather, the pattern may indicate a regularly varying set of characteristics. For example, a trend may consist of a series of outcomes at a roulette wheel such that every second outcome is a red outcome, and every outcome between red outcomes is a black outcome. In other words, the trend represents a pattern whereby after each red outcome a black outcome occurs, and after each black outcome a red outcome occurs. A player, such as a secondary player, may bet on the continuance of such a trend. For example, if the most recent outcome has been a red outcome, then the player may bet that the next outcome will be a black outcome. A player may bet that such a trend will continue for multiple outcomes. For example, a player may bet that outcomes will alternate between red and black for the next 10 consecutive outcomes.

In various embodiments, a trend may include any pattern. A player may bet on the continuance or discontinuance of any pattern. The player may bet that a pattern will continue for any number of games in the future, or that the pattern will discontinue at a designated point in the future. A payout provided to a player who has bet correctly may depend on the nature of the pattern and on the number of games or outcomes into the future that the player has bet the pattern will continue. For example, a winning player who has bet that a pattern will continue relatively far into the future may receive a higher payout than does a player who has bet that a pattern will continue one or only a few games into the future. For example, if each outcome that would continue a pattern is a relatively rare outcome (e.g., the player has bet that a pattern of green outcomes occurring will continue at a roulette wheel), then the player may receive a larger payout than does a player who bets on the continuation of a pattern with relatively common outcomes (e.g., a pattern of blackjack games where the dealer wins).

In various embodiments, a secondary player may bet on a trend or pattern in the winnings of a primary player. For example, a secondary player may bet that a primary player will have positive net winnings for each of the next four five-minute periods. The primary player may have achieved positive net winnings for the prior 10 five-minute periods, or the secondary player may simply be betting on a new trend occurring. In various embodiments, a secondary player may bet on a trend in a primary player's balance or bankroll. For example, a secondary player may bet that a primary player's bankroll will increase in every ten minute period for the next hour. In various embodiments, a secondary player may bet on a see-saw trend in the winnings or in the bankroll of a primary player. For example, a secondary player may bet that the bankroll of a primary player will increase in the next five-minute period, decrease in the following five-minute period, then increase in the following five-minute period, and so on. In various embodiments, a secondary player may bet that the bankroll of a primary player (or the bankroll of another secondary player) will reach certain points, one after the other. There may, however, be no particular designated time period when the bankroll has to reach the points. For example, a secondary player may bet that the bankroll of a primary player will reach 100, then will reach 50, then will reach 150, then will reach 25, then will reach 155, and so on. The secondary player may win if the primary player's bankroll reaches those points in order. However, the secondary player may lose his bet if the bankroll of the primary player reaches the points out of order. For example, the secondary player may lose his bet if the primary player's bankroll reaches 155 before it reaches 25. Embodiments described herein with respect to a bankroll may also apply to a balance at a gaming device, to an amount of chips at a gaming table, to an amount of net winnings, and so on. For example, a secondary player may bet that the net winnings of a primary player will reach a first point, followed by a second point, followed by a third point, and so on.

Sports

In various embodiments, data may be gathered for sports. For example, data may include a sports score, a number of yards rushed by a particular player in a game of football, a number of runs hit by a particular baseball player, a number of aces served by a tennis player, a number under par achieved by a golf player, and so on. Data may be aggregated over various games. For example, the total runs hit by any player in major league baseball during a particular day may be added up and may define the value of a statistic. A secondary player may bet on values of the statistic. Other exemplary data may include the number of punches connected in a boxing match, the number or three-pointers shot in a game of basketball, the number of collisions in a car race, and so on.

Secondary Player Chooses a Characteristic of a Game

In various embodiments, a secondary player may designate a category for a game of a primary player in which to participate, such that a game falling into the category has certain characteristics. The game may be a game with a certain beginning state. The game may be a game for which certain resolutions have occurred for events in the game. In some embodiments, a secondary player may designate a particular starting hand or category of starting hand in a game of video poker. For example, a secondary player may designate a hand that includes three cards of the same rank. Accordingly, the casino server may search for a game of a primary player which has featured a starting hand with three cards of the same rank. In some embodiments, the secondary player may designate a particular starting point total in a game of blackjack. Accordingly, the casino server may search for a game of a primary player which has featured a starting hand with the particular starting point total. For example, a secondary player may designate a particular dealer up-card in a game of blackjack. Accordingly, the casino server may search for a game of a primary player in which the designated dealer up-card has been dealt. In some embodiments, a secondary player may designate a category of game at a slot machine in which a "cherry" symbol has occurred on the first reel of the slot machine. Accordingly, the casino server may search for a game of a primary player in which a "cherry" symbol has occurred on the first reel of the slot machine. In various embodiments, a secondary player may place a constraint on games in which he wishes to participate. The casino server may then find one or more games for the secondary player meeting such constraints. In some embodiments, the secondary player may place a constraint such that the primary player has won at least X amount in the game. In some embodiments, the secondary player may place a constraint on the game such that the primary player has received a particular card in the game. As will be appreciated, many other constraints may be placed on the game.

Adjusting Game Rules for a Game that has been Chosen for a Particular Characteristic In various embodiments, a category of game that a secondary player has designated may have an increased likelihood of ending with a particular outcome than does a game chosen purely at random. In various embodiments, a category of game that a secondary player has designated may have an increased likelihood of ending with a particular outcome than does a game started from scratch. For example, if a secondary player indicates a desire to participate in a slot machine game where the first symbol is "cherry", then the secondary player may be more likely to finish the game with a winning outcome than he would be had he participated in a game started from scratch. For example, if a secondary player indicates a desire to participate in a video poker game where the initial hand contains three cards of the same rank, then the secondary player is guaranteed, if he so desires, to finish the game with three-of-a-kind.

Thus, in various embodiments, when a secondary player has the opportunity to participate in a certain category of game designated by the secondary player, the secondary player may derive an increased advantage in the game, all else being equal. For example, the secondary player may assure that he will participate in a winning game by designating a category of game that will always be winning. In various embodiments, the house may alter a game chosen according to a secondary player's designation in such a way as to increase the house advantage in the game. The house may alter the game in such a way as to provide the house with an equal or approximately equal advantage to what the house would have had if a game had been started from scratch. For example, if the house normally has an advantage of 5% in a slot machine game, and a secondary player chooses to play a particular game in which a "cherry" symbol will occur on the first reel, then the house may alter the probabilities of various subsequent symbols, payouts associated with one or more outcomes, or required bet amounts in such a way as to maintain the house advantage for the game near 5%.

In some embodiments, a secondary player may choose a constraint on a game. For example, a secondary player may apply a constraint on a game such that the game must be a game of blackjack in which the initial hand has a point total of 11. The house may make an alteration to the game such that the probabilities of various outcomes of the games shift in the favor of the house. For example, in the aforementioned example of a blackjack game in which the initial primary player hand has a point total of 11, the house may alter the remaining portion of the deck of cards by removing all ten-valued cards. This may shift the advantage towards the house (though not necessarily make the house the favorite) because it would lessen the player's chance of achieving 21 points and would also lessen the dealer's chance of busting. Thus, the house may have made an alteration to the game that decreases the player's chance of achieving a particular outcome or category of outcome. At the same time, the alteration may increase the player's chance of achieving a particular outcome or category of outcome (e.g., a hand with less than a 21 point total). In various embodiments, the house may make an alteration to a game in order to increase or decrease the probability of one or more outcomes. In various embodiments, the house may alter a probability directly (e.g., by changing probabilities used in a random number generator used to create game outcomes), or may make an alteration which has the effect of altering a probability of an outcome (e.g., the house adds or removes cards from a deck of cards which has the effect of changing the probability of an outcome).

In some embodiments, a payout associated with an outcome may change. For example, suppose a secondary player indicates a desire to participate in a game in which the point total for the primary player's initial hand was 11. In response, the house may reduce the payout associated with a player win. Rather than paying $10, for example, a winning outcome may only pay $10.

In some embodiments, a required bet amount may change. For example, suppose a secondary player wishes to participate in a slot machine game in which the first two symbols are "bell" symbols. Rather than requiring the secondary player to bet $1, as might be typical for the game, the house may require the secondary player to bet $5. Meanwhile, the payouts may not change vis-à-vis a game in which the secondary player set no particular constraint.

In some embodiments, a rule of the game may change. For example, a secondary player wishes to participate in a game of blackjack in which the dealer begins with a point total of 13. A rule may change which allows the dealer to make any decision at any time, including hitting with an 18 if a player has a 19. By changing a rule of a game, the house may effectively alter the probabilities of one or more outcomes.

In some embodiments, a payout ratio may change. For example, a particular outcome may pay 5 to 1 given a constraint imposed by a secondary player, whereas ordinarily the same outcome might pay 20 to 1.

In various embodiments, changes made to rules, probabilities, payouts, and payout ratios may favor the player. For example, the secondary player may apply a constraint to a game which is unfavorable to the secondary player. For example, the secondary player may indicate a desire to participate in a game of blackjack where he begins with a point total of 15, with no aces. Such a starting hand is considered a bad hand and significantly lowers the secondary player's chances of winning. Accordingly, for example, a payout associated with a player win may be increased so as to compensate the secondary player for the disadvantageous starting hand.

In various embodiments, a secondary player may indicate desired odds for achieving one or more outcomes in a game. In various embodiments, a secondary player may indicate desired odds for achieving any of a set of outcomes, such as desired odds for achieving any winning outcome. For example, a secondary player may indicate that he wants his odds of achieving a winning outcome to be 1:2, i.e., he wishes to achieve one winning outcome for every two losing outcomes, on average. The casino may accordingly select a set of games of a primary player such that within the set of games, there is one winning game for every two losing games. The casino may then randomly select a game from among the set of games and allow the secondary player to participate in the selected game. In various embodiments, the casino may adjust or determine a payout of an outcome of a game in response to the secondary player selecting the odds for an outcome of the game. Note that the payout adjustment need not necessarily occur for the same outcome for which the secondary player has selected odds. For example, the secondary player may indicate desired odds for a first outcome and the casino may adjust the payout for a second outcome. In various embodiments, the casino may adjust the payout for one or more outcomes so as to counteract the advantage that the secondary player may obtain from selecting the odds of an outcome. For example, if the secondary player indicates desired odds for achieving an outcome, where such odds are greater than the standard or typical odds of achieving such outcome, then the casino may reduce a payout for one or more outcomes from what the typical payout would be. If a secondary player indicates desired odds for an outcome, where such odds work to the secondary player's disadvantage (e.g., the secondary player has indicated desired odds for a winning outcome that are less than the typical odds for the winning outcome) then the casino may change a payout associated with one or more outcomes in the secondary player's favor, e.g., the casino may increase one or more payouts. In some embodiments, the casino may adjust one or more payouts so as to maintain a constant or near constant house advantage. For example, the casino may change payouts so as to assure that the house advantage after adjustments in the odds of an outcome and in payouts is nearly the same as the house advantage was before the adjustments in odds and payouts. In some embodiments, if the secondary player indicates a desire for increased odds of a first outcome, then the casino may decrease the odds of a second outcome. For example, the casino may find a set of games of a primary player in which the first outcome occurs more than usual, but in which the second outcome occurs less than usual. The casino may then select a game at random from the set of games so as to allow the secondary player to participate. It will be appreciated that in the embodiments described herein, the secondary player could just as readily indicate a desired probability for one or more outcomes instead of indicating desired odds. It will be appreciated that a simple mathematical transformation can transform odds into probabilities, and vice versa.

In various embodiments, a secondary player may indicate desired payout for an outcome. For example, the secondary player may indicate a desire for a payout that is greater than the payout ordinarily associated with the outcome. Accordingly, the casino may adjust the probability of the outcome occurring. For example, the casino may reduce the probability of the outcome occurring. In various embodiments, the casino may reduce the probability of an outcome by selecting a pool of games of one or more primary players in which the outcome has occurred less frequently than would ordinarily be expected. The casino may then select a game at random from among the pool of games and allow the secondary player to participate in the selected game. In various embodiments, the casino may adjust the probability of an outcome that is different from the outcome whose payout the secondary player has asked to be adjusted. For example, the secondary player may indicate that he wishes to increase the payout for a first outcome. The casino may then adjust the probability of a second outcome. The second outcome may be a winning outcome. In various embodiments, the casino may make an adjustment to the probability of occurrence of one or more outcomes so as to counteract adjustments made to payouts in the secondary player's favor. In various embodiments, the casino seeks to maintain the same or nearly the same house advantage before and after any adjustments made by the secondary player and the house. For example, if a house advantage is ordinarily 5% for a game, then the house may seek to counteract any adjustments made to payouts by the secondary player so as to maintain the house advantage for the game at 5%.

In various embodiments, a secondary player may set a payout, a probability, and/or odds using a dial. The dial may allow the secondary player to adjust a setting along a continuum or near continuum by turning the dial to the appropriate degree. The secondary player might also use a scroll bar, a mouse, an arrow key, or any other input device in order to indicate a setting. In response to the secondary player adjusting a first setting, the house may adjust a second setting so as, for example, to maintain a constant house advantage. The house may adjust a setting for a probability by selecting an appropriate pool of games of a primary player such that a frequency of occurrence of one or more outcomes is equal to a desired frequency. The house may adjust a payout by simply providing a different payout than is typical in the event of the occurrence of a particular outcome.

In various embodiments, the house may change the odds of one or more outcomes by altering the composition of a deck of cards. For example, the house may add or remove cards from a deck of cards. In some embodiments, a secondary player may designate a particular category of starting hand of a game. For example, in a game of blackjack, a secondary player may indicate a desire to start with a point total of 18. The house may adjust the composition of the unused portion of the deck in response. For example, the house may add cards with rank three to the deck in order to lessen the dealer's chances of busting.

In some embodiments, a secondary player may indicate a desired starting hand for both the secondary player and for the dealer. For example, the secondary player may indicate a starting point total for the secondary player and the secondary player may indicate a particular up-card for the dealer. In some embodiments, the secondary player may indicate a starting hand for the secondary player and a complete starting hand for the dealer. In some embodiments, the secondary player may indicate a starting hand plus an additional card for the secondary player. For example, the secondary player may indicate a starting hand with two nines plus an additional card of a 10 (e.g., after the secondary has split his initial two cards). In some embodiments, a secondary player may indicate a starting hand for the dealer plus an additional card. In some embodiments, a secondary player may indicate any sequence of initial cards for the primary player and/or any sequence of initial cards for the dealer. The secondary player may specify a point total, a number of cards, the ranks of cards, particular cards (e.g., both rank and suit) and so on. For any indications provided by the secondary player, the casino may search for a game of a primary player that suits the indications. For example, if the secondary player has indicated a desire to participate in a game where a primary player has a starting point total of 18, then the house may search for a game of a primary player with the starting point total of 18.

Records of Performance

In various embodiments, a viewable record may be created for a primary player. The record may include historical performance metrics for the primary player. The record may constitute a profit and loss statement for the primary player. The record may include an indication of an amount won by the primary player over a certain period of time. The record may include an indication of an amount lost by the primary player over a certain period of time. The record may include an indication of a total amount wagered by the primary player over a certain period of time. The time period covered by the record may be: (a) a particular hour; (b) a particular day; (c) a particular week; (d) a particular weekend; (e) the duration of a primary player's stay at a casino; (f) the duration of a primary player's play session at a casino; (g) the duration of a primary player's session at a particular gaming device; and so on. The record may include a breakdown of performance metrics into various categories. The record may show performance metrics by time period, by wager amount, by gaming device, by dealer, by casino, by type of gaming device (e.g., reel slot machine versus video slot machine), or by any other category. For example, the record may include a first set of data describing the primary player's winnings at blackjack during the last day, a second set of data describing the primary player's winnings at video poker during the last day, a third set of data describing the primary player's winnings at roulette during the last day, and so on. In some embodiments, the record may include a listing of individual games played by a primary player (e.g., all games played by the primary player). The listing may include data associated with each game, including an amount wagered, an amount won, an amount lost, an outcome received, a time of the game, a decision made, an initial hand received in the game, a final hand received in the game, an action by a dealer, a hand of an opponent, a decision of an opponent, an amount raised, and so on. The listing may segregate games into different categories. For example, data about all games played at a slot machine may be listed together, while data about all games played at a table game may be listed together.

The record for a primary player may be viewable by the primary player. For example, the primary player may be able to call up a view of the record on the screen of any gaming device, any terminal, any mobile device, any Internet connected device, and so on. The record may be printable, for example, onto a cashless gaming ticket. In some embodiments, the record for a primary player may be viewable by a secondary player. For example, the secondary player may search for the name of a primary player and then view the record for the primary player.

In various embodiments, a primary player may specify limits. The limits may be visible in the record of the primary player. A limit may include a stop limit. The limit may force or encourage the primary player to stop playing if certain criteria are met. For example, the limit may encourage the primary player to stop playing if he has lost $100. In various embodiments, an alert may be sent to a primary player once performance metrics of the primary player meet certain criteria. For example, an alert might be sent to the primary player once the primary player has accumulated winnings of $500.

The alert may tell the primary player that he wanted to stop playing once his winnings reached $500.

In some embodiments, a secondary player may receive an alert based on the performance of a primary player. For example, the secondary player may receive an alert when a primary player has won 10 games in a row, when a primary player has lost 10 games in a row, when a primary player's fortunes have swung back and forth three times between winnings and losses, and/or when any other condition has been met. In various embodiments, a secondary player may specify an alert condition. The secondary player may then be alerted if the alert condition is met. For example, once a primary player satisfies an alert condition, the secondary player may be alerted that the primary player has satisfied the secondary player's alert condition. The secondary player may then be given the opportunity to participate in the next game of the primary player. A secondary player may be alerted if a primary player has just won a large payout, if the primary player has won a designated number of large payouts in a particular period of time, if the primary player has won more than a certain amount in the prior hour, and so on. A secondary player may be alerted if a primary player has lost more than a certain amount in the last hour, if the secondary player has had more than 90% of his outcomes be losing outcomes in the last 30 minutes, if the primary player has just had a near miss, and so on.

Data from One Game Used in Another

Various embodiments describe the use of data in a gaming context, such as in the context of casino gaming, mobile gaming, charity bingo, or on-line gaming. In various embodiments, data generated in a first game may be used in a second game. For example, a set of data may be generated in a first game. The set of data may be used to determine an outcome of the first game. The same set of data may also be used to determine an outcome of a second game. For example, in a game of blackjack, 14 cards may be dealt. Data indicating the ranks and suits of the 14 cards may be recorded. Such data may later be used to conduct a game of video poker. In conducting the game of video poker, data about a first 5 of the 14 cards may be presented to a player, leaving 9 cards remaining. The player may select 3 discards, after which data about 3 replacement cards may be presented to the player from the data about the 9 cards remaining. In various embodiments, data in a first game may be generated through physical means. Generation of data through physical means may include generating data through a process that is not solely based on the manipulation of electrons and photons. The generation of data through physical means may include the generating an outcome at a roulette wheel, the dealing of one or more cards from a deck of cards, the rolling of a die, or any other physical or partly physical process. The generation of data through physical means may include the generation of a roulette outcome through the manual spinning of a roulette wheel, e.g., by a casino employee. The generation of data through physical means may include the generation of a roulette outcome through the automatic spinning of a roulette wheel, e.g., by computer controlled motors. The generation of data through physical means may include the rolling of dice by a human, such as a craps player. The generation of data through physical means may include the rolling of dice automatically, e.g., through the motorized spinning of a transparent enclosure containing dice.

In various embodiments, the outcomes and/or the resolutions of events in a first game may be used as inputs for generating outcomes and resolutions of events in a second game. For example, the outcomes and/or resolutions of events in a first game may serve as random numbers for use in an algorithm for generating outcomes and/or resolutions in a second game. In some embodiments, the outcomes and/or resolutions of events in a first game may be directly used as outcomes or resolutions in a second game (e.g., without any further transformations). In various embodiments, a first game may include a game of a player or a game that has been conducted automatically (e.g., without participation by any player). In various embodiments, a first game may include a game where outcomes or resolutions have been generated through physical processes (e.g., as opposed to electronic processes). For example, the first game may include outcomes or resolutions that have been generated through a roll of dice, through a spin of a roulette wheel, through the dealing of cards, or through any other physical process.

Readers

Data may be recorded from a first game in various ways. In some embodiments, a human may manually enter data from a game. For example, a casino employee may use a key board to key in the numbers 4 and 3, representing the numbers rolled on two dice in a game of craps. In some embodiments, a sensor or reader may detect and record data from a game. A roulette reader may detect and record the spaces in which a roulette ball has landed following a spin of a roulette wheel. An exemplary roulette sensing apparatus is described in U.S. Pat. No. 4,396,193 to Reinhardt, et al., entitled "Roulette wheel directional sensing apparatus". U.S. Pat. No. 4,396,193 is hereby incorporated by reference. A card shoe may be equipped with sensors and/or algorithms for reading cards dealt from the shoe and determining data about the cards, such as rank and suit. An exemplary such card shoe is described in U.S. Pat. No. 7,029,009 to Grauzer, et al., entitled "Playing card dealing shoe with automated internal card feeding and card reading". U.S. Pat. No. 7,029,009 is hereby incorporated by reference. In various embodiments, a camera may capture images of a game being played. Data may be extracted from such images, including data about cards dealt, data about rolls of dice, and data about a number generated at a roulette wheel. Such data may be extracted using image processing algorithms, for example. U.S. Pat. No. 4,531,187 to Uhland, entitled "Game monitoring apparatus" describes a "means for optically monitoring the cards played" in a game. U.S. Pat. No. 4,531,187 is hereby incorporated by reference.

Camera

In various embodiments, a camera may record footage of a first game being played. For example, a camera may record footage of dice being rolled, of cards being dealt, of a roulette wheel being spun, and so on. In various embodiments, the footage may be stored. In various embodiments, the footage may be stored in association with one or more tags or other data, including a date during which the filmed game was played, a time during which the game was played, a game identifier, an identifier for a player in the game (e.g., a player's name), an identifier for a dealer in the game, a location of the game, a casino in which the game was played, an indication of the type of game being played (e.g., blackjack; e.g.; craps), and so on. Subsequent to the video footage being recorded, a player involved in a second game may indicate a desire to see the video footage. The player in the second game may be involved in a game that uses data from the game depicted in the video footage. For example, the player involved in the second game may be involved in a game of video poker that uses the same cards originally dealt in a game of blackjack. The player may desire to see film footage of the game of blackjack. The player may desire to see the film footage so as to verify that the cards dealt in the game of blackjack, which are the same cards now being used in his own game, were dealt fairly. Any tags stored in association with the video footage may aid the house or casino in retrieving the video footage upon a player's request. For example, data used in a second game may be tagged with an identifier of a first game. A player in the second game may request to see video footage of how that data was generated in the first game. Accordingly, a casino may search for video footage that is stored in association with the identifier. Any such video footage may then be retrieved and shown to the player in the second game.

Skins

In various embodiments, data generated in a first game may be used in a second game. One or more algorithms may be used to transform the data from the first game into data suitable for use in the second game. For example, data from a first game may include number in a first range. Data suitable for use in a second game may include numbers in a second range. Accordingly, for example, data from the first range may be mapped to the second range using a mathematical transformation, such as multiplication or division by a constant. For example, data from a first game may include data about cards dealt in the first game (e.g., the first game is game of blackjack). Such data may take the form of numbers, where the numbers 1 through 52 each represent a different card in a standard deck of 52 cards. Data required for the second game may include numerical data in the range of 1 to 6, since the second game may be a dice game (e.g., craps). Accordingly, data from the range of 1 to 52 may be mapped to data in the range of 1 to 6. The mapping may occur as follows. It will be appreciated that many other mappings are possible. A number from 1 to 52 is completely discarded if the number is 49, 50, 51, or 52. If a number is discarded, a second number is then used (e.g., a number representing a different card that was dealt in the first game). If a number is not discarded, the number is divided by eight and the result is rounded up to the nearest integer. Thus, the number 1 will map to the number 1, the number 2 will map to the number 1, the number 8 will map to the number 1, the number 9 will map to the number 2, the number 17 will map to the number 3, and the number 48 will map to the number 6. A mapping has thus been accomplished from a game of cards to a game of dice. Two or more cards may be used from the game of cards (more than two cards may be needed if one of the cards is represented by a number greater than 48) to conduct a roll of dice in a game of craps.

Once data suitable for use in the second game is obtained, an appropriate skin may be used with the second game. The skin may include graphics and play patterns that make the second game more familiar to the player of the second game. For example, once data has been generated which includes numbers between 1 and 6, the casino (or a device of the casino, such as a gaming device) may be used to graphically render the generation of outcomes that corresponds to the data. For example, if numbers 3 and 6 have been generated as data suitable for a second game, the casino may show graphical depictions of the numbers 3 and 6 being rolled on a pair of dice. Thus, the player may engage in a game of craps.

Note that in various embodiments, data used in a second game may be based on data that has been derived from a first game which was played in the past. Thus, the outcome of the second game may be pre-determined, in some sense. However, since the player of the second game may not be familiar with the first game, or since the player may not be familiar with the algorithm used to transform data from the first game into data used in the second game, the player may be unable to take advantage of advanced knowledge of the outcome of the second game.

In various embodiments, data generated in a first game may be used in a second game that is played on a gaming device. The gaming device may be a slot machine, video poker machine, video bingo machine, mobile gaming device (e.g., a mobile gaming device as defined by Nevada bill AB 471), and so on. In various embodiments, data generated in a first game may be used in a second game that is played over a network. Data generated in a first game may be used in Internet gaming, such as in conducting a second game at an on-line casino. Similarly, video footage from the first game may be available for a player who participates in the second game at the on-line casino. By viewing the video footage, the player may become more confident that the data being used in the second game was generated fairly.

Auditing the Data Generated in the First Game

In various embodiments, data generated at a first game or a first series of games may be tested or audited to provide verification that the data is fair. In various embodiments, a test may be performed to verify that the data conforms to some statistical distribution. The statistical distribution may be a distribution that is generally thought to govern in the one or more random processes used to generate the data. For example, a set of data may include data about 10,000 outcomes generated at one of a group of roulette wheels, each roulette wheel having 38 spaces. An applicable statistical distribution may predict that each possible outcome of the roulette wheel would occur approximately once every 38 outcomes, or approximately 263 times out of the data set of 10,000 outcomes. Thus, a test of the data about the 10,000 outcomes might test that each of the 38 possible outcomes of a roulette wheel occurred approximately 263 times out of the 10,000 outcomes. The tests may allow for some deviation. For example, it may be considered acceptable for an outcome to occur from 213 to 313 times. However, if an outcome occurs a number of times that is not between 213 and 313, then the data may be considered suspicious. Data may be required to pass one or more tests, such as tests of statistical distribution, before the data will be permitted to be used in a second game.

Hands as Entry into a Jackpot

Everyone Bets on One Side or the Other

In various embodiments, a single game may allow the participation of two or more secondary players. In various embodiments, the single game may allow the participation of players across an entire casino. The single game may be prominently featured or publicized. For example, the progress of the game may be shown on prominent display screens or monitors throughout a casino. The game may be played on an elevated stage or platform that is visible to many. In various embodiments, the game may allow participation by secondary players in real time. For example, a secondary player may place a bet on the game, the game may occur, and then the secondary player may be paid based on the outcome of the game and the bet of the secondary player. In various embodiments, the game may be played by a primary player. In various embodiments, the game may be played by a primary dealer and the house, or a representative of the casino. For example, the game may include a primary player and a dealer. In various embodiments, the game may be generated electronically. The game may be a game played on a gaming device by a primary player. The game may be played entirely electronically.

In various embodiments, a given secondary player may place a bet that the primary player will win. In various embodiments, the secondary player may place a bet that the house will win. Among all secondary players placing bets on the game, some may bet on the primary player and some may bet on the house. In various embodiments, secondary players may bet on other events as well. For example, secondary players may bet that particular cards will fall, that a particular point total will be achieved, that a particular roll of dice will occur and so. The featured game may be any suitable game, such as blackjack, craps, baccarat, roulette, video poker, or any other suitable game.

In various embodiments, a game may allow the participation of a small group of players. For example, a game may allow the participation of eight secondary players. The secondary players may all be players at one gaming table, in one area of a casino, in one restaurant, or may all be grouped together in some other way. One of the group of players may play the featured game. The other players may then act as secondary players and participate in the featured game. In various embodiments, the player who plays the feature game may rotate amongst the group of players.

Bet on Particular Cards

In various embodiments, a secondary player may bet on a particular events that will occur in a game. The secondary player may bet that a particular roll of the dice will occur, or that the dealer will bust in a game of blackjack.

In various embodiments, a secondary player may bet on particular cards that will occur in the featured game. For example, a secondary player may bet that an ace of spades and a king of hearts will be dealt in the featured game. If the ace of spades and king of hearts do appear in the game, the secondary player may win a significant multiple of his bet, e.g., ten times his bet. The amount that a secondary player wins may be based on the probability with which the resolution of the events the player is betting on is likely to occur. For example, if the secondary player bets on an event resolution with a small probability of occurrence, the secondary player may stand to win relatively more. In various embodiments, the amount that a secondary player stands to win may depend on the specificity with which he specifies the event resolutions of a featured game. For example, a secondary player may stand to win more if he correctly specifies ranks and suits of a set of cards in a featured game than if he simply specifies ranks.

In various embodiments, a secondary player may bet that a particular card will be dealt in the featured game. In various embodiments, a secondary player may bet on a particular combination of cards that will be dealt in the featured game. In various embodiments, a secondary player may bet on an order with which cards will be dealt. For example, a secondary player may bet that an ace will be dealt first, followed by a ten, followed by a queen. In various embodiments, a secondary player may bet on cards that will occur in a player hand. In various embodiments, a secondary player may bet on cards that will occur in a dealer hand. In various embodiments, a secondary player may bet on a first set of cards that will occur in a player hand and on a second set of cards that will occur in a dealer hand. For example, a secondary player may bet that a player will receive a jack of diamonds and a nine of hearts and that a dealer will receive a seven of clubs, two of hearts, and queen of clubs.

In various embodiments, a secondary player may specify each card that will be dealt in the featured game. The secondary player may win only if each specified card is dealt.

In various embodiments, a secondary player may participate in his own game as a primary player. At the same time, the secondary player may bet on the featured game as a secondary player. One or more events that occur in the secondary player's own game may serve to specify the secondary player's bet on the featured game. For example, the secondary player may play a game of blackjack where he receives the ace of spades and the ten of hearts. By receiving such cards, the secondary player may automatically be betting that the primary player in the featured game will also receive the ace of spades and the ten of hearts. Thus, the secondary player's own hand may serve as a specification of a bet placed in a game played by a different player (i.e., the primary player). A hand, a set of cards, a roll of the dice, or any other event in which a secondary participates (e.g., as a primary player) may serve as an entry, ticket, or bet into another game (e.g., into a featured game).

Pari-Mutuel Betting

In various embodiments, betting on a featured game may be pari-mutuel. The house may take a percentage of all bets placed. The pool of bets may then be given to the player or players who have correctly specified the resolution an event in the featured game. For example, the pool of all bets may go to the player who correctly specifies the most cards that are dealt in the featured game. For tied players, the pool may be divided equally and/or in proportion to the bets placed by the tied players.

Progressive Betting

In various embodiments, betting on a featured game may be progressive. All or a portion of bets placed by secondary players may go into a pool. The pool may be won by any secondary player who correctly specifies the resolution of one or more events in the featured game. For example, a secondary player may win the pool for correctly specifying each card that is dealt to the primary player and each card that is dealt to the dealer in a game of blackjack. If there is not a winner of the pool, then the pool may carry over to the next game.

In various embodiments, a secondary player may win a portion of the pool for correctly specifying the resolution of some events but not others, or for being off by a small amount from correctly specifying event resolutions. For example, if a secondary player correctly specifies all but one of the cards dealt in a game, the secondary player may win 10% of all bets placed on the game. As another example, if a secondary player correctly specifies all the suits of the cards dealt but not all the ranks, then the secondary player may win 5% of the pool. As another example, if the secondary player correctly specifies all but one card, and specifies the correct rank but incorrect suit on the remaining card, then the player may win 20% of the pool.

In various embodiments, where there is a progressive pool, a secondary player's own game (e.g., a game in which the secondary player serves as a primary player) may serve to determine the secondary player's entry into the featured game.

Fixed Odds Game

In various embodiments, a bet made by a secondary player in a featured game may be made according to fixed odds. For example, the secondary player may bet that certain events will transpire in the primary game, and may receive a fixed payout based on those events. The secondary player receive different levels of fixed payouts depending on how close the secondary player came to specifying the events that transpired in the featured game.

Player in the Spotlight

The featured game may be a game in which an ordinary casino patron is playing. A particular primary player may play the featured game for some number of games. Then, another primary player may play in the featured game. In various embodiments, a primary player need not make any special efforts to be in the featured game. Instead, for example, a cameraman may travel around a casino, alternately filming different primary players involved in games. The game of the primary player currently being filmed may be the featured game.

Featured Game on a Mobile Device

In various embodiments, the featured game may be presented on a mobile gaming device. For example, a secondary player may watch the progress and the events of the featured game on his mobile gaming device. The secondary player may also place bets on the featured game using his mobile gaming device. In various embodiments, the featured game may be presented on any device, including on a gaming device. For example, a secondary player may watch the featured game on a display screen of a slot machine. The secondary player may even place bets on the featured game using the slot machine interface.

Bet on any Game

In various embodiments, a secondary player may bet on events within any particular game, including betting on the outcome of any particular game. The secondary player need not be restricted to betting only on a prominently featured game. The secondary player may, for example, decide that he would like to bet on a particular primary player of blackjack who is currently playing at a blackjack table within a casino. The secondary player may then specify, for example, one or more cards that will be dealt in that game. If the secondary player is correct then the secondary player may win a payout.

In various embodiments, a secondary player may bet on an event or events (including an outcome) within a plurality of games. The secondary player may thus stand to win any of the plurality of games has an event resolution that was correctly specified by the secondary player. For example, the secondary player may bet that any player at a blackjack table will get two aces as his first two cards in the next game of blackjack. The secondary player may then win money if any of the players at the blackjack table does in fact get two aces as his first two cards in the next game of blackjack. In various embodiments, the secondary player may win a payout that is based on the number of games in which his specified resolutions actually occurred. In the aforementioned example, the secondary player may win a first amount if the event resolution he specified occurred in one game, and may win a second amount if the event resolution he specified occurred in two games. The second amount may be greater than the first amount. The secondary player may win a special jackpot if the event resolution he specified occurred in all games. In various embodiments, the payout received by a secondary player for specifying an event resolution in a plurality of games may depend on the number of games. If the event specified by the secondary player occurs in one of five games the secondary player may win more than if the event had occurred in one of 25 games.

Specify Event Resolutions that may Apply in Multiple Games

In various embodiments, a secondary player may specify one or more event resolutions, or an outcome. The secondary player may specify, for example, a set of cards that may be dealt, a set of numbers that may be rolled on dice, a number that will arise in roulette, and so on. The event resolutions specified by the secondary player may then apply in a plurality of featured games. For example, the event resolutions may apply in a series of consecutive featured games.

As an example, a secondary player may specify that a primary player in blackjack will receive the two of hearts, ten of clubs and nine of diamonds. The secondary player may further specify that the dealer will receive an ace of spades and a king of spades. The secondary player may then win a prize if the specified cards are dealt to the specified parties (i.e., player and dealer) in any of the next 100 featured games of blackjack.

In various embodiments, the secondary player may be required to make a bet for every featured game in which he participates as a secondary player (e.g., for every game in which he is eligible to win a payout or jackpot). In various embodiments, the secondary player may receive free entry as a secondary player into the featured game so long as the secondary player also is playing in his own game (e.g., in the capacity of a primary player). Where the secondary player receives free entry, a portion of his wager in the secondary player's own game may be used to fund the prize pool or payout in the featured game.

For example, 1 cent may come from every secondary player's bet in his/her own game and contribute towards the prize pool of the featured game. The prize pool may build up as a progressive prize until it is won by one of the secondary players.

Specifying the Outcome of Event Resolutions

A secondary player may specify the outcome of event resolutions in various ways. In various embodiments, the secondary player may himself choose particular resolutions. For example, the secondary player may choose particular cards that he thinks will be dealt in the featured game. For example, the secondary player may choose particular numbers that he thinks will be rolled in a featured craps game. In various embodiments, the secondary player does not himself choose an event resolution or outcome. Rather, an event resolution in the secondary player's own game (e.g., a game in which the secondary player is serving as a primary player) may determine what event resolution or outcome in the featured game wins for the secondary player. In various embodiments, an event resolution or outcome in the featured game must match an event resolution or outcome in the secondary player's own game in order for the secondary player to win a payout or prize from the featured game. For example, the secondary player may be playing a game of blackjack (as a primary player). At the same time, the secondary player may place a $1 bet on a featured game of blackjack. The secondary player may win a $10,000 payout if every card dealt in the featured game matches, by rank and suit, every card dealt in the game of the secondary player.

In various embodiments, a secondary player describes the configuration of a game (e.g., of a hand). The description by the secondary player may include a description of what the primary player will have and a description of what the dealer will have. Following the secondary player's description of a configuration, there may be some period of time, or some number of plays during which games are monitored. The games monitored may be featured games or any suitable games within a casino or even outside the casino. The secondary player may win if any of the monitored games then matches the description originally set forth by the secondary player. If the secondary player wins, the secondary player may win a progressive prize.

The following is a list of embodiments, not claims. Various embodiments include:

A. A method comprising:
  receiving a first bet;
  receiving a first description of a first set of cards;
  receiving a second description of a second set of cards;
  determining a third description of a third set of cards that are dealt to a first player in a first game;
    determining a fourth description of a fourth set of cards that
      are dealt to a first dealer in the first game; and providing a payout based on the first bet if the third description of the third set of cards matches first description of the first set of cards and if the fourth description of the fourth set of cards matches the second description of the second set of cards.

B. The method of embodiment A in which the first description includes a description of the rank and suit of each of the first set of cards.

C. The method of embodiment B in which providing a payout includes providing a payout based on the first bet if the third description of the third set of cards includes a description of the rank and suit of each of the first set of cards and if the fourth description of the fourth set of cards matches the second description of the second set of cards.

D. The method of embodiment A in which the first game is a game of blackjack.

E. The method of embodiment A, further including:
receiving a second bet;
receiving a fifth description of a fifth set of cards;
receiving a sixth description of a sixth set of cards; and
providing a payout based on the second bet if the third description of the third set of cards matches the fifth description of the fifth set of cards and if the fourth description of the sixth set of cards matches the sixth description of the sixth set of cards.

F. The method of embodiment A in which the first set of cards is dealt to a second player in a second game, and in which the second set of cards is dealt to a dealer in the second game.

G. The method of embodiment A further including:
receiving a second bet;
determining a fifth description of a fifth set of cards that are dealt to a second player in a second game;
determining a sixth description of a sixth set of cards that are dealt to a second dealer in the second game; and
providing a payout based on the second bet if the fifth description of the fifth set of cards matches first description of the first set of cards and if the sixth description of the sixth set of cards matches the second description of the second set of cards.

H. The method of embodiment A in which the first bet, the first description, and the second description are all received from a second player, and in which the step of providing includes:
providing a payout to the second player based on the first bet if the third description of the third set of cards matches first description of the first set of cards and if the fourth description of the fourth set of cards matches the second description of the second set of cards.

I. A method comprising:
initializing a progressive prize pool at a first value;
receiving a first bet from a first player;
setting the progressive prize pool at a second value which is based on the first value and the first bet;
receiving from the first player a first description of a first set of cards;
receiving a second bet from a second player;
setting the progressive prize pool at a third value which is based on the second value and the second bet;
receiving from the second player a second description of a second set of cards;
determining a third description of a third set of cards that are dealt in a first game;
providing the progressive prize pool to the first player if the third description of the third set of cards matches the first description of the first set of cards; and
providing the progressive prize pool to the second player if the third description of the third set of cards matches the second description of the second set of cards.

J. The method of embodiment I further including:
receiving a third bet from a third player;
setting the progressive prize pool at a fourth value which is based on the third value and the third bet;
receiving from the third player a fourth description of a fourth set of cards;
determining a fifth description of a fifth set of cards that are dealt in a second game; and
providing the progressive prize pool to the third player if the fourth description of the fourth set of cards matches the fifth description of the fifth set of cards.

K. A method comprising:
receiving from a first player a first description of a first set of cards;
determining a second description of a second set of cards that are dealt in a first game played by a second player;
determining a third description of a third set of cards that are dealt in a second game played by a third player; and
providing a payout to the first player if the first description of the first set of cards matches either the second description of the second set of cards or the third description of the third set of cards.

L. The method of embodiment K in which the second game is played after the first game.

M. The method of embodiment K in which the third player is the same as the second player.

N. The method of embodiment K further including:
receiving an indication that the first player participates in a third game at about the same time that the first game is played; and
receiving an indication that the first player participates in a fourth game at about the same time that the second game is played.

O. The method of embodiment K in which the third game is different from the first game, and in which the fourth game is different from the second game.

When a Player is Near a Dealer, the Dealer is Told. The Dealer can Greet the Player by Name.

In various embodiments, when a player comes near a dealer, the dealer may be told. In various embodiments, when a player comes within a predetermined range of the dealer, the dealer may be told. A predetermined range may be, for example, 5 feet, 10 feet, 20 feet, or any other predetermined range. In various embodiments, a dealer may be told of a player's proximity in various ways. A screen at the dealer's table may display a message for the dealer indicating that the player is near. In various embodiments, a dealer may wear headphones which receive an electronic (e.g., wireless) audio feed from a casino server or from a casino employee. When a player arrives near the dealer, the dealer may be told via a voice in his headphones. For example, a voice message may say to the dealer, "John Smith has just arrived to your right. He is a 65-year-old male. Say 'hi' to him." In various embodiments, the player's presence near the dealer may be detected in various ways. The player may be carrying a mobile device, for example.

When a player is near to a dealer, the dealer may take various actions. The dealer may greet the player, such as by name. The dealer may ask the player whether the player would like to join the table for a game. The dealer may ask the player whether he would like to link to the table using his mobile device. The player would then, for example, be able to participate in a game at the table as a secondary player, or to play as a primary player without sitting down. The dealer may offer the player a special incentive to play. For example, the dealer may offer two extra comp points per dollar wagered for the first hour if the player sits down. The dealer may mention other events in the player's life. For example, the dealer may congratulate the player on a large payout he received recently, on a recent birthday, on a recent move to another state, or on anything else about which the dealer (or the casino) may have information. A dealer may be trained to interact with a player in a particular way (e.g., to greet the player by name). In various embodiments, a dealer may be prompted in real time or near real time as to what to day to a player. For example, a message may appear on a screen at the dealer's table telling the dealer to congratulate the player on getting married recently. In various embodiments, a dealer may be provided with general information about a player. It may then be left to the dealer to improvise a greeting or other conversation with the player.

In various embodiments, a game table, gaming device, or other object may be programmed or configured to greet a player or otherwise interact with a player as the player walks by. For example, when a player comes within ten feet of a gaming table, a voice may be broadcast from a speaker on the gaming table. The voice may say, "won't you come sit and play for a while, Mr. Smith?" A gaming table or other object may say various things to a player, including referring to a recent event in the player's life or saying anything else.

In various embodiments, a casino employee may speak to a player via a gaming table or gaming device. A player may come within a predetermined distance of a gaming table. The gaming table may detect the presence of the player. The gaming table may then alert a remote casino representative. The remote casino representative may be sitting at a computer terminal which may be in communication with the casino server. The computer terminal may display information about the player to the casino representative. The casino representative may then begin speaking to the player using a microphone. The casino representative's voice may then be transmitted over a network (e.g., over a casino network or over the Internet) to the gaming table. The casino representative's voice may then be broadcast from a speaker at the gaming table. The gaming table may also capture voice or video from the player (e.g., using microphones or cameras), and transmit this back to the casino representative. In this way, the casino representative may have a conversation with the player. To the player, it may appear as if the table is talking to him.

The invention claimed is:

1. A method comprising:
receiving, by a processor of a computing device, an indication of a first plurality of decisions made by a first player under a first set of circumstances in a first set of wagering games in which the first player has wagered money, in which each decision includes a choice of an action from a respective set of possible actions that each have an effect on a respective outcome of a respective wagering game of the first set of wagering games;
determining, by the computing device, a first set of rules that, when followed under the first set of circumstances, generate the first plurality of decisions and would cause each game of the first set of wagering games to have the respective outcome if followed;
determining, by the computing device, a second set of rules that may be followed when making one or more decisions in a wagering game, in which the one or more decisions include one or more choices of one or more actions from a respective set of possible actions that each would have an effect on an outcome of the wagering game;
determining, by the computing device, a first performance metric for the first set of rules at a first time;
determining, by the computing device, a second performance metric for the second set of rules at the first time;
determining, by the computing device, a first ranking of the first set of rules and the second set of rules based on the first performance metric and based on the second performance metric;
presenting, by the computing device, the first ranking to a second player;
determining, by the computing device, a third performance metric for the first set of rules at a second time;
determining, by the computing device, a fourth performance metric for the second set of rules at the second time;
determining, by the computing device, a second ranking of the first set of rules and the second set of rules based on the third performance metric and based on the fourth performance metric, in which the second ranking is different from the first ranking; and
presenting, by the computing device, the second ranking to the second player
in which each performance metric of the first, second, third, and fourth performance metric indicates a respective level of success achieved from following a respective one of the first set of rules and the second set of rules.

2. The method of claim 1, in which determining a first performance metric includes:
tracking decisions made in a third set of wagering games by a first set of human players;
determining a plurality of players who have followed the first set of rules, in which the plurality of players is a subset of the first set of human players; and
determining an amount of money that the second set of players has won as a result of wagering in the third set of games.

3. The method of claim 1, in which presenting the first ranking includes:
assigning a first text identifier to the first set of rules;
assigning a second text identifier to the second set of rules; and
displaying a list that includes the first text identifier and the second text identifier, in which the list is ordered based on the ranking.

4. The method of claim 1, comprising:
receiving, by the computing device from the second player, a fourth instruction to place bets on behalf of the second player in accordance with a set of rules that is ranked the highest among a plurality of sets of rules that includes the first set of rules and the second set of rules;
placing, by the computing device at the first time and in response to determining the first ranking, a first bet on behalf of the second player that is made in accordance with the first set of rules; and
placing, by the computing device at the second time and in response to determining the second ranking, a second bet on behalf of the second player that is made in accordance with the second set of rules.

5. The method of claim 4, comprising:
determining that the first player is making decisions in another set of games that do not follow the first set of rules; and
in response to determining that the first player is making decision in another set of games that do not follow the first set of rules, ceasing to follow the first set of rules when placing bets on behalf of the second player.

6. The method of claim 4, comprising:
  determining that the first player is making decisions in another set of games that do not follow the first set of rules; and
  in response to determining that the first player is making decision in another set of games that do not follow the first set of rules, alerting the second player that the first player has changed a pattern of play.

7. The method of claim 4, comprising:
  determining that the first player is making decisions in another set of games that do not follow the first set of rules but instead follow a third set of rules; and
  in response to determining that the first player is making decision in another set of games that do not follow the first set of rules, placing a third wager on behalf of the second player that is made in accordance with the third set of rules.

8. The method of claim 1, in which determining the first performance metric includes determining a performance metric describing the performance of the first set of rules with respect to games played in the hour preceding the first time, in which the first performance metric includes a first level of success achieved from following the first set of rules during the hour.

9. The method of claim 1, comprising:
  determining, by the computing device at the first time and in response to determining the first ranking, a first bet on behalf of the second player that is made in accordance with the first set of rules;
  determining, by the computing device at the second time and in response to determining the second ranking, a second bet on behalf of the second player that is made in accordance with the second set of rules;
  receiving a second instruction from the second player to cease following the plurality of sets of rules during play of one of the second set of games;
  receiving from the second player a third instruction detailing a third decision during the one of the second set of games, in which the third decision does not follow a currently followed set of rules;
  applying the third decision to the one of the second set of games;
  in which transmitting the description of the first set of rules includes at least one of alerting the second player to the first set of rules and transmitting, to a device of the second player, computer executable instructions that when executed result in a for following of the first set of rules;
  in which the method includes:
  presenting during each of the one or more games, an opportunity to manually enter a decision during each of the one or more games rather than follow the first set of rules; and in which the second instruction is received in response to such presenting;
  determining, by the computing device, that the first player is making decisions in another set of games that do not follow the first set of rules but instead follow a third set of rules;
  in response to determining that the first player is making decision in another set of games that do not follow the first set of rules, at least one of alerting the second player that the first player has changed a pattern of play and transmitting second computer executable instructions that when executed result in a following of the third set of rules;
  providing, by the computing device, a search interface to the second player through which the second player may enter criteria that define the first, second, third, and fourth performance parameters based on criteria that the second player desires;
  receiving a request to follow a selected portion of the first set of rules from the second player but not all of the first set of rules during play of a plurality of further games; and
  following just the selected portion of the first set of rules during play of the plurality of further games on behalf of the second player;
  in which the selected portion includes rules governing a play strategy and an unselected portion includes rules governing a betting pattern;
  in which determining a first performance metric includes:
    (a) tracking decisions made in a third set of games by a first set of players,
    (b) determining a second set of players who have followed the first set of rules, in which the second set of players is a subset of the first set of players, and
    (c) determining an amount of money that the second set of players has won;
  in which presenting the first ranking includes:
    (a) assigning a first text identifier to the first set of rules,
    (b) assigning a second text identifier to the second set of rules, and
    (c) displaying a list that includes the first text identifier and the second text identifier, in which the list is ordered based on the ranking; and
  in which determining the first performance metric includes determining a performance metric describing the performance of the first set of rules with respect to games played in the hour preceding the first time, in which the first performance metric includes a first level of success achieved from following the first set of rules during the hour.

10. The method of claim 1, in which each respective level of success includes an amount of money won from playing a plurality of respective wagering games as a result of wagering in the plurality of respective wagering games.

11. The method of claim 1, comprising:
  providing a search interface to the second player through which the second player may enter criteria that define the first, second, third, and fourth performance parameters based on criteria that the second player desires.

12. An apparatus comprising:
  a computing device; and
  a non-transitory medium having stored thereon a plurality of instructions that when executed by the computing device causes the computing device:
  receive an indication of a first plurality of decisions made by a first player under a first set of circumstances in a first set of games in which the first player has wagered money, in which each decision includes a choice of an action from a respective set of possible actions that each have an effect on a respective outcome of a respective wagering game of the first set of wagering games;
  determine a first set of rules that, when followed under the first set of circumstances, generate the first plurality of decisions and would cause each game of the first set of wagering games to have the respective outcome if followed;
  determine a second set of rules that may be followed when making one or more decisions in a wagering game, in which the one or more decisions include one or more choices of one or more actions from a respective set of possible actions that each would have an effect on an outcome of the wagering game;

determine a first performance metric for the first set of rules at a first time;
determine a second performance metric for the second set of rules at the first time;
determine a first ranking of the first set of rules and the second set of rules based on the first performance metric and based on the second performance metric;
present the first ranking to a second player;
determine a third performance metric for the first set of rules at a second time;
determine a fourth performance metric for the second set of rules at the second time;
in which each performance metric of the first, second, third, and fourth performance metric indicates a respective level of success achieved from following a respective one of the first set of rules and the second set of rules;
determine a second ranking of the first set of rules and the second set of rules based on the third performance metric and based on the fourth performance metric, in which the second ranking is different from the first ranking;
present the second ranking to the second player;
receive a first instruction from the second player to place bets on behalf of the second player during a second set of games in accordance with a set of rules that is ranked the highest among a plurality of sets of rules that includes the first set of rules and the second set of rules;
generate, in response to receiving the first instruction, a second plurality of decisions in play of the second set of games on behalf of the second player;
place, at the first time in response to determining the first ranking, a first bet on behalf of the second player that is made in accordance with the first set of rules; and
place, at the second time in response to determining the second ranking, a second bet on behalf of the second player that is made in accordance with the second set of rules.

13. The apparatus of claim 12, in which the instructions cause the computing device to:
receive a request from a device of the second player for a description of the first set of rules; and
transmitting the description of the first set of rules to the device of the second player.

14. The apparatus of claim 13, in which the instructions cause the computing device to:
receive a second instruction from the second player to cease following the plurality of sets of rules during play of one of the second set of games;
receive from the second player a third instruction detailing a third decision during the one of the second set of games, in which the third decision does not follow a currently followed set of rules;
apply the third decision to the one of the second set of games; and
conduct the second set of games;
in which generating the second plurality of decisions in accordance with the first set of rules includes:
  (a) determining a bet size in accordance with the first set of rules,
  (b) determining a first outcome in a game of the set of games,
  (c) determining a course of action to take in the game in accordance with the first set of rules, and
  (d) determining a second outcome in the game based on the first outcome and based on the course of action.

15. A method comprising:
receiving, by a processor of a computing device, an indication of a first plurality of decisions made by a first player under a first set of circumstances in a first set of wagering games in which the first player has wagered money, in which each decision includes a choice of an action from a respective set of possible actions that each have an effect on a respective outcome of a respective wagering game of the first set of wagering games;
determining, by the computing device, a first set of rules that, when followed under the first set of circumstances, generate the first plurality of decisions and would cause each game of the first set of wagering games to have the respective outcome if followed;
receiving, by the computing device, a request from a device of a second player for a description of the first set of rules;
transmitting, by the computing device to a device of the second player, computer executable instructions that when executed result in a following of the first set of rules by the device of the second player during one or more games;
determining that the first player is making decisions in another set of games that do not follow the first set of rules but instead follow a third set of rules; and
in response to determining that the first player is making decision in another set of games that do not follow the first set of rules, at least one of alerting the second player that the first player has changed a pattern of play and transmitting second computer executable instructions that when executed result in a following of the third set of rules.

16. A method comprising:
receiving, by a processor of a computing device, an indication of a first plurality of decisions made by a first player under a first set of circumstances in a first set of wagering games in which the first player has wagered money, in which each decision includes a choice of an action from a respective set of possible actions that each have an effect on a respective outcome of a respective wagering game of the first set of wagering games;
determining, by the computing device, a first set of rules that, when followed under the first set of circumstances, generate the first plurality of decisions and would cause each game of the first set of wagering games to have the respective outcome if followed;
receiving, by the computing device, a request from a device of a second player for a description of the first set of rules;
transmitting, by the computing device, the description of the first set of rules to the device of the second player;
receiving, by the computing device, a request to follow a selected portion of the first set of rules from the second player but not all of the first set of rules during play of a plurality of further games in which the selected portion includes rules governing a play strategy and an unselected portion includes rules governing a betting pattern; and
following, by the computing device, just the selected portion of the first set of rules during play of the plurality of further games on behalf of the second player.

* * * * *